United States Patent [19]
Yardley et al.

[11] Patent Number: 5,341,130
[45] Date of Patent: Aug. 23, 1994

[54] DOWNWARD COMPATIBLE AGV SYSTEM AND METHODS

[75] Inventors: James V. Yardley, Centerville; Gary L. Whatcott, Holladay; John A. M. Petersen; Bryan A. Bloomfield, both of Bountiful; Vaughn W. Guest, Farmington; Rick S. Mottes, Roy; Robert K. Forman, Taylorsville; L. Bruce Christensen, Kaysville, all of Utah; Joseph Zuercher, Brookfield; Herman P. Schutten, Milwaukee, both of Wis.

[73] Assignee: Eaton-Kenway, Inc., Salt Lake City, Utah

[21] Appl. No.: 908,691

[22] Filed: Jun. 26, 1992

Related U.S. Application Data

[62] Division of Ser. No. 621,486, Dec. 3, 1990, Pat. No. 5,281,901.

[51] Int. Cl.$^5$ .............................................. G06F 15/50
[52] U.S. Cl. .......................... 340/825.06; 364/424.02; 180/168; 318/587
[58] Field of Search ................... 340/825.06; 180/168; 318/587; 364/424.02

[56] References Cited

U.S. PATENT DOCUMENTS

| | | |
|---|---|---|
| 1,799,576 | 4/1931 | Wildhaber . |
| 2,246,385 | 6/1941 | Schaper ................................. 250/40 |
| 3,009,525 | 11/1961 | De Liban ............................... 180/82 |
| 3,033,305 | 5/1962 | Harned et al. ....................... 180/79.1 |
| 3,147,817 | 9/1964 | De Liban ............................... 180/82 |
| 3,187,260 | 6/1965 | Dove .................................... 328/57 |
| 3,198,279 | 8/1965 | Quinn ................................... 180/79 |
| 3,431,996 | 3/1969 | Giles et al. ........................... 180/98 |
| 3,544,788 | 12/1970 | Guzik .................................... 246/63 |
| 3,556,244 | 1/1971 | Gray ..................................... 180/98 |
| 3,617,769 | 11/1971 | Hanson ................................. 307/229 |
| 3,628,624 | 12/1971 | Waerner ............................... 180/98 |
| 3,683,378 | 8/1972 | Polhemus ........................... 343/7 ED |
| 3,693,028 | 9/1972 | Fussell ................................. 307/235 |
| 3,734,229 | 5/1973 | Comer .................................. 180/98 |
| 3,757,887 | 11/1973 | Moore .................................. 180/98 |
| 3,773,136 | 11/1973 | Palazetti ............................... 180/98 |
| 3,849,636 | 11/1974 | Helms .............................. 235/150.27 |

(List continued on next page.)

FOREIGN PATENT DOCUMENTS 7030481  5/1985  Australia ..................... H03H 17/06

(List continued on next page.)

OTHER PUBLICATIONS

Japanese Abstract vol. 5, No. 66, Feb. 17, 1981, 56-16331.

(List continued on next page.)

Primary Examiner—Donald J. Yusko
Assistant Examiner—Michael Horabik
Attorney, Agent, or Firm—Lynn G. Foster

[57] ABSTRACT

An automated guided vehicle (AGV) control system which is downward compatible with existing guidewire systems providing both guidewire navigation and communication and autonomous navigation and guidance and wireless communication between a central controller and each vehicle. Vehicle steering and control includes autonomous guidance and navigation of the vehicle over paths marked by update markers which may be spaced well apart, such as fifty feet. The control system employs high frequency two-way data transmission and reception capability over the guidewires and via wireless communications. The same data rates and message formats are used in both guidewire and wireless communications systems. Substantially the same communications electronics are used for the central controller and each vehicle. Novel navigation and guidance algorithms are used to select and calculate a nonlinear path to each next vehicle waypoint when the vehicle is operating in the autonomous mode. The nonlinear path orginates with an initial direction equal tc the heading of the vehicle as it enters the path and a waypoint heading defined as part of the message received from the central control system which plans and controls travel of each vehicle in the system.

37 Claims, 85 Drawing Sheets

U.S. PATENT DOCUMENTS

| | | | |
|---|---|---|---|
| 4,007,382 | 2/1977 | Warberg | 307/236 |
| 4,010,409 | 3/1977 | Waites | 318/587 |
| 4,020,487 | 4/1977 | Winter | 340/347 NT |
| 4,023,753 | 5/1977 | Dobler | 246/5 |
| 4,043,418 | 8/1977 | Blakeslee | 180/98 |
| 4,083,008 | 4/1978 | Eschke | 325/163 |
| 4,088,939 | 5/1978 | Mitschke | 318/376 |
| 4,097,808 | 6/1978 | Parke | 325/51 |
| 4,127,182 | 11/1978 | Thole | 180/98 |
| 4,215,759 | 8/1980 | Diaz | 180/168 |
| 4,222,008 | 9/1980 | Mezrich | 328/28 |
| 4,247,896 | 1/1981 | Schmelbel | 364/436 |
| 4,253,541 | 3/1981 | Iida et al. | 180/168 |
| 4,258,813 | 3/1981 | Rubel | 180/168 |
| 4,260,990 | 4/1981 | Lichtblau | 343/742 |
| 4,284,160 | 8/1981 | Liban | 180/168 |
| 4,284,941 | 8/1981 | Regueiro | 318/587 |
| 4,307,329 | 12/1981 | Taylor | 318/587 |
| 4,310,789 | 1/1982 | Mank et al. | 318/587 |
| 4,322,670 | 3/1982 | Taylor | 318/587 |
| 4,333,024 | 6/1982 | Maussion | 307/351 |
| 4,361,202 | 11/1982 | Minovitch | 180/168 |
| 4,454,583 | 6/1984 | Schneiderhan et al. | 364/449 |
| 4,472,716 | 9/1984 | Hansen | 340/905 |
| 4,535,294 | 8/1985 | Ericksen et al. | 328/150 |
| 4,556,864 | 12/1985 | Roy | 340/310 A |
| 4,593,238 | 6/1986 | Yamamoto | 318/587 |
| 4,593,239 | 6/1986 | Yamamoto | 318/587 |
| 4,613,804 | 9/1986 | Swenson | 318/587 |
| 4,613,973 | 9/1986 | Dahl | 375/37 |
| 4,626,995 | 12/1986 | Lofgren et al. | 364/424.02 |
| 4,630,216 | 12/1986 | Tyler et al. | 364/478 |
| 4,658,928 | 4/1987 | Seo | 180/168 |
| 4,700,302 | 10/1987 | Arakawa et al. | 364/424 |
| 4,711,316 | 12/1987 | Katou et al. | 180/168 |
| 4,727,492 | 2/1988 | Reeve et al. | 364/424 |
| 4,731,867 | 3/1988 | Seabury | 455/41 |
| 4,742,283 | 5/1988 | Bolger et al. | 318/587 |
| 4,751,516 | 6/1988 | Lichtblau | 343/742 |
| 4,777,601 | 10/1988 | Boegli | 364/424.02 |
| 4,791,570 | 12/1988 | Sherman et al. | 364/436 |
| 4,800,978 | 1/1989 | Wasa et al. | 180/168 |
| 4,811,229 | 3/1989 | Wilson | 364/424.02 |
| 4,847,769 | 7/1989 | Reeve | 364/424.02 |
| 4,847,774 | 7/1989 | Tomikawa et al. | 364/449 |
| 4,902,948 | 2/1990 | Sherman et al. | 318/580 |
| 4,908,557 | 3/1990 | Sudare et al. | 318/587 |
| 4,939,650 | 7/1990 | Nishikawa | 364/424.02 |
| 4,939,651 | 7/1990 | Onishi | 364/424.02 |
| 4,987,540 | 1/1991 | Luke, Jr. | 364/424.02 |
| 4,993,507 | 2/1991 | Ohkura | 180/168 |
| 4,996,468 | 2/1991 | Field | 318/587 |
| 5,000,279 | 3/1991 | Konda et al. | 180/168 |
| 5,023,790 | 6/1991 | Luke, Jr. | 364/424.02 |

FOREIGN PATENT DOCUMENTS

| | | | |
|---|---|---|---|
| 50101 | 1/1981 | European Pat. Off. | G05D 1/02 |
| 077985 | 5/1983 | European Pat. Off. | G01C 21/12 |
| 108812 | 5/1984 | European Pat. Off. | H03M 1/00 |
| 124260 | 11/1984 | European Pat. Off. | H04B 3/56 |
| 193985 | 9/1986 | European Pat. Off. | G05D 1/02 |
| 206443 | 12/1986 | European Pat. Off. | |
| 2428583 | 1/1976 | Fed. Rep. of Germany | H01Q 21/12 |
| 2722222 | 3/1978 | Fed. Rep. of Germany | G05D 1/02 |
| 2801045 | 9/1978 | Fed. Rep. of Germany | G01C 21/00 |
| 2833897 | 3/1979 | Fed. Rep. of Germany | H04L 27/10 |
| 2947116 | 7/1980 | Fed. Rep. of Germany | |
| 2920181 | 11/1980 | Fed. Rep. of Germany | G05D 1/03 |
| 3136355 | 3/1983 | Fed. Rep. of Germany | G06F 15/16 |
| 2336726 | 7/1977 | France | G05D 1/00 |
| 2375579 | 7/1978 | France | G01C 19/38 |
| 2526181 | 4/1983 | France | G05D 1/02 |
| 56-118602 | 9/1981 | Japan | G01B 7/00 |
| 59-135514 | 3/1984 | Japan | G05D 1/03 |
| 61-112215 | 5/1986 | Japan | G05D 1/02 |
| 50650538 | 3/1979 | U.S.S.R. | A01B 69/04 |
| 2143395 | 5/1984 | United Kingdom | G01S 17/02 |
| 2158965 | 5/1984 | United Kingdom | G05D 1/02 |
| WO80/02013 | 10/1980 | World Int. Prop. O. | 5/00/ |

OTHER PUBLICATIONS

IBM Publ. vol. 27 No. 4A, Sep. 1984, pp. 2037–2040.

Nov. 1990 article in Material Handling Engineering entitled "AGVS: Latest Developments in Guidance Systems"; Schwind pp. 53–60.

Cyplex Literature: High Performance AGV Guidance and Communications; Jan. 1989.

Wiredriver 2 Users Guide; Cyplex; Jan. 1987.

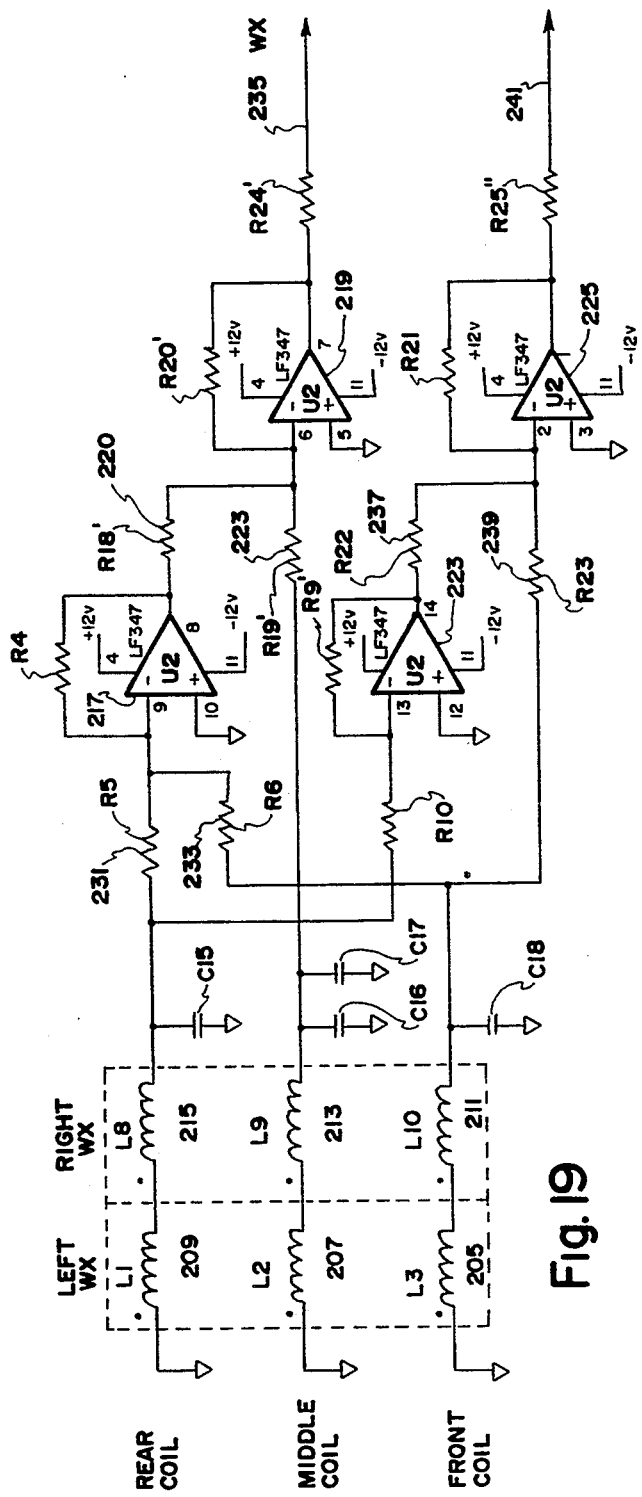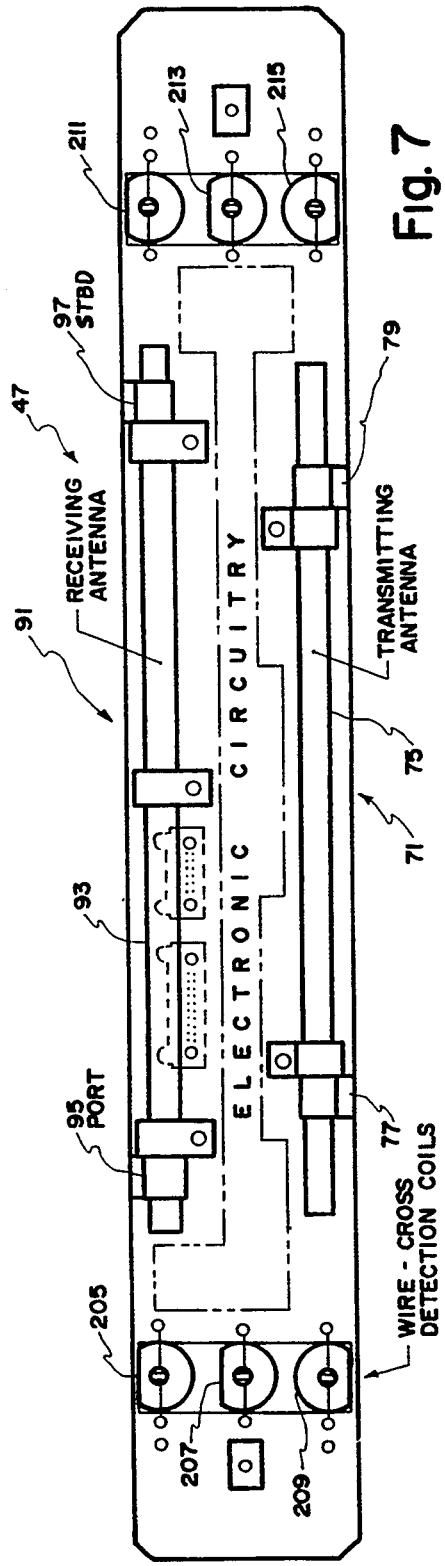

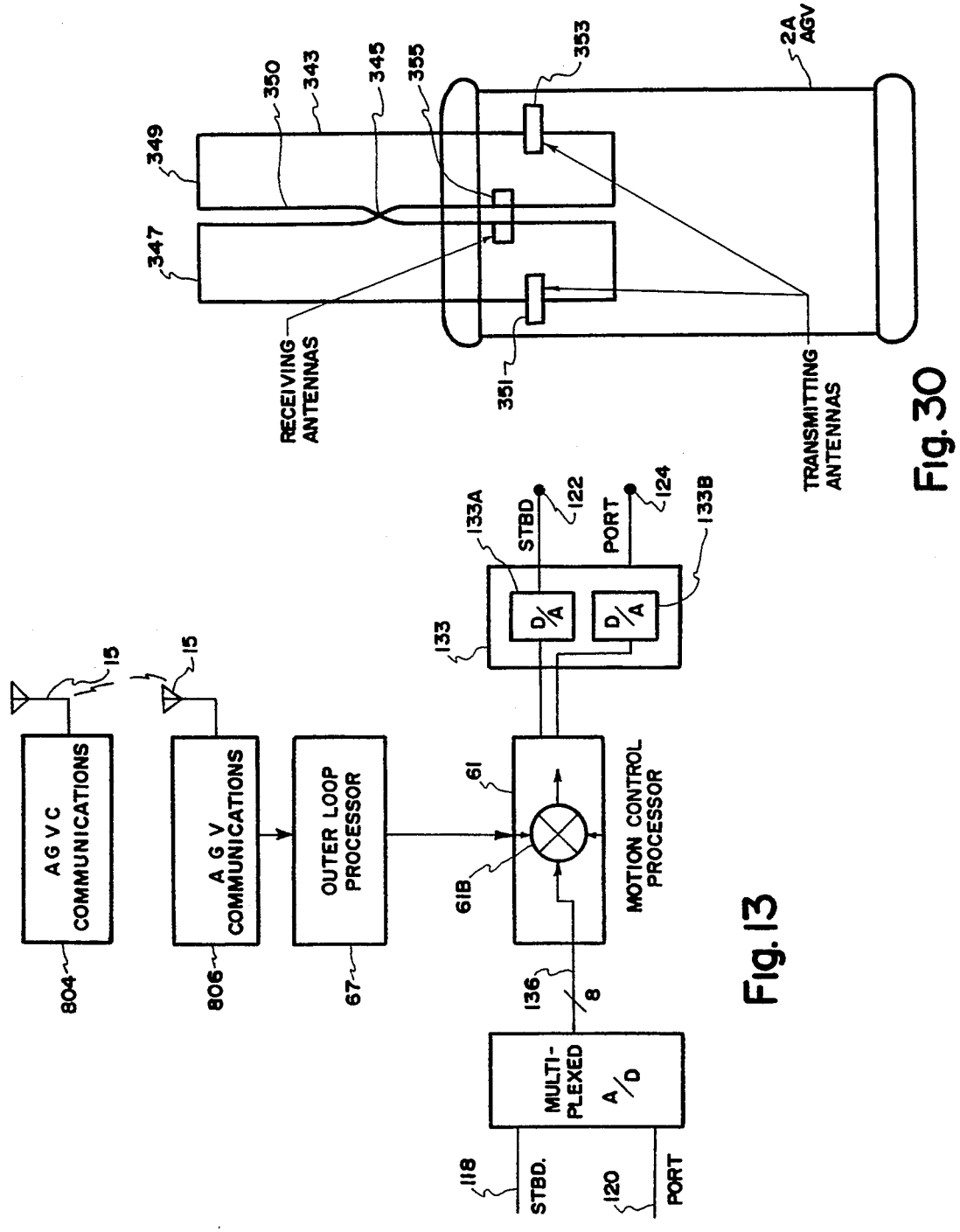

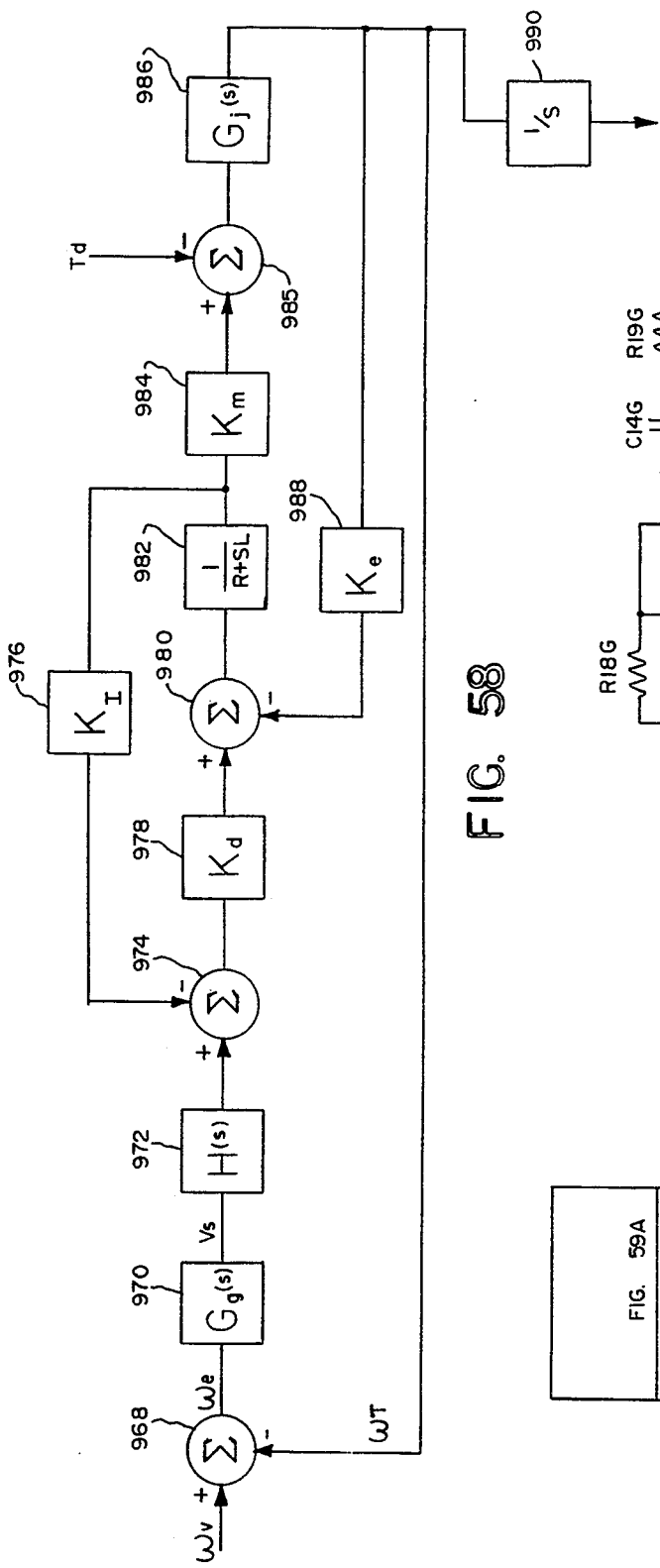
FIG. 58
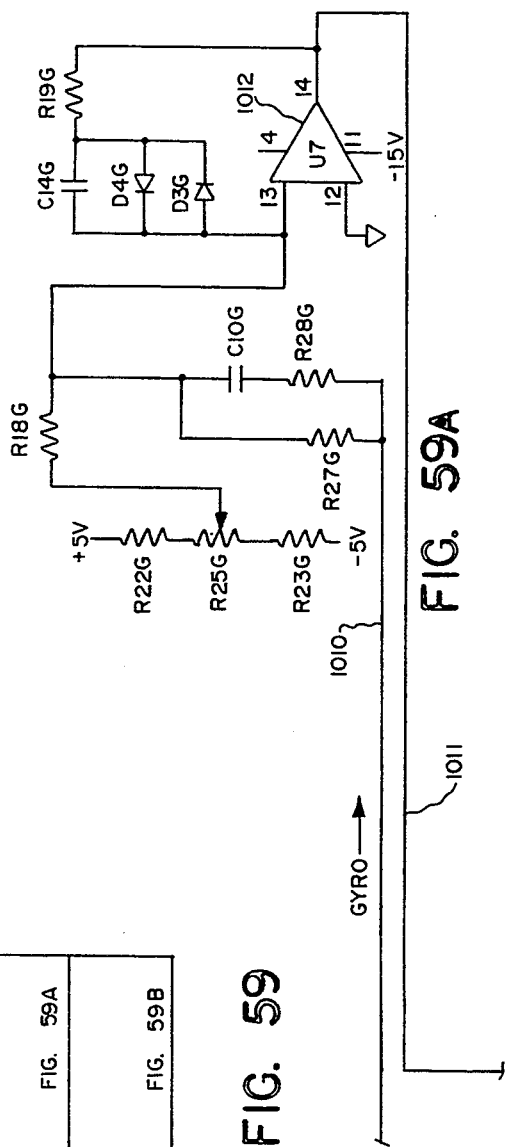
FIG. 59A
FIG. 59
| FIG. 59A | FIG. 59B |
|---|---|

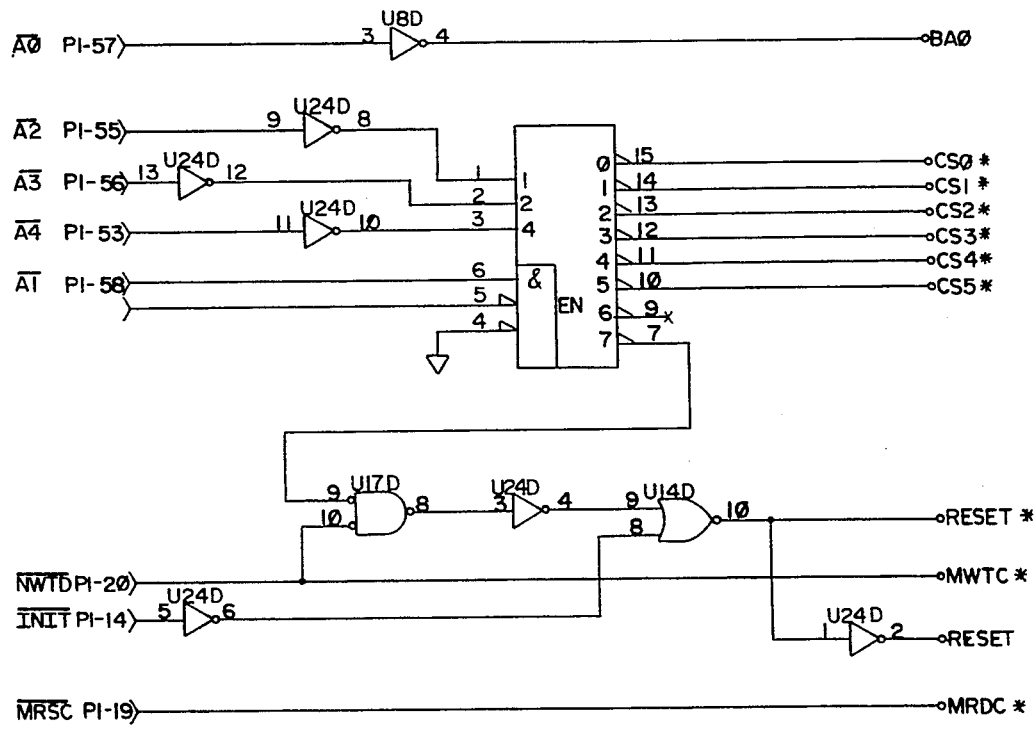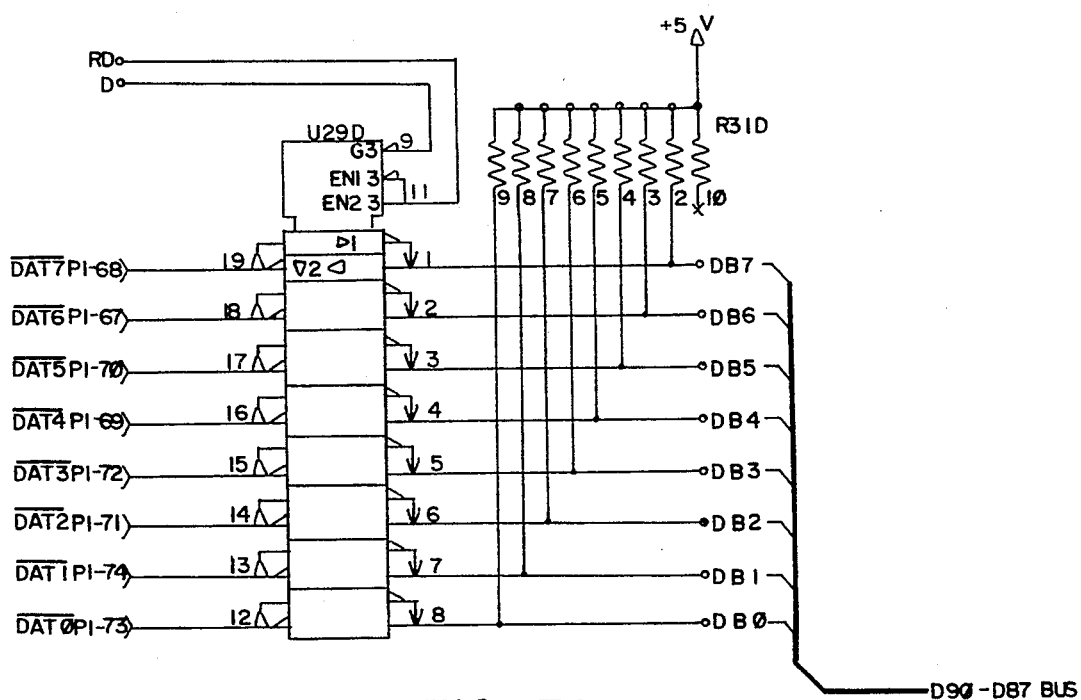
FIG. 78

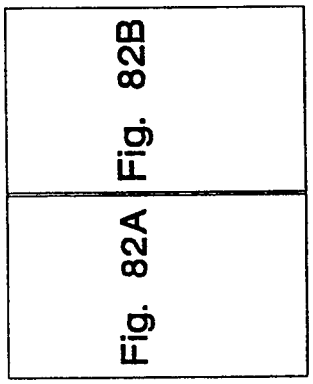
Fig. 82
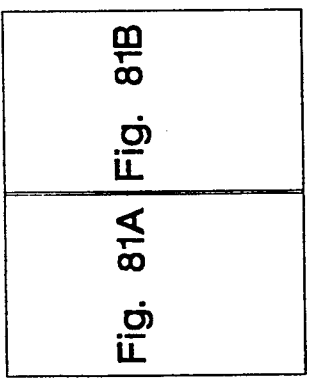
Fig. 81
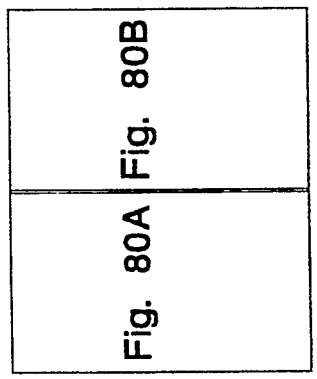
Fig. 80
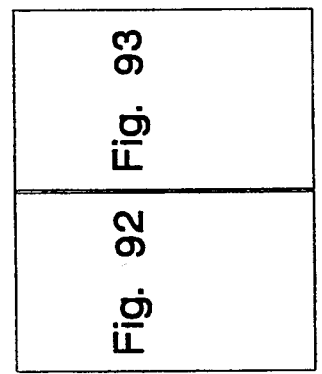
Fig. 86
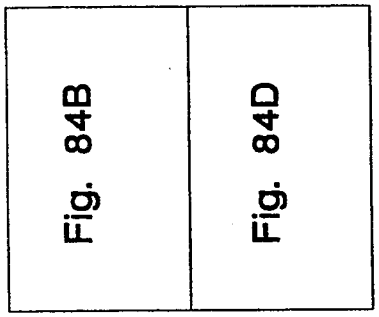
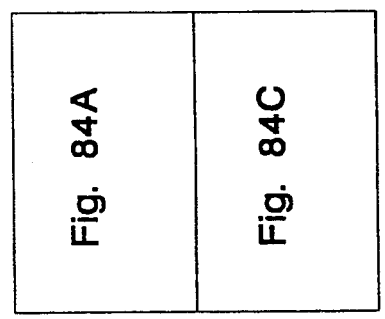
Fig. 84

DOWNWARD COMPATIBLE AGV SYSTEM AND METHODS

This application is a division of our co-pending U.S. patent application Ser. No. 621,486, filed Dec. 3, 1990, now U.S. Pat. No. 5,281,901, which issued Jan. 25, 1994.

FIELD OF THE INVENTION

The field of the invention is control, communication systems, and automatic navigation and guidance of vehicles, including vehicles that navigate without a driver on board either by self-contained navigation and guidance with occasional calibrating updates or, alternatively, by following a guide wire which is activated by an AGV controller which is not on the vehicle or, otherwise, activated by energy sources on the vehicle itself.

BACKGROUND AND DESCRIPTION OF RELATED ART

Automated guidance over a wire-guide path has been used in the guidance of a driverless automatically controlled vehicle (AGV) along a desired course have been set forth in U.S. Pat. Nos. 3,009,525 and 3,147,817 issued to Robert DeLiban. In such disclosures, the AGV followed a traffic path defined by a conductor energized by source not on the vehicle.

Later U.S. Pat. Nos. 4,791,570 and 4,902,948 of this assignee describe communication systems and methods for controlling a plurality of task-performing AGV's along a network of guide wires. U.S. Pat. Nos. 4,791,570 and 4,902,948 describe a guide wire logic and communications capability which provides for infinite expansion as to the number of guide wire loops and vehicles which comprise the system; accommodates polling of vehicles of the system not at predetermined times but only upon the occurrence of certain events, causes high data transmission rates to occur over low frequency carriers using the guide wires.

Today, there are a large number of installations of AGV systems which employ guide wires. However, the cost of installing and remodeling guide wire paths has proved to be a deterrent to purchase of new systems and the expansion of older installations. Factory layout flexibility and related installation and operational cost reduction, not realized with guide-wire systems, is possible with autonomously operating AGV's. Apparatus and methods of guide-wireless control of AGV's are found in U.S. Pat. Nos. 4,908,557 and 4,847,769 and in published European Patent Application 193,985.

U.S. Pat. No. 4,908,557 issued to Masahiro Sudara discloses a control apparatus which navigates along a path defined by update magnets arranged in the floor such that a null or bipolar signal is produced in each detecting sensor of a Hall sensor array located in each AGV. An algorithm is described which calculates position of the magnet based upon treating each sensor as a point or unit of measurement and performs calculations based upon a minimum distance in units of sensor positions. The precision of measurement is statistically dependent upon the physical displacement of each of the Hall sensors and the steepness of the signal about the transition between the magnet's North and South fields. As such, the precision of measurement of a magnet's position by the method described by Masahiro Sudara is of the order of magnitude of the center-to-center spacing of the Hall sensors. This level of measurement precision produces errors in vehicle bearing estimates which markedly restricts allowable distance of separation between the update magnets in the vehicle path, significant precision being required to provide assurance the vehicle will retain sufficient bearing accuracy to acquire to stay on a planned path between widely separated magnets.

U.S. Pat. No. 4,847,769 issued to Peter J. Reeve discloses a navigation system which carries out a dead reckoning calculation of the vehicles position based upon inputs from linear and angular measurements from a steering wheel and a bearing and/or a range to a target. The bearing and/or range to the target, determined by laser bearing finding equipment, provides updating data which are used to recalibrate to periodically reduce errors due to drift and other factors in the heading angle and spatial position of the AGV, angular drift in the steering angle, crabbing angle, and variations in the measured radius of the steering wheel. A Kalman filter is used to calculate corrective calibrations which are derived from the bearing and/or range to the target measurements. The laser bearing finding equipment comprises a laser emitter located at an obstruction free position on the AGV such that the vehicle may confirm its position by seeking a number of targets distributed about the AGV in a factory frame of reference.

European Patent Application 193,985 describes a grid-wireless system for navigating a free ranging vehicle. The system employs a grid of marker elements which are closely spaced to eliminate the measurement problems encountered with prior known navigation systems.

However, none of the related art addresses problems related to compatibility with existing guide-wire systems, providing the capability to operate along an existing guide-wire path and in an autonomous mode as well. Further, problems related to minimizing the numbers of floor markers required and, therefore, long distance autonomous operation between floor markers and providing unrestricted top loading surfaces for vehicles have likewise not been addressed in the known related art.

BRIEF SUMMARY AND OBJECTS OF THE INVENTION

For completeness in describing the entire invention, some information from copending applications PROPORTIONAL POSITION SENSING SYSTEM FOR AN AUTOMATIC GUIDED VEHICLE, Ser. No. 07/618,793, filed Nov. 27, 1990, now U.S. Pat. No. 5,187,664, which issued Feb. 16, 1993, and continuation-in-part UPDATE MARKER SYSTEM FOR NAVIGATION OF AN AUTOMATIC GUIDED VEHICLE, Ser. No. 07/544,693, filed Jun. 27, 1990, now abandoned; inventors Bryan A. Bloomfield, et al., being assign to the same assignee, is repeated herein. Another invention in which a guided vehicle follows passive conductors on the floor is described in U.S. Pat. No. 4,613,804, issued Sep. 23, 1986, entitled "Floor Position Sensing Apparatus and Method," invented by R. R. Swenson and assigned to the assignee of the present invention. That Patent is also made a part of the present application by reference.

In brief summary, the present invention comprises an automated guided vehicle (AGV) control system which is downward compatible with existing guide-wire systems, providing both AGV guide-wire navigation and guidance and communication and autonomous navigation and guidance and wireless communication within the same vehicle. The AGV control system comprises an AGV controller, a plurality of types of guide path marking apparatus, at least one AGV capable of a plurality of navigation and guidance modes, including autonomous operation, and a two-way communication system between the AGV controller and each AGV.

The AGV controller controls the movement of each individual AGV along predetermined path segments. Two-way communications comprise guide-wire carried messages and wireless messages provided over short access period links between the each AGV and the AGV controller. Guide path marking types of apparatus comprise vehicle powered and non-vehicle powered guidewire loops and guide path update markers.

The navigation and guidance system comprises redundant measurement capability such that measurement errors caused by factors comprising drift temperature change, wear, and aging are dynamically evaluated during each AGV operating mission and sensor inputs are calibrated in real time to reduce the effect of such errors. A Kalman filter is used to determine calibrating updates. Sensor measurement precision and calibration and novel navigation methods provide autonomous operation such that an AGV operating in the autonomous mode experienced an error having a deviation standard no greater than two inches when traveling between update markers which are fifty feet apart. The AGV controller sends and each individual AGV receives and acknowledges each next path segment end position and exit bearing from that path segment. Thereby, incremental control of each vehicle over pre-segmented portions of a path is provided by the AGV controller. From the position and bearing received from the AGV controller, each AGV calculates a non-linear path for self-contained guidance control of the AGV over the path segment whereby vehicle guidance accuracy is improved.

Such vehicle navigation and guidance accuracy provides a system which comprises widely spaced update markers and a resultingly low guide path installation and remodeling cost. Further, passive guide wire apparatus, which is manually portable, provides a temporary path for vehicles during remodeling and the like and a high accuracy guide path for positioning an AGV at a terminal. Through the use of measurements which provide redundant estimates of vehicle distance and bearing and, thereby, concurrent estimates of measurement errors, such as angular rate sensor drift, a low cost rate sensor is effectively used in the vehicle navigation and guidance system. A periodic sampling of the angular rate sensor apparatus with drift corrections, provides an effective redundant measurement in the vehicle sensor matrix. All of the AGV sensors and communications systems reside below the top surface of the AGV, freeing the top surface for loading and unloading cargo and for attaching to other vehicles.

Accordingly, it is a primary object to provide an AGV control system which controls at least one AGV which navigates over paths marked by guide-wires and, alternatively, over paths marked by intermittently placed update markers.

It is a further primary object to provide an AGV control system which comprises autonomously operating AGV's and wireless communications and is downwardly compatible with existing AGV guide-wire installations It is a still further primary object to provide a system for controlling a plurality of unmanned, task-performing vehicles whereby the travel paths and tasks performed by the vehicles are strictly controlled by an AGV controller on a path segment by path segment basis.

It is another primary object to provide at least two navigation and guidance systems within at least one AGV, at least one navigation and guidance system providing greater accuracy and precision than at least one of the other navigation and guidance systems, whereby at least one AGV is selectively more accurately and precisely guided over selected segments of the guide path and less accurately and precisely guided over other segments whereby a cost effective selection of guide path markers may be made, based upon accuracy and precision requirements of each guide path segment.

It is another primary object to provide a digital computer based, automated guided vehicle controller which provide centralized planning and control for at least one AGV whereby each AGV is sent a control message which defines a limited activity to be performed by the vehicle.

It is yet another primary object to provide an AGV controller which sends position and bearing of the end of a next-to-be-traveled path segment by which the AGV calculates a guide path.

It is another object to provide an AGV controller comprising a compiler which provides position and bearing, for the end of each path segment sent to a vehicle, calculated from previously entered input data which defines a plurality of markers and paths within a factory frame of reference.

It is another object to provide an AGV controller which is programmably changeable using a higher programming language, such as a "C" compiler.

It is another object to provide an AGV control system which comprises update markers in the floor of an AGV path comprising marker to marker spacing which may be widely separated, such as fifty feet between markers, thereby reducing installation and remodeling costs.

It is another object to provide an AGV control system which comprises a combination of markers in the floor, the combination comprising update markers and guide-wires.

It is another object to provide an AGV control system which comprises a combination of markers in and on the floor, the combination comprising update markers and guide-wires.

It is another object to provide an AGV control system wherein the update markers in the floor of an AGV path comprise magnets.

It is another object to provide an AGV control system which comprises update markers in the floor of an AGV path, the markers comprising magnets oriented such that only a South or a North field is sensible by superiorly disposed sensors.

It is another object to provide an AGV control system which comprises a combination of markers in and on the floor, the combination comprising guide-wires which are activated by an energy source on an AGV and guide-wires which are activated by an energy source not on the AGV.

It is another object to provide an AGV control system which comprises a combination of markers in and on the floor, the combination comprising markers which are activated by an energy source on an AGV and markers which are activated by an energy source not on the AGV.

It is a principal object to provide an AGV and AGV controller communication system which assigns tasks by polling each AGV.

It is another principal object to provide AGV/AGV controller communications which comprise wireless communications apparatus.

It is another principal object to provide receiving AGV communications which acquire an incoming message in less than five milliseconds.

It is another principal object to provide AGV communications which alternatively use wireless or guidewire communications links.

It is a further principal object to provide an AGV and AGV controller communication system which communicates over wireless communications wherein each AGV is polled, not at predetermined times, but only upon the occurrence of certain events.

It is a still further principal object to provide an AGV and AGV controller communication system which communicates over wireless communications wherein each message is acquired by the receiving apparatus in less than five milliseconds.

It is another principal object to provide an AGV and AGV controller communication system which communicates over wireless communications wherein each message is uniquely addressable to a single AGV.

It is a main object to provide a navigation and guidance system for an AGV which is totally contained below the top surface of the AGV, such that the top surface is free for loading and unloading and for attachment to other apparatus.

It is another main object to provide a navigation and guidance system for an AGV which comprises two-way communications apparatus, whereby at least task direction is received from an AGV controller and message acknowledgement and AGV status is transmitted to the AGV controller.

It is further main object to provide a navigation and guidance system which comprises a redundancy in sensor measurement capability such that sensor-based errors due to factors comprising temperature, wear, drift, aging, and earlier incorrect calibration are quantifiable.

It is a still further main object to provide a navigation and guidance system which recalibrates sensor inputs in real time with quantified values derived from processing redundant data from the sensors whereby the accuracy and precision of the navigation and guidance system is improved.

It is another further main object to provide a Kalman filter by which the sensor based errors are quantified.

It is another object to provide navigation and guidance apparatus for enabling an AGV to ascertain and control its position rather precisely at a predetermined area on the floor, such as at a terminal.

It is another object to provide navigation and guidance apparatus which enables an AGV to ascertain not only its position relative to a floor reference system, but also its heading, by sensing the lateral positions of two sensors on the vehicle that are spaced apart longitudinally.

It is another object to provide position-sensing navigation and guidance apparatus in which only passive elements are required on (or in) the floor and all energy required for the sensing of position comes from the vehicle, at least at certain areas such as in a terminal.

It is another object to provide navigation and guidance position-sensing apparatus in which the passive elements of equipment at the floor comprise one or more passive loops of electrical conductor.

It is another object to provide a navigation and guidance position-sensing apparatus having a magnetic-signal receiving system that compensates for undesired signals, such as those received directly from its transmitting antennas on the vehicle, and responds only to signals received indirectly via floor-mounted passive loops.

It is another object to provide a navigation and guidance position-sensing apparatus on an AGV in which two receiving coils are spaced apart on only one high-permeability magnetic core to improve the linearity of response of the signals as a function of the amount of their offset from a passive loop on the floor.

It is another object to provide navigation and guidance apparatus to enable an AGV to utilize equipment in common to ascertain and control both its lateral and longitudinal positions relative to a known reference on the floor at, for example, a terminal.

It is another object to provide a navigation and guidance system for positioning an AGV in which the AGV is automatically guided to a predetermined station or terminal by one type of guidance mode and is precisely positioned within the station by another type of guidance mode.

In a system having at least one AGV capable ordinarily navigating without any guidewires in the floor between terminals and of positioning itself accurately at terminals, an inventive object is to provide terminal-positioning apparatus of a type that enables the same AGV to operate also in hybrid factory installations that have some guidewires in the floor; the terminal-positioning portions of the guidance apparatus are utilized for the additional purpose of following the guidewires in the floor in order to navigate between stations.

It is another object to provide AGV terminal-positioning apparatus that enables an AGV to operate in a hybrid installation that has active guidewires (i.e., guidewires energized by conductive connections) at the floor within some of its terminals, and that has passive loops (i.e., conductive loops energized by magnetic induction) at the floor within others of its terminals.

It is another object, in one embodiment, to utilize one or more phase-locked loops to process signals received by receiving antennas in detecting a passive conductive floor loop, and in which the receiving circuits have capability for initialization and for automatic gain control of the phase-locked signal level.

It is another object to provide navigation and guidance apparatus for measuring, with improved accuracy, the position of a vehicle relative to a known marker at the floor to ascertain the vehicle's position relative to a factory reference system.

It is another object to utilize a generally transverse array of sensors on the vehicle to sense the marker and to process the sensed data regarding marker position in a particular way to determine the relative position of the vehicle with improved accuracy.

It is another object to determine intermittently placed guide path marker-AGV relative position by taking readings with a plurality of intermittent guide path marker sensors, including the sensor having the greatest reading, the two sensors immediately on one side of it, and the two sensors immediately on the other side of it, and correlating and interpolating the readings with a stored spatial pattern of magnetic field strength whereby the determination of the relative position of the vehicle with improved accuracy is realized.

It is another object to ascertain the longitudinal position of the vehicle by means of the intermittently placed guide path marker by sensing the occurrence of maximum readings of the sensors as the vehicle passes over the marker.

It is another object to utilize the generally transverse array of sensors to concurrently sense two closely positioned markers having predetermined relative and factory reference locations and, thereby, provide concurrent measurements for ascertaining the attitude of the array of sensors, associated bearing of the vehicle in addition to determination of lateral and longitudinal vehicle position.

It is a chief object to provide a navigation and guidance system which comprises redundant measurements of AGV position and bearing.

It is another chief object to provide a navigation and guidance system which comprises guide-wire sensing apparatus, wheel encoding apparatus, and update marker sensors, thereby providing redundancy of measurement.

It is another chief object to provide a navigation and guidance system which comprises guide-wire sensing apparatus, wheel encoding apparatus, angular rate sensing apparatus, and update marker sensors, thereby providing increased redundancy of measurement.

It is another chief object to provide a navigation and guidance system which comprises angular rate sensing apparatus which further comprises an inertial platform which rotates to follow angular travel of the angular rate sensor whereby the maximum offset of the angular rate sensor is reduced and gain of the output sensors are increased, thereby increasing angular rate sensor sensitivity without saturation.

It is another chief object to provide a navigation and guidance system for an AGV which comprises a one dimensional angular rate sensor.

It is another chief object to provide a navigation and guidance system for an AGV which comprises a low cost, long lived angular rate sensor.

It is a key object to provide frequent calibration of drift for a low cost, highly reliable AGV navigation and guidance system angular rate sensor, which may have a high drift rate, such that an error having a standard deviation of not greater than 2 inches results in fifty feet of AGV travel.

It is another key object to use a Kalman filter to quantify values for the frequent drift calibration.

It is a significant object to provide guide-wire and update markers sensors sufficiently longitudinally symmetrically disposed such that the AGV may operate bidirectionally as well as unidirectionally.

It is a further significant object to provide guidewire and update marker sensing which allows correction for any offsets from symmetry such that the AGV operates bidirectionally.

It is an important object to provide an onboard AGV traffic controller which comprises at least one digital processor whereby messages received from the AGV communication system are processed, navigation and guidance parameters are calculated, communication and sensor control switches are controlled, and rate and direction of vehicle travel and function is regulated.

It is another important object to provide a navigation and guidance system which comprises a programmed "E" stop, which is triggered by a digital processor interrupt and brings an AGV to a slow, controlled stop when an emergency stop requirement is detected.

It is another important object to provide navigation and guidance system which comprises a backup to the "E" stop which immediately halts progress of the AGV when an "E" stop malfunction is detected.

It is another important object to provide a navigation and guidance system comprising an onboard digital processor which calculates a guide path derived from current position and bearing of the AGV and the target position and bearing at the end-of-next-path segment received from the AGV controller.

It is another important object to provide a navigation and guidance system which calculates a guide path which comprises one dependent and one independent variable and which is independent of vehicle speed.

It is another important object to provide a navigation and guidance system which calculates a non-linear guide path defined in Cartesian coordinates.

It is another important object to provide a navigation and guidance system which calculates a non-linear guide path defined in polar coordinates.

It is another important object to provide a navigation and guidance system comprising a program in the onboard digital processor which selects between and sequences implementation of calculated cartesian and polar coordinate, non-linear guide paths along which the vehicle is guided.

These and other objects and features of the present invention will be apparent from the detailed description taken with reference to accompanying drawings.

BRIEF DESCRIPTION OF THE FIGURES

FIG. 7. A circuit board layout showing antennas for lateral and wire-cross positioning operations.

FIG. 13. Block diagram showing an automatic guided vehicle controller (AGVC), microprocessors, and some equipment for operation in a passive wire loop mode.

FIG. 19. Circuit diagram of wire-crossing detection circuits including antennas (i.e., coils) and signal-combining circuits.

FIG. 30. Plan view showing an alternative embodiment having different transmitting antenna locations on a vehicle and a passive wire loop on the ground at a terminal, in which the two lobes of the passive wire loop are in a side-by-side configuration.

FIG. 58 is a block diagram of a model of the stabilization and control loop of the inertial platform.

FIG. 59. provides a map showing relative orientation of the circuit diagram as seen in FIGS. 59A–59B.

FIGS. 59A and 59B provide a circuit diagram for the stabilization and control loop of the inertial platform.

FIGS. 80, 81, 82, and 84 provide a map showing relative orientation of the schematic circuits seen in FIGS. 80A–B, 81A–B, 82A–B, and 84A–D, respectively.

FIGS. 78, 79, 80A–B, 81A–B, 82A–B, 83, 84A–D and 85A–B provide a schematic of the components and circuits of a communications board, comprising two central processing units, contained in each vehicle.

FIG. 86 is a map showing relative orientation of the schematic of circuits seen in FIG. 92 to the schematic of circuits seen in FIG. 93. FIGS, 90, 91, 92, 93, and 94 provide a map showing relative orientation of the schematic circuits seen in FIGS. 90A–B, 91A–B, 92A–B, 93A–B, and 94A–B, respectively.

DETAILED DESCRIPTION OF THE ILLUSTRATED EMBODIMENTS

Figure 95:
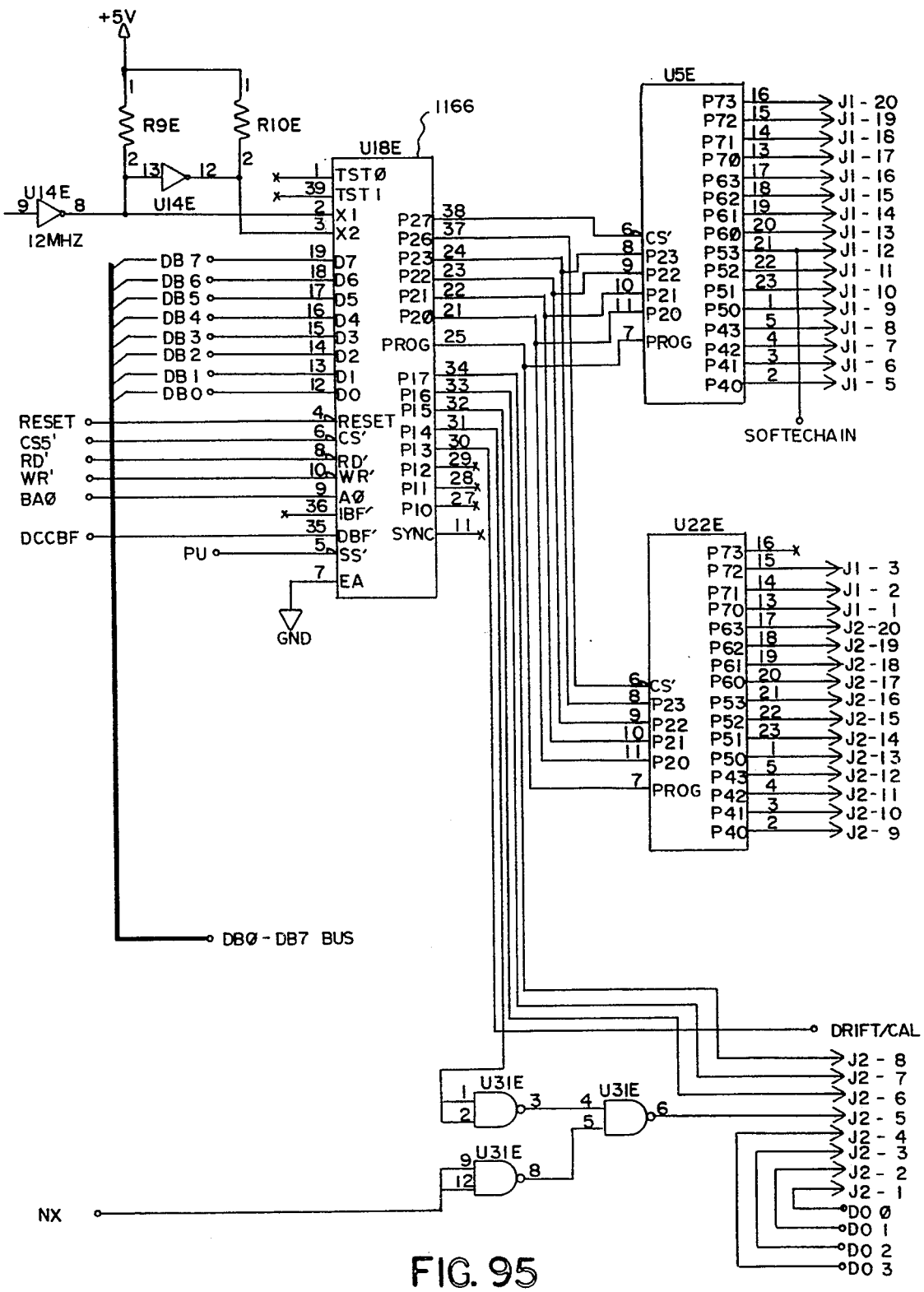

In this description, two sets of terms are used to reference angular direction of travel of an automatic guided vehicle (AGV), port and starboard and left and right. Port and starboard are directional references of left and right, respectively, to the true vehicle front which may be identified by the presence of a light, placement of a grill, indicia, or other accessory at the front of the AGV. Right and left are references with regard to the direction of travel of the AGV. As an example, because the vehicle operatively travels both forward and backward, port is left when the vehicle is traveling in the direction of the true vehicle front and right when the vehicle is traveling in the reverse direction. Reference is now made to the embodiments illustrated in FIGS. 1–95 wherein like numerals are used to designate like parts throughout.

Overview of an Automatic Guided Vehicle (AGV) Control System

The AGV control system comprises an automatic guided vehicle controller (AGVC), at least one of a plurality of types of guide path marking systems, at least one AGV comprising navigation and guidance systems capable of operating over the plurality of types of guide path marking systems, and a two-way communication system between each AGV and the AGVC. The plurality of types of guide path marking systems and AGV navigation and guidance systems comprise guidewire marking and navigation and guidance, such that new AGV's and AGVC's are downward compatible with current guidewire installations.

Figure 1:
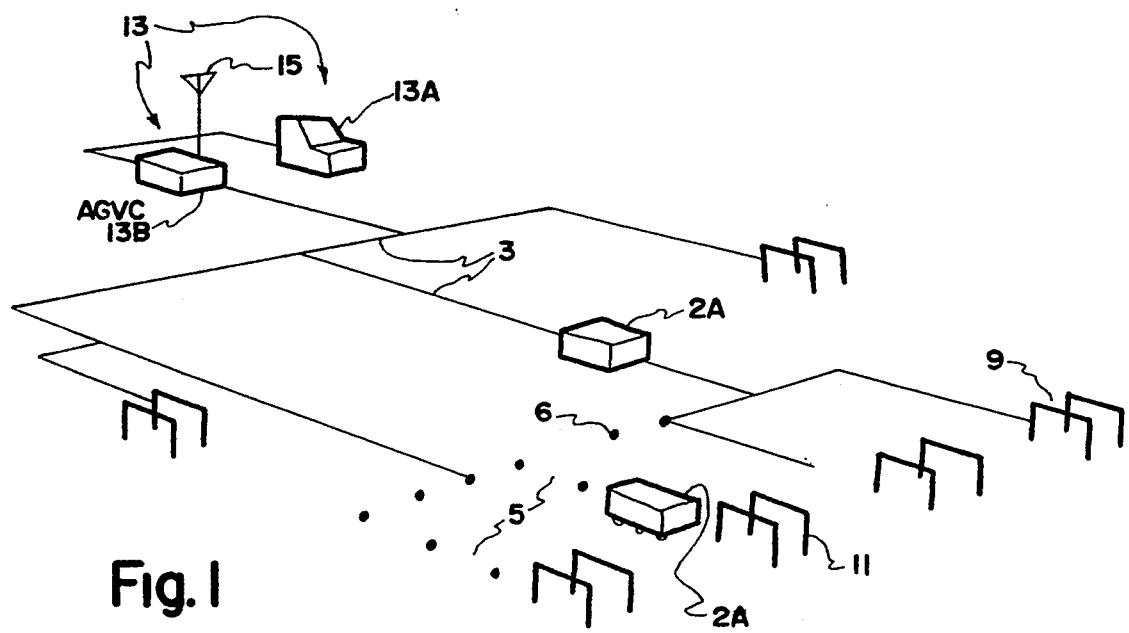
FIG. 1. Overview of an illustrative application of a preferred embodiment of the invention, including vehicular routes and some terminals for pickup and delivery.

In FIG. 1 the interior of a warehouse building, in which automated guided vehicles, generally designated 2A, travel about on routes such as routes 3 and 5 among a number of terminals such as terminals 9 and 11, is schematically shown. This is an example of a hybrid facility. The routes 3 have guidewires in the floor to define the routes and guide and communicate with AGV's travelling thereon. The routes 5 are traversed by self-contained navigation and guidance and wireless communicating AGV's which follow paths marked by update markers 6 located at irregular intervals as much as 50 feet apart along the routes 5. The same vehicles are used on both types of routes. Routes 3 shown as single wires in FIG. 1 represent guidewire loops as is well known in the art. Each guidewire receives power from AGVC 13. Update markers 6, constituting, in combination, guide path 5, represent devices from which accurate positioning may be derived and which may be magnets as described in detail later.

Figure 55:
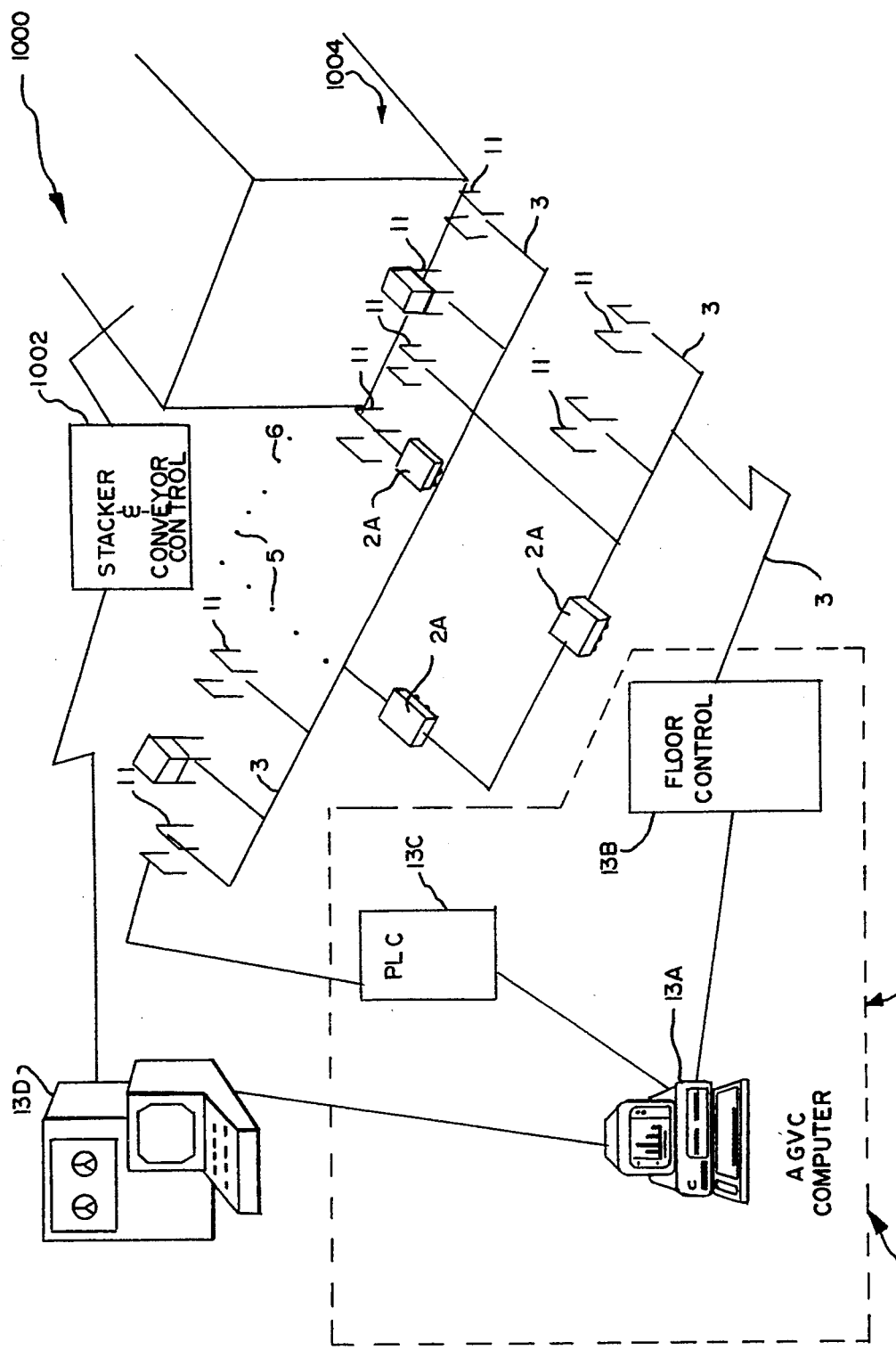
FIG. 55 is a simplified block diagram of an inventory management system showing interconnections between a vehicle controller (AGVC computer) and a management system controller.

Referring to FIG. 55, AGVC 13 comprises an AGVC computer 13A and at least one floor controller 13B, and may further comprise at least one programmable logic controller (PLC 13C). AGVC 13 software is currently commercially available in AGV 2A guidewire systems sold and distributed by Eaton-Kenway, 515 East 100 South, Salt Lake City, Utah 84102. As seen in FIG. 55, the AGVC comprises a communications link whereby a management computer 13D is connected and through which tasks are assigned to AGVC 13. Thus, AGVC 13 may be part of a larger inventory management system 1000 which is controlled by management computer 13D. In addition to controlling AGVC 13, management computer 13D processes orders, maintains an inventory, produces reports, and manages conveyer tracking and operation of vertical stacker controllers 1002 whereby material is moved to stacks and retrieved from within a storage facility 1004.

Upon receipt of load movement task from management computer 13D, AGVC computer 13A selects an AGV 2A and schedules an optimum path for the selected AGV 2A. Based upon the path scheduled and the current position of each AGV 2A, AGVC computer 13A provides path segment by path segment control of movement of each AGV 2A under its control through two-way communications between the AGVC and each of the AGV's 2A. The length of each path segment ranges from a fraction of the length of an AGV 2A to a length greater than an AGV 2A length, which can be a plurality of AGV lengths.

AGVC 13 provides signals to the vehicles via guidewires embedded in the floor when they are operating on the routes 3. As described in U.S. Pat. No. 4,791,570, AGVC 13 can communicate with a plurality of communication circuits each connected to a guidewire. As seen in FIG. 1, it also sends the same data through wireless antenna 15 for vehicles not on a guidewire path or otherwise unable to receive communications from AGVC 13.

In order to keep transmission and reception from AGVC 13 and each AGV 2A, mutually exclusive in the currently preferred embodiment, a communications protocol has been adopted for both the guidewire and wireless modes of communication. The protocol gives priority to transmission from AGVC 13 such that no data is transmitted from any AGV 2A when the AGVC 13 is transmitting. All data transmitted by AGVC 13 is transmitted globally, that is, it is transmitted by each and every communication circuit in the system. To avoid data collision, each AGV 24 only attempts to transmit data when it has been polled by AGVC 13.

In addition, AGVC 13 monitors obstacle (such as fire control, exit doors, etc.) and other discreet devices, AGV 2A battery status, sizing measurements in sizing stations and controls site specific devices such as lights. All monitoring and controlling is performed over both hard wired and wireless communications, as available.

The AGVC Communications System

AGVC 13 comprises multiple communications modes. As seen in FIG. 1, an AGV 2A can travel over a guidewire route 3 or a ground marker route 5. When AGV 2A travels over guidewire route 3, communicating messages can be used over the guidewire or via wireless communications. When AGV 2A traverses a path 5 of ground markers 6, a wireless communications system 1110 (see FIG. 71) is used. In a hybrid facility comprising both guidewire and ground marked paths where at least one AGV 2A may be on each route 3, 5 at any time, AGVC 13 must communicate over both modes concurrently. The circuits and methods for communicating over a guidewire are the same as those described in U.S. Pat. Nos. 4,791,570 and 4,902,948, which are the property of the assignee of this invention and which are made a part hereof by reference.

Figure 71:
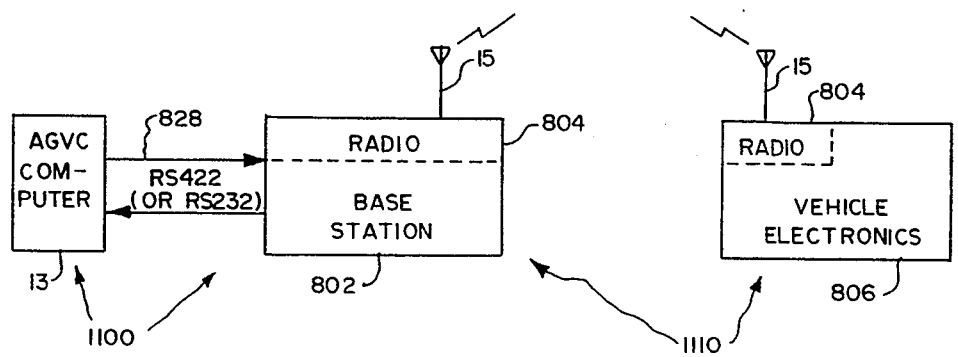
FIG. 71 is a simplified block diagram of a wireless communication system showing source of control from an automated guided vehicle controller and two-way communications between the controller and a related base station and at least one vehicle electronics.

As seen in FIG. 71, the wireless communications system 1110 comprises a non-vehicle portion 1100 and a vehicle portion 806. The non-vehicle portion 1100 comprises AGVC 13 which includes an AGVC computer 13A interconnected to base station 802 by either an RS422 or an RS232 communicating link 828. Base station 802 is electrically connected to a radio 804 which sends and receives through an antenna 15 whereby wireless communications are sent to and received from the plurality of vehicles 2A in the facility. In the currently preferred embodiment, radio 804, commonly used by both base station 802 and each AGV 2A, is a model KS-900, available from TEKK Inc., 224 N.W. Platte Valley Drive, Kansas City, Mo. 64150, although other radios can be used within the scope of the invention.

Figure 72:
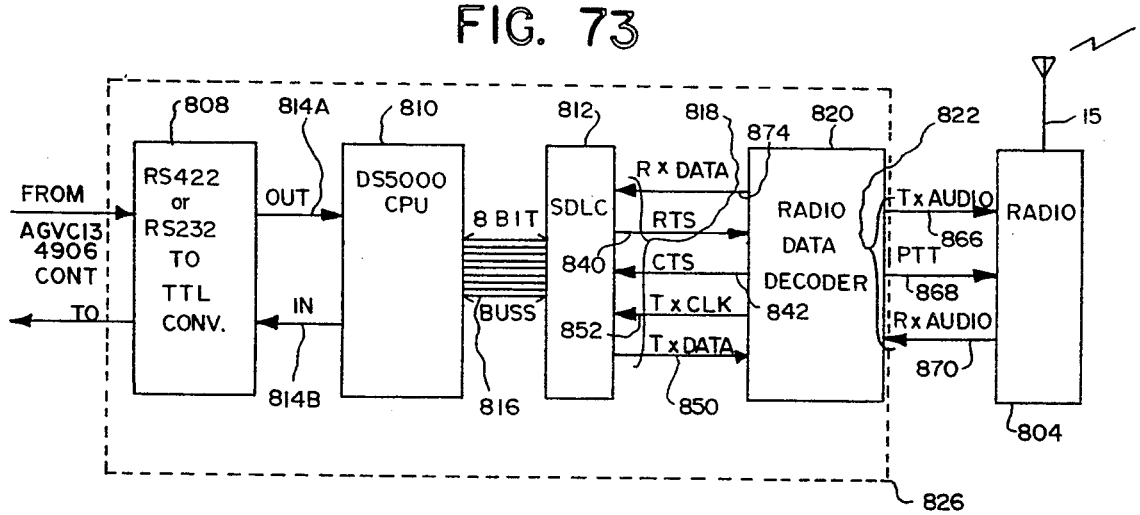
FIG. 72 is a block diagram of base station communication electronics and a related radio.

A block diagram of base station 826 is seen in FIG. 72. Base station 826 comprises circuits 808 which selectively convert RS422 and RS232 signals to levels processable by base station 826 logic circuits. Circuits 808 communicate with a central processing unit 810 via output line 814A and input line 814B. Although other central processing units can be used within the scope of the invention, central processing unit 810 is a DS5000 (from Dallas Semiconductor) in the currently preferred embodiment. Central processing unit 810 communicates with an SDLC chip 812 which operates in the same manner as SDLC chips in guidewire communications. Output from SDLC chip comprises request to sent (RTS 840), and transmitted data (TxDATA 850) to a radio data decoder 820. Inputs to the SDLC chip from the radio data decoder 820 comprise a transmit clock (TxCLK 852), a clear to send (CTS 842) signal, and received data (RxDATA 874).

Circuits and operation of radio data decoder 820 is discussed in detail hereafter. Radio data decoder 820 is connected to transmit (PTT 868), and an audio data receive line (RxAUDIO 870). Thus data is received from AGVC 13 in RS232 or RS422 format, transferred to, buffered in memory, and resent from central processing unit 810 to the SDLC chip 812. From SDLC 812, data is sent to decoding circuits, wherein the data is translated for efficient transmission, and therefrom sent to radio 804 for transmission through antenna 15.

Base station 802 received data is detected at antenna 15 and relayed to radio 804 wherefrom, the data in audio format, is sent to radio data decoder 820 wherein the audio RxAUDIO 870 signals are transformed to RxDATA 874 signals which can be processed by SDLC chip 812. Once processed by SDLC chip 812, data is sent through bus 816 for storage in memory and further transmission to AGVC computer 13A after conversion to the selected RS422 or RS232 format.

The message format sent via wireless transmission is the same as the format described in the earlier referenced U.S. Pat. Nos. '570 and '948. The message format being:

<BOM><AGV 2A
       address><message><CRC><EOM>

The message within the message format is either a command or status and may be of any length. BOM and EOM are the same beginning and end of message codes used in guidewire communications. The CRC check code is also calculated in the same manner as the CRC in guidewire communications.

Figure 73:
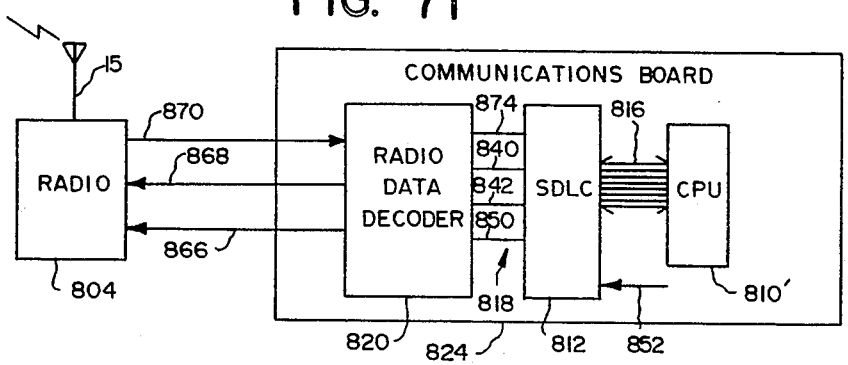
FIG. 73 is a block diagram of vehicle communications electronics showing connecting relationships among a communications processor, an SDLC chip, a radio data decoder, and a two-way radio.

The vehicle 2A portion 806 of wireless communications system 1110 is seen in FIG. 73. Intra-vehicle connections are not shown but are identical to those described in previously referenced U.S. Pat. Nos. '570 and '948. Interconnections and operation of central processing unit 810', SDLC chip 812, and radio data decoder 820 are the same as the same central processing unit 810', SDLC chip 812, and radio data decoder 820 used in the non-vehicle portion 1100 of communication system 1110. Though not necessary within the scope of the invention, the same radio 804 is also used.

Figure 74:
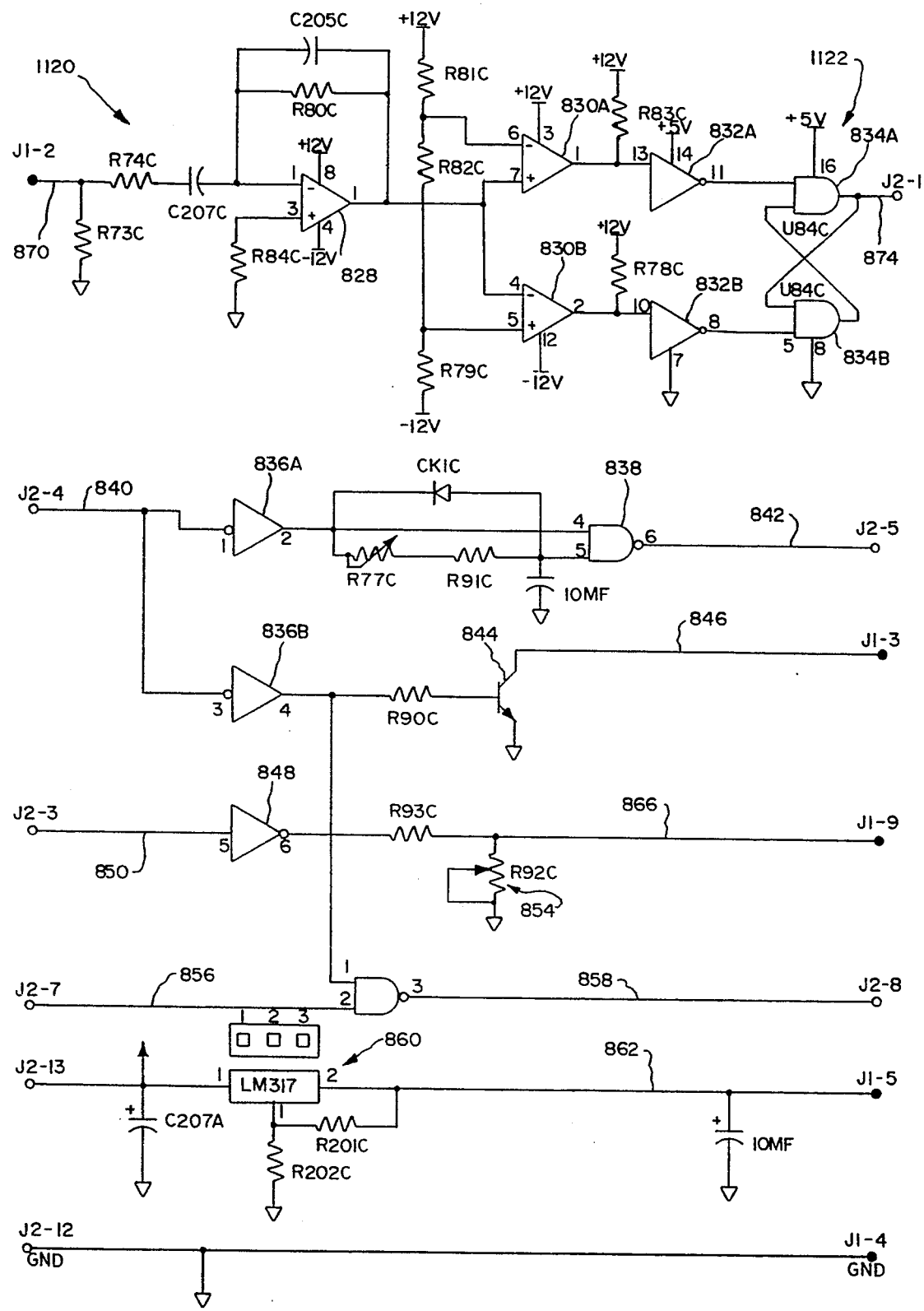
FIG. 74 is a schematic of the circuits for the radio data decoder, and communications control and data lines comprising request to send, clear to send and permission to transmit, transmit data to audio conversion, transmit clock control, and power regulation circuits.

A digital decoding circuit 1120 portion of radio data decoder 820 is seen in the circuit schematic in FIG. 74. A 9600 baud digital data stream is sent to radio 804 wherefrom the signal is modulated and sent over a carrier wave to another receiving radio 804. Using digital decoding circuit 1120, the 9600 baud stream requires a base band of only one-half the 9600 baud digital data stream frequency to send a signal which, as received and provided by a receiving radio 804, produces a discriminator waveform seen as discriminator output 1136 in FIG. 76. Digital decoding circuit 1120 receives and reconstructs the 9600 baud signal which is transmitted effectively at 4800 cycles per second. Even at 4800 cycles per second, received signal amplitude is substantially lower than other radio signals which are transmitted at frequencies lower than the 3000 cycle per second base band cutoff of radio 804. Digital decoding circuit 1120 is of primary importance in the digital data reconstruction because a frequency of 9600 cycles per second is too far beyond the 3000 cycle per second base band cutoff of radio 804 to be reliably detected. Even so, the amplitude of the 4800 cycle per second frequency signal requires special processing to reliably reconstruct the original digital data stream.

Digital decoding circuit 1120 is similar to the circuit disclosed in U.S. Pat. No. 4,613,973 which is the property of the assignee of this invention. Input to circuit 1120 is RxAUDIO 870 which is received from radio 804. The digital decoding circuit 820 produces a digital signal which is communicated to SDLC chip 812.

Digital decoding circuit 1120 as presently preferred, comprises seriatim a differential amplifier 828, a comparator circuit comprising a positive comparator 830A and a negative comparator 830B, one digital level translator 832A, 832B for each comparator 830A, 830B, and a latch circuit comprising a flip-flop 1122 formed of two inverting AND gates 834A and 834B. Differential amplifier 828 produces distinct voltage spikes corresponding to voltage transitions of the waveform received from radio 804 across a zero voltage. A positive voltage spike is produced whenever the waveform passes from negative to positive, and a negative voltage spike is produced whenever the waveform passes from positive to negative.

The comparator circuit produces a voltage at each comparator 830A and 830B, a first voltage which is interrupted whenever the output of differential amplifier 828 exceeds a certain predetermined value and a second voltage which is interrupted whenever the output of the differential amplifier 828 is less than a certain pre-determined value.

Digital level translators 832A, 832B are MC1489 chips (from Motorola Semiconductor) which are more generally used in RS232 positive/negative voltage levels to digital voltage levels conversion. In this case, the input levels to digital level translators 832A, 832B are ±12 volts; output is compatible with standard TTL voltages.

The latch circuit receives the outputs of digital level translators 832A and 832B as set and reset inputs, respectively, to the flip-flop 1122 thereby producing as an output a digital data stream.

Referring to FIG. 74, the output of radio 804 is provided with a load resistor R73C, chosen to balance the capacitively coupled output of discriminator circuitry contained in radio 804. A representative output 1136, seen in FIG. 76, from radio 804 comprises a digital data stream 1134 which has been distorted by modulation and demodulation of a carrier wave. The output 1136 is passed to differential amplifier 828 which comprises a differentiating input through capacitor C207C. The differential amplifier used in the currently preferred embodiment is TL072 from Texas Instrument. A list of components used in the currently preferred embodiment is found in a table below. It should be understood that the components used in the list are for the currently preferred embodiment and other components can be used within the scope of the invention. The other resistors R74C and R80C and capacitor C205C function in a known fashion. The differential amplifier 828 operates as a differentiation device by resistor R74C and capacitor C207C. The feedback resistor R80C and capacitor C205C are provided for the purpose of limiting input bandwidth to suppress high frequency noise.

Given the data stream 1134, the output of differential amplifier 828 comprises a waveform 1138. See FIG. 76. The maximum amplitude of waveform 1138 is adjusted to a suitable value for example, in excess of 6.5 volts positive and negative, by either adjusting the amplitude of waveform 1136 at the output of radio 804, or by choosing appropriate values for the resistors and capacitors used with amplifier 828.

The output 1138 of the differential amplifier 828 is communicated to the comparator circuit comprising positive voltage comparator 830A and negative voltage comparator 830B. Comparators 830A and 830B are provided with suitable comparison voltages through voltage dividing resistors R81C, R82C, and R79C and pull-up resistors R83C and R78C. A satisfactory integrated circuit is an LM339 available from National Semiconductor. In the preferred embodiment, the comparison voltages are provided by a source of positive potential and a source of negative potential connected by a voltage divider formed by R81C, R82C, and R79C. For the ±12 voltage level used in the preferred embodiment, resistor values are those listed the table below.

Digital level translators 832A and 832B are inserted between comparators 830A and 830B, respectively, and produce logic level outputs for the inputs to flip-flop 1122.

Figure 76:
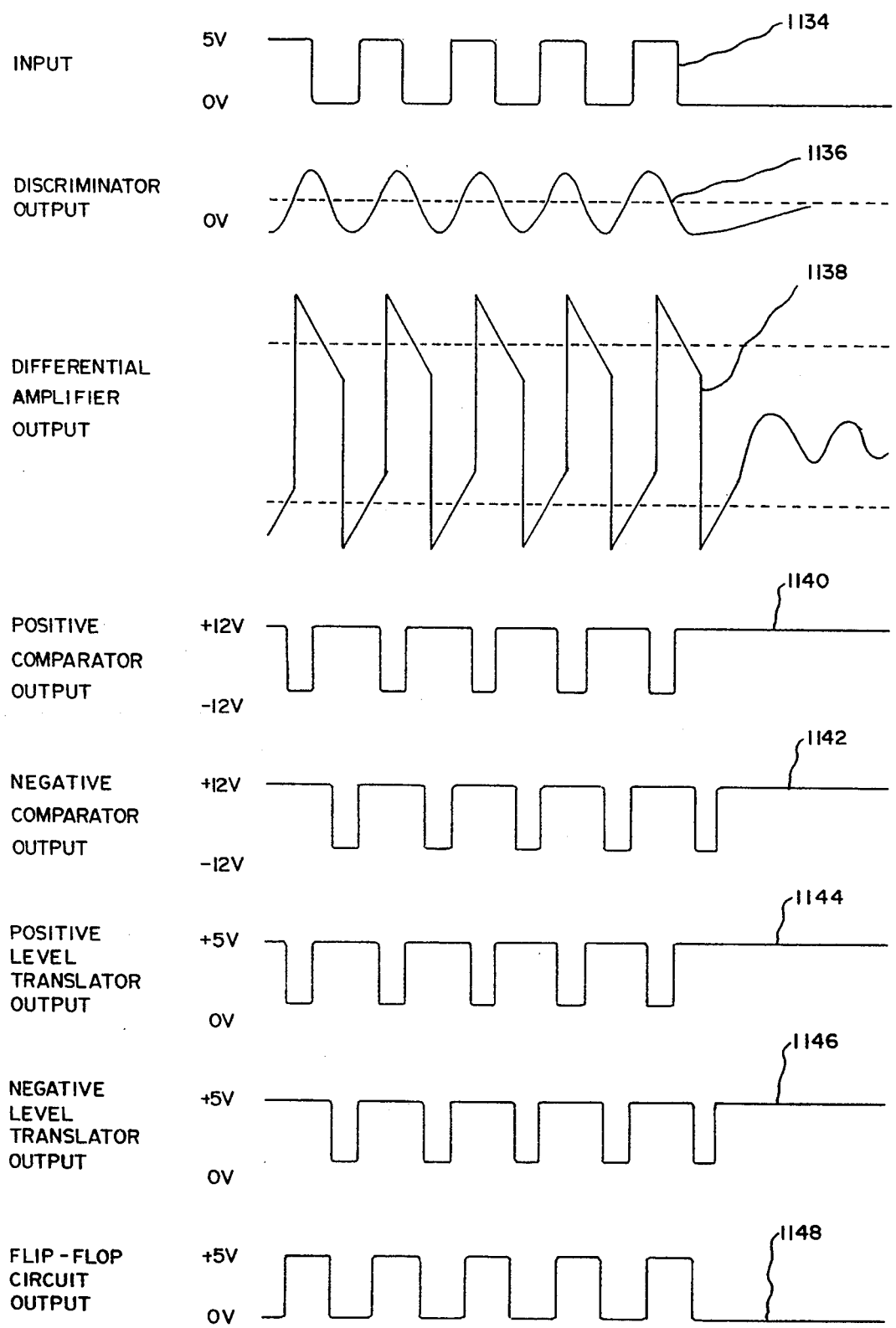
FIG. 76 is a timing diagram showing representative waveforms involved in practicing the radio data decoder.

The function of positive comparator 830A is to interrupt a current at the output of positive comparator 830A whenever and as long as the amplitude of waveform 1138 exceeds the positive comparison level voltage. A representative output 140 from positive comparator 830A is seen in FIG. 76.

The function of negative comparator 830B is to interrupt a current at the output of negative comparator 830B whenever and as long as the amplitude of waveform 1138 is less than the negative comparison voltage. A representative output 1142 from negative comparator 830B is seen in FIG. 76.

The two outputs of comparator circuits 830A, 830B are respectively applied to the inputs of flip-flop 1122 through digital level translators 832A and 832B, respectively. In the currently preferred embodiment, a set-reset flip-flop 1122 comprises two negative logic AND gates (NAND gates 834A and 834B) connected as shown in FIG. 74. A suitable negative logic AND gate is SN74279 available from Texas Instruments. A low logic level at the input of NAND gate 834A will set flip-flop 1122 Output to a logic level "high". Flip-flop 1122 output is reset to "low" by a "low" logic level at the input of NAND gate 834B. Flip-flop 1122 output 1148 voltage level (FIG. 76) represents a stream of digital data corresponding to the digital input 1134.

The values of circuit components are not critical to the operation of receiving circuit 1120. Of course, the combinations of resistors and capacitors are chosen such that the response time (or "time constant") of the differentiating circuit is compatible with the input frequency from the radio 804. Variations and modifications may be made without departing from the present invention. In operation, receiving circuit 1120 provides a rapid "off" to "on" time of less than five milliseconds.

Figure 75A:
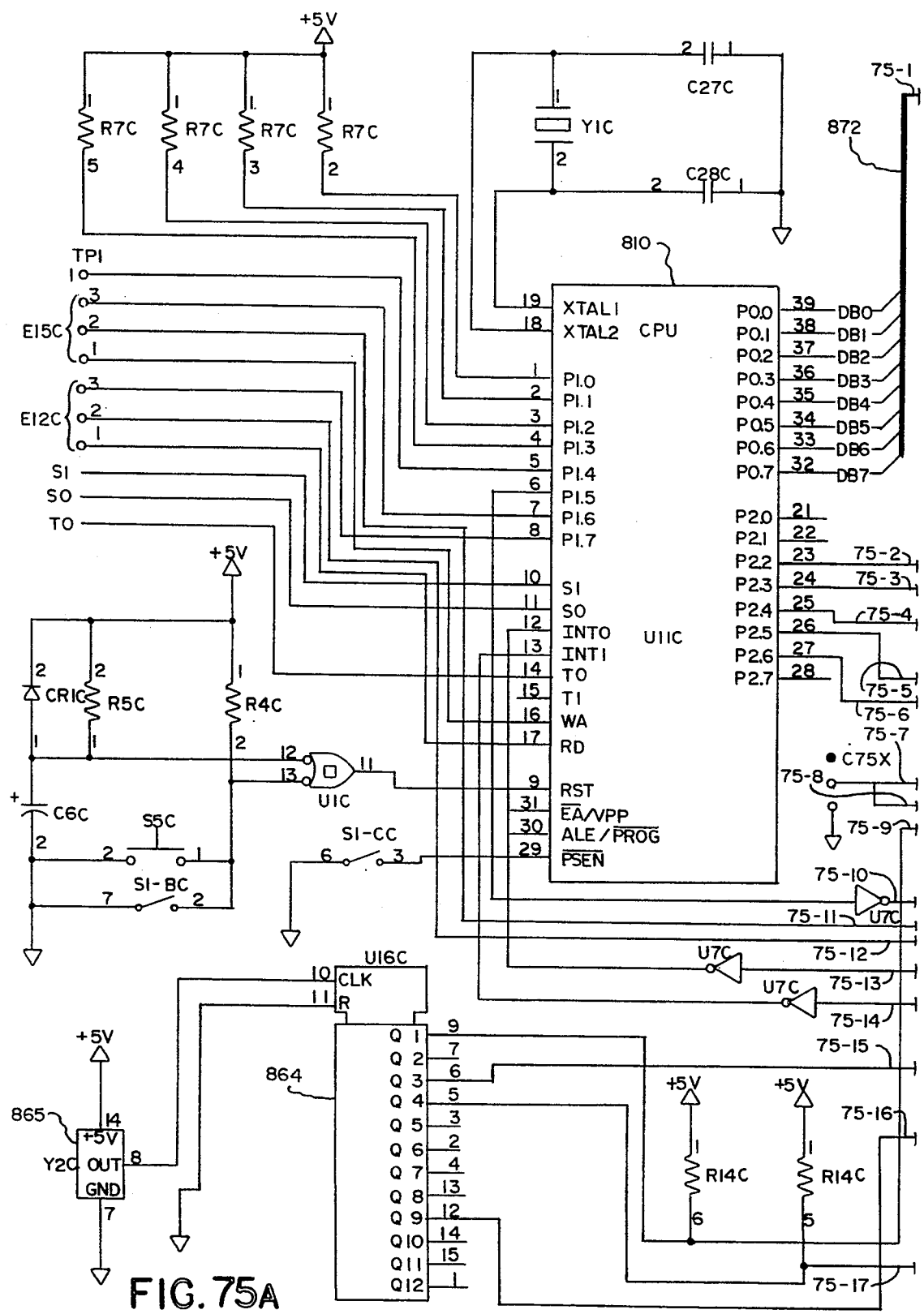
FIG. 75 is a detailed schematic of the automated guided vehicle controller communications electronics which receive input from the radio data decoder, said electronics comprising an SDLC chip, a central processing unit, a clock generator, and floor controller interfacing circuits.
Figure 75B:
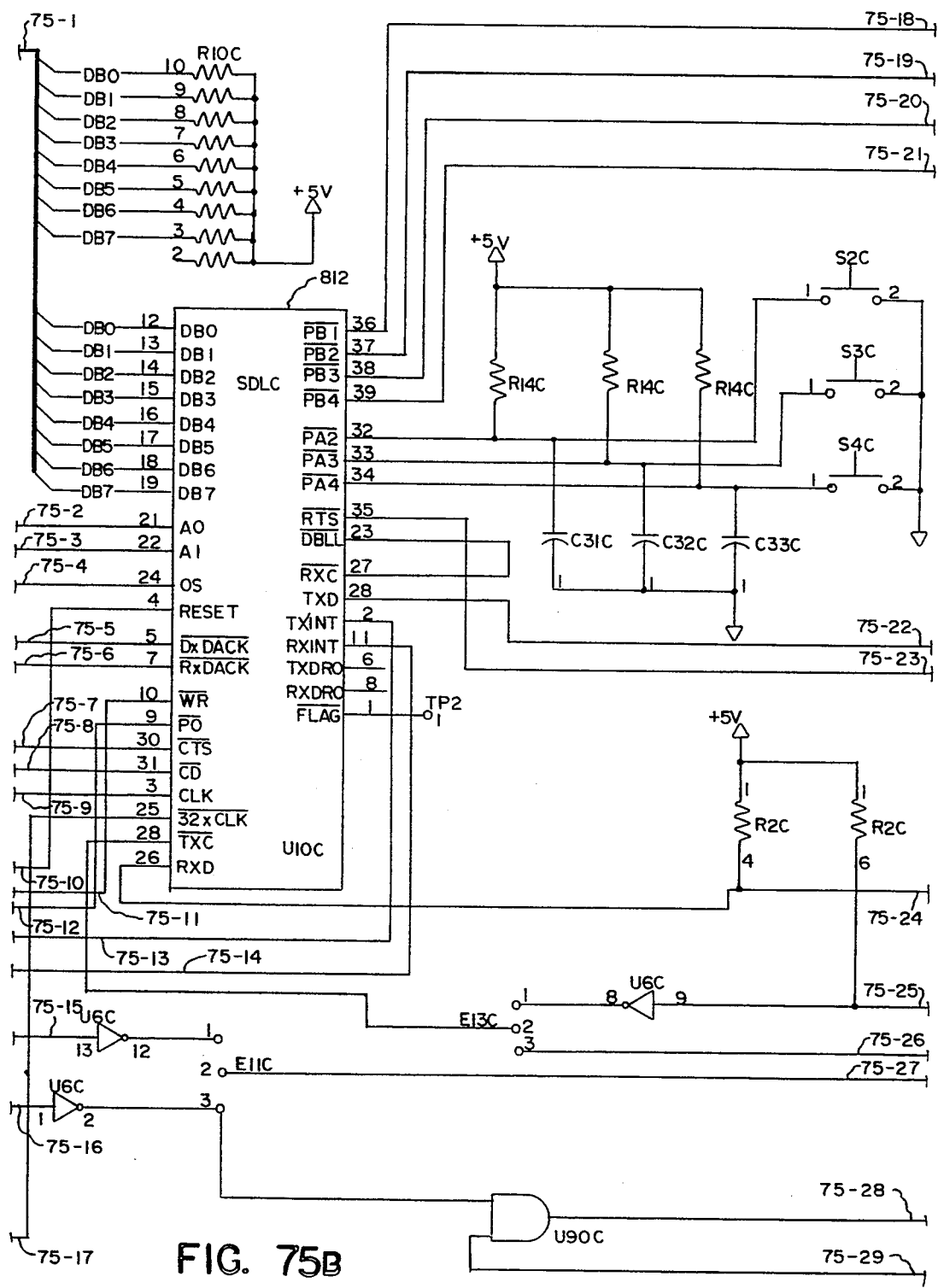
Figure 75C:
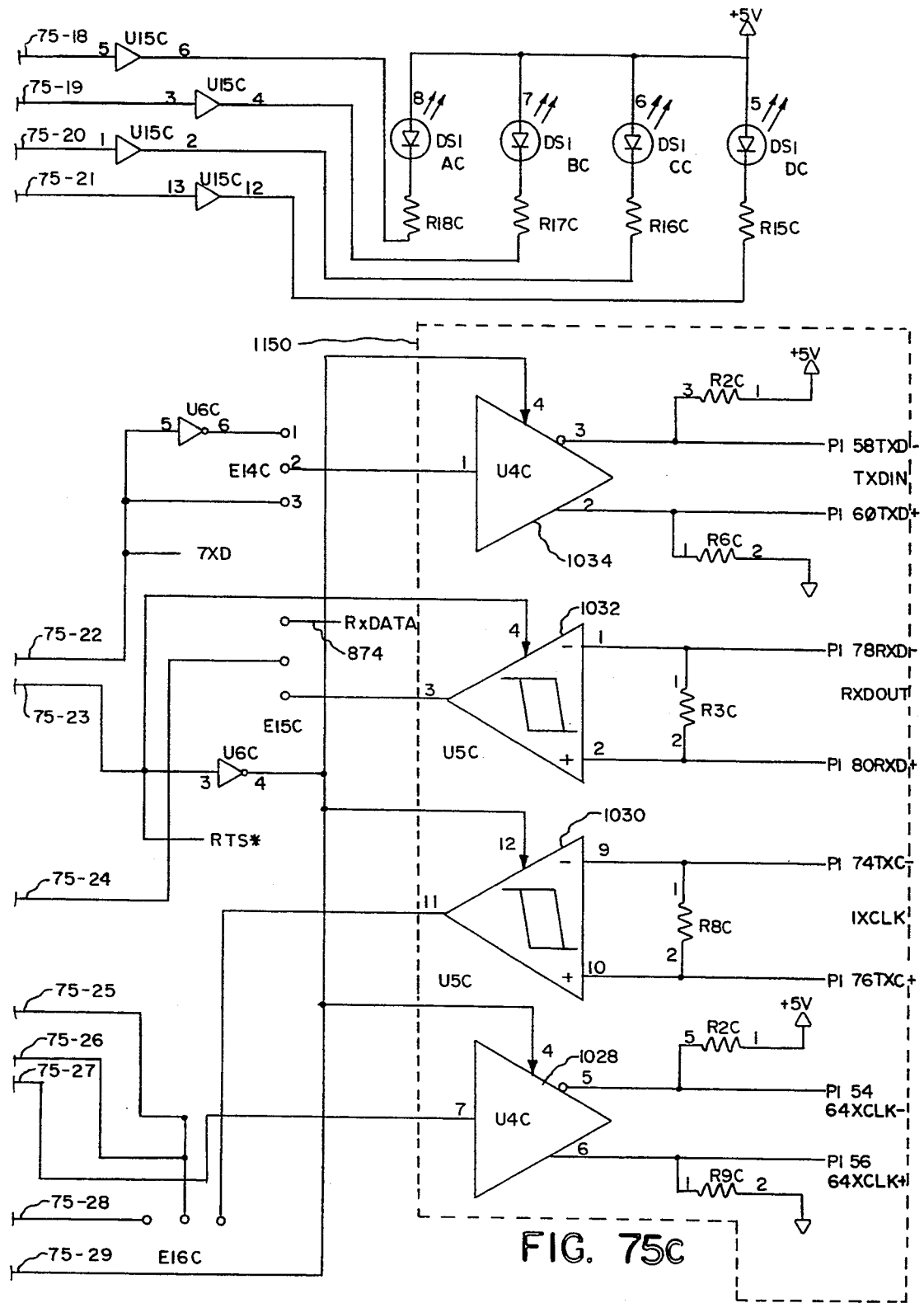

A detailed schematic of the circuits comprising interconnections between central processing unit 810 and SDLC chip 812 is found in FIG. 75. Connections between each of the components are standard and known in the art. Therein, RxDATA 874 is received through switch E15 to the RxD input of SDLC chip 812. Clock generation is provided by oscillator 865 and clock divider chip 864. Light emitting diodes DS1AC provide visual status of operation of SDLC chip 864. All "E" references specify computer controlled switches or jumpers.

Of particular interest is the interface to a guidewire floor controller which comprises the interfacing circuits 1150 enclosed by dashed lines in FIG. 75. Interfacing circuits 1150 comprising guidewire floor controller drivers of transmit driver 1034, receive amplifier 1032, transmit clock 1030, and an output amplifier for a sixty-four times clock 1028. Components used in currently preferred embodiment of the wireless communication system as seen in FIGS. 74 and 75 are found in the following list:

| Number | Name | Value or Type |
| --- | --- | --- |
| R2C | Resistor | 2.2 K Ohms |
| R3C | Resistor | 100 Ohms |
| R4C | Resistor | 2.2 K Ohms |
| R5C | Resistor | 2.2 K Ohms |
| R6C | Resistor | 2.2 K Ohms |
| R8C | Resistor | 100 Ohms |
| R9C | Resistor | 2.2 K Ohms |
| R10C | Resistor | 4.7 K Ohms |
| R14C | Resistor | 2.2 K Ohms |
| R15C | Resistor | 180 Ohms |
| R16C | Resistor | 180 Ohms |
| R17C | Resistor | 180 Ohms |
| R18C | Resistor | 180 Ohms |
| R73C | Resistor | 30 K Ohms |
| R74C | Resistor | 10 K Ohms |
| R77C | Resistor | 10 K Ohms |
| R78C | Resistor | 10 K Ohms |
| R79C | Resistor | 3.3 K Ohms |
| R80C | Resistor | 1000 K Ohms |
| R81C | Resistor | 3.3 K Ohms |
| R82C | Resistor | 5.1 K Ohms |
| R84C | Resistor | 10 K Ohms |
| R83C | Resistor | 100 Ohms |
| R90C | Resistor | 4.3 K Ohms |
| R91C | Resistor | 10 K Ohms |
| R92C | Resistor | 100 Ohms |
| R93C | Resistor | 2.4 K Ohms |
| R201C | Resistor | 200 Ohms |
| R202C | Resistor | 1.33 K Ohms |
| C205C | Capacitor | 10 pf |
| C207C | Capacitor | .01 μf |
| C207AC | Capacitor | 10 μf |
| C27C | Capacitor | 33 pf |
| C28C | Capacitor | 33 pf |
| C6C | Capacitor | 100 μf |
| C31C | Capacitor | 0.47 μf |
| C32C | Capacitor | 0.47 μf |
| C33C | Capacitor | 0.47 μf |
| 810C | CPU | DS500032-12 |
| 812C | SDLC | 8273 |
| 834AC | Nand | 74LS279 |
| 834BC | Nand | 74LS279 |
| 836AC | Inv. Amp. | Std |
| 836BC | Inv. Amp. | Std |
| 838C | Nand | 74LS132 |
| 838AC | Nand | 74LS00 |
| 848C | Inv. Amp. | Std |
| 860C | Pow. Reg. | LM317 |
| 864C | Clock Gen. | 74HC4040 |
| 1034C | Out. Amp. | 3487 |
| 1028C | Out. Amp. | 3487 |
| 1030C | Input Amp. | 3486 |
| 1032C | Input Amp. | 3486 |
| CR1C | Diode | 1N914 |
| U1C | Nor | 74LS132 |
| U6C | Inv. Amp. | 74LS04 |
| U7C | Inv. Amp. | 74LS04 |

-continued

| Number | Name | Value or Type |
| --- | --- | --- |
| U14C | Nor | 74LS02 |
| U15C | Amplifier | 7407 |
| U33C | Inv. Amp. | 1489 |
| U82C | Diff. Amp. | TL072 |
| U83C | Diff. Amp. | LM339 |
| U90C | And Gate | Std |

Guide Path Marking

AGVC 13 controls automatic guide vehicles over a plurality of guide paths. As seen in FIG. 1, the guide paths may be a substantially continuous guidewire or series of guidewires activated by a central source such as AGVC 13, a sequence of intermittently placed update markers requiring an AGV 2A to traverse therebetween by self contained guidance, or a passive guidewire not connected to a power source but receiving emitted power induced from the AGV 2A, itself. These paths are depicted by guidewires 3 and update markers 6 in FIG. 1. Passive wire loops in a mat 51 as seen schematically in FIG. 3. The passive wire loop in a mat 51 provides opportunity for guidewire guidance where there is no power connection to AGVC 13. Such opportunities are found in terminal positioning and providing temporary paths between otherwise marked guide paths.

The Automatic Guided Vehicle (AGV 2A)

Figure 2:
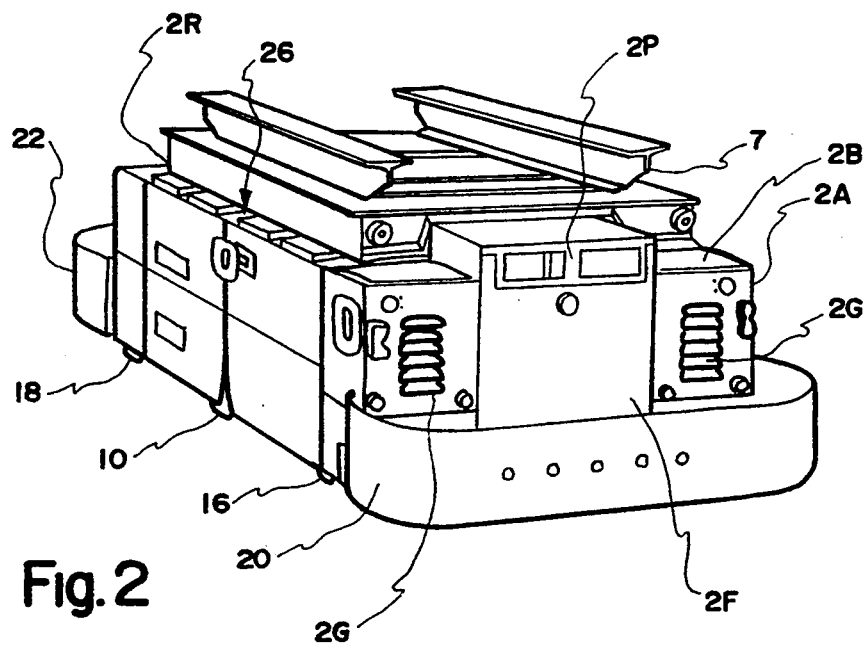
FIG. 2. Perspective view of an automatic guided vehicle.
Figure 3:
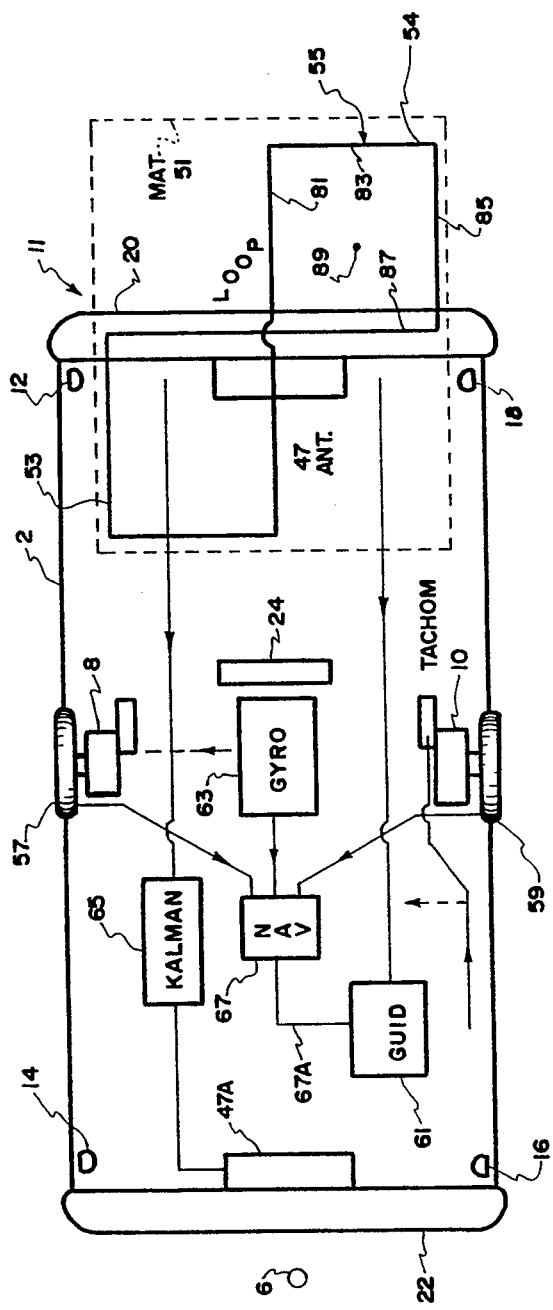
FIG. 3. Simplified top view of the vehicle and of a passive loop of conductor in a floor mat at a terminal.

One automatic guided vehicle, AGV 2A, is depicted isometrically in FIG. 2 and schematically, showing placement of wheels and castors in FIG. 3. It has drive wheels 8, 10 on its port and starboard sides respectively, which are powered individually by motors. Casters 12, 14, 18 and 16 support the vehicle at its port front, port rear, starboard front and starboard rear corners respectively. As earlier described, the terms port, starboard, front and rear refer to physical absolutes of the vehicle. The terms left and right are relative to the direction of travel; the vehicle operates symmetrically in either direction. The front 2F of vehicle 2A as seen in FIG. 2 comprises and is identified by two laterally disposed grills 2G and a control panel 2P. The rear 2R of vehicle 2A is the other end. Port and starboard are referenced to the front 2F of vehicle 2A. These terms are generally used herein.

Touch-sensitive bumpers 20, 22 are located at the front and rear of the vehicle, respectively, to detect obstacles in the path and to activate switches to stop the vehicle.

In addition to the mechanical parts mentioned above, each AGV 2A further comprises sensors, a two-way communication system, a navigation and guidance system, and a vehicle traffic control system, each of which resides below the top surface 28 of AGV 2A wherein vehicle 2A comprises a well 26 used for navigation and guidance apparatus, leaving the top surface free for loads or other uses, as seen in FIG. 2.

The AGV 2A Communications System

The AGV 2A communications system comprises both guidewire and wireless communications capability. Guidewire communications are the same as disclosed in U.S. Pat. Nos. 4,491,570 and 4,902,948 which are the property of the assignee of this invention and which are made part hereof by reference. A block diagram of the wireless communications system is seen in FIG. 73. As seen therein communications board 824 comprises wireless communications components and circuits which are similar to the wireless communications components and circuits seen in the block diagram of base station 826 in FIG. 72. However, a central processing unit 8742 is used in communications board 824 while a DS5000 central processing unit is used in base station 826. Even so, wireless communications functions of communications board 824 and base station 826 are the same. The major difference is the higher volume message handling and buffering required of base station 826.

As seen in FIG. 73, a radio 804 is located in each wireless communicating vehicle 2A and receives signals via an antenna 15. Communication lines RxAUDIO 870, PTT 868, and TxAUDIO 866 transmit received audio digital data streams, permission to transmit, and digital data streams to be transmitted, respectively, in the directions shown, between radio 804 and radio data decoder 820.

Radio data decoder 820 operates as earlier described. Also as earlier described, lines RxDATA 874, RTS 840, CTS 842, and TxDATA communicate received data, request to send, clear to send, and data to be transmitted, respectively, between radio data decoder 820 and SDLC 812, over lines 818 in the directions shown. SDLC operates as is well known in the art. A bus 816 provides communication between SDLC 812 and CPU 810'. A circuit diagram which includes the circuits related to the vehicle 2A provided in FIGS. 87-95 and hereafter described as part of the vehicle 2A microprocessor system.

The AGV 2A Sensors

Each AGV 2A comprises a plurality of sensors and sensors types providing measurement capacity for a plurality guide path marking systems and redundancy of measurement whereby the effects of systematic sensor errors are dynamically removed from the estimates of AGV 2A position and direction of travel. A navigation and guidance system provides a plurality of operating modes for guiding the AGV 2A over a number of different guide paths. As seen in FIG. 3, sensors of the currently preferred embodiment comprise antennae 47 for measuring a magnetic field emitted by guidewire 3 or a mat 51, Hall sensors 24 for measuring each traversed update marker 6, which, in the currently preferred embodiment, comprises a magnet, as described in detail hereafter, an angular rate sensor system 500 for dynamically measuring vehicle direction, and an encoder 58 for each fifth wheel 57 and sixth wheel 59 for measuring travel at the port and starboard sites of AGV 2A, respectively.

A simplified top view of AGV 2A is shown conceptually in FIG. 3. An update marker 6 is shown on the floor on the left side of the figure. This is a guidance system of the type represented by the routes 5 of FIG. 1. In FIG. 3, on the ground at the terminal 11 is a mat 51, which has a loop of wire 55 in the shape of a skewed figure eight embedded in it. A left-hand portion or lobe of the loop is designated 53 and a right-hand portion or lobe is designated 54. An antenna system 47 is near the front of the vehicle; it is centered on a longitudinal centerline of the vehicle and extends transversely. A similar antenna system 47A is at the rear.

FIG. 3 also shows an array of Hall sensors 24 that are employed in the navigation and guidance system of the vehicle, as well as other navigation and guidance subsystems and components including a gyroscope 63, a navigation computer 67, a motion control processor (computer) 61 and fifth and sixth wheels 57, 59 for measuring the travel of the port and starboard sides respectively of the vehicle. In combination, these sensors provide redundancy of measurement whereby errors due to causes comprising drift, miscalibration, wear, temperature change, and variations in vehicle response to load and use are dynamically corrected. A Kalman filter 65 is used to evaluate such errors in each sensor and provide adjusting corrections to the navigation and guidance system as described hereafter.

The position-sensing portion of the vehicle includes a magnetic-field transmitter on the vehicle, the passive loop of wire 55 on the floor, and signal-receiving equipment on the vehicle. During operation of the system as a whole the vehicles 2A drive about on the various segments of the routes 3, 5 as shown in FIG. 1 to pick up and deliver loads. The vehicles are propelled forward and steered by rotation of the drive wheels 8 and 10. The direction and speed of each wheel 8, 10 is controlled by its respective portion of a control system as described below

The AGV 2A Navigation and Guidance System
Update Marker Guidance System

Figure 32:
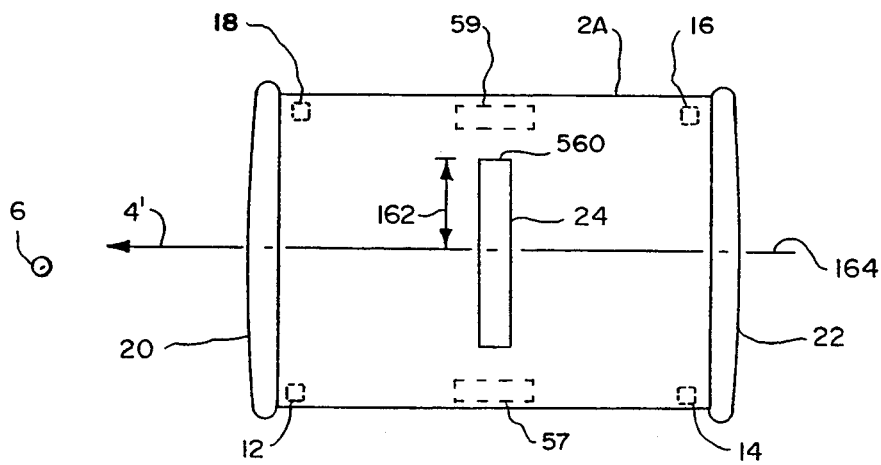
FIG. 32 depicts a guided vehicle system that utilizes an update marker navigation and guidance system.

FIG. 32 is a stylized top view of the guided vehicle 2A driving in the direction of the arrow 4' toward a magnet 6 that is mounted in the floor. As related earlier, vehicle 2A has drive wheels 57, 59 on the left and right sides respectively, which are powered individually by motors that are not shown in FIG. 32. Casters 12, 14, 18 and 16 support the vehicle at its left-front, left-rear, right-front and right-rear corners respectively. The terms front and back are used here for convenience of description; the vehicle operates symmetrically in either direction.

Touch-sensitive feelers or bumpers 20, 22 are located at the front and back of the vehicle respectively to detect obstacles in the path and to activate switches to stop the vehicle. A transversely arranged linear array of magnetic sensors 24 is mounted on the vehicle as shown in FIG. 32.

Update Marker System—The floor magnet

Figure 33:
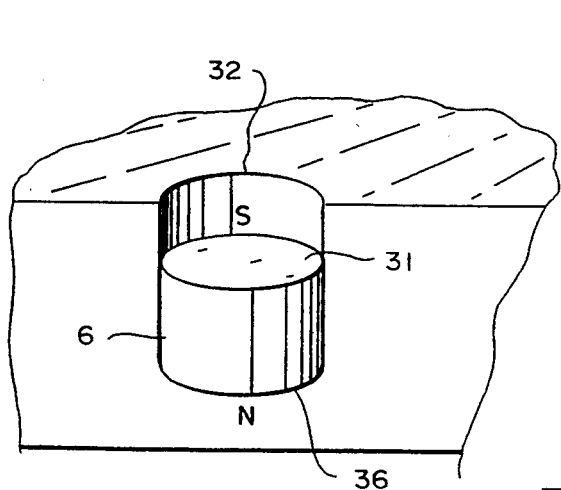
FIG. 33 shows an update marker magnet in the floor.

In FIG. 33 a floor marker 6 is shown in place in a hole 32 in the floor. In this embodiment, floor marker 6 comprises a cylindrical magnet, placed with its axis vertical, and has its south-polarized face 31 facing upward and its north-polarized face 36 at the bottom of the hole. Since only magnets are used in the currently preferred embodiment, the term marker 6 and magnet 6 will be used interchangeably. However, this interchangeable use is only for the purpose of simplicity and clarity of presentation. In the general case, it should be understood that more than one kind of floor marker can be used in the invention. The diameter of the magnet 6 in this embodiment is ⅞ inch and its axial height is 1 inch.

Magnetic-Field Sensors

Figure 34:
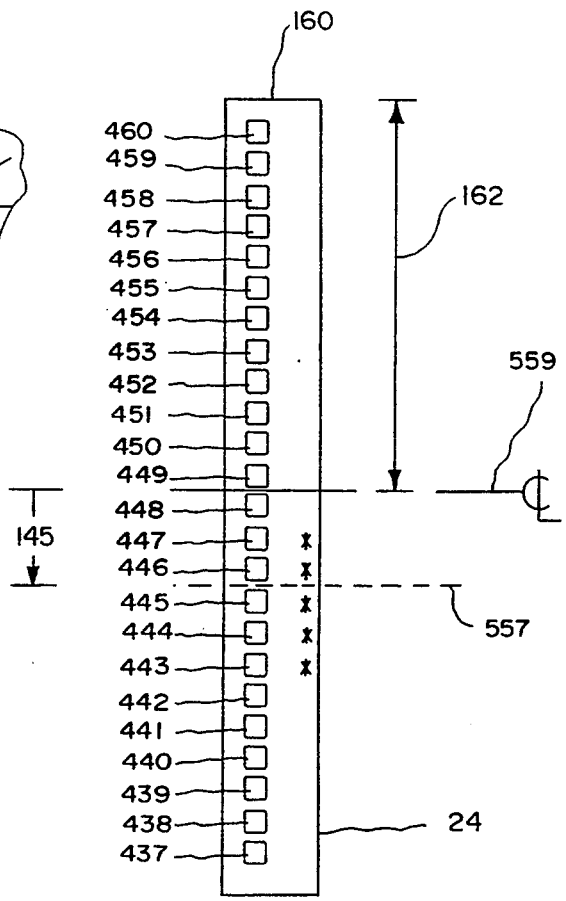
FIG. 34 shows an array of Hall magnetic sensors on the vehicle.

The array 24 of magnetic-field sensors is shown in plan view in FIG. 34. In this embodiment it comprises twenty-four Hall-effect sensors spaced for example 0.8 inch apart in a straight line perpendicular to the longitudinal centerline 559 of vehicle 2A and laterally centered on the centerline 559 of vehicle 2A. The first sensor is labeled 437; the twelfth sensor is 448; the thirteenth sensor is 449 and the twenty-fourth sensor is 460.

The sensors 24 are commercially available devices whose analog output voltage varies as a function of the magnetic field it detects. Each sensor has a null voltage, which is its output when no magnetic field is present. When a magnetic field is present the voltage consistently increases or decreases relative to the center of flux of a magnet and to the null voltage, depending upon whether the magnet crosses a south or north pole. In the described embodiment of the invention the sensors always detect a south pole field 31, so their output voltage always increases as a result of being near a magnet.

Figure 35:
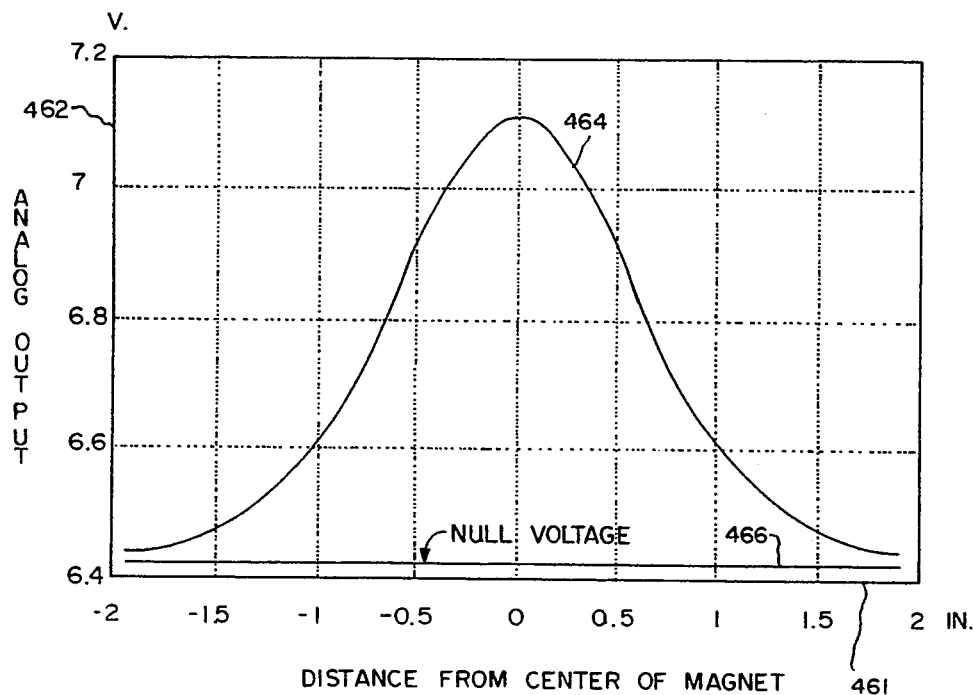
FIG. 35 is a curve of analog voltage output from one of the Hall sensors as a function of distance of the sensor from a floor magnet.

A representative graph 464 of the analog output voltage versus distance of a sensor from the center of a magnet 6 is shown in FIG. 35. Voltage output from the Hall sensor (such as sensor 445, for example) is shown on the ordinate 462, in volts. The distance 145 from the center 557 of the magnet to the sensor is shown on the abscissa 461 in inches. For the measurement shown, the graph has a depressed zero and the output voltage in the absence of any magnetic field is the null voltage 466 of about 6.44 volts.

In this measurement, when the sensor 445 is directly over the center 557 of the magnet the analog output voltage is approximately 7.1 volts. When the sensor 445 is approximately one inch away from the center 557 of the magnet 6 the analog output voltage 464 produced by the sensor is approximately 6.65 Volts. Thus, two magnets which are more than four inches apart, but sufficiently close to be simultaneously sensed, produce detectable signals which are essentially independent.

Circuits for Processing Sensor Signals

Figure 36:
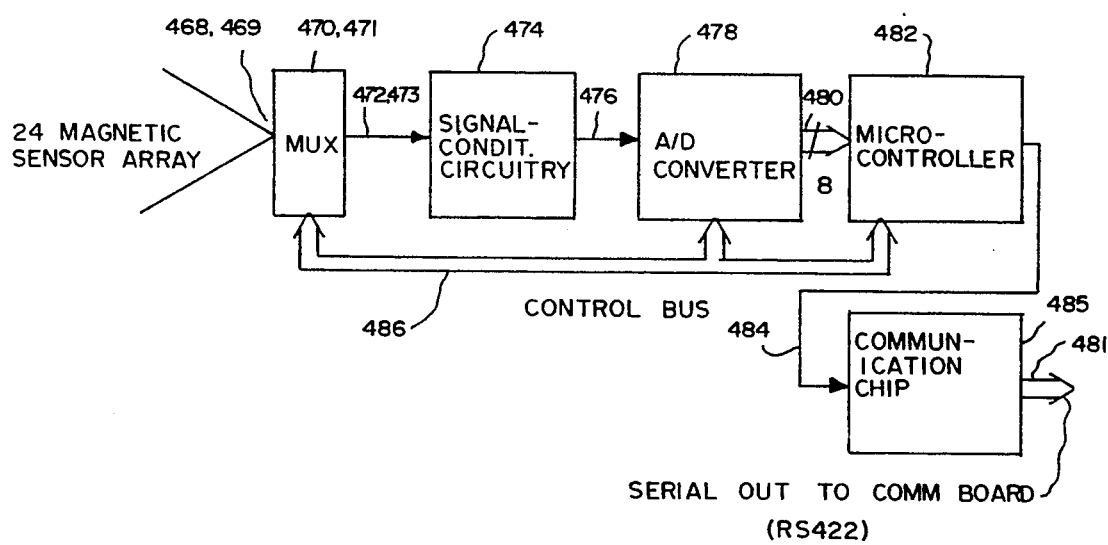
FIG. 36 is a block diagram of some electronic equipment on the vehicle for processing magnet sensor signals.

Signals from the twenty-four Hall sensors of array 24 are input at terminals 468, 469 to a pair of ganged multiplexers 470, 471, as shown in FIG. 36. The multiplexers 470, 471 receive analog signals continuously from the twenty-four sensors 437–460, and select one at a time sequentially for output at line 472. The two output signals from the multiplexers are connected to a signal-conditioning circuit 474 whose functions are explained in more detail below. Its output at line 476 is connected to an analog-to-digital converter (A/D) 478 whose output comprises eight digital lines 480 that conduct digital signals to a microcontroller 482.

Output data from the microcontroller 482 are in serial form differential output at a line 484, which conducts the data through a communication chip 485 and differential output lines 481, therefrom, to a communication board, not shown. A control bus 486 enables the microcontroller 482 to control multiplexers 470, 471 and the A/D converter 478 as described more fully below.

Circuit Details

Figure 37:
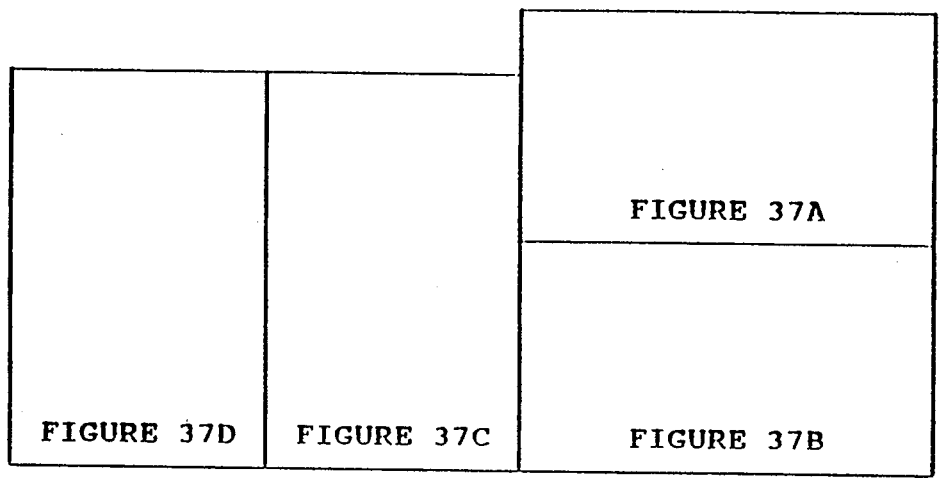
FIG. 37. provides a map showing relative orientation of the schematic circuits as seen in FIGS. 37A-37D.

More details of the electronic circuits on the vehicle are shown in FIGS. 37 and 37A–D. In combination, FIGS. 37A–D comprise a single circuit layout, numbered in clockwise rotation and divided as seen in FIG. 37. Interconnections among FIGS. 37A–D comprise twenty-four lines between FIGS. 37A and 37B, six lines between FIGS. 37B and 37C, and four lines between 37C and 37D. The lines between 37A and 37B comprise twenty four sensor inputs 468, 469. Interconnections between 37B and 37C comprise five lines, generally designated 514, and line 416. Lines 484, 484', 514' and 631' connect components of FIGS. 37C and 37D.

The twenty-four sensor inputs 468, 469 are connected to two sequentially addressed multiplexers which may be Model AD7506 multiplexers. Outputs 472, 473 are each connected through a series resistor 491 to a summing inverting input 483 of amplifier 495. Output of amplifier 495 is conducted through a series resistor 490 to an inverting input 92 of a difference amplifier 494. A non-inverting input 96 of the difference amplifier 494 is provided with a fixed reference voltage from a regulated DC voltage source 498 and an inverting amplifier 501, which are conventional circuits.

The output 504 of the difference amplifier 494 is connected to the analog input terminal of an analog-to-digital converter 478. The circuits involving subcircuits 494, 495, 498, and 501 are represented by the signal-conditioning circuit block 474 of FIG. 36.

A/D converter 478 is a commercially available semiconductor device and may be model No. AD670 marketed by Analog Devices company of Norwood, Mass. It converts the analog signals that it receives on line 476 to 8-bit digital data at its eight output lines 480. Those lines 480 conduct the digital signal to input terminals of the microcontroller 482.

The microcontroller 482 may be of the type Intel 8051, 8751, etc. The one used in this embodiment is a Model DS5000, which is available from Dallas Semiconductor company of Dallas, Tex., and which is the same as Intel 8751 except with more internal RAM. A crystal 510 and two capacitors 512 are connected to a terminal of microprocessor 482 to determine the clock frequency of the microprocessor. Five lines generally indicated as 514 are connected from outputs of the microcontroller 482 to inputs of multiplexers 470, 471 to enable the microcontroller to step multiplexers 470, 471, through the twenty-four sensor inputs sequentially by addressing them one at a time. Output lines 484 from the microprocessor lead to a communications chip 485 and therefrom to a communication board related to a main microcontroller. Communications chip 485 may be a Motorola-manufactured and marketed MC3487.

The following table is a list of component types and values, as used in the circuit of FIGS. 37A-D.

| Number | Name | Value or Type |
| --- | --- | --- |
| MC1 | Capacitor | 1.0 μf |
| MC2 | Capacitor | 1.0 μf |
| MC3 | Capacitor | 1.0 μf |
| MC8 | Capacitor | 0.1 μf |
| MC9 | Capacitor | 33 pf |
| MC10 | Capacitor | 33 pf |
| MC11 | Capacitor | 0.1 μf |
| MC12 | Capacitor | 100 μf |
| MC13 | Capacitor | 0.1 μf |
| MC14 | Capacitor | 0.1 μf |
| MCR1 | Diode | 1N914 |
| MCR2 | Diode | HLMP6500 |
| MQ1 | Transistor | 2N2222 |
| MR1, R2 | Resistor | 100 K Ohms |
| MR3 | Resistor | 150 K Ohms |
| MR4 | Resistor | 100 K Ohms |
| MR5 | Resistor | 1.69 K Ohms |
| MR6 | Resistor | 2.21 K Ohms |
| MR8, 9 | Resistor | 2.2 K Ohms |
| MR11, 12 | Resistor | 10 K Ohms |
| MR13, 14 | Resistor | 2.2 K Ohms |
| MR15, 16, 17 | Resistor | 100 K Ohms |
| MR19 | Resistor | 43 K Ohms |
| MR20 | Resistor | 75 Ohms |
| R7 | Resistor | 4.7 K Ohms |
| R10 | Resistor | 100 K Ohms |
| R18 | Resistor | 150 K Ohms |
| E1-24 | Hall Sensor | 91SS12-2 |

-continued

| Number | Name | Value or Type |
| --- | --- | --- |
| U1, U9 | Multiplexer | AD7506 |
| MU2 | Diff. Amp. | LF347 |
| MU3 | Comm. Chip | MC3486 |
| MU4 | Microcontr. | DS500032 |
| MU5 | A/D Converter | AD670KN |
| MU6 | Logic Circuit | 74LS132 |
| MU7 | Comm. Chip | MC3487 |
| MU8 | DC Regulator | LM317LZ |
| MY1 | Crystal | 12MHZ |

Data Processing

Figure 40:
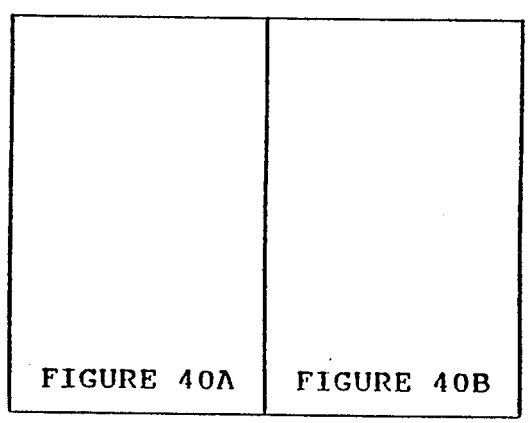
FIG. 40. provides a map showing relative orientation of the flow chart as seen in FIGS. 40A-40B.
Figure 37A:
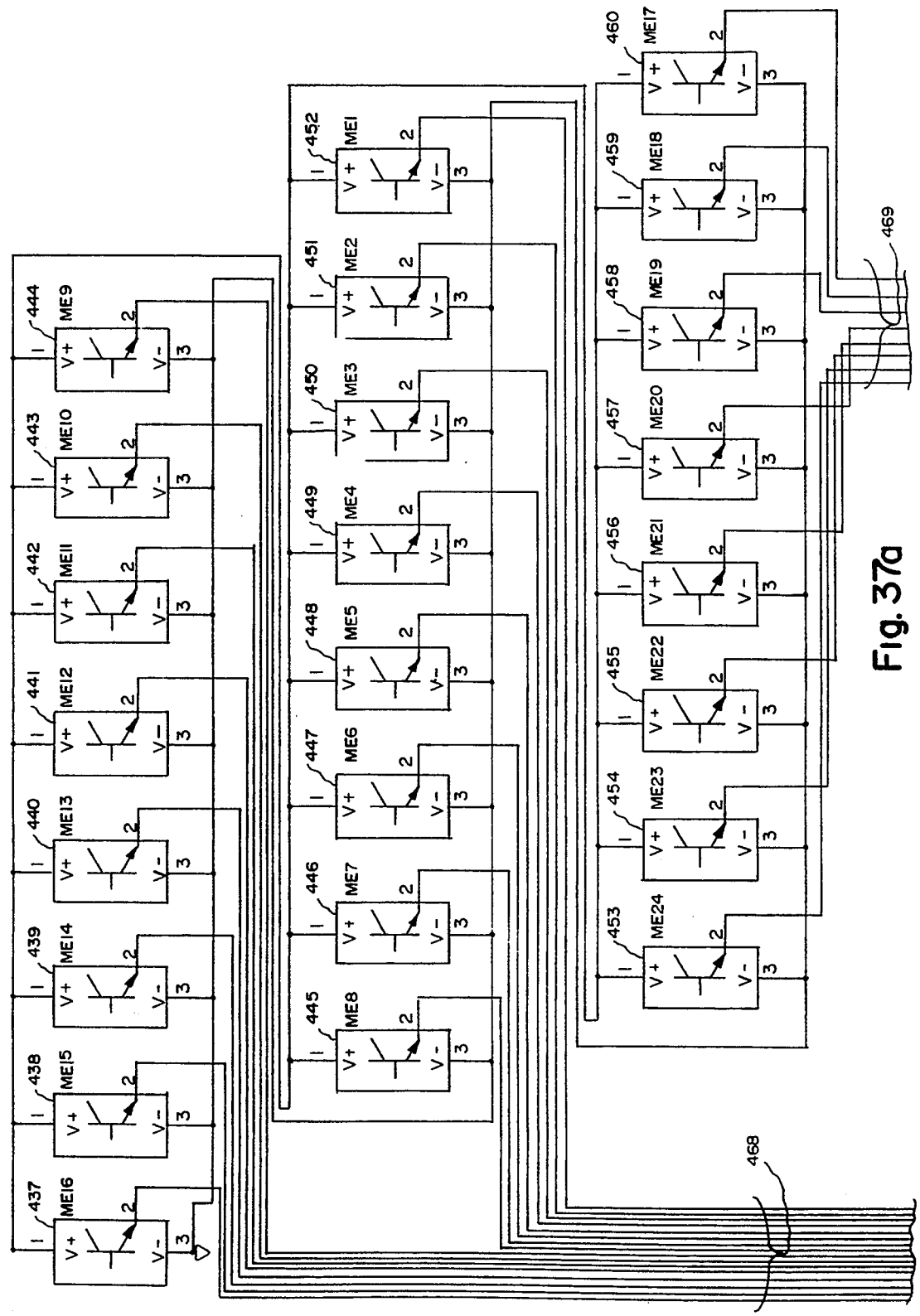
FIGS. 37A, 37B, 37C, and 37D are, in combination. a schematic diagram of the same electronic equipment.
Figure 37B:
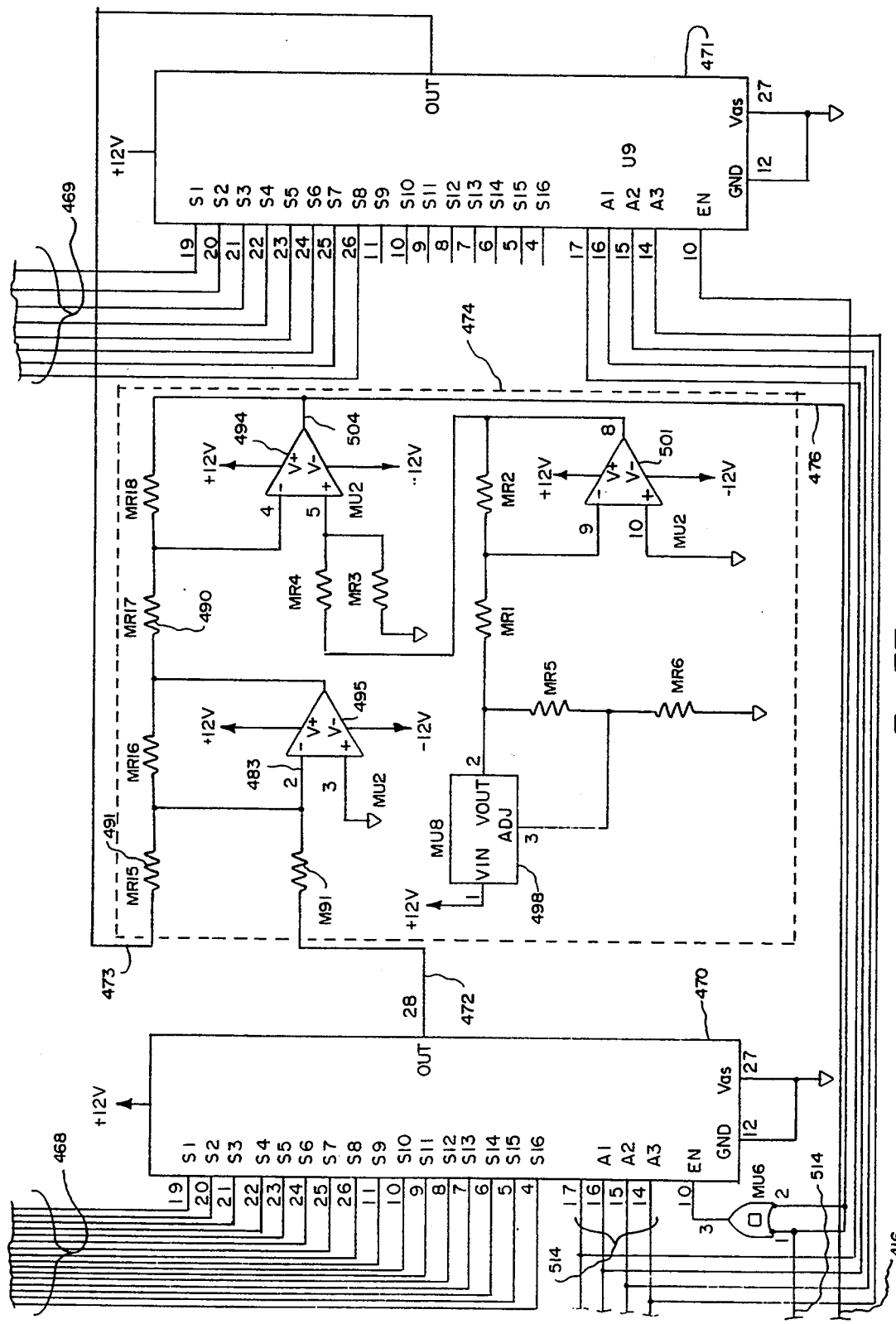
Figure 37C:
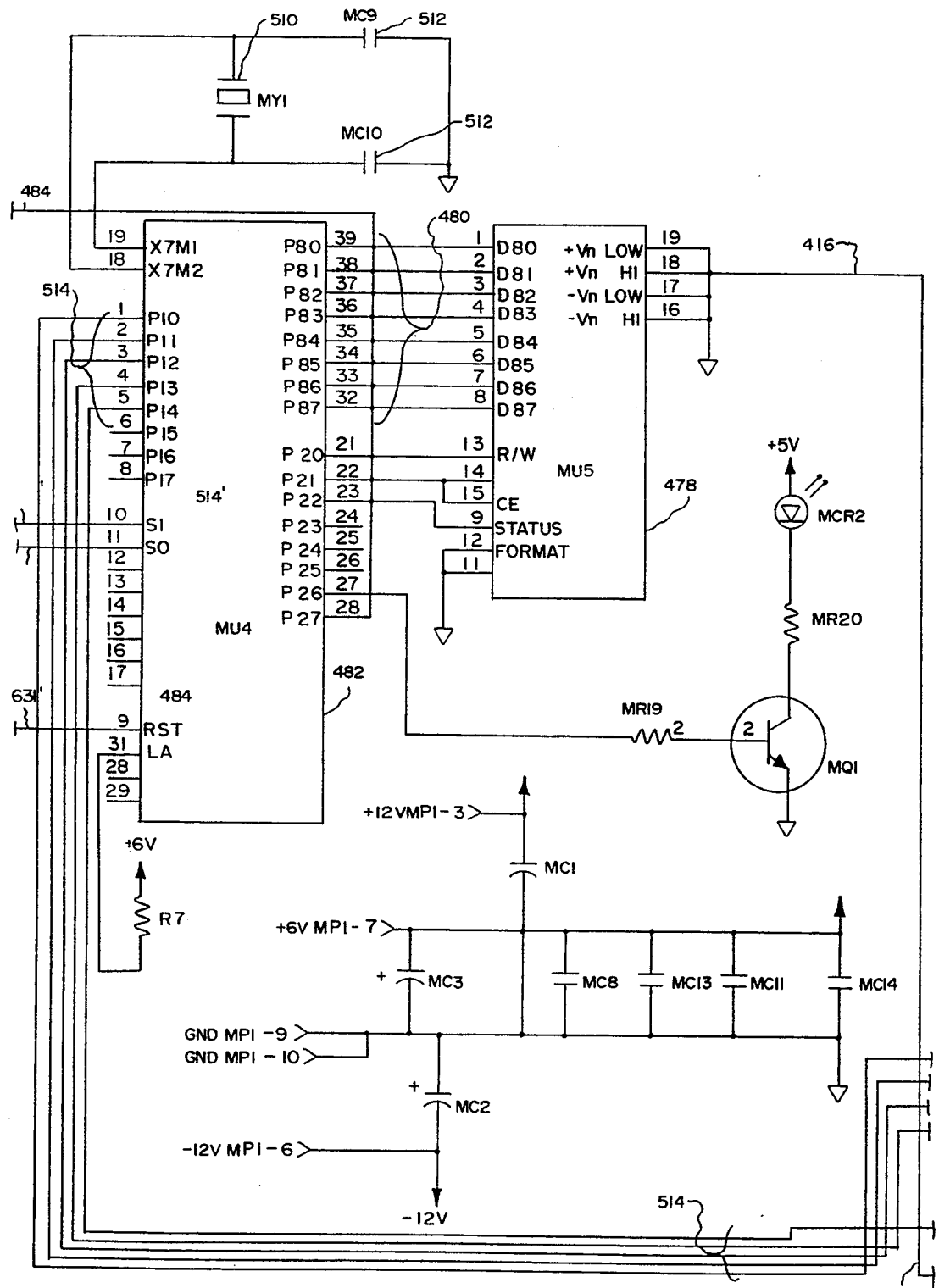
Figure 37D:
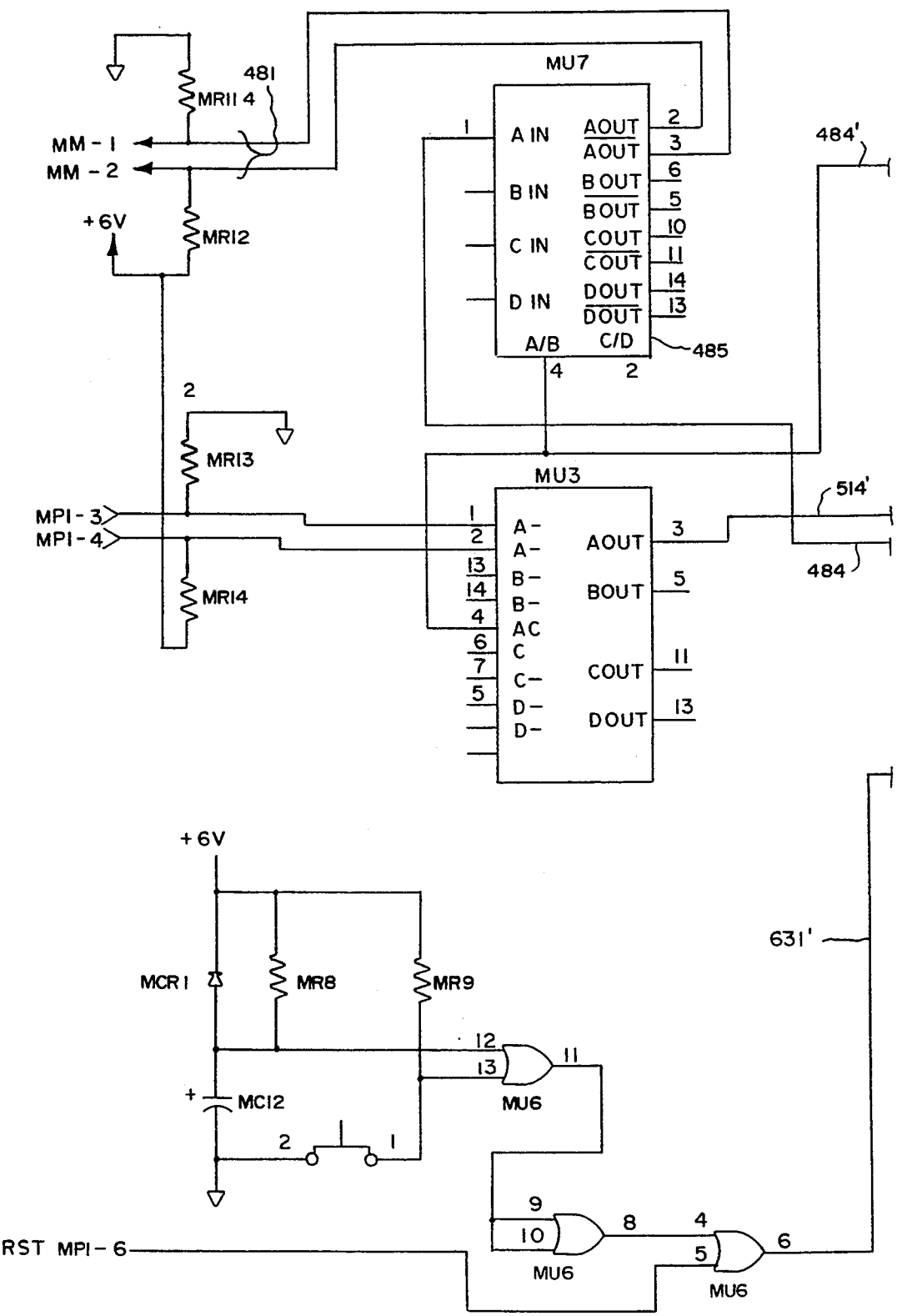
Figure 38:
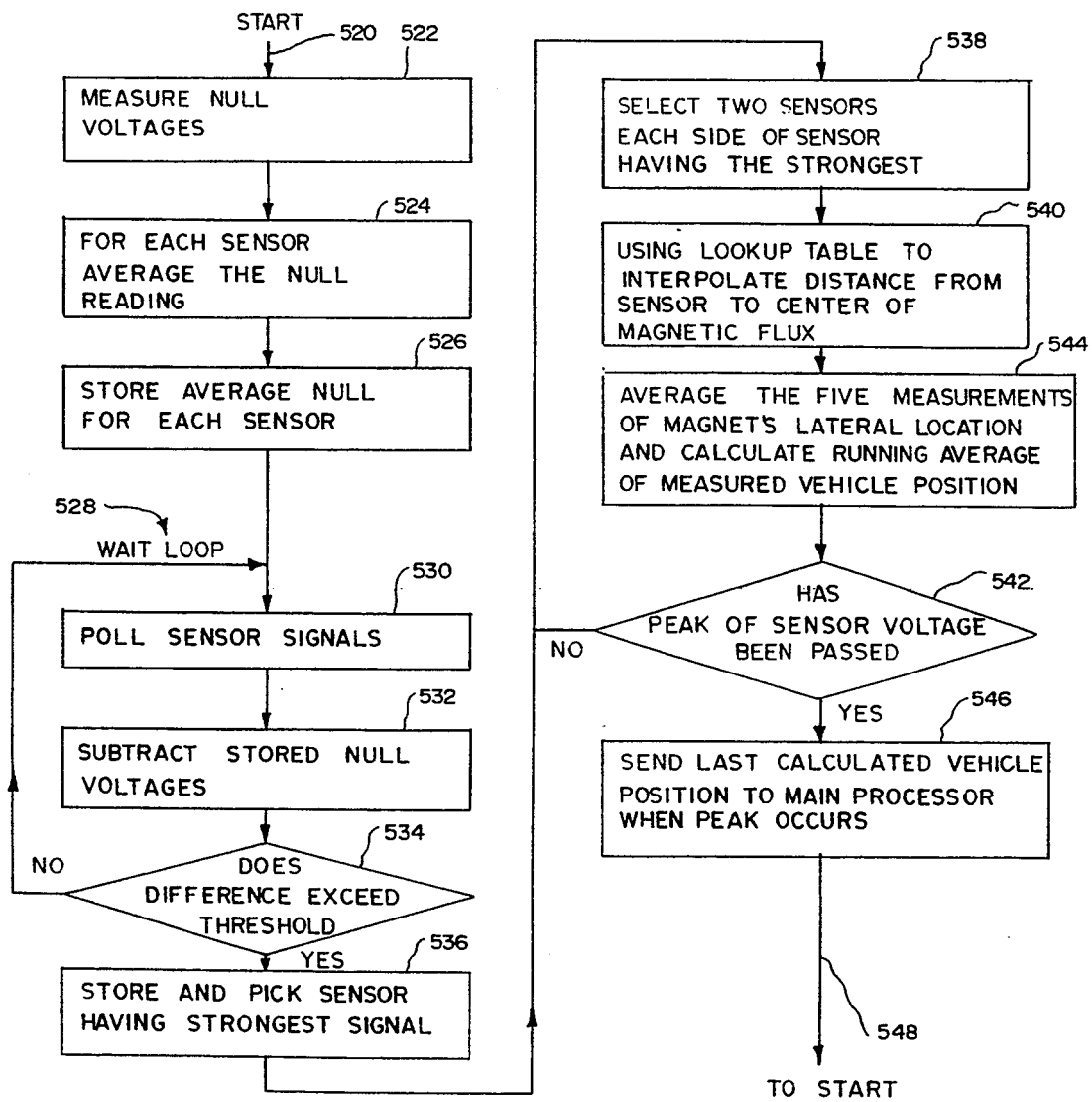
FIG. 38 is a simplified flow chart of an algorithm for processing sensor data to measure the lateral position of the vehicle relative to a magnet and to detect when a row of Hall sensors crosses the magnet.
Figure 39:
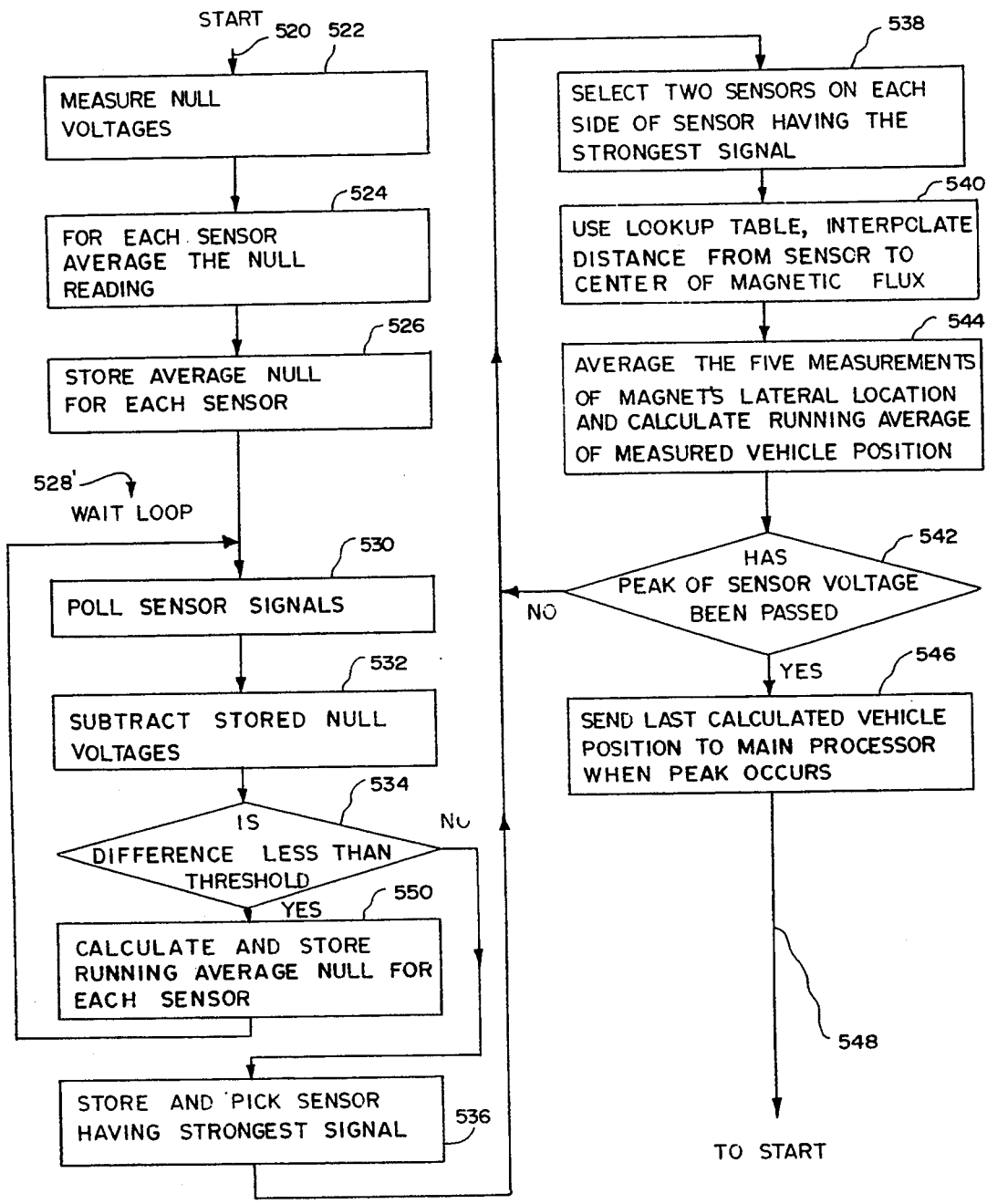
FIG. 39 is a simplified flow chart similar to FIG. 38 including sensor null measurement and related calibration during the WAIT LOOP.

A simplified algorithm is shown in the flow chart of FIG. 38 to explain how the microprocessor 482 determines the lateral and longitudinal positions of floor-mounted magnet 6 as the array of Hall sensors 24 passes generally over the magnet 6. Programming techniques for accomplishing the specified steps, seen in FIG. 38 and also in FIGS. 39 and 40, are known in the computer art.

Initializing and Updating of the Null Voltages

When the update marker system is activated the null voltage of each sensor 437-460 is measured by multiplexing the outputs of the sensors one at a time. The respective null signals of each of the sensors are measured several times, added together and divided to obtain an average value. Averaging is necessary to reduce the effects of errors in measurements of the null voltages. Each sensor has a different average null voltage; an average is computed for each sensor alone.

Because the sensor outputs vary with temperature the null voltage is remeasured (updated) for all of the sensors after each time that a magnet is traversed. This reduces errors that otherwise might result from differences in temperature along a vehicle's path.

A simplified description of the program of FIG. 38 starts at a flow line 520. In block 522 the null voltages of the sensors 437-460 are measured. To do this the microprocessor 482 of FIGS. 37 A-D address the first sensor by way of multiplexers 470, 471. The signal from the first sensor passes across line 472 to the difference amplifier 494 and the A/D converter 478, thence to the microprocessor 482, FIGS. 37 A-D, where it is temporarily stored.

Returning to FIG. 38, in block 522 the multiplexers 470, 471 are strobed to multiplex in the null voltage of the second sensor, etc. until all sensors have been measured. The entire sequence is then repeated several times in block 522, starting again with the first sensor. In block 524 all of the null readings of the first sensor are averaged and in block 526 the average value of null readings of the first sensor is stored. This averaging and storing process is performed for all twenty-four of the sensors.

Detection of a Magnet

After the null voltages have been stored the program goes into a wait loop 528. In the wait loop the microprocessor 482 continuously polls each sensor 437-460 to determine whether or not a signal level in excess of a predetermined threshold level exists, which would indicate the presence of a magnet nearby.

Details of the wait-loop are as follows. Block 530 shows the polling of sensor signals. In Block 532 the previously stored null voltage corresponding to each sensor is subtracted from the signal output of that sensor to obtain a difference signal, representing the strength of a magnetic field. In the block 534 the difference signal is tested to ascertain whether or not it exceeds a predetermined threshold level, which is set so as to differentiate between noise and true magnetic marker signals. If the difference signal is below the threshold level the wait-loop routine is repeated.

In another preferred embodiment, the program flow of which is seen in FIG. 39, the averaging and storing process is continued through a wait loop 528'. In this embodiment, a running average of each null voltage is calculated in block 550 by the following equation:

$$N_j(t)=(K_1*N_j(t-1)+r_j(t))/(K_1+1)$$

where:
- j represents the figure number of a selected sensor (i.e. j=437 thru 460).
- t is the time of the current sample.
- t−1 is the time of the previous sample.
- $N_j(t)$ is the average measurement of each null voltage at time t for sensor j.
- $K_1$ is an integer multiplier which determines the time or sample by sample weighting of past and present measurements on the current running average voltage calculation. ($K_1$ may be on the order of 100.)
- $N_j(t-1)$ is the average measurement of each null voltage at the previous sample or time t−1 for sensor j.
- $r_j(t)$ is the raw voltage measurement of the voltage at time t for sensor j.

When a difference signal is found to exceed the predetermined threshold level, the null voltage calculation is terminated. All other program functions in wait-loop 528' are the same as those of wait-loop 528.

Selection of a Group of Sensors

If the difference signal is large enough, block 536 stores the difference signal. It then finds the sensor having the greatest such difference signal and the sensor having the second greatest. The program of microprocessor 482 identifies the two closest sensors on the left side of the sensor that has the greatest difference signal, and the two closest sensors on the right side of the sensor that have the greatest difference signal, in block 538. Thus a group of five sensors is defined. The program then refers in block 540 to a lookup table that is stored in its memory to determine the distance to the magnet from each sensor, based on the magnitude of the signal received from the sensor.

Two tables, as shown by example below, relate the voltage measured by each sensor (437–460) to the absolute distance to the center 557 of magnet 6. Table 1 is a lookup table comprising voltages measured at incremental distances by a sensor (437–460) from a magnet 6. Table 2 is a table providing the actual distances from the sensor to the center 557 of the magnetic field as derived from currently used sensors (437–460) and magnet field strength.

| Relative Memory Location | Table 1 (Measured Voltage) | Table 2 (Radial Distance) |
|---|---|---|
| 0 | 142 raw ADC units | 0.0 inches |
| 1 | 139 | 0.0941 |
| 2 | 133 | 0.1882 |
| 3 | 124 | 0.2823 |
| 4 | 112 | 0.3764 |
| 5 | 99 | 0.4705 |
| 6 | 85 | 0.5646 |
| 7 | 71 | 0.6587 |
| 8 | 58 | 0.7528 |
| 9 | 46 | 0.8469 |
| 10 | 37 | 0.9410 |
| 11 | 29 | 1.0351 |
| 12 | 23 | 1.1292 |
| 13 | 17 | 1.2233 |
| 14 | 13 | 1.3174 |
| 15 | 9 | 1.4115 |
| 18 | 7 | 1.5056 |
| 17 | 4 | 1.5997 |
| 18 | 3 | 1.6938 |
| 19 | 2 | 1.7879 |

The step of looking up the distance from the sensor to the magnet is performed by the microprocessor 482, and is represented by the block 540 of FIGS. 38 and 39. The five selected sensors are denoted by $S_i$ (where i = −2 to 2) and the center sensor or sensor having the greatest measured voltage is $S_0$. Before a search is made to correlate each measured voltage with the related distance to the center of magnetic flux, the stored null voltage, $N_j$, is subtracted from the currently derived raw signal from each sensor (437–460) to provide a search variable, $E_i$, devoid of the null offset error as shown in the following equation:

$$E_i = S_0 - N_j$$

A sequential search through Table 1 is performed for each search variable $E_i$ each time the group of five sensors is sampled. To determine the distance from each selected sensor ($S_{-2,-1,0,1,2}$) to the center of magnetic flux, the table is searched until the difference between the value in Table 1 and the search variable changes sign. When the sign change occurs, the search variable is determined to be between the last and next-to-last Table 1 value used. An interpolation variable, I, is next calculated as follows:

$$I = (E_i - T_k)/(T_{k-1} - T_k)$$

where the previously undefined variables are:
- k is the relative memory position of the last Table 1 value used.
- $T_k$ represents the Table 1 value at relative memory position k.
- $T_{k-1}$ represents the Table 1 value at relative memory position k−1.

also:
- R represents a radial distance measurement of Table 2.
- $R_k$ represents the Table 2 value at relative memory position k.
- $R_{k-1}$ represents the Table 2 value at relative memory position at k−1.

The radial distance, $D_i$, from each sensor to the center of flux of magnet 6 is then calculated as:

$$D_i = I*(R_{k-1} - R_k) + R_{k-1}$$

To calculate the position of the center of flux of magnet 6 from a common fixed point, such as array end 560, on the array 24, each $D_i$ is treated as a lateral vector, the sign of which is determined by its position relative to sensors having the greatest and second greatest difference signals as here before related. The position of the center of flux of magnet 6 from the common fixed point 560 is then calculated by adding or subtracting each $D_i$ depending upon the sign of the vector to or from linear distance $L_i$ of each sensor from array end 560 as shown in the following equation:

$$P_i = L_i \pm D_i$$

A further correction may be made to relate the center of flux of magnet 6 to the centerline 164 of vehicle 2A by adding a constant which represents the distance from fixed point 560 on array 24 to centerline 164 of vehicle 2A. See FIG. 34.

Average Lateral Position

In block 544 an average is taken of the five estimates of the location 145 of the magnet with respect to the centerline 559 of the vehicle. One estimate is available from each of the five sensors of the group (having asterisks in FIG. 34) whose middle one is the sensor of strongest signal.

In this example, sensor 445 is $S_0$, sensor 443 is $S_{-2}$, sensor 444 is $S_{-1}$, sensor 446 is $S_1$, and sensor 447 is $S_2$.

After each of the five sensors have been sampled, an average estimate of the position, $X_t$, of the center of flux of magnet 6 is calculated as shown below:

$$X_t = (P_{-2} + P_{-1} + P_0 + P_1 + P_2)/5 + C$$

where

C is the distance 182 from the distance from fixed point 560 on array 24 to the centerline 164 of vehicle 2A.

The accuracy of measurement is further ameliorated by a running average of the successively measured values of $X_t$. Though other equations may be used to calculate the running average, the following equation is employed in the currently preferred embodiment:

$$X(t) = (K_2 * X(t-1) + X(t))/(K_2 + 1)$$

where

X(t) is the running average of the measurement of the center of flux of magnet 6 for the series of five sensors measured at time t and related to the centerline 164 of vehicle 2A.

X(t−1) is the previous running average of the measurement of the center of flux of magnet 6 for the series of five sensors measured at time t−1 and related to the centerline 164 of vehicle 2A.

$K_2$ is the filter or decay constant for the running average. $K_2$ is on the order of three in the currently preferred embodiment.

As one familiar with computer addressing would know, the values of measured voltages for Table 1 need not be derived from incremental distances, but only from measurements taken at known, regularly increasing or decreasing distances which are then stored in the related memory location in Table 2. New and useful Tables 1 and 2 may be generated for combinations of sensors and magnets which yield different voltage versus distance values by measuring the voltage as a function of distance for the new combination. As seen in Table 2, in the above example, the radial distances stored in incremental memory locations are even multiples of 0.0941 inches.

Time of Peak Sensor Signals

The next program function, performed in block 542, is to determine whether or not the peak of sensor voltage has been passed. The peak values of output voltage from the Hall sensors of array 24 occur when the array 24 is directly over the floor-mounted magnet 6. When the reading of the sensors start to decline the array of sensors has passed over the center of flux of magnet 6. This condition is detected by block 542 by conventional programming.

Improved Accuracy of the Measurement

The combination of precalibrating each sensor prior to measurement to take out the offsetting null voltage and averaging and calculating a running average until the peak voltage is reached provides a measurement of significantly improved accuracy. The accuracy of the lateral position measurement 145 is 0.02 inch.

Output

The process of selecting a group of sensors, looking up distances and averaging them is a form of cross-correlation of received signals with a stored field pattern. This result is transmitted, block 546, from the microprocessor 482 to a main microprocessor, not shown. It is transmitted promptly when the peak readings are detected, so the time of transmission of the data serves as an indication of the time at which the sensor array 24 crosses marker magnet 6. In this way both lateral and longitudinal position information are obtained from one passage of the array 24 over magnet 6.

Data from block 546 is transmitted to the main microprocessor board. Data flow among the microprocessors in AGV 2A are described in detail later. The program, at point 548, then returns to the starting program flow line 520 of FIGS. 38 and 39.

Another embodiment having two arrays of sensors such as array 24 is also feasible.

Figure 42:
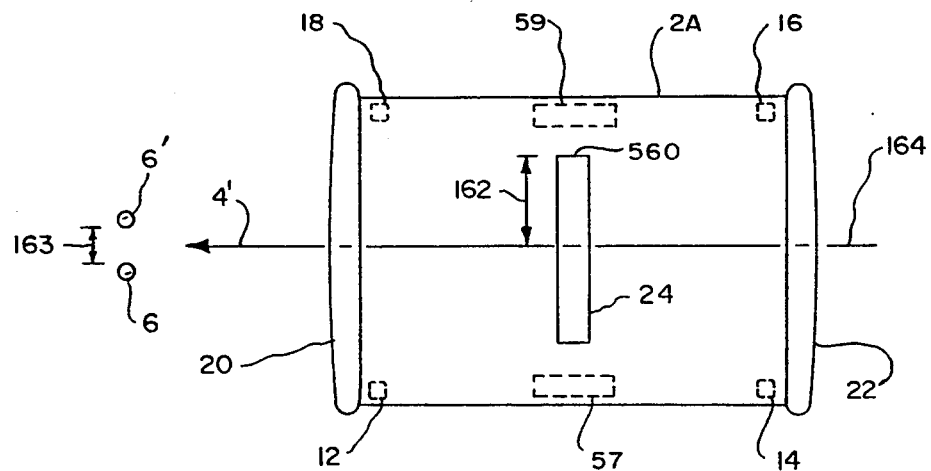
FIG. 42 is similar to FIG. 32, depicting a guided vehicle system that utilizes the updata marker guidance system and showing the presence of two magnets on the path ahead of the vehicle.
Figure 41:
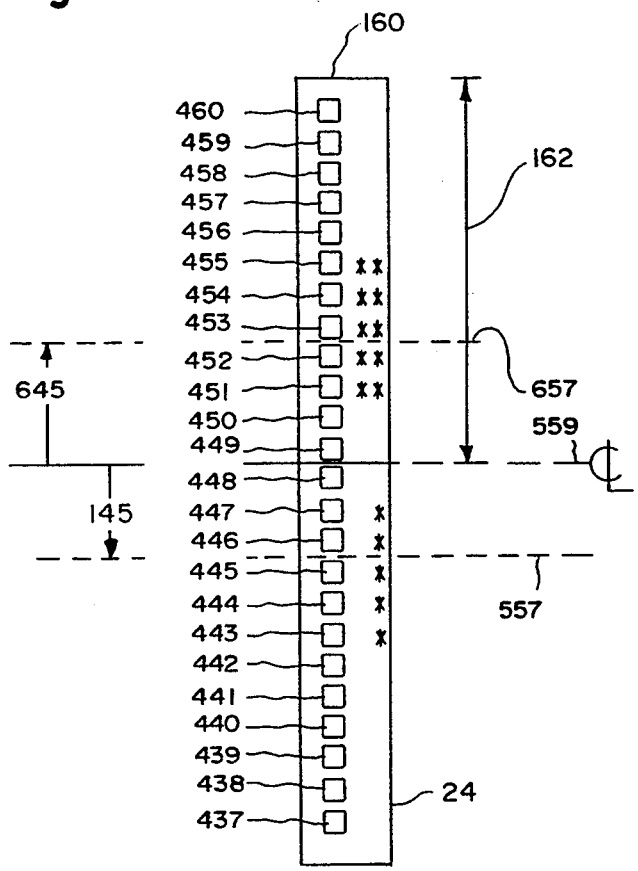
FIG. 41 is similar to FIG. 34, showing an array of Hall magnetic sensors on the vehicle, and including indicia exemplary of the presence of two magnets.

Reference is now made to FIGS. 40-42, wherein a second preferred embodiment is seen. In the second embodiment, two magnets 6, 6' are placed in sufficiently close proximity that magnetic flux from each of magnets 6, 6' is sensed by a plurality of sensors 437-460 concurrently, yet separation 163 of magnets 6, 6' is sufficient to permit independent processing of signals derived from each magnet 6 or 6'.

As seen in FIG. 41, exemplary path 557 of the center of flux 557 of one magnet 6 is the same as the path described in FIG. 34. A second path 657 is seen for second magnet 6'. The table below summarizes the results of signals derived from two concurrently measured magnetic paths 557, 657, showing the assumed greatest signal level sensed for each magnet, next highest level and sensors active for the measurement of position of each magnet (indicated by a single asterisk (*) for magnet 6 and a double asterisk (**) for magnet 6'):

| Relative sensor Position | First magnet (6) Number | Second Magnet (6') Number |
| --- | --- | --- |
| S-2 | 443 | 451 |
| S-1 | 444 | 452* |
| S0 | 445 | 453 |
| S1 | 446* | 454 |

| -continued | | |
|---|---|---|
| Relative sensor Position | First magnet (6) Number | Second Magnet (6') Number |
| S2 | 447 | 455 |

*indicates the sensor adjacent to the sensor having the greatest signal magnitude and having the second greatest signal magnitude thereby providing an indication the center of magnetic flux (145, 645) lies therebetween.

Figure 40A:
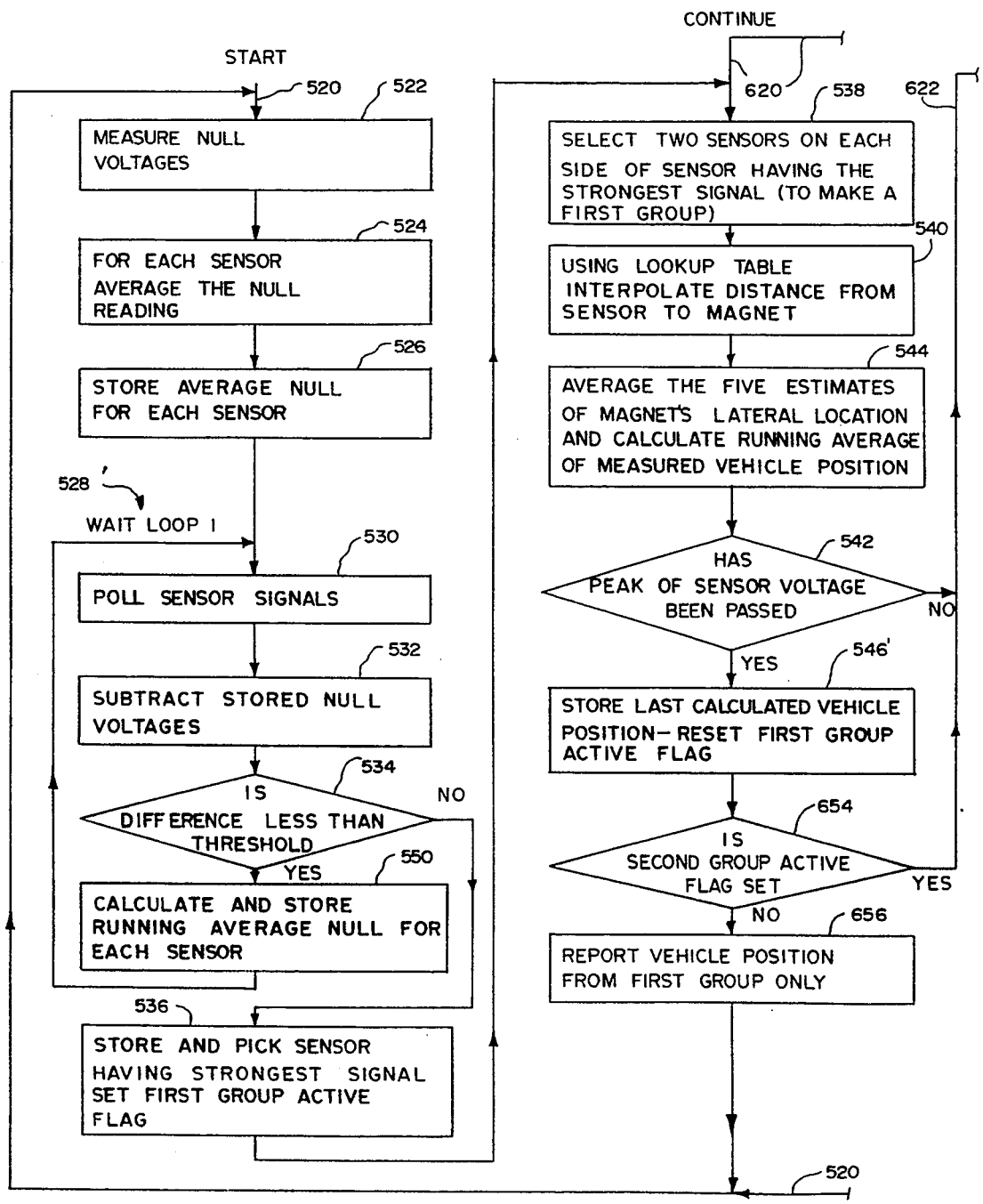
FIGS. 40A and 40B comprise a simplified flow chart of an algorithm for processing sensor data to concurrently measure the lateral position of the vehicle relative to two magnets and to detect when the row of Hall sensors crosses each magnet.
Figure 40B:
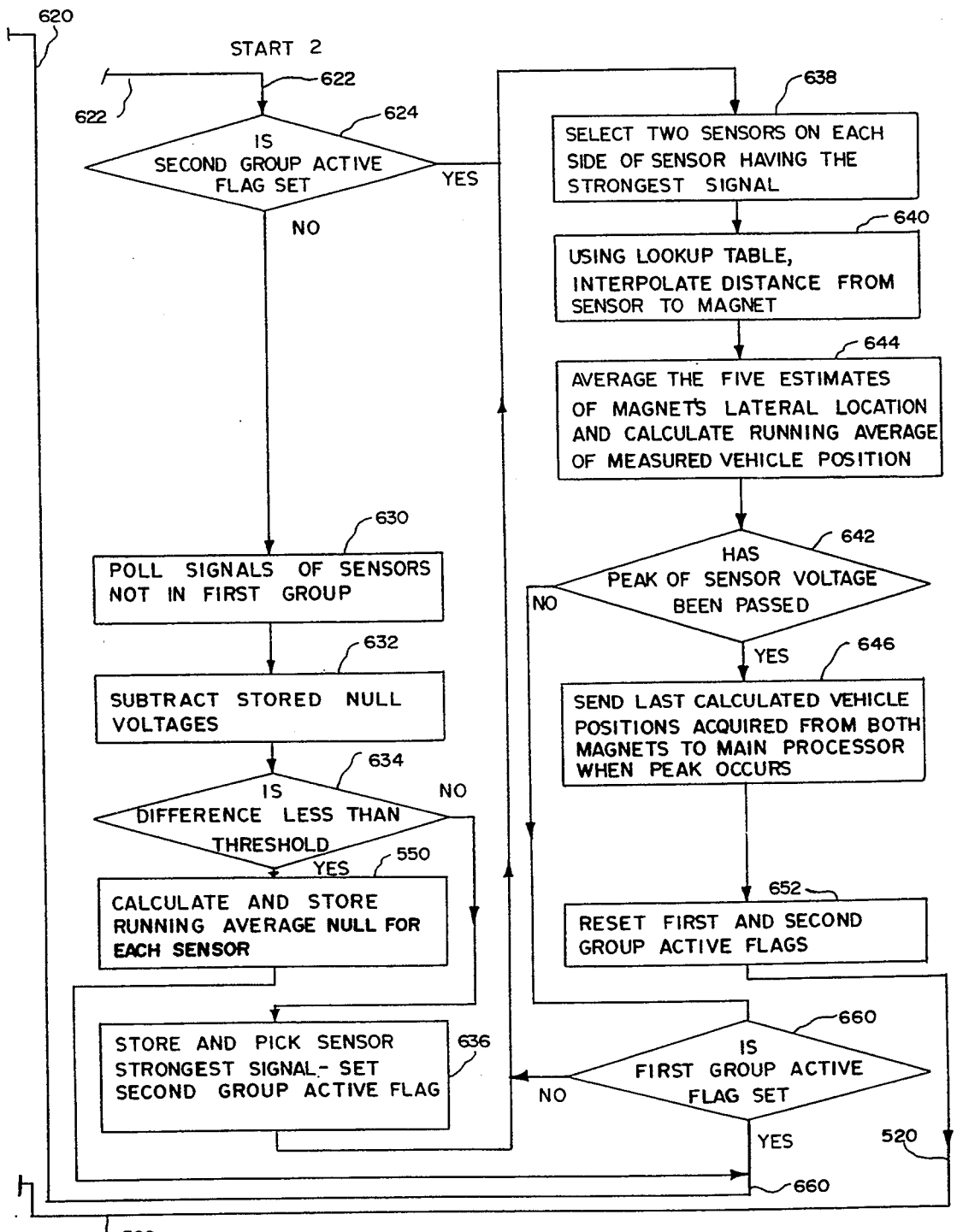

FIGS. 40 and 40A–B show a simplified flow chart of the logical and calculational steps for determining the position of the vehicle relative to each magnet 6, 6'. FIG. 40 shows the orientation of FIG. 40A relative to FIG. 40B. Program flow line 520 connects the output of block 652 in FIG. 40B to START in FIG. 40A. Program flow line 620 connects the "yes" output of block 660 in FIG. 40B to CONTINUE in FIG. 40A. Program flow line 622 connects the "yes" output of block 654 and the "no" output of block 542 of FIG. 40A to START 2 in FIG. 40B.

As before described, the null offsets are calculated during a known null period as specified in blocks 522, 524, and 526. As earlier described, in FIG. 39, a WAIT LOOP 528' provides an updating of the null calibration for each of the sensors until an over threshold measurement indicates detection of magnetic flux of a first magnet 6 or 6'. Upon such detection as part of block 536 activity, the sensor values are stored and the sensor having the strongest signal is selected as earlier described for block 536 in FIG. 38. In addition in block 536, a first sensor group active flag is set to signal a first magnet position measurement is active.

As earlier described, the activities of blocks 538, 540, and 544 select the group of sensors used in the calculation of what is now the first sensor group, interpolate the distance from each sensor of the first group to the center of magnetic flux of the first detected magnet and average, then calculate a running average of the position of the vehicle relative to the magnet. Decision block 542 branches to a block 546' when the peak value of the first sensed signal is detected or to a second path headed by START 2 before the peak is discovered.

At START 2, input program flow line 622 leads to decision block 624 wherein a decision is made whether or not a second group active flag is set indicating a signal has previously been detected from a second magnet. If the second group flag is not set, a single pass through blocks 630, 632, and 634 is made. Blocks 630, 632, and 634 comprise programming functions which are similar to those described for blocks 530, 532, and 534, except blocks 630, 632, and 634 only process information related to sensors of array 24 not involved with the first group. If no threshold is detected in block 634, an updated null calibration is calculated for each sensor which is not part of the first group and a branch is made TO CONTINUE to merge with program flow line 620. If a signal above threshold is detected, a branch is made to block 636 wherein the appropriate signal values are stored and processed as in block 536 for a second group of sensors and the second group active flag is set.

The program proceeds directly from block 636 to block 638. If the second group active flag is set upon entry at program flow line 622, a branch is made directly to block 638 therefrom.

Sequentially, blocks 638, 640, and 644 perform the same functions upon data received from sensors of the second group as blocks 538, 540, and 544 perform upon data received from sensors of the first group. Decision block 642 determines whether or not a signal peak, as before described, has been reached. If not, the process continues to decision block 660. If so, measured position values, as derived from both magnets 6 and 6', are transmitted to the main processor for use in navigation and guidance updating, the first and second group active flags are reset as shown in blocks 646 and 652. From block 652, the logic path proceeds to START at program flow line 520 to repeat the function preliminary to the search for one or more additional magnets along the vehicle's path.

From decision block 660, a branch is made to block 638 if the first group active flag is reset indicating a peak has been detected for the first measured magnetic field. If the first group active flag is set, the program proceeds to program flow line 620 whereat block 538 is entered to subsequently process the output of the first group of sensors dedicated to making a measurement of the position of the first detected magnetic field.

If within block 542 a peak voltage is detected, the programs proceeds to block 546' wherein the measured position determined by first group measurements are stored for later recovery and transmission to the main processor and the first group active flag is reset. From block 18', decision block 654 is entered, wherein a branch is made to proceed TO START 2 through program flow line 622 if the second group active flag is set or to proceed to block 656 if the second group active flag is reset. At block 656, only the first group measured position is reported based upon only one magnetic field having been detected and no concurrent measurement having been made.

Guidewire Guidance Systems

Figure 4A:
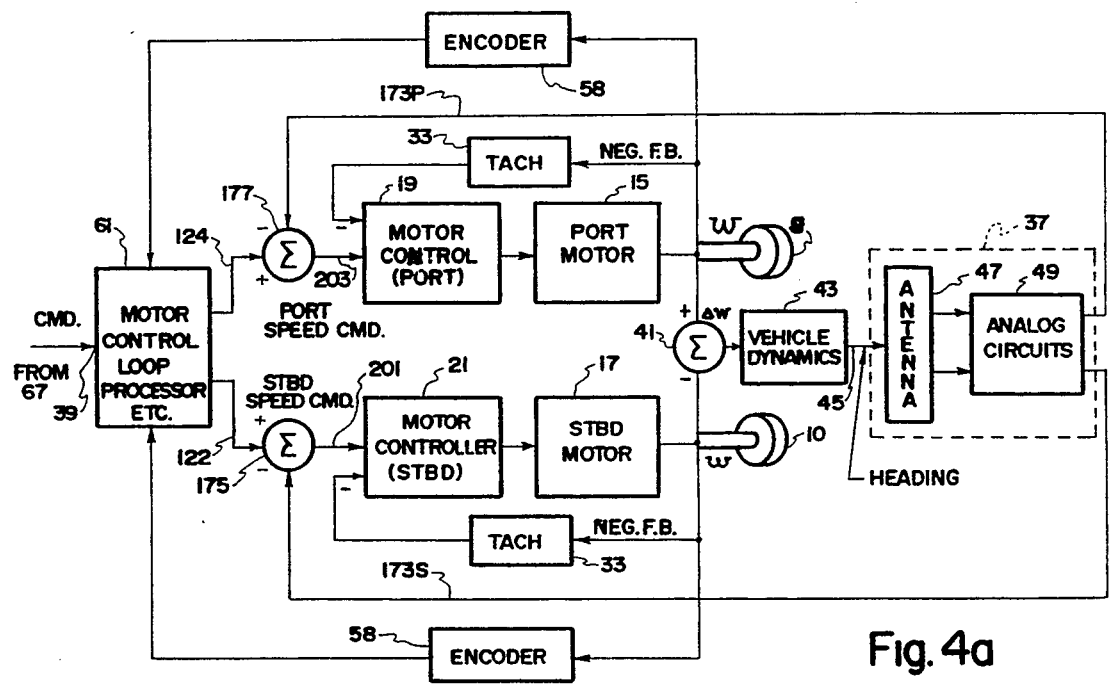
FIG. 4A. Simpified electronic block diagram of a guidance system for a vehicle which operates in both a general purpose and a terminal-positioning mode.

The various types of guidance systems are used at different times for controlling the AGV 2A, each type being used under control and direction of AGVC 13 and AGV 2A motion control processor 61. FIG. 4A shows a motion control processor 61 of a preferred control system for a vehicle. The port drive wheel 8 is driven by a port motor 15. The port motor 15 is controlled by a port motor controller 19, which receives control signals from a summing junction 177.

Inputs to the summing junction 177 and port motor controller 19 include:
1. control signals at an input 124 that come from the inner guidance loop motion control data processor 61;
2. an input from a tachometer 33 that measures the speed of the port motor 15; and
3. an input 173P from a terminal-positioning-mode module 37 of vehicle navigation and guidance system, which will be described in detail below.

In a similar arrangement, a starboard wheel 10 is driven by a starboard motor 17, a starboard motor 17 is controlled by a motor controller 21 that is driven by the output of a summing junction 175, which receives speed commands from the motion control processor 61. The summing junction 175 also receives signals from the terminal-positioning-mode module 37.

The motion control processor 61 receives commands at an input 39 from a self-contained navigation and guidance system. The vehicle is driven in forward and reverse directions, relative to the front of the vehicle, and is steered in accordance with the speeds of the wheels 8, 10. The actions of the drive wheels 8, 10 affect the vehicle in a manner that is represented symbolically by a summing junction 41 and by a block 43 labeled "vehicle dynamics" on FIG. 4A.

The spacing between the wheels and other factors are represented by the block 43°. Outputs of the block 43 are represented symbolically at a point 45. The outputs are the speed and heading of the vehicle as well as, when integrated, the position of the vehicle. The position of the vehicle controls the error signals as the vehicle moves about, for example, when it enters a terminal 9, 11. As shown in block 37 of FIG. 4A the terminal-positioning-mode of the vehicle navigation and guidance system includes the antenna assembly 47 and an analog circuit block 49, both of which will be described in detail.

Commands for control of the vehicle are at terminal 39 on the left side of FIG. 4A. Commands and feedback signals such as 173P and 173S are conducted through the summing junctions 177, 175 to the port motor controller 19 and the starboard motor controller 21 respectively. They drive the port motor 15 and the starboard motor 17 respectively, which drive the port and starboard wheels 8, 10 respectively.

Figure 4C:
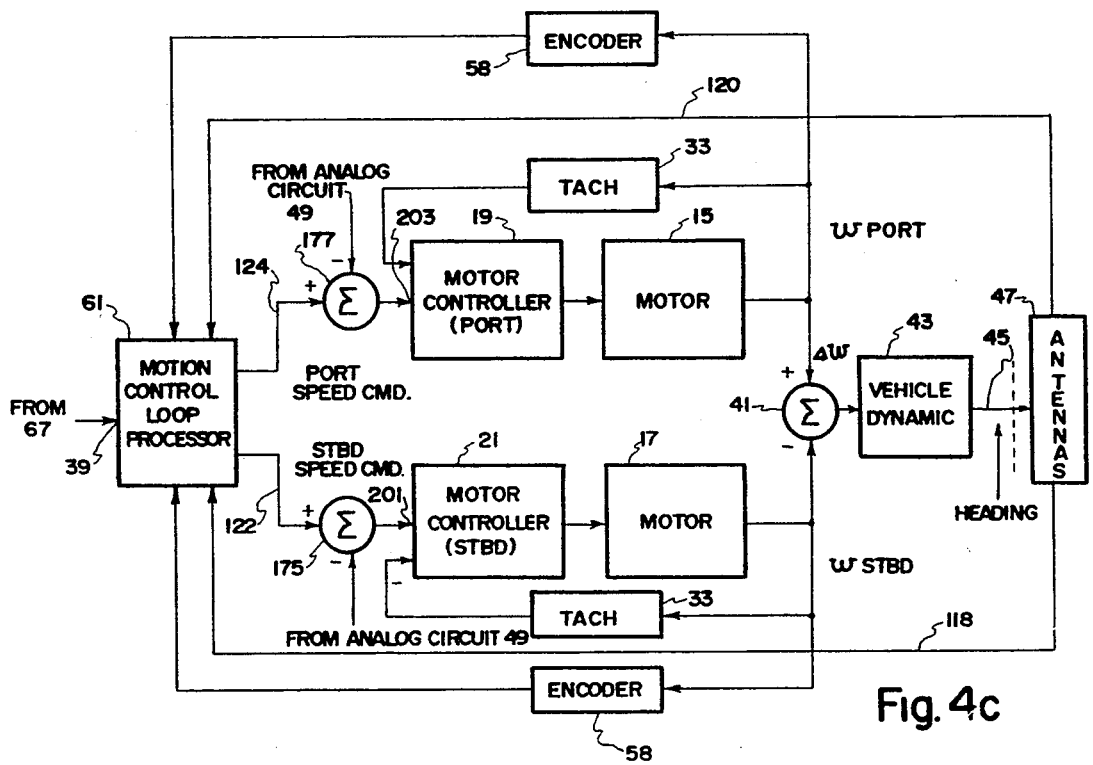
FIG. 4C. Simplified electronic block diagram similar to FIG. 4A, but showing only elements that are used when the apparatus is in the terminal positioning mode of operation and omitting other elements.

When the vehicle 2A enters a terminal having a passive loop floor mat 51, it comes principally under the control of the terminal-positioning mode of the vehicle navigation and guidance system, etc. This system produces signals at lines 118, 120 that are input to the motion control processor 61 as seen in FIG. 4C.

When a vehicle with an incorrect lateral position (e.g., with an offset from the centerline of the terminal), enters a terminal an error signal is generated by the terminal-positioning mode of the vehicle navigation and guidance system. The signals at lines 118, 120, in combination, produce an error signal which has such polarity (see also FIG. 12B) as to operate the motors 15, 17 to steer the vehicle in a direction to correct the error of position. Antenna output signal conditioning circuits similar to those seen in FIG. 12B for front-end antenna signal conditioning, not shown, are located at the rear-end of the vehicle but are of opposite hand.

Figure 4B:
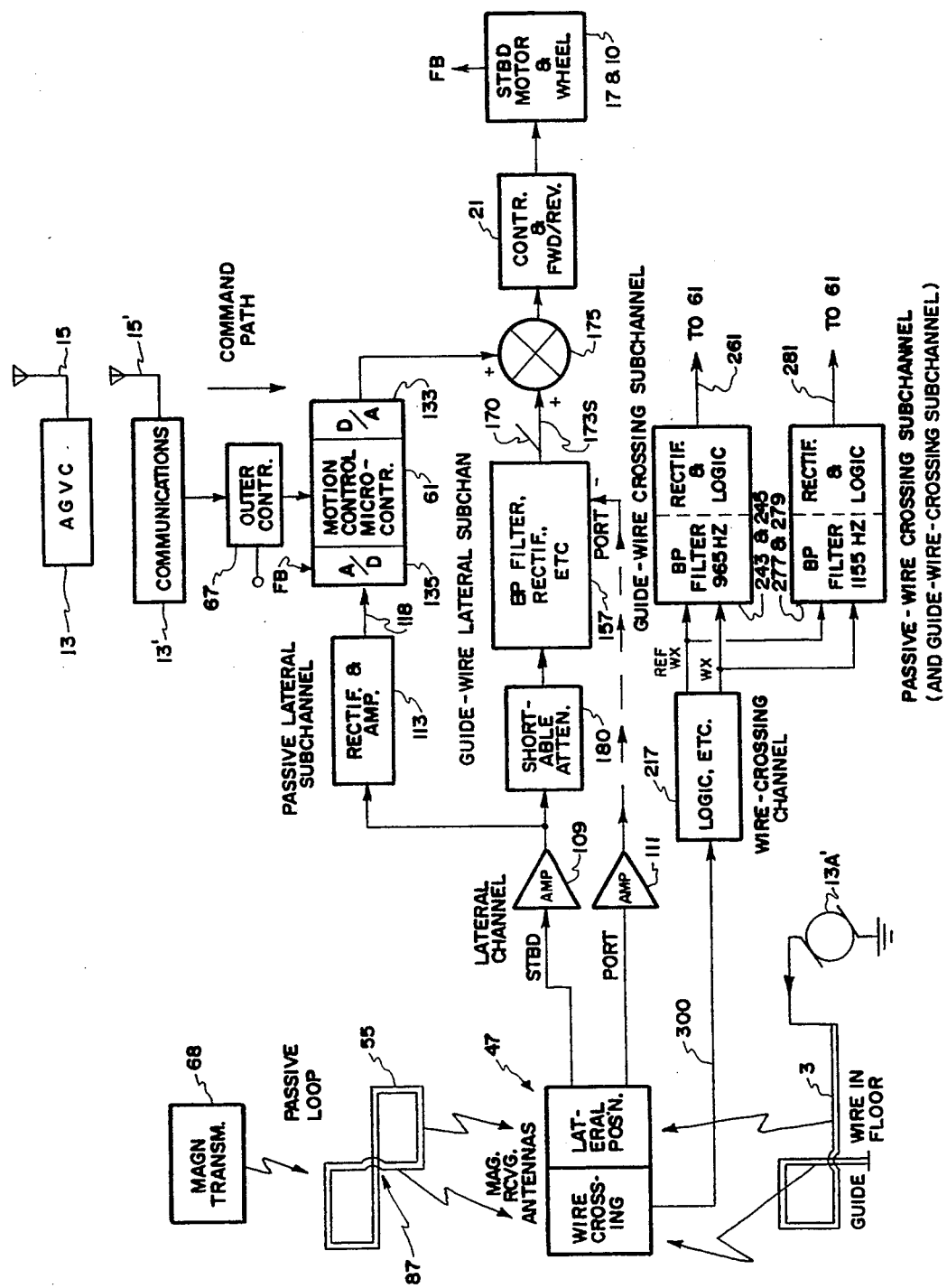
FIG. 4B. Simplified block diagram providing an overview of interconnections of major subsystems which operate in a terminal-positioning mode.

When the vehicle has proceeded longitudinally to where a wire-cross exists, another signal, on line 300 of FIG. 4B, notifies the outer loop processor 67, which takes appropriate action on altering speed commands. The antenna assembly 47 of FIG. 4B includes antennas that are receptive to the transverse wire-crossing portion 87 of the loop 55, as will be described in more detail below in sections relating to wire-crossing positioning of the vehicle. The longitudinal position of the vehicle is controlled by the motor controllers 19 and 21, which operate the motors 15, 17 so as to move the vehicle forward and back as necessary to position it over the wire-crossing portion 87 of the passive loop 55, etc.

Overview of Interconnections of Major Guidewire Subsystems

FIG. 4B is a simplified diagram showing the relationships between major subsystems of the terminal-positioning mode of the vehicle navigation and guidance system.

Commands from the AGVC 13, which stores map-like route and vehicle-location information, by wireless transmission to communications block 13' go to an outer loop microcontroller 67 whose outputs go to a motion control microcontroller 61. They then pass through a D/A converter 133 to a summing junction 175. The output of summing junction 175 goes to a controller 21 and forward/reverse block, which drives the starboard motor 17 and wheel 10. Only the starboard circuits are being described.

As the vehicle moves about to carry out the commands that it receives, feedback signals responsive to its position are generated. They are processed and entered into the control system through several channels. As shown on FIG. 4B, these channels include a Passive Lateral Subchannel at terminal 118, a Guidewire Lateral Subchannel at terminal 173S, a Guidewire-Crossing Subchannel 261 and a Passive-Wire-Crossing Subchannel 281. The channels are described briefly here to show their relationships, and in much greater detail in subsequent sections.

A magnetic transmitter 68 couples magnetic energy to a passive loop 55 on the floor in a terminal. Induced current in the passive loop 55 produces magnetic fields that are sensed by a receiving antenna system 47. The receiving antenna system 47 comprises separate magnetic receiving antennas for lateral positioning of the vehicle and for wire-crossing positioning of the vehicle.

Instead of being energized by the magnetic transmitter 68, the magnetic receiving antennas 47 can, alternatively, be energized by magnetic fields produced by a wire 3 in the floor, as shown on FIG. 4B. The wire 3 in the floor is energized by the AGVC 13, which is represented on FIG. 4B for drafting convenience by an AC generator 13A'.

Output from the lateral-positioning system's antennas are connected to a right Lateral Channel, which will be described in more detail, and to a left Lateral Channel which will not be described because it is the same as the right Lateral Channel From preamplifier 109, the right Lateral Channel 109 divides into a Passive Lateral Subchannel, including rectifier 113 and an amplifier. The Passive Lateral Subchannel connects through an A/D converter 135 to the motion control processor 61, where it joins the command signals. Signals then pass through the D/A converter 133 and are input to the summing junction 175.

FIG. 4C is a simplified version of FIG. 4A. It is a functional block diagram showing elements that are in use when the equipment is in the terminal-positioning mode of operation. The Passive Lateral Subchannel components, which are used in the Terminal-positioning mode of operation are shown. The analog circuits 49 are not shown in FIG. 4C because they are effectively by-passed when the terminal-positioning mode is operating.

The right Lateral Channel also goes to a Guidewire Lateral Subchannel, which starts at a shortable attenuator 180. FIG. 4B. (Most of a corresponding left portion of the channel, starting at 111, is omitted from FIG. 4B.) The right Lateral Channel 109 then goes to a bandpass filter 157 and other signal-processing elements. It is switchable by a switch 170 (controlled by outer controller 67) before terminal 173S to allow input to the summing junction 175 when guiding over a guidewire 3 in the floor, and to prevent interference from signal at 173S when guiding over a passive wire 55 in the floor.

The wire-crossing receiving antennas are connected to a Wire-Crossing Channel at logic circuits 217, etc. These circuits produce a wire-crossing signal WX and a wire-crossing reference signal REFWX, both of which are connected to two subchannels. The first of the two wire-crossing subchannels is a Passive-Wire-Crossing Subchannel that starts with 1155-Hz bandpass filters 277 and 279. Its signal proceeds through rectifier and logic circuits to an output terminal 281. Terminal 281 is connected to the outer loop microcontroller 67, completing a positioning-feedback loop.

The other subchannel to which the Wire-Crossing-Channel is connected is the Guidewire Crossing Subchannel of FIG. 4B. It starts with 965-Hz bandpass filters 243 and 245. The signals proceed through rectifiers and logic circuitry to terminal 261. From there the feedback signals are connected to the outer loop microcontroller 67, where they join the command signals from the AGVC 13, to complete a positioning-feedback loop.

When a vehicle is in a terminal that has a passive loop 55 on the floor, lateral positioning is accomplished by means of the Lateral Channel and the Passive Lateral Subchannel. Longitudinal positioning is accomplished through the Wire-Crossing Channel and the Passive-Wire-Crossing Subchannel.

When a vehicle is in a terminal having an active guidewire in the floor, lateral positioning of the vehicle is accomplished through the Lateral Channel and the Guidewire Lateral Subchannel. Longitudinal positioning is accomplished by means of the Wire-Crossing Channel and the Guidewire-Crossing Subchannel.

When a vehicle is not in a terminal and is on a route, such as route 5, that has only update magnets, guidance is accomplished by self-contained navigation and guidance.

When a vehicle is not in a terminal and is on a route, such as route 3, in which there are actively energized guidewires in the floor, lateral positioning is accomplished by means of the Lateral Channel and the Guidewire Lateral Subchannel. Longitudinal positioning can be accomplished between terminals where there is a wire crossing by means of the Wire-Crossing Channel and the Guidewire-Crossing Subchannel.

Magnetic Fields Transmitter

Figure 5:
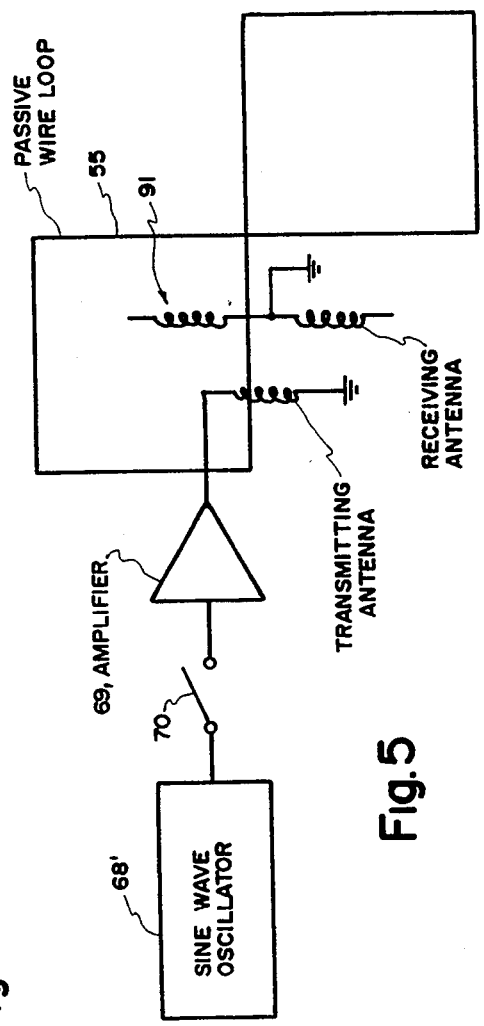
FIG. 5. Simplified block diagram of certain components of a vehicle navigation and guidance system on a vehicle for transmitting a magnetic field when operating in the terminal-positioning mode.

The subsystem 37 of FIG. 4A includes a magnetic field transmitter that is shown in simplified form in FIG. 5. A sinusoidal waveform oscillator 68' on the vehicle is connected through a switch 70 and an amplifier 69 to a transmitting antenna 71 to provide a magnetic field signal of frequency 1,155 Hz. The transmitting antenna 71 is part of the antenna assembly 47 shown on FIGS. 3 and 4A.

Figure 6:
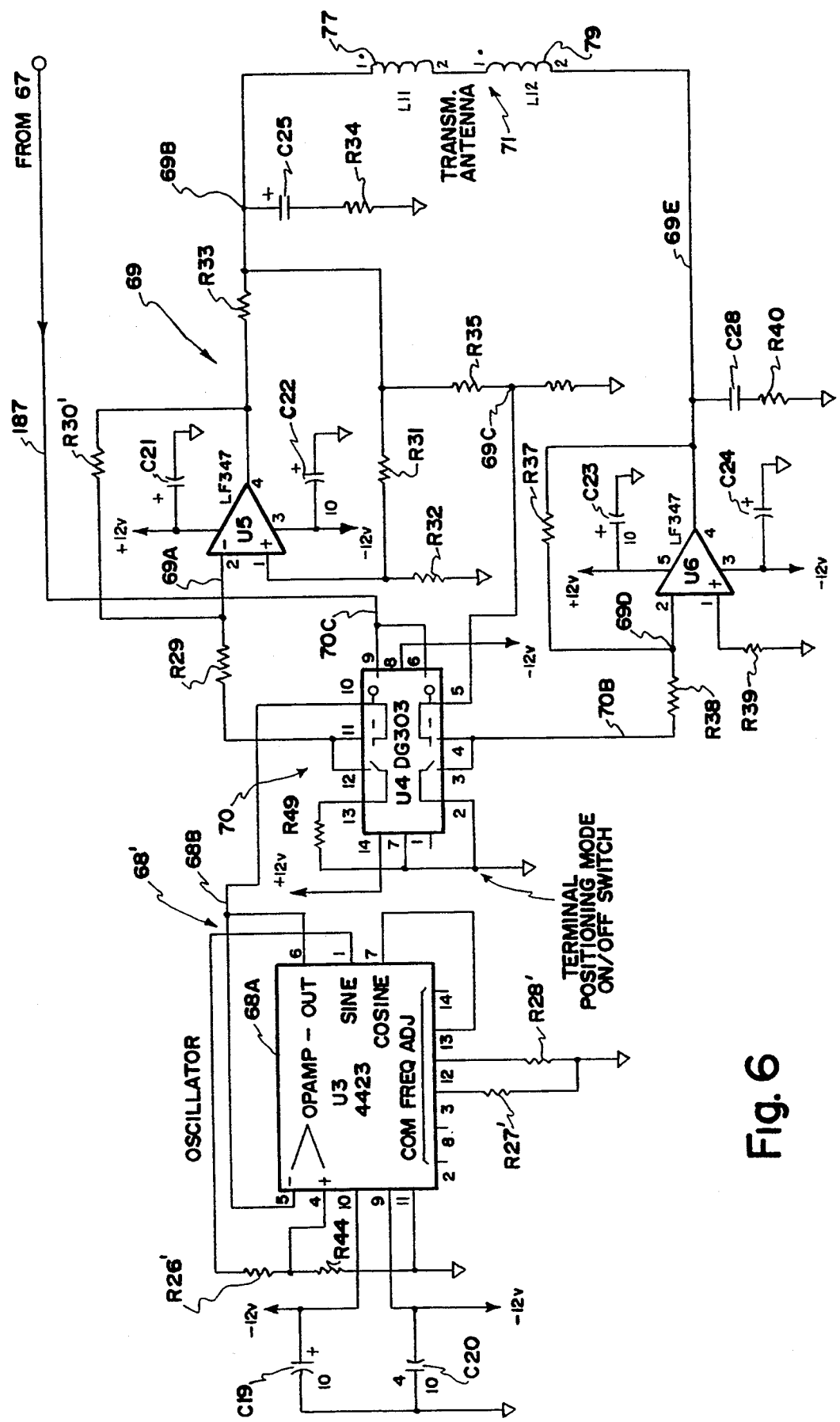
FIG. 6. Circuit diagram of an oscillator, switch, driver, and transmitting antenna of FIG. 5, which are transmitter portions of the preferred vehicle navigation system when operating in the terminal-positioning mode.

The transmitter is shown in more detail in FIG. 6. The main component of its oscillator 68' is a conventional commercially available chip 68A. Its output at terminal 68B is connected to the analog on-off switch 70. When the switch is in a conductive condition the oscillator's signal is connected to input 69A of one side of a push-pull current driver amplifier 69.

The output at 69B of one amplifier 69 is connected through a resistor to a point 69C, which is connected to another pole of the analog switch 70. The output of that pole at 70B is connected to an inverting input 69D of another side of the push-pull driver amplifier 69. The output of that other side is at a terminal 69E.

The output terminals 69B, 69E of the push-pull drivers 69 are connected to two series-connected coils 77, 79 of the transmitting antenna 71, as shown in FIG. 6.

The analog on-off switch 70 is operated by a signal at a terminal 70C, which comes from the outer loop microprocessor 67. The transmitter system comprising elements 68', 69, 70 and 71 is turned off by operation of the switch 70 when the vehicle is being operated in a mode in which it follows an actively energized guidewire. The outer loop processor receives information from the AGVC 13, which keeps track of whether or not the vehicle is approaching or in a terminal.

As shown in FIG. 7, the transmitting antenna 71 includes a ferrite rod 75 that serves as a core for the antenna. The relative magnetic permeability of the ferrite rod is about 2000. Mounted on the core 75 near its ends are a left-side coil of wire 77 and a right-side coil 79. The push-pull drivers 69 are connected to the coils 77, 79 with such polarity that the coils produce reinforcing magnetomotive force (of the same phase) in the ferrite rod 75.

The lateral position of the transmitting antenna 71 relative to the center 81 of the floor loop assembly 55 has very little effect on the amount of current induced in the passive loop 55 within a wide lateral range between the transmitting coils 77, 79 because the amount of magnetic flux linking the loop 55 does not change appreciably within that range. The electric current induced in the loop 55 is, however, inversely dependent upon the vertical and longitudinal distance between the transmitting antenna 71 and the central wire portion 81 of the loop 55.

The operation of the transmitter is as follows: The oscillator 68 produces a signal which can be connected through the analog on-off switch 70 to the push-pull drivers 69. The output signal from the push-pull drivers 69 energizes the transmitting antenna 71.

The transmitting antenna produces a magnetic field that extends downward to encircle the wire element 81 of the loop 55 (or any wire that is within the range of the transmitting antenna, e.g., a guidewire in the floor). In the case of a loop such as loop 55, the AC magnetic field produced by the antenna 71 induces a current in the wire segment 81, and that current produces a magnetic field surrounding the wire segments 81, 87, etc. of the loop 55.

Receiving Antennas and Coupling with Wires on Floor

FIG. 7 also shows a receiving antenna assembly 91. It detects magnetic fields produced by currents in wires on the floor. In this preferred embodiment, a single ferrite rod core 93 is used, with one receiving coil 95 mounted near the left end of the rod and another receiving coil 97 mounted near the right end of the rod 93. Alternatively, two shorter ferrite rods can be employed with a fixed lateral space between them, each encircled by only one of the two receiving coils 95, 97.

In this embodiment the receiving antenna assembly 91 is mounted parallel to and close to the transmitting antenna 71. The signal that the receiving antenna assembly 91 receives has two components: (a) a signal from either the passive loop of wire 55 or a guidewire in the floor and (b) a direct signal from the transmitting antenna 71 if it is on. Because the position of the transmitting antenna 71 is fixed in relation to the receiving antenna 91 the undesired direct signal component is relatively constant, so it can be deducted.

Referring now to the component of signal received from the wires in the floor such as the wire 81 of the loop 55, the current in each coil 95, 97 of the receiving antenna assembly 91 depends upon the nearness of the receiving antenna 91 as a whole to the plastic floor mat 51 and upon the lateral displacement of the receiving antenna 91 from the center wire segment 81 of the passive loop 55.

Figure 8:
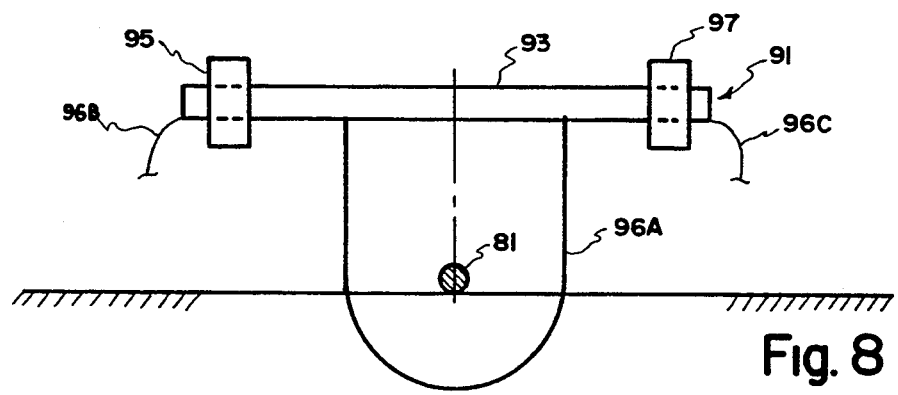
FIG. 8. Vertical sectional view of a conductor on the floor and a receiving antenna assembly on a vehicle that is centered above it.
Figure 9:
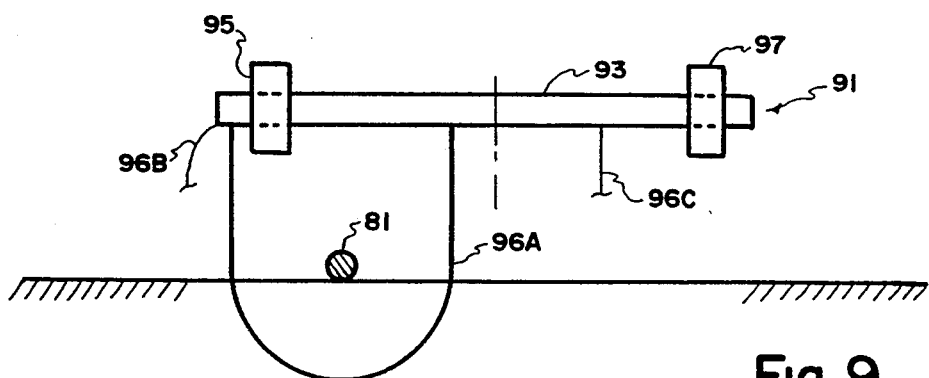
FIG. 9. Another vertical sectional view of a conductor on the floor and a receiving antenna assembly that is offset laterally above it.

The relationship between received signals and lateral displacement is relatively linear for the central 90% of the lateral distance between the two receiving coils 95, 97, FIG. 7. The ferrite rod 97 helps to provide this linearity. FIGS. 8 and 9 illustrate the manner in which magnetic flux produced by electric current in the wire 81 (FIG. 3) enters the ferrite receiving rod 93 and links the coils 95, 97. In order to facilitate the explanation, FIGS. 8 and 9 are not drawn to scale.

In FIG. 8 the receiving antenna 91 is centered laterally over the current-carrying conductor 81, while in FIG. 9 the antenna 91 is offset laterally from the conductor 81. The direction of lines of magnetic flux is shown by a stylized line sketch 96A in FIG. 8. Other lines of flux 96B, 96C of course enter the ferrite rod at its left- and right-hand ends, and hence encircle the turns of the coils 95, 97. The current carrying conductor 81 can represent several turns of wire in some embodiments.

In FIG. 9 the flux line 96A encircles the coil 95, because of the offset position of the antenna 91. The flux line 96B still enters the left end of the rod 93 and encircles the coil 95. When the vehicle is offset, the partially shown flux line 96C no longer encircles the right coil 97. This arrangement, in which a single ferrite rod is used for both receiving coils, has been found to improve the linearity of the induced signal in the receiving system as a function of the offset of the vehicle from the current-carrying conductor 81.

Figure 10A:
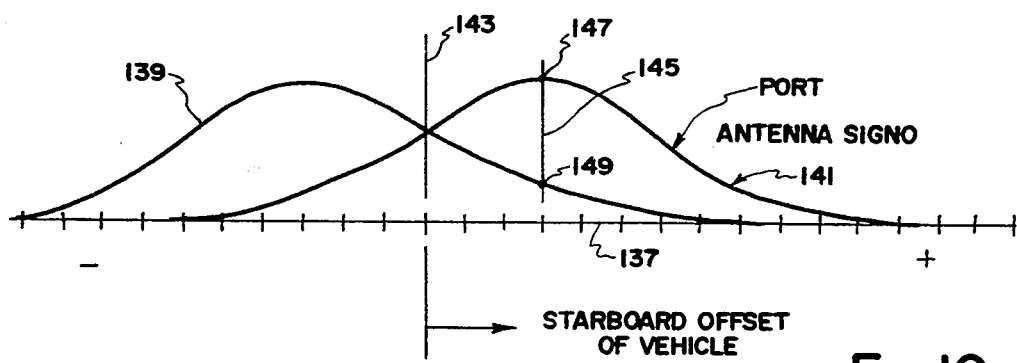
FIG. 10A. Graph of amplitudes of signals received at magnetic receiving antennas on the vehicle as a function of the vehicle's lateral location relative to a current carrying wire (such as a part of a conductive loop) on the floor.

A graph of the amplitudes of signals induced in the receiving antenna coils 95, 97 is shown in FIG. 10A. The abscissa 137 represents the lateral offset of the vehicle from the longitudinal centerline of the terminal 11. The ordinate 143 of the graph of FIG. 10A represents signal strength at the coils 95, 97.

In particular the starboard receiving antenna coil 97 produces a signal shown by a curve 139, and the left antenna receiving coil produces a signal shown by a curve 141. When the vehicle is exactly in the position defined by the programmed lateral offset and represented by the vertical line 143 of FIG. 10A, the signals 139 and 141 cause the wheels 8, 10 to rotate at equal speeds.

For example, when the lateral offset is zero and when the vehicle comprises an offset such as at the vertical line 145, the left antenna 95 receives a much stronger signal, as indicated by a point 147 on the curve 141, than does the right antenna coil 97, as indicated by the weaker signal at a point 149 of the curve 139. The result is that the left wheel 8 is then driven slower than the right wheel 10 and the vehicle's position is corrected to center the vehicle over the guidewire as it moves forward into the terminal 11 or, alternatively, along a guidewire in the floor in the terminal 9.

Figure 10B:
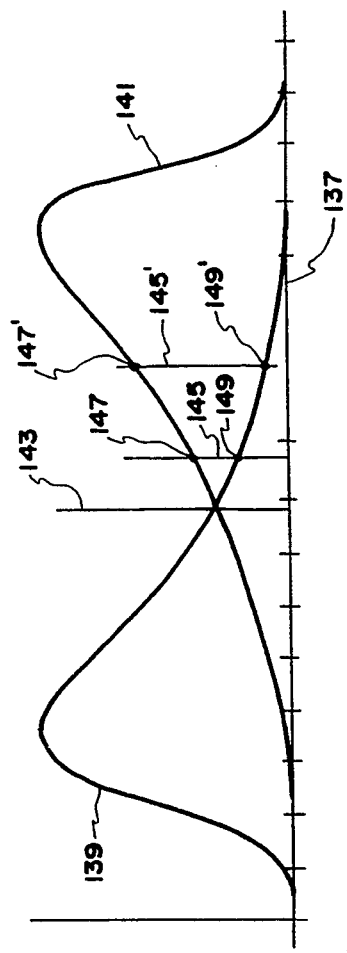
FIG. 10B. Graph of amplitudes of signals seen in FIG. 10A showing a lateral offset used to control the vehicle's lateral position relative to the current carrying wire.

From time to time, it may be desirable to drive the vehicle with an offset lateral to a guidewire. This is accomplished under program control by the motion control processor 61 wherein a lateral offset bias is digitally added to one of the signals over terminals 118, 120, after digitization. As seen in FIG. 10B, which comprises the same axes and curves seen in FIG. 10A, a desired offset 145' away from center line 143 establishes two curve 139 and 141 intersections, 149' and 147', respectively. The lateral offset bias is calculated as the difference between the values at intersections 149' and 147' and comprising a sign opposite the sign of an offset error which occurs on the same side of center line 143.

Hybridity of Self-Contained Navigation-and-Guidance and Proportional-Positioning System Figures relating to hybridity include FIGS. 4 and 13. The vehicle navigation and guidance system, in the self-contained mode, operates by starting with a known position and heading and measuring the distances traveled by both the left and right sides of the vehicle. It integrates those distances to keep track of the location of the vehicle. The position is updated periodically by detecting a magnet of known position such as magnet 6 in the floor over which the vehicle travels.

The AGVC 13 keeps track of the status and position of each vehicle. The AGVC 13 has terminal information and a map of the path layout stored in memory. When a vehicle is directed to a terminal, such as terminal 11, that has a passive floor loop 55 and not an active guidewire, the AGVC 13 tells the outer loop processor 67 to guide in the terminal-positioning mode of the vehicle navigation and guidance system. Commands and other signals pass between computer 67 and computer 61 on a line 67A of FIG. 3. The outer loop guidance microcontroller 67 then sends a control signal on a line 187 (FIGS. 6 and 15) to a switch 70 that energizes the transmitting antenna 71. It also sends a control signal to another switch 185 that causes attenuation of the guidewire-signal channel (terminals 153 and 155) of FIG. 15 (and FIGS. 14, 16A).

Figure 16A:
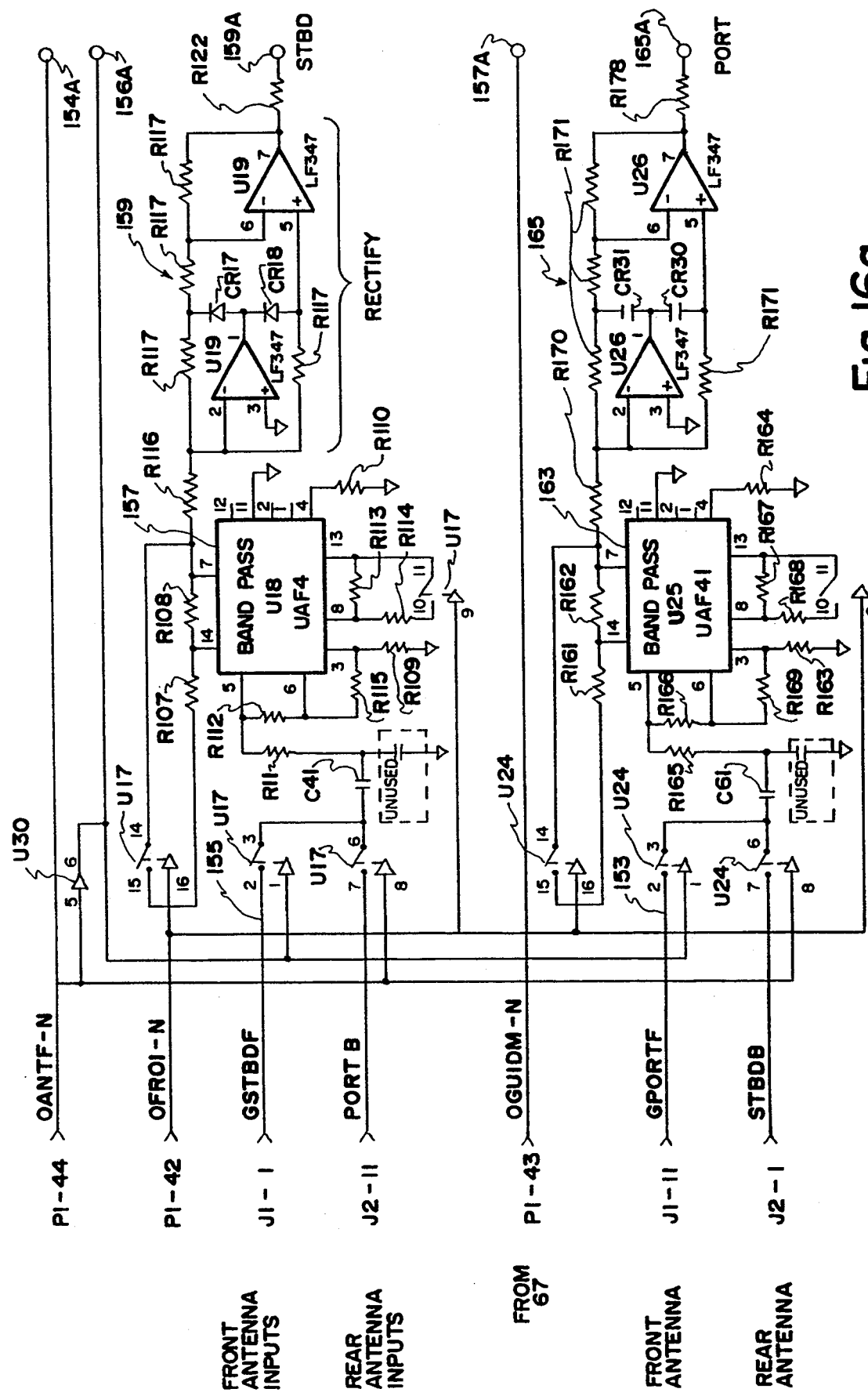
FIG. 16A. Circuit diagram of a bandpass-filtering and signal-rectifying portion of the equipment for a guidewire-tracking mode of operation (middle portion of circuit).
Figure 16B:
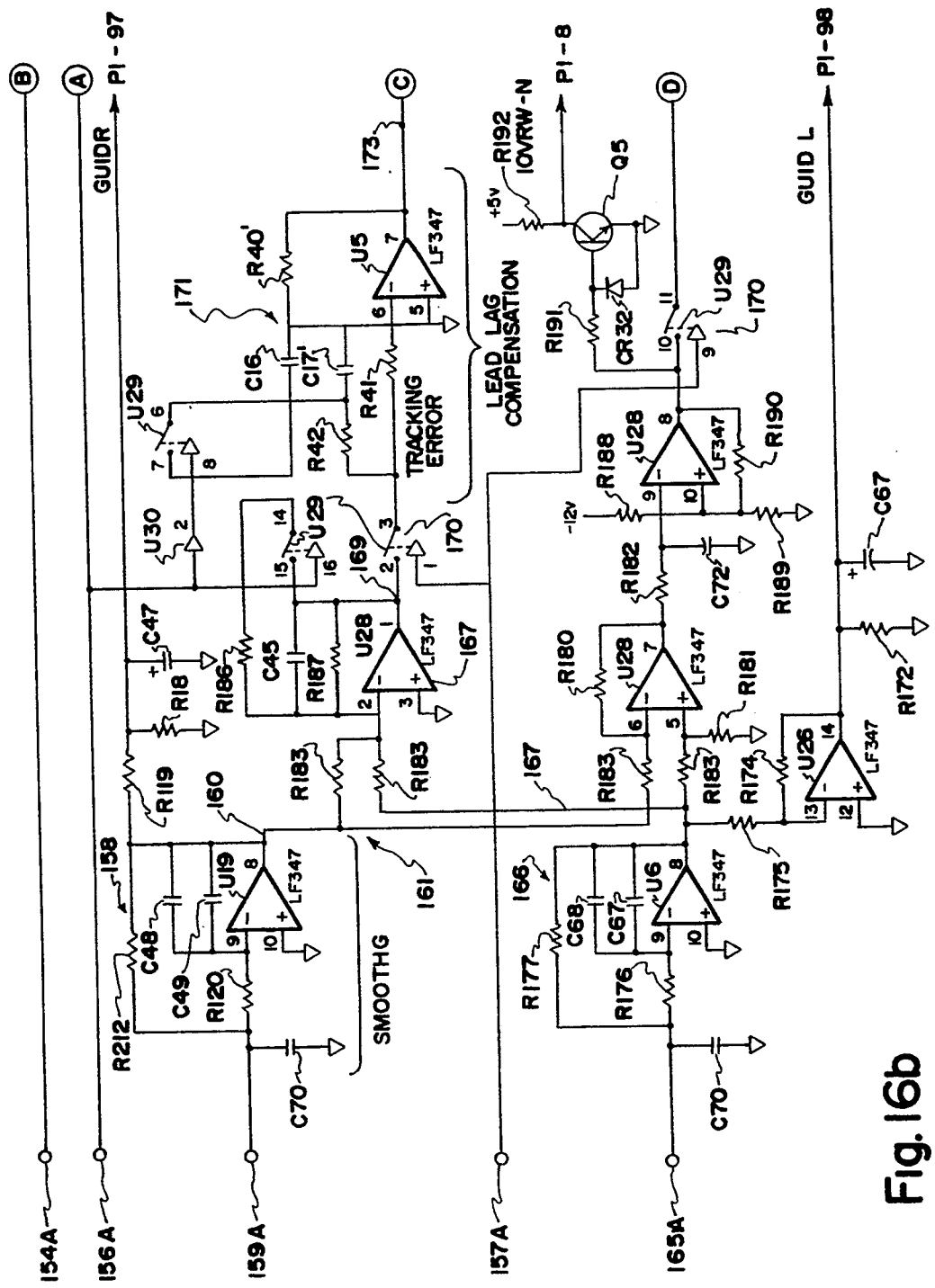
FIG. 16B. Circuit diagram, a continuation of FIG. 16A, of a smoothing and compensator portion of the equipment for a guidewire-tracking mode of operation.

The active guidewire-signal channel's error signal at terminal 169 of FIG. 16B is switched off so that it does not interfere with the passive wire loop's signal at terminals 122 and 124. This insures that the passive wire loop's signal (FIGS. 12 and 13) completely controls the vehicle. More detailed descriptions of the circuits involved are presented below.

Lateral Positioning of a Vehicle at a Terminal Having a Passive Floor Loop

Figure 11:
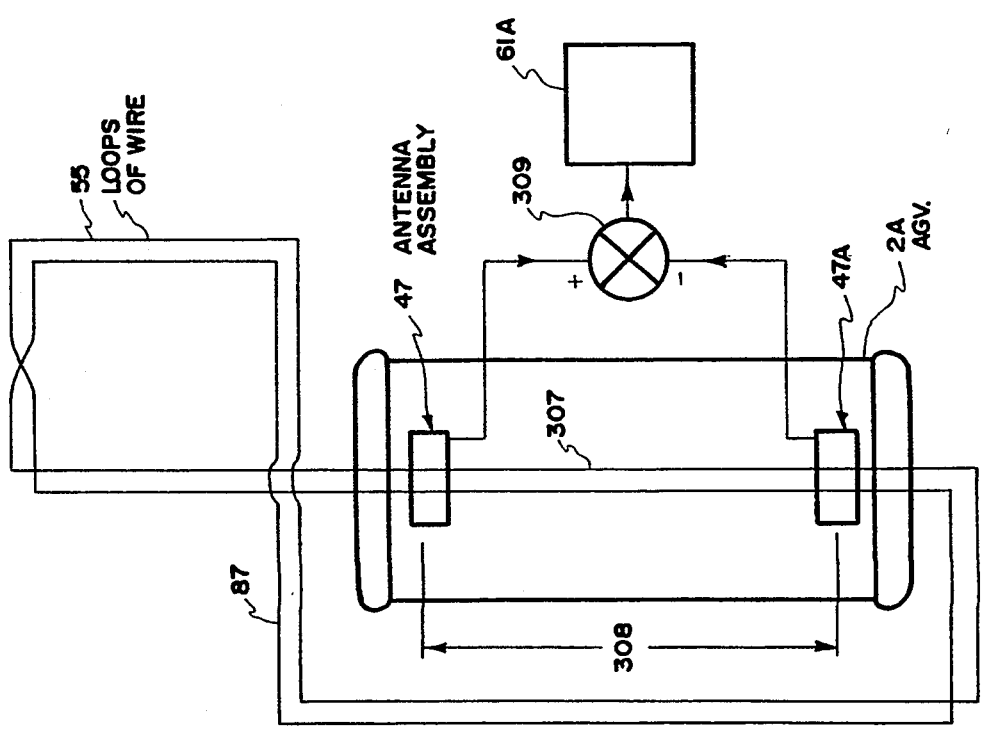
FIG. 11. Plan view of an alternative configuration of antennas and a passive loop arrangement having two turns.

FIG. 11 shows a conductive loop that is short-circuited to itself and doubled over so that it has two turns. One, two or any other convenient number of turns can be used. If preferred, separate superimposed shorted loops could of course be used instead. They are folded to form the skewed figure eight FIG. 11 in order to produce a wire cross at any desired position. Loops can of course be used for precise positioning of vehicles at places other than terminals if desired.

The location of an automatic guided vehicle 2A is shown and its antenna assembly 47 is indicated on the vehicle. The longitudinal conductors are designated by the reference number and the transverse or cross wires are designated 87.

Figure 12A:
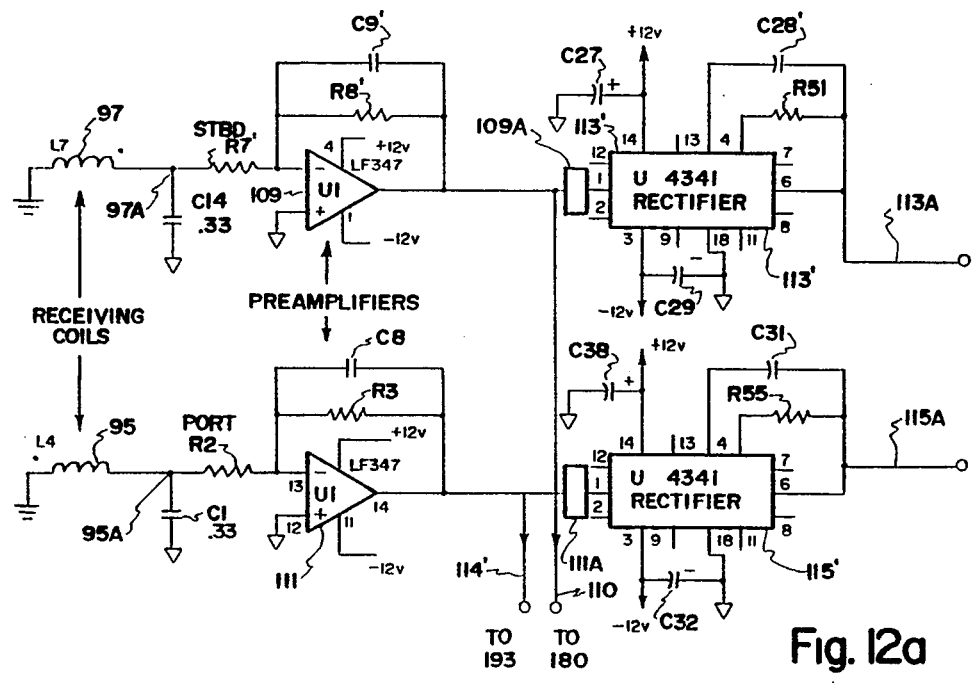
FIG. 12A. Circuit diagram of receiving antennas, preamplifiers used in common by several circuits. Also shown are rectifiers for terminal-positioning operation in which only a passive loop of wire is on the floor.
Figure 12B:
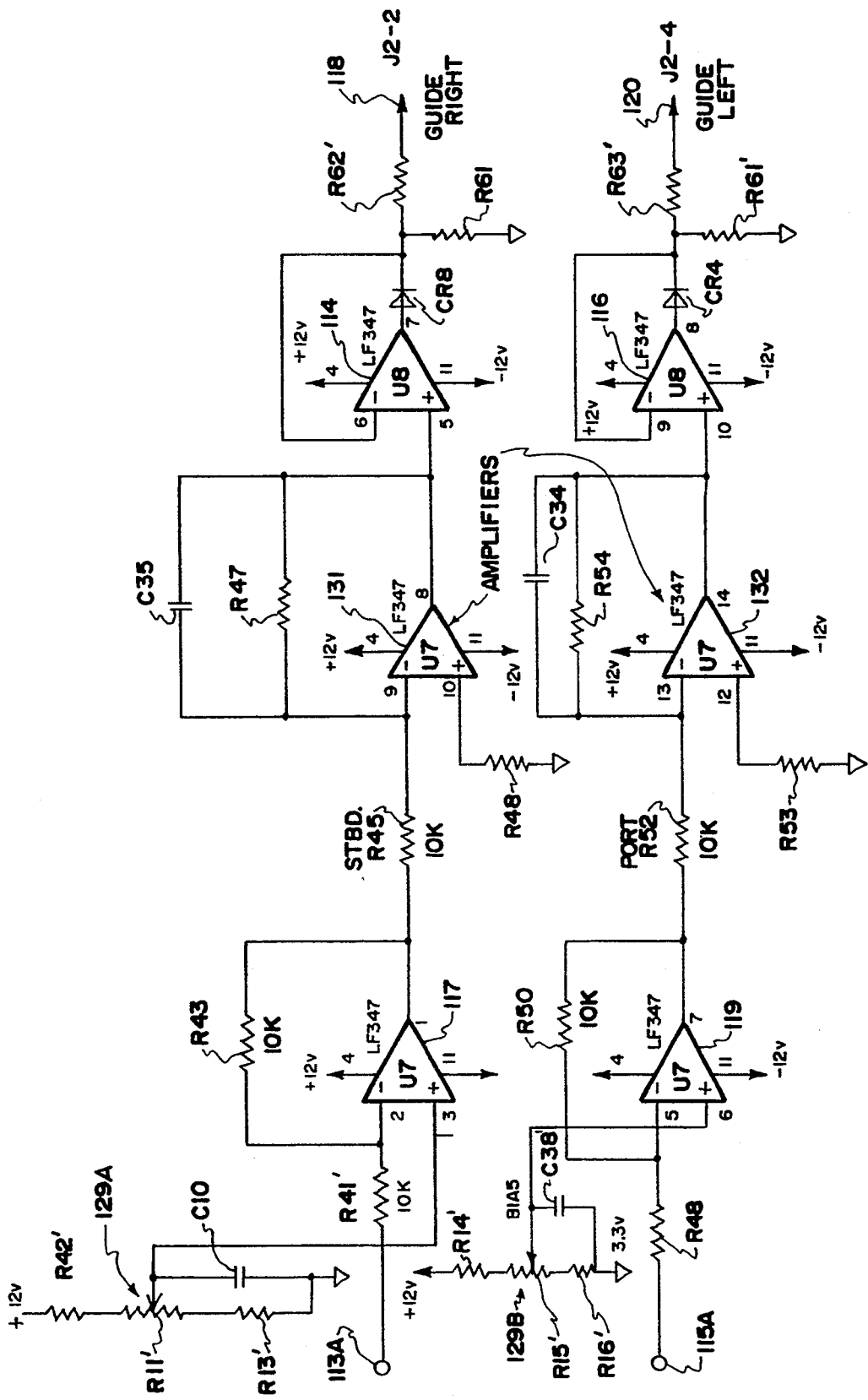
FIG. 12B. Circuit diagram, continued from FIG. 12A, of antenna output signal conditioning circuits for vehicle front-end terminal-positioning operation in which only a passive loop of wire is on the floor.

FIGS. 12A and 12B show a circuit diagram of a portion of the receiving equipment for receiving magnetic field information. The equipment of FIGS. 12A and 12B is part of block 151 of FIG. 14. In FIG. 12A the receiving antenna's coils 95 and 97 are shown at the left side of the figure with one terminal of each coil connected to ground. The instantaneous polarity of one coil relative to the other is indicated by the dots.

The circuits of FIGS. 12A and 12B are symmetrical for left and right signals so only the right channel will be described in detail. Coil 97 is connected to a preamplifier 109, which serves also as a lowpass filter to suppress high-frequency noise. The output of the preamplifier 109 is connected to a bandpass filter 109A with center frequency equal to the frequency of the transmitting oscillator 68'. The output of the bandpass filter is rectified by rectifier 113 to convert the signal to a DC value. The DC output of rectifier 113 is connected via terminal 113A to a shifting amplifier 117. The non-inverting input of that same amplifier receives a bias from an adjustable voltage-dividing biasing circuit 129A, which, at the output of amplifier 117, offsets the signal that was received from rectifier 113.

The bias of amplifier 117 is a DC bias for offsetting the direct magnetic coupling received from the transmit antenna. The purpose of the bias is to remove as much of the direct coupling component of the signal as possible so that only the signal from the guidewire is amplified, thus enabling a subsequent analog-to-digital converter 135 to be a high-resolution type.

It would not be necessary for the bias 129A to be adjustable because it is sufficient to offset the signal only slightly, but it is adjustable in the preferred embodiment. The left signal is later subtracted from the right signal in the motion control processor 61 anyway, so the portion of the direct signal that is not properly biased at amplifier 117 would be canceled by the subtraction if the antennas are centered with respect to each other. However, an adjustable bias on both right (129A) and left (129B) sides eliminates the need to adjust the antenna assembly, and allows bias adjustments to be made manually any time after the antennas are fixed in position. An automatic bias adjustment embodiment is described below in a section called Automatic Bias-Setting Embodiment.

The motion control processor 61 can also observe what the offset is when the vehicle is far removed from any floor wire, store that offset value, and use it to compensate the signals received while processing.

An inverting amplifier 131 receives the DC output signal from the amplifier 117, and a half-wave rectifying, unity gain amplifier 114, which follows amplifier 131, outputs values greater than or equal to zero as required by the A/D converter.

In a similar manner the left-coil signal from coil 95 is processed by circuit elements 111, 115, 119, 132, and 116, to provide another output signal, at a terminal 120.

Figure 14:
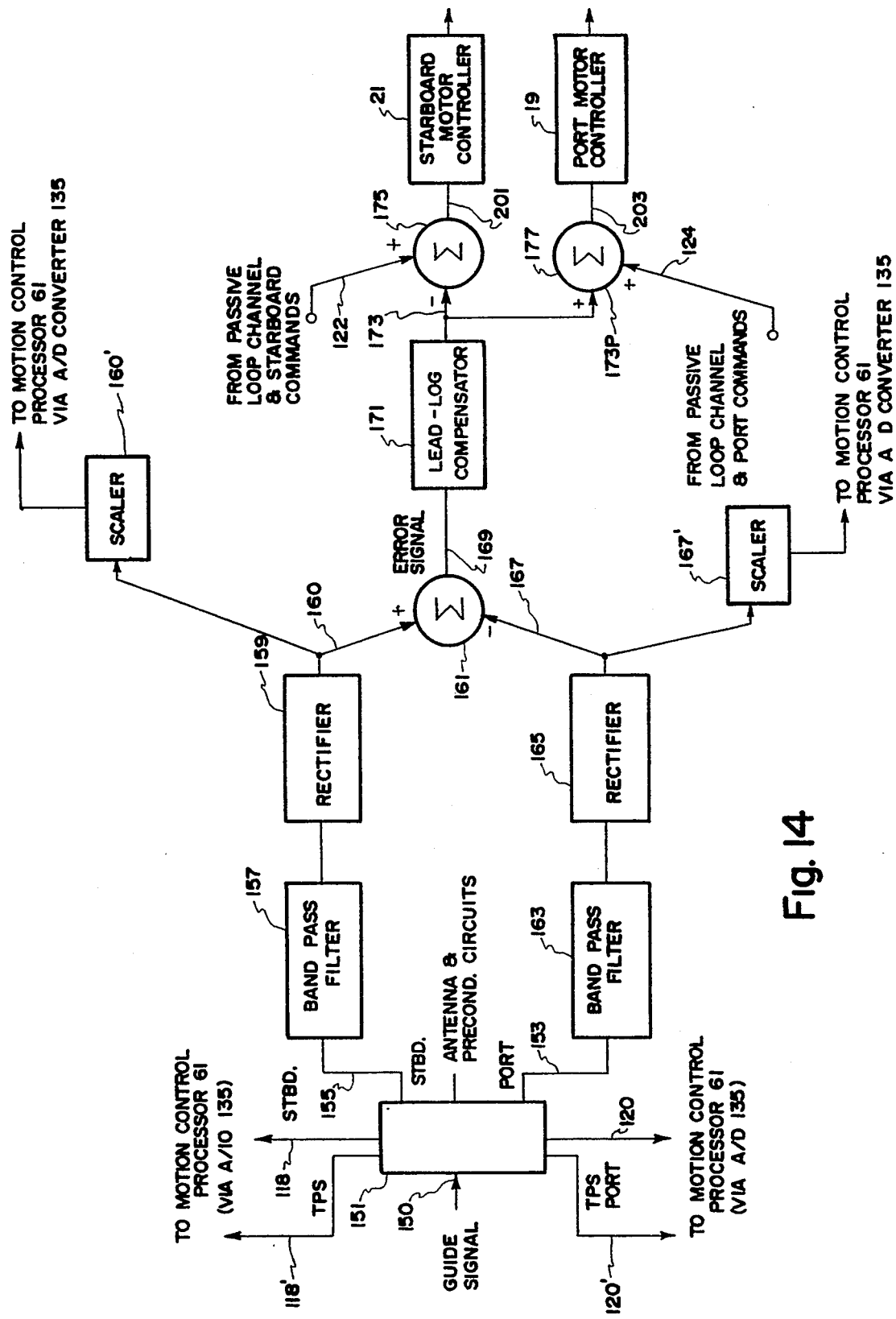
FIG. 14. Block diagram of equipment for guidewire-tracking mode of operation of the vehicle. (See FIGS. 15-17 for details.)

The terminals 118, 120, which have DC signals received from the right-side and the left-side coils 97, 95 respectively of the front-end receiving antenna 91, are shown also on FIG. 13. Also seen in FIG. 14 are terminals 118', 120', which comprise DC signals received from the starboard and port side, respectively, from coils similar to coils 97, 95, but located at the rear of the vehicle. Two additional left and right sensing antenna 91 signals are routed through bandpass filters 163, 157, respectively, and therefrom to rectifiers 165, 159. Terminals 167, 160 from rectifiers 165, 159, respectively, connect to summing amplifier 167, as earlier described. In addition, signals through terminals 167, 160 are transmitted to A/D converter 135 through scaling resistors 167', 160' for A/D conversion and transmitted therefrom to motion control processor 61. In the currently preferred embodiment, antenna 91 signals are processed directly by motion control processor 61, thereby bypassing lead-lag compensator 171. All six such inputs are connected to a multiplexed analog-to-digital (A/D) converter 135, which alternately converts signals on all input lines to eight-bit digital signals at an output bus 136.

Those digital signals are conducted to the vehicle's motion control processor 61. It is a Model DS5000 microprocessor manufactured by the Dallas Semiconductor Corporation.

Another input to the motion control processor 61 is received from an outer loop microprocessor 67, which is an Intel Corporation Model 80186 device. The AGVC 13 communicates with the outer loop processor 67. Data is transmitted between the AGVC 13 and the outer loop processor 67 by guidewires in the floor or by a radio link using an antenna 15.

Commands sent from the outer loop processor 67 to the motion control processor 61 include the desired vehicle speed and the ratio of the left and right wheel speeds, which controls the radius of curvature of travel.

However, when the terminal-positioning mode of the vehicle navigation and guidance system is being used the ratio of the left and right wheel speeds is 1.0. The speed command is the same to the left wheel as to the right wheel; corrective signals are generated from the receive antenna and are combined with the speed commands to force the vehicle to track the wire. Therefore, the vehicle follows the path of the guidewire regardless of the path's layout (e.g., a non-straight path). Microcomputer programs for speed control of wheels of automatic guided vehicles are well known in the prior art. In the currently preferred embodiment, calculations have been simplified by assuming the error offset represents the current guidewire position relative to vehicle 2A. The program which performs the calculations is provided in detail in software listings.

In one travel direction, the port and starboard wheels delineate left and right direction, as is true when the vehicle is traveling in the forward direction. However, when the vehicle is traveling in the rearward direction, the port and starboard wheels delineate opposite hand directions, right and left, respectively. For this reason, inputs 118 and 120 as seen in FIG. 13 are received from the starboard and port side of the vehicle and are processed as right and left direction signals, respectively.

Digital data from the motion control processor 61 is conducted to a digital-to-analog (D/A) converter block 133. The block 133 contains two D/A converters 133A and 133B for starboard and port signals respectively. The analog signal at each of their output terminals 122, 124 is connected through a summing junction 175, 177 to a motor controller 21, 19, to motors 17, 15, and the drive wheels 10, 8. See FIG. 14.

During operation of the vehicle at places away from a terminal the AGVC 13 and the outer loop processor 67 provide commands to the motion control processor 61, which supplies signals through the D/As 133A, 133B to control the motion of the vehicle via its controllers, motors, and drive wheels.

During operation in a terminal the antennas 97, 95 receive induced signals from a loop of wire 55 on the floor, and provide signals through the circuits of FIGS. 12A and 12B and the A/D converter 135 of FIG. 13, then through the motion control processor 61, terminals 122, 124, junctions 175, 177, controllers 21, 19 (FIG. 14) and motors 17, 15. These error signals alter the speed commands of their respective wheels to position the vehicle laterally as desired in the terminal.

Summary of Passive Loop Positioning Operation

To summarize, the terminal-positioning mode of the vehicle navigation and guidance apparatus guides the vehicle over a passive wire as follows:

First, microprocessors 61 and 67 receive a signal from the AGVC 13 notifying them that the vehicle 2 is entering a terminal such as terminal 11. The transmitting antenna 71 is turned on by means of the analog switch 70, FIG. 6, which is controlled by the microprocessor 61.

Signals from the receiving antennas 91 are preamplified. The right-coil and left-coil signals are conditioned with identical electronic circuits, so the following description covers only the right-coil signal. The right-coil signal is routed through two different paths, namely the circuits of terminals 118 and 155, FIG. 14.

Within block 151 of FIG. 14, the right-coil signal is routed to a bandpass filter, rectified, inverted and added to (i.e., offset by) a bias, and amplified to obtain the signal at terminal 118. It is also routed to an attenuator to obtain the signal at terminal 155.

The signal at 118 goes through a path including the motion control processor 61, (and necessary A/D and D/A converters), FIG. 13. The signal at terminal 155 is amplified in a bandpass filter 157 and then rectified (159), and no bias is removed, leaving the difference at terminal 160 very small. Consequently the error signal is very small. The signal at 169 is switched off by the outer loop processor 67 while the vehicle is traveling in over a passive guidewire, to eliminate any possible undesirable effects. (See switch 170, FIGS. 4B and 16B).

Lateral Positioning of Vehicle over Active Guidewires at Terminals and Elsewhere In the case of terminals such as terminal 9 of FIG. 1 that are approached on routes such as routes 3 of FIG. 1 (which have guidewires embedded in the floor), guidewires are used in the floor of the terminals also, to position the vehicle within the terminal. FIG. 14 shows receiving equipment on the vehicle for guidewire operation both inside and outside a terminal, so far as lateral positioning of the vehicle is concerned, As shown in FIG. 14, guide signals from a wire in the floor enter (at terminal 150) a block labeled "Antenna and Preconditioning Circuits" 151. Portions of this block 151 were already described in connection with FIGS. 12A and 12B, where terminals 118 and 120 are shown. Other portions of the block 151 will be described subsequently in connection with FIG. 15, but for purposes of explaining the general concept it is helpful to finish describing the block diagram of FIG. 14 first.

The Antenna and Preconditioning Circuits block 151 outputs an AC signal at a terminal 155, which goes to a bandpass filter 157. This filter is tunable to either guidewire frequency, specifically 965 Hz or 1155 Hz. Two guidewire frequencies are available to enable commanding the vehicle to select either one of two guidewire paths at a fork.

The outer loop processor 67 alternates the center frequency of this bandpass filter 157 by means of an analog switch, which switches appropriate resistor values into the circuit to select the desired frequency, until a significant amplitude is detected, signifying acquisition of the guidewire. The filtered signal is fullwave rectified in a block 159. The result at terminal 160, which is from starboard signal channel, is sent to a non-inverting input of a summing junction 161.

A port channel output from the block 151 is at terminal 153. It is passed through a bandpass filter 163, then through a fullwave rectifier 165. At a terminal 167 it is entered into an inverting input of the summing junction 161. The output of the summing junction 161, at terminal 169, is an error signal. That error signal is passed through a lead-lag compensator 171, which is tailored to the dynamics of the system as a whole to provide stability, fast response, and high accuracy.

The output of the lead-lag compensator 171 is inverted and added to the starboard speed command 122 from the D/A 133A of FIG. 13 at summing junction 175. See also FIG. 4A for a broader view. The summing junction 175 outputs a signal at a terminal 201, which is connected to the starboard motor controller 21. That motor controller controls the motor 17 which drives the wheel 10, as described earlier.

The output from the lead-lag compensator 171 is connected also to another summing junction 177 without being inverted first. Summing junction 177 adds the compensated error signal 171 to the port speed command 124. The summing junction 177 outputs a signal to the port motor controller 19, which drives the port motor 15, hence the wheel 8. The elements 157 through 177 are on an analog circuit board.

Figure 15:
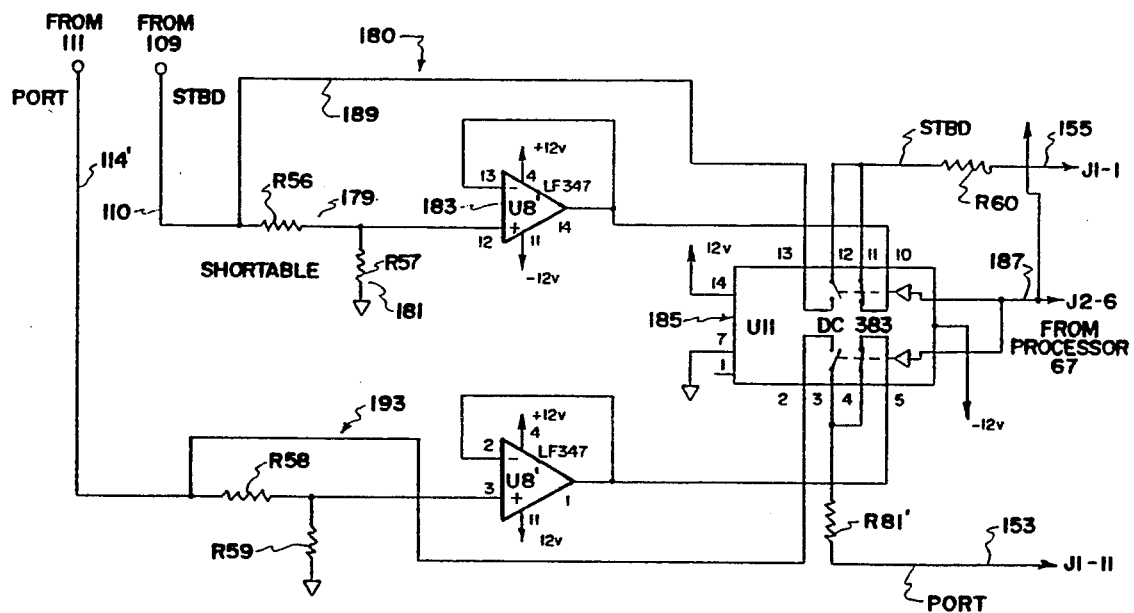
FIG. 15. Diagram of circuits including the receiving antennas, their preamplifiers, and short-circuitable attenuators (input portion of circuit) as used when the vehicle is relying on an active guidewire for position information.

Details of the lateral-control circuits on the vehicle for a guidewire mode of operation are shown in FIGS. 15, 16 and 17, which will now be described. FIG. 15 shows connections 110, 114' from the preamplifiers 109, 111 that were shown on FIGS. 12A. The signal from preamplifier 109 goes to an attenuator 180 consisting of resistors 179, 181, and an amplifier 183.

That attenuator is arranged so that it can be short-circuited by an analog switch 185 upon receipt of a control signal (at a switch terminal 187) from the outer loop microprocessor 67. A short-circuiting conductor 189 is connected around the attenuator 180. One output of the analog switch 185, which comprises a pair of ganged single-pole single-throw switches interconnected to form a single double-pole double-throw selector switch, is at a terminal 155, for the starboard side signal.

In an identical way, the output of preamplifier 111 goes to a switchable attenuator 193 and through the analog switch 185 to an output terminal 153 for the port side.

In FIGS. 6 and 15 the analog switches 70 and 185 are arranged such that when the oscillator 68' is disconnected from the transmit antenna 71, the attenuators 180, 193 are short-circuited and do not attenuate. This situation occurs when the vehicle is relying on active guidewires for guidance.

At other times, the oscillator 68' feeds the transmitting antenna 71 (via switch 70) and the attenuators 180 and 193 are permitted (by switch 185) to attenuate the signals received from antenna coils 97 and 95. This situation occurs when the vehicle is relying on passive guidewires for guidance.

Terminals 153 and 155 are at the left of FIG. 16A, which shows a middle portion of analog circuits for receiving and processing signals when operating in the guidewire mode. The starboard signal at terminal 155 of FIG. 16A is conducted through a switch to a bandpass amplifier filter 157, which is tuned to one of the guidewire frequencies, i.e., 965 Hz or 1155 Hz. The output of bandpass filter 157 is rectified in rectifier 159, smoothed in filter 158 and sent to a summing junction 161.

At the same time the signal 153 of FIG. 16A passes through a bandpass filter 163, through a rectifier 165 and an amplifier 166, and is connected to another input terminal 167 of the summing junction 161. The output of summing junction 161, at terminal 169, passes through the lead-lag compensator 171 to the terminal 173.

Figure 17A:
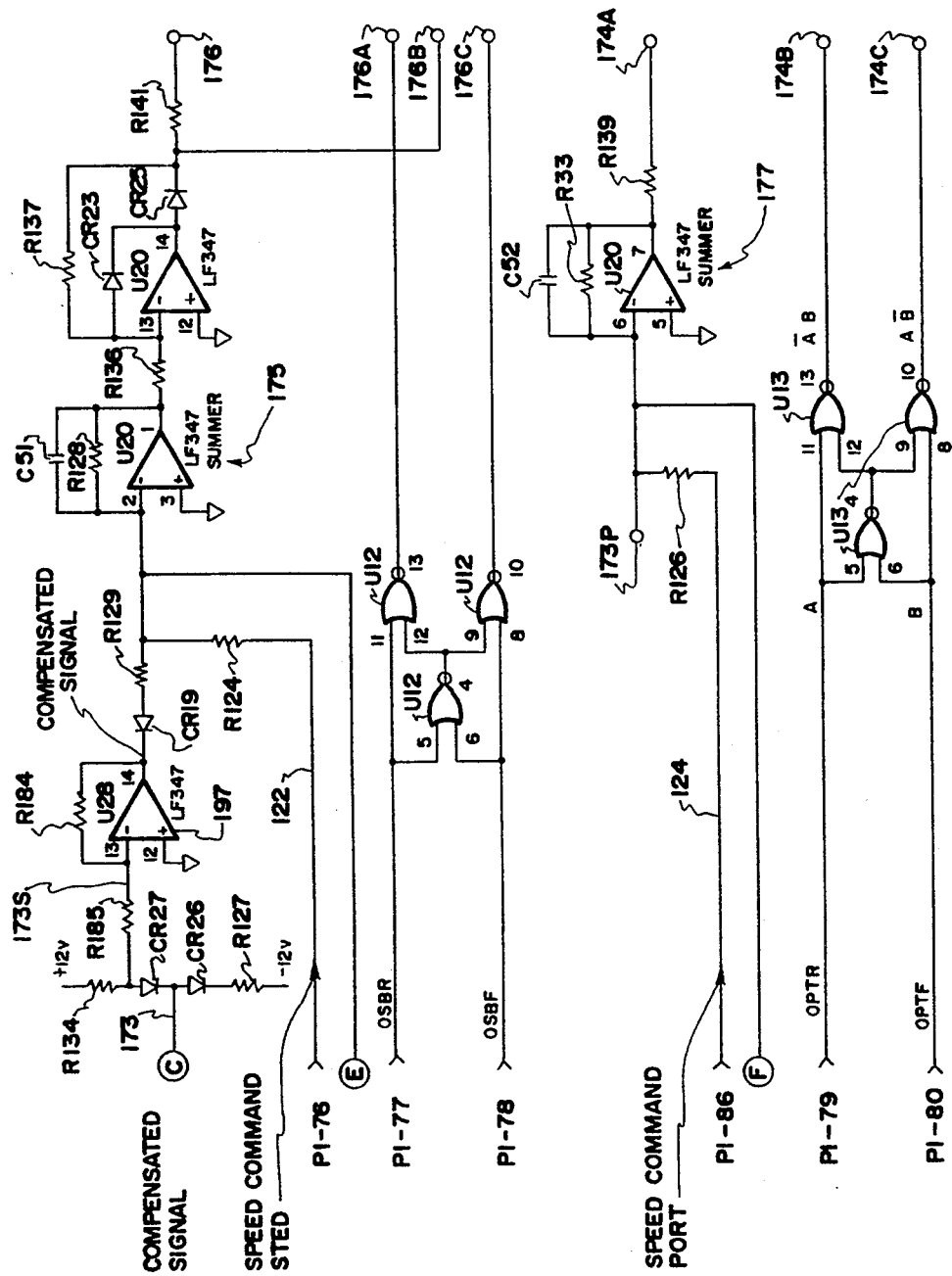
FIG. 17A. Circuit diagram, a continuation of FIG. 16B, of a portion of an analog board that sums a command from the motion control microprocessor with a compensated error signal, and drives a motor controller.
Figure 17B:
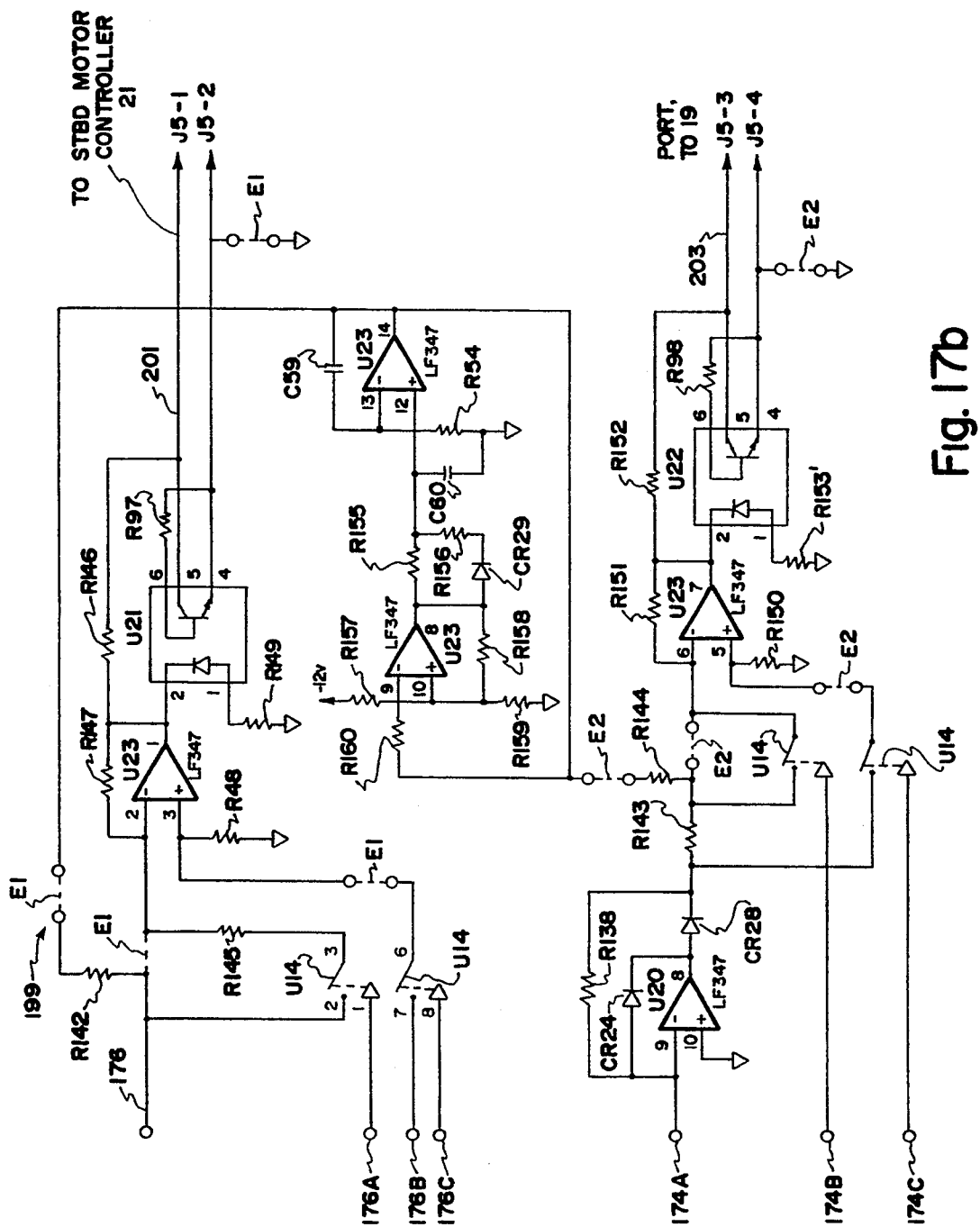
FIG. 17B. Circuit diagram, a continuation of FIG. 17A, of a portion of an analog board that controls direction of the vehicle (forward or reverse), and drives a motor controller.

In FIGS. 17A and 17B circuits are shown that follow FIG. 16B and are output portions of an analog board.

These output portions sum the commands at terminals 122 and 124 from the microprocessor 61, with the compensated error signal at terminal 173 that drives the motor controllers. A signal of FIG. 17A at terminal 173 splits into terminals 173S and 173P. The starboard signal at 173S is inverted in device 197 and summed with the starboard speed command 122 at summing junction 175, then passes through some circuits 199 merely to select a forward or reverse direction of motion. It flows to an output terminal 201 that goes to the starboard motor controller 21. The circuits of this figure are of a conventional nature so their details are omitted from this description, although they are shown in detail in the included drawings.

The signal at terminal 173P of FIG. 17A is not inverted but is connected directly to a summing junction, 177, and passes through circuits similar to those just described to send a signal, at a terminal 203, to the port motor controller 19, as shown on FIGS. 14, 17A, and 17B. Junctions between FIGS. 17A and 17B are designated 174A, 174B, 174C, 176A, 176B, and 176C.

Operation of the Motion Control Processor

The following equations describe the operation of the microprocessor 61. The speed commands $C_s(n)$ and $C_p(n)$ are signals that originate from the AGVC 13 and that are sent from the outer loop microprocessor 67 to the motion control processor 61. These signals are added in microprocessor 61 to the compensated error signal $e_c(n)$ to yield the resultant signals $R_s(n)$ and $R_p(n)$, which serve as inputs to the summing junctions 175 and 177, at terminals 122 and 124 of FIG. 14.

The quantity $e(n)$ is a measure of how far the vehicle is off-center from the floor wire; a zero value of $e(n)$ means that the vehicle is centered over the wire. The $e(n)$ signal could be programmed to call for an offset. If the floor wire were at an incorrect position laterally, the fault could be compensated by having the program cause the vehicle to operate off to one side of the wire. For example, the vehicle could be offset by two inches by simply adding a term to the error signal $e(n)$.

The term $e_c(n)$, which is the compensated error signal, is the output of a digital filter in microprocessor 61 that provides dynamic loop compensation of the closed control loop. It involves the current value and recent values of the error signal $e(n)$, as well as recent values of the compensated error signal $e_c(n)$,

Summary of Guidewire Tracking

To summarize, the terminal-positioning mode of the vehicle navigation and guidance system apparatus guides the vehicle on a guidewire portion 3 of an installation in the following manner. The transmitter assembly 68', 69, 71 is turned off by means of the switch 70 of FIGS. 5 and 6. Signals from guidewires, received at the receiving antenna 91, are preamplified (FIG. 15) and routed directly to an analog circuit board (FIG. 14). The starboard and port signals $C_s(n)$ and $C_p(n)$ above replicate, with opposite signs, the commands being received at terminals 122 and 124 from the microprocessor 61. The summing junctions 175 and 177 output speed commands, varied slightly by error signals, to control the motors 15 and 17 to drive the vehicle.

Use of the Vehicle Navigation and Guidance Apparatus in Two Guidance Modes—Namely Active Guidewire and Self-Contained Navigation and Guidance Certain components are used in common, at terminals and elsewhere, by both the terminal-positioning mode of the vehicle navigation and guidance system for passive floor loops and the guidewire guidance mode. The guidance system as a whole may have a portion of its routes (routes 3) in which vehicle guidance is provided by guidewires in the floor. The terminal-positioning mode of the vehicle navigation and guidance system can be used to track those floor guidewires.

The components that are used in common include the receiving antennas 47, the FIG. 17 portion of the analog board 49, the preamplifiers shown in FIG. 12A, the controllers 19, of FIGS. 4 and 14, the motors 15 and 17 of FIG. 4A, and of course the wheels 8, 10.

Wire-Crossing Detection for Longitudinal Positioning of Vehicles

Longitudinal positioning of the vehicle 2A at terminal 9 or 11 is accomplished by sensing the location of the vehicle with respect to a wire that extends transversely across the floor in the terminal area. Current in the transversely-disposed conductor produces an alternating magnetic field surrounding it. The current can be due to active conductive energization of the wire or can be induced by transformer action from a transmitting antenna on the vehicle that generates a magnetic field. The magnetic field encircles the wire so that, at a particular instant, its direction is upward at one side of the wire, is horizontal directly over the wire, and is downward on the other side of the wire.

Magnetic coils for sensing the presence and location of the wire crossing are shown on FIG. 7. The three coils on the left side are a front coil 205, a middle coil 207, and a rear coil 209. The coils on the starboard side are: front 211, middle 213, and rear 215.

When these coils are in place on the vehicle their axes are vertical so that their turns are horizontal. Consequently when the middle coil 207 is directly over a current-carrying wire at the floor, magnetic flux passes through the front coil 205 in one direction, say upward, at the same time that magnetic flux passes through the rear coil 209 in the opposite direction, i.e., downward. At that same time flux in the coil 207 does not link any turns because the flux there is horizontal and the coil's turns are horizontal.

When the coil 207 is directly over the current-carrying floor wire, an alternating magnetic flux would therefore produce one phase of signal in the coil 205, an opposite phase of signal in the coil 209, and zero signal in the coil 207. The principle of operation of the apparatus in detecting the longitudinal location of the vehicle by means of wire-crossing detection based on these three signals.

Figure 18:
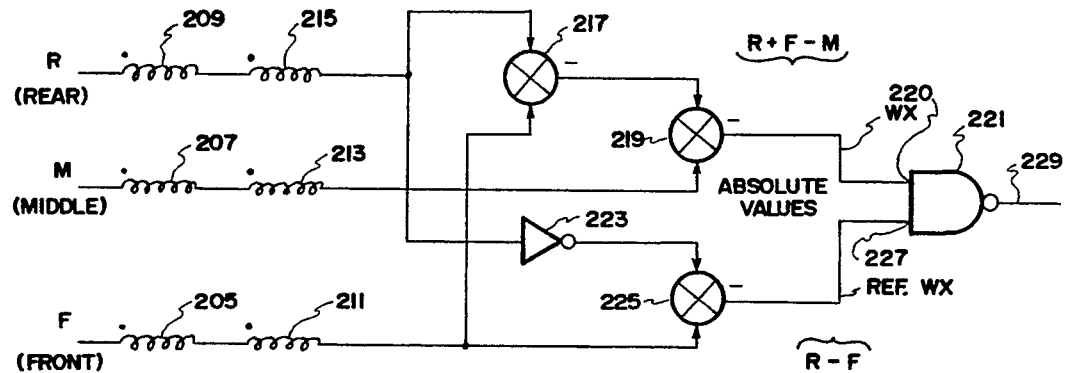
FIG. 18. Simplified diagram of wire-crossing detection circuits. (See FIG. 19 for details.)

The method of combining the three signals is shown in FIG. 18, which is simplified in order to illustrate the concepts. Signals can occur in either coil 209 alone, or 215 alone, or both simultaneously. A signal from coils 205 and 211 is added to a signal from coils 209 and 215 at a summing junction 217. The sum is inverted and added to a signal from the middle coils 207 and 213 at a summing junction 219. The output of summing junction 219 is inverted and applied as an input 220 to a NAND gate 221.

The signal from coils 209 and 215 is also inverted in an inverter 223 and is input to a summing junction 225. This signal is added to a signal from the coils 205 and 211 by summing inverting amplifier 225. The output of the summing junction 225 is inverted and applied to a second input 227 of the NAND gate 221.

The signal at the first input 220 is a "wire-crossing signal" WX while the signal at terminal 227 is a "wire-crossing reference signal" REFWX. Absolute values of the signal WX and the signal REFWX are used at the terminals 220 and 227. The output of NAND gate 221 is terminal 229.

When a vehicle drives into a terminal it approaches a transversely lying wire 87 on the floor across the path of the vehicle. Only the left-hand coils will be discussed. Before the vehicle arrives at the wire, all three of the coils 205, 207 and 209 are linked by some alternating magnetic flux from the wire and all three of their signals are in phase. For simplicity of discussion, this phase is referred to as "downward" flux.

When the vehicle has advanced to where only the front coil 205 has crossed the wire on the floor, the coil 205 has "upward" flux and the coils 207 and 209 still have downward flux. That is, the instantaneous polarity of the output signal from the front coil 205 is opposite the polarity of the middle and rear coils 207, 209. When the vehicle has advanced to where the middle coil 207 is directly over the floor wire, coil 205 has upward flux, coil 207 has zero linking flux (because the flux is parallel to the plane of its coils),' and the rear coil 209 has downward flux.

The signal at point 220 of FIG. 18 is the rear coil's signal plus the front coil's signal minus the middle coil's signal. When the middle coil 207 is directly over the floor wire 87 the signal from the front coil 205 is equal and opposite to the signal from the rear coil 209 so those terms cancel. At the same time the signal from the middle coil 207 is a minimum, so the signal at point 220 is zero. This represents a wire-crossing position.

At that time the reference signal at a point 227 is a maximum because that signal is the rear coil's signal minus the front coil's signal. Since the signals from these two coils 205 and 209 are of opposite polarity at that time, their algebraic difference becomes the sum of the magnitudes of the two, so it is a maximum.

The logic circuit involving NAND gate 221 and circuits leading up to it are arranged so that when the signal at 220 is crossing zero and the signal at 227 is relatively great (although not necessarily a maximum) the NAND gate 221 outputs a logic signal at the point 229 that is suitable for indicating that the vehicle is directly over the wire crossing. That output at 229 is low when a wire crossing is detected.

Figure 20:
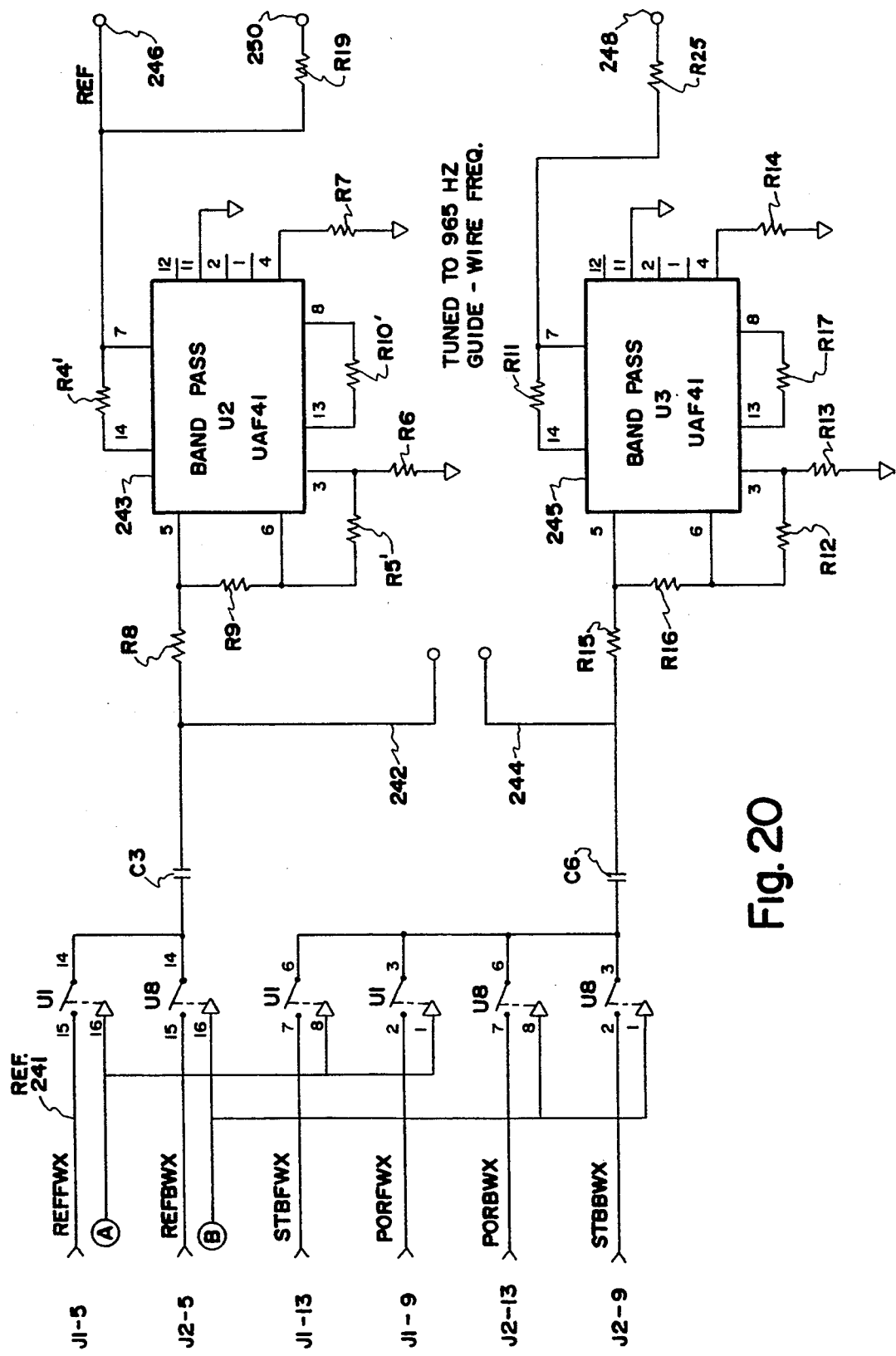
FIG. 20. Circuit diagram of a portion of wire-crossing detection apparatus tuned to a frequency assigned for active guidewire operation of the vehicle.

Details of the wire-crossing circuits are shown in FIGS. 19 and 20, and some waveforms at selected points in the circuit are shown in FIGS. 23 through 27.

In FIG. 19 the coils 209 and 215 are in series and are connected through a resistor 231 to one input of an inverting summing junction 217. Coils 205 and 211 are connected in series, and are connected through resistor 233 to a second input of the summing junction 217. The output of the summing junction 217 is connected through a resistor 220 to one input of another summing junction 219. A second input to the summing junction 219 comes from a series connection of the middle coils 207 and 213, through a resistor 222. The inverted output of summing junction 219 is at a terminal 235, which is shown in both FIG. 19 and FIG. 20.

The output of coils 209 and 215 of FIG. 19 is connected also with an inverter 223, whose output is connected through a resistor 237 to an input of the summing inverting amplifier 225. Another input of the summing inverting amplifier 225 comes from the series-connected coils 205 and 211, through a summing resistor 239. The summing inverting amplifier 225 is connected so as to invert the summed signal.

The output of summing inverting amplifier 225 is at terminal 241, which is shown on both FIG. 19 and FIG. 20. The signal at terminal 235 is the wire-crossing signal itself and that at 241 is the reference wire-crossing signal. The circuits of FIG. 19 are used in common to detect wire crossings that are (a) directly energized as in terminal 9 of guidewire routes 3, and (b) passive induction loops as at terminal 11.

On FIG. 20 the signals at terminals 235 and 241 are connected through switching to bandpass filters 243 and 245. They are tuned to receive 965 Hz, which is the active guidewire frequency. A similar other subcircuit, of FIG. 22, to be described later, is tuned to 1155 Hz, which is the frequency of the transmitter on the vehicle that is used for exciting passive loops in the floor mat at a terminal. The 1155 Hz circuit is connected at terminals 242 and 244.

Figure 22:
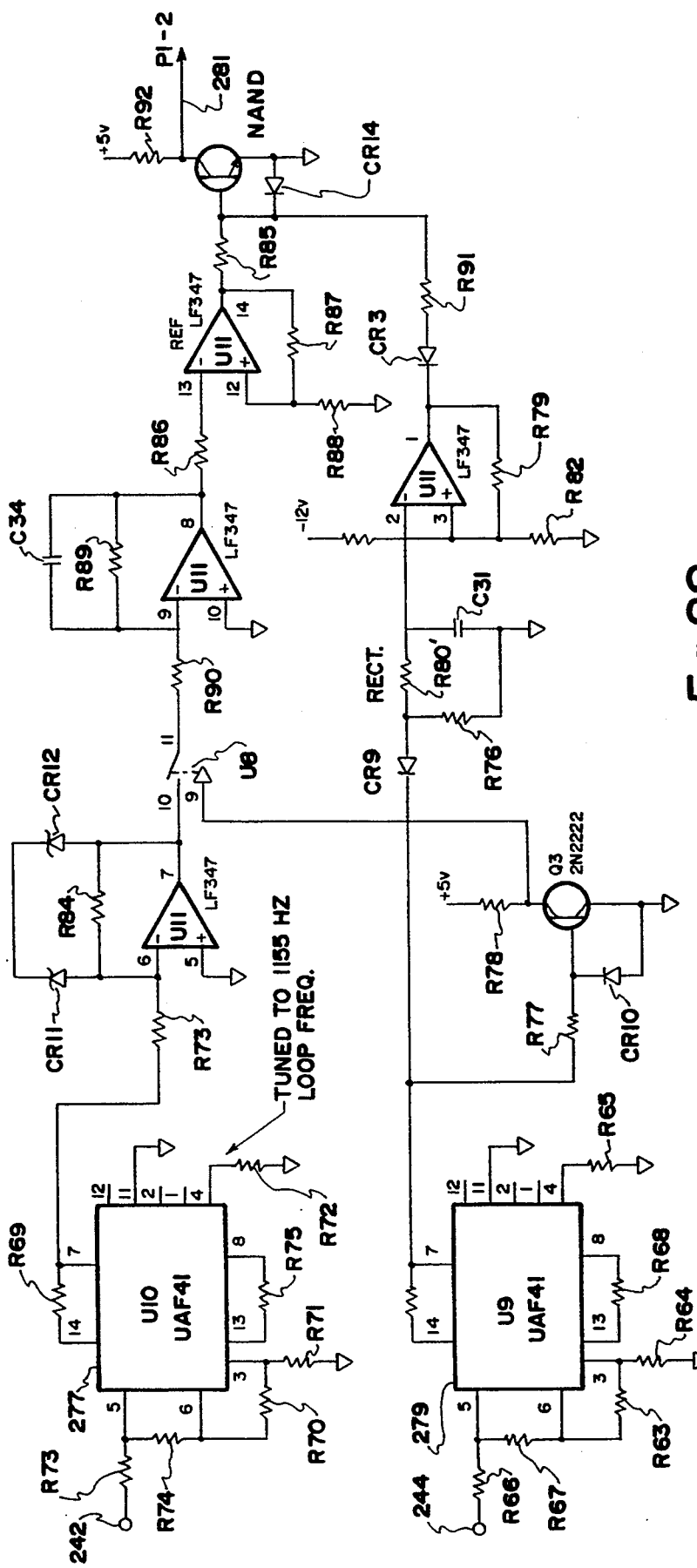
FIG. 22. Circuit diagram of a portion of wire-crossing detection apparatus tuned to a frequency assigned for passive wire loop operation in a terminal.

The two frequencies 965 Hz of FIG. 20 and 1155 Hz of FIG. 22 are used in a guidewire system for causing the vehicle to branch to a first or second route at a junction such as a "T", by applying an appropriate frequency to the guidewire when the vehicle approaches the junction. However, in a terminal having a passive loop, the receiver subchannel of 1155 Hz frequency is used for detecting a passive loop signal, whose energy originated with the onboard transmitter 68, and the receiver subchannel of 965 Hz frequency is used for detecting a conductively energized active guidewire crosswire at the terminal.

Thus the 1155 Hz passive-wire-crossing subchannel 277 (see FIG. 4), is used for detecting a passive loop when the vehicle is in a terminal, and is used for detecting a junction guidewire when the vehicle is not in a terminal. The 965 Hz guidewire-crossing subchannel 243 of FIG. 4 is dedicated to only guidewire sensing, both in and out of terminals.

Figure 21:
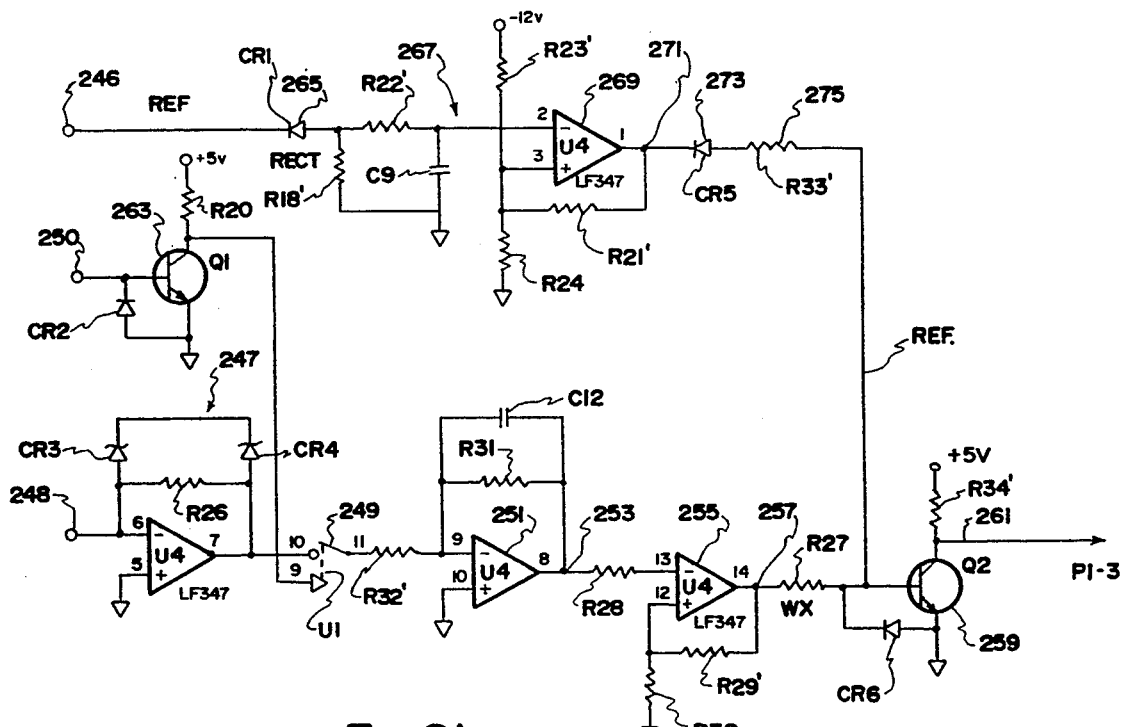
FIG. 21. Circuit diagram, a continuation of FIG. 20, of a portion of wire-crossing detection apparatus tuned to a frequency for active guidewire operation.
Figure 23:
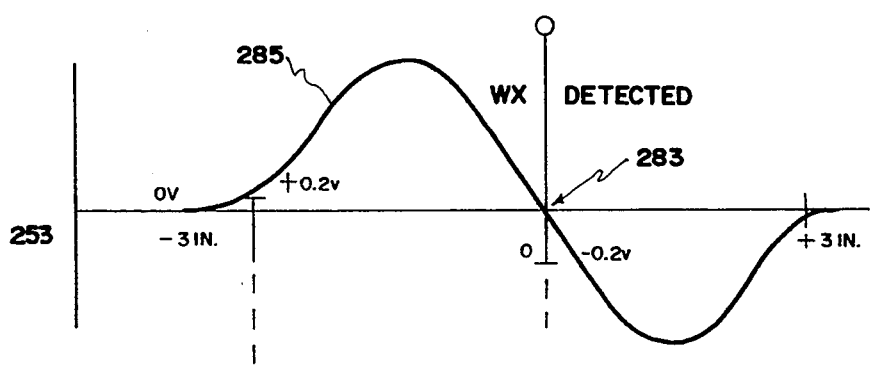
FIG. 23-27. Signal waveforms at various points in the wire-crossing detection circuit of FIG. 21, namely at terminals 253, 257, 267, 271, and 261, respectively.

On FIG. 20, the signal of terminal 235 passes through switching to a bandpass filter 245. FIG. 21 is a continuation, at terminals 246 and 248, of FIG. 20. The output of filter 245 passes through an amplifier circuit 247, a switch 249, and an inverting amplifier 251. The output of inverter 251 is shown in the graph of FIG. 23. That graph is the detected wire-crossing signal at a terminal 253.

Figure 24:
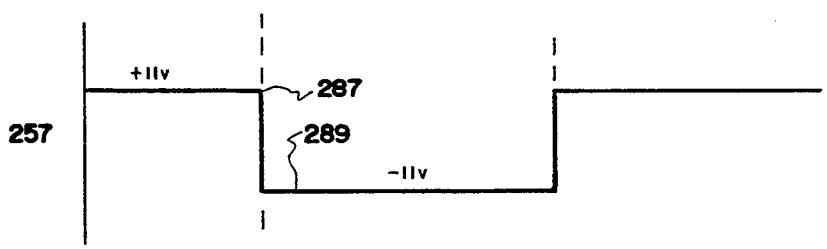

That signal passes through an amplifier 255 that eliminates the negative-going portion of signal and squares off the positive-going portion of the signal and inverts it, to produce the signal shown in the graph of FIG. 24. That signal appears at a point 257 of FIG. 21. It corresponds to the WX signal at terminal 220 of the simplified diagram of FIG. 18. Terminal 257 is connected to a transistor 259 in such a way as to perform a logical NAND function. The output signal, at terminal 261, is shown on the graph of FIG. 27.

On FIG. 20, the reference channel of terminal 241 goes to a bandpass filter 243. One output of the filter 243 goes via a terminal 250 to a transistor amplifier circuit 263 as shown on FIG. 21. The SPST switch 249 is controlled by the transistor amplifier circuit 263 and hence by the reference signal at 253. That reference signal turns on the cross-wire signal channel 251 when a strong reference signal is present and positive. (See FIG. 24).

The reference-channel bandpass filter 243 also outputs a signal through a diode 265 to an inverting input terminal 267 of an amplifier 269, FIG. 21. The waveform at input terminal 267 is shown on the graph of FIG. 25. It is a negative-going signal whose magnitude increases as the vehicle approaches the center of the cross wire and whose magnitude diminishes as the vehicle continues past the center. It is the algebraic sum of the outputs of the front and rear coils.

Figure 25:
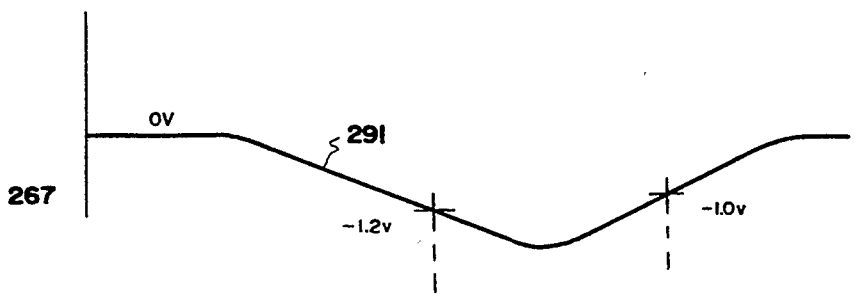
Figure 26:
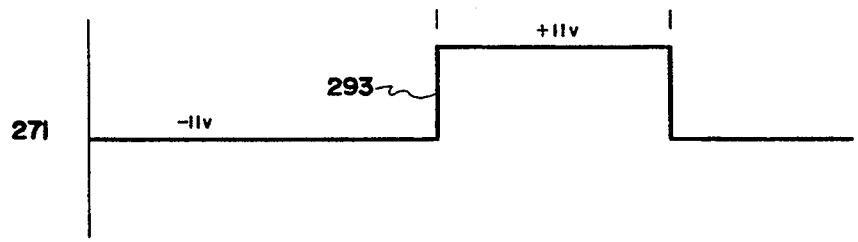
Figure 27:
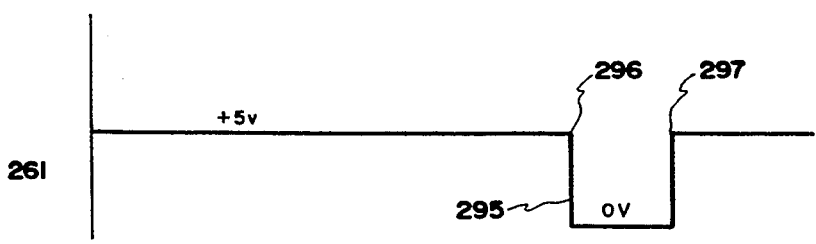

At a threshold of minus 1.2 volts the reference signal at 267 is tripped. Amplifier 269 is configured as a Schmitt trigger with about 0.2 volts of hysteresis. The threshold for decreasing magnitude is 1.0 volt, as shown in FIG. 25. This threshold is passed as the vehicle continues forward past the wire cross. The output of the amplifier 269, at a terminal 271, is shown as a large square graph 293 in FIG. 26.

The square graph 293, which has a range from negative 11 volts to positive 11 volts, is applied through a diode 273 and a resistor 275 to the base of transistor 259. That signal serves as the reference-channel input to the NAND gate whose principle component is transistor 259. Transistor 259 is part of the NAND gate 221 of the simplified diagram of FIG. 18.

The circuit of FIG. 22 has bandpass filters 277 and 279, both of which are tuned to 1155 Hz for passive loops. Otherwise, the circuit of FIG. 22 is identical to that of FIG. 21. The output of the circuit of FIG. 22 is at a point 281. This is the cross-wire signal output when a passive loop is used instead of an active guidewire.

The curves of FIGS. 23 through 27 are aligned vertically over each other to provide the same vehicle-position scale on the abscissa for all of them. Collectively they portray what happens in the circuit when a guided vehicle having antennas 205-215 as in FIG. 7 enters a terminal and drives over a wire-crossing that it must detect for purposes of longitudinally positioning the vehicle. The abscissa of all of the graphs of FIGS. 23 through 27 is distance expressed in inches, as measured positively and negatively from a zero point 283 on FIG. 23. Point 283 is the vehicle's position when the middle coil 207 is directly over the wire-crossing on the floor.

As shown in FIG. 23, at a distance of −3 inches, a curve 285, which is the wire-crossing signal at terminal 253 of FIG. 21, has increased to a +0.2-volt level. A Schmitt trigger 255 trips its output from positive saturation level to negative saturation level 289 at a point 287 in FIG. 24. The graph at FIG. 24 is the signal at terminal 257 of FIG. 21, as a function of the vehicle's longitudinal position.

On FIG. 23, when the curve 285 decreases (at a short distance to the right of the zero-point 283) to a level more negative than −0.2 volts, which is the negative threshold level of Schmitt trigger 255, the output signal at terminal 257 returns to a positive saturation level. The signal 289 essentially serves as one input of the NAND gate 259.

Turning now to the reference signal channel of FIG. 21, a signal at terminal 267 diminishes gradually from zero to a minimum at the wire-crossing center represented above by point 283. The waveform at terminal 267 of FIG. 21 is the V-shaped waveform 291 of FIG. 25. As the signal 291 decreases past −1.2 volts, amplifier 269 is triggered to saturate to the positive rail. Alternatively, as signal 291 increases past −1.0 volt, amplifier 269 is triggered to saturate to the negative rail. The output signal at terminal 271 is shown as waveform 293 in FIG. 26.

At the output terminal 261, a negative-transition pulse 295 is produced at a wire cross. As shown on FIG. 27, its leading edge 296 occurs at a place very slightly more positive than the zero center point 283 of the wire 87 on the floor. Its positive-going edge, if the vehicle were to continue in a forward motion, would occur at a position 297 on FIG. 27. The output signal at terminal 261 is a positioning signal whose edge 296 indicates that the middle coil 207 is almost directly over the wire-crossing. This signal goes to the motion control processor 61 to stop the vehicle and/or control its repositioning, by means of well-known computer control programming techniques

Measurement of Heading of Vehicle, in One Embodiment of the Invention

In one preferred embodiment, one sensing antenna 47 is mounted at the front of the vehicle and another sensing antenna 47A is mounted at the back of the vehicle, as shown in FIG. 11. A measurement of the lateral offsets of the center of each of the antennas 47 and 47A from a central longitudinal wire segment 307 on the floor indicates the vehicle's heading. The net difference in offsets divided by the longitudinal spacing 308 between the antenna assemblies 47, 47A is the tangent of the heading angle the vehicle relative to the wire 307.

The signals from antennas 47 and 47A are processed in the manner described in detail above and subtracted in a comparator 309 and entered into a portion 61A of the microcomputer 61. See FIG. 11. Stored in the microcomputer 61 is information as to the longitudinal spacing 308 between the two antennas, which enables the computer to compute the vehicle's heading.

Alternative Receiving System Embodiment Having Phase-Locked Loops

Figure 28:
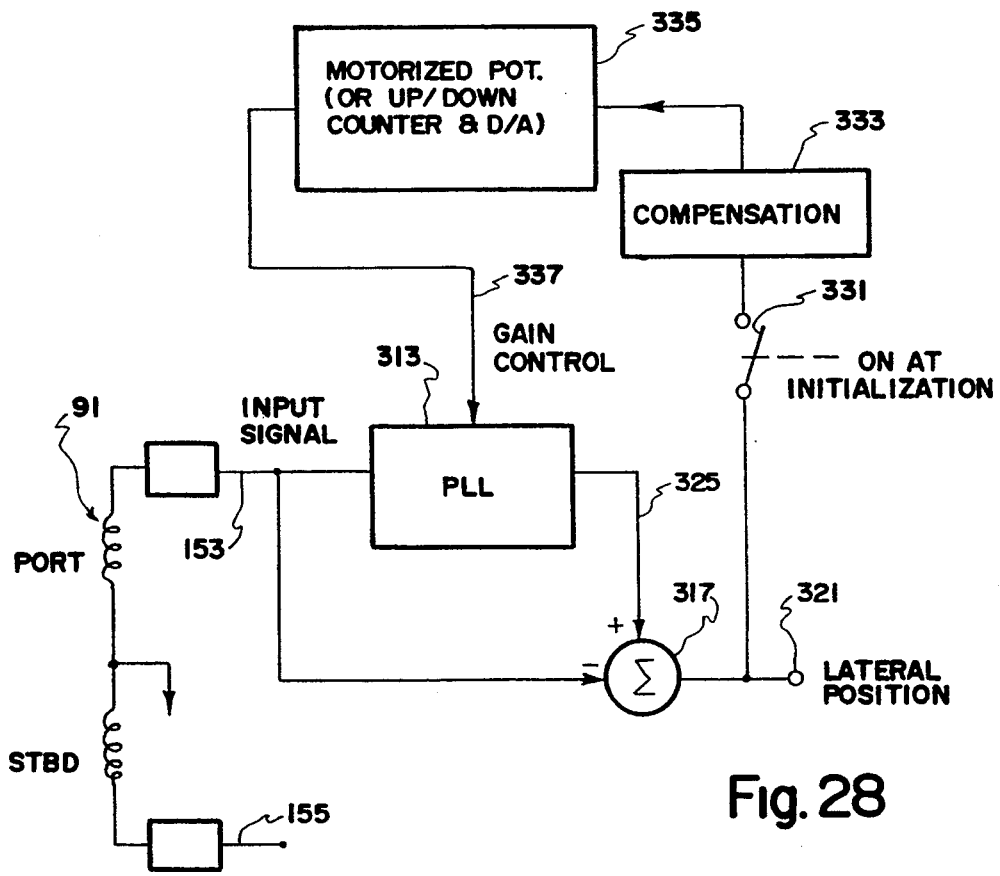
FIG. 28. Block diagram of an alternative embodiment of the invention that uses phase-locked oscillators in a portion of the system for processing signals from lateral-position-detecting antennas.
Figure 29:
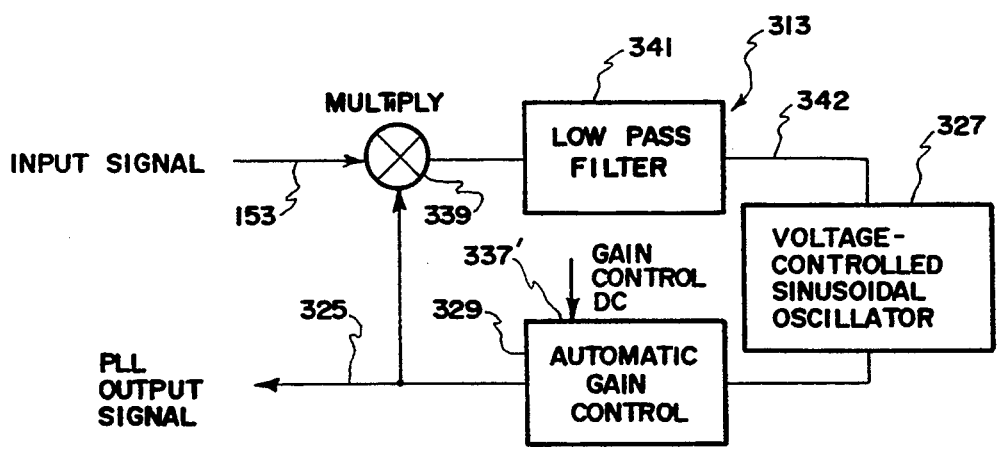
FIG. 29. Block diagram of a phase-locked oscillator having automatic gain control, used in FIG. 28.

An alternative embodiment of the apparatus for determining lateral position of a vehicle incorporates a phase-locked loop (PLL). FIGS. 28 and 29 show this embodiment, which is an AC biasing system for compensating for (i.e., subtracting) the component of signal that is received at antenna 91 directly from the transmitting antenna 71.

The filtered and amplified signals from the lateral receiving antenna 91 are at terminals 153, 155 of FIGS. 15 and 28. The left-side signal at 153 is input to PLL 313 and subtracted in a summing amplifier 317 from the output (at 325) of the PLL 313, as shown in FIG. 28. The difference is a voltage at terminal 321, whose amplitude is approximately proportional to the vehicle's lateral position. The PLL 313 is shown in more detail in FIG. 29. The output 325 of the PLL 313 is the output of a sinusoidal voltage-controlled oscillator (VCO) 327, which is part of the PLL 313, as made clear by FIG. 29. The right-side signal at terminal 155 is processed by similar circuits.

The VCO 327 produces a signal whose phase is locked to the phase of the input signal 153. This is accomplished by multiplying the output of oscillator 327 (as modified by a gain-control circuit 329, under control of DC voltage at a terminal 337) in a multiplier 339. The output of 339 is a DC signal representative of the phase difference, or phase error, between the output of the VCO 327 and the input signal 153, and is attempted to be driven to zero by the PLL.

This DC signal enters a lowpass filter 341, whose output at 342 is used to control the phase of the VCO 327, (the oscillator's frequency being the time rate of change of its phase). This arrangement provides a final output signal at terminal 325, which is a robust AC signal having the same phase as that of the input signal 153. The circuit of FIG. 29 is block 313 of FIG. 28.

To make this alternative embodiment more refined, the automatic gain control 329 is employed during initialization to set up the amplitude of the output of the VCO 327 to be equal to the signal voltage at the terminal 153 under conditions described below.

The operation of the embodiment shown in FIGS. 28 and 29 is as follows. The phase of the left signal is tracked by the PLL 313 of FIG. 28 (and the phase of the right signal tracked by a corresponding PLL). The PLL 313 provides at its output 325 a signal of pre-adjusted amplitude (which is set upon initialization), and of phase that tracks the phase of the received signal at terminal 155.

Initialization is performed far away from floor wires. The only input signal at that time is that which is induced directly in antenna 91 by a magnetic field produced by the transmitting antenna 71. To initialize the system a switch 331 is closed and a motorized potentiometer 335 (or alternatively an up/down counter and a D/A converter) are adjusted to achieve a DC level at terminal 337 such that the output signal of the PLL 313 is at a certain amplitude. That certain amplitude is the value at which the PLL's output signal 325 is exactly equal to the input signal 155 as determined by the summing amplifier 317.

The switch 331 is then opened. The motorized pot 335 remains in the position in which it was set during initialization. It continues to control the gain of block 329 via terminal 337 so that the amplitude of the output signal at 325 from the PLL 313 remains the same as it was at initialization. If the signal 155 changes in amplitude, the lateral position signal at output 321 changes.

The signal at terminal 321 can be bandpass filtered, fullwave rectified, subtracted from the signal of the right-side receiving antenna, and used for control in the same manner as is shown starting with terminal 155 in the embodiment of FIG. 14.

Alternative Transmitting Antenna Placement

FIG. 30 illustrates an alternative technique for passive loop positioning of a vehicle in a terminal that is equipped with a passive loop. The passive loop 343 in this embodiment is a coil of wire with its ends connected together so as to form a closed loop, and which is flopped over at a point such as point 345 so that it forms a left-hand loop 347 and a right-hand loop 349.

Magnetic fields produced by current in the loop reinforce, i.e., they are additive, in the center leg 350 where two wire segments lie close to each other. The transmitting antenna system comprises two antennas (coils) 351 and 353, on separate cores, which are spaced apart by an amount that places them over the outside legs of the folded loop 343. The coils 351 and 353 are phased so as to reinforce each other in inducing current in the loop 343. The receiving antenna assembly 355 is the same as was described earlier.

Another Embodiment

An alternative embodiment of the terminal-positioning mode of the vehicle navigation and guidance apparatus processes the received signals differently than described above. This alternative embodiment is adequately describable without a separate figure. It has equipment that subtracts the two rectified signals that come from the rectifiers 113, 115 of FIG. 12A. Their difference is a voltage approximately proportional to the lateral position of the vehicle. In this embodiment it is best for the two direct signals from the transmitting antenna assembly 71, which are received by the two receiving coils 95, 97, to be of equal strength. Equality of direct signals is achieved by adjusting the position of the receiving antenna assembly 91 with respect to the transmitting antenna assembly 71.

Automatic Bias-Setting Embodiment

An alternative embodiment provides automatic setting of the biases 129A and 129B of FIG. 12B; such automatic setting is a calibration step for the Proportional Positioning System. Bias setting compensates for an undesired offset of the receiving antenna's signal (see FIG. 7), caused by energy that is directly magnetically coupled from the transmitting antenna 71 to the receiving antenna 91 (i.e-, energy not received via the passive loop 55).

The Proportional Positioning System is a portion of the AGV described elsewhere herein. It includes, as shown on FIG. 4B, the on-board magnetic transmitter 68, the passive loop 55, the lateral-position antenna of block 47, the lateral-channel preamplifier 109, the Passive Lateral Subchannel including terminals 113A and 118, and the A/D converter 135.

The preamplifier 109 is shown again in the more detailed schematic diagram of FIG. 12A, whose circuit is continued on FIG. 12B. FIGS. 12A and 12B, whose output is at terminal 118, depict only a manual bias-setting circuit, 129A and 129B.

In the alternative currently preferred automatic embodiment now to be described (see FIG. 31), the signal at a bias terminal 361 is an automatically controlled zero-to-five-volt bias for offsetting the direct magnetic coupling component from the transmitting antenna 71. The automatic bias-setting circuit as a whole is a closed loop that, during calibration, provides whatever voltage is necessary at terminal 361 to make the voltage at terminal 362 equal zero.

The automatic bias-setting circuit makes precise adjustment of the location of the transmitting antenna unnecessary and enables easy compensation for aging of components, etc. Circuitry of this type is preferably provided for both of the receiving coils 95, 97.

Figure 31:
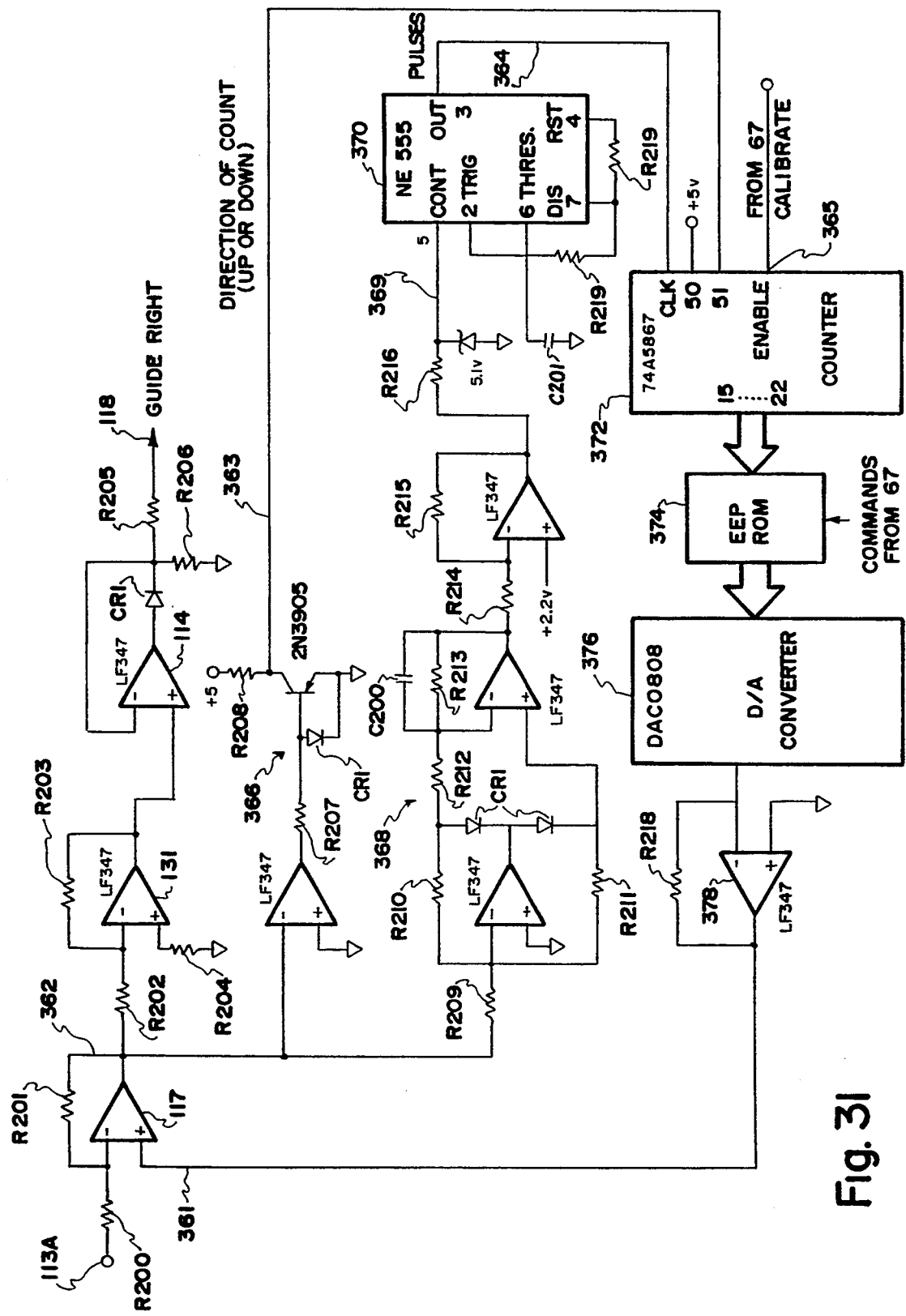
FIG. 31. Circuit diagram reproducing circuits from the top line of FIG. 12B and showing thereto connected circuits for calibration of an automatic offset adjust which compensates for offsets in antenna null measurements.

The components of the automatic circuit and their interconnections are shown in the circuit diagram of FIG. 31. To show how the circuit interfaces with the other AGV circuits, the top line of FIG. 12B is reproduced as the top line of FIG. 31, except with the automatic bias circuit replacing the manual bias circuit 129A.

As seen in FIG. 31, an analog signal at output terminal 362 of amplifier 117 is conducted to a digitizing circuit 366, which consists of an inverting amplifier and a transistor clipping circuit. Circuit 366 produces a logic 1 level at its output terminal 363 if the signal at terminal 362 is positive, and a logic 0 level at terminal 363 if terminal 362 is negative.

Terminal 363 is connected to a counter 372, which also has a clock input terminal 364 for receiving pulses that are to be counted. The direction of counting is determined by the logic level of terminal 363. The count is incremented upon occurrence of a clock pulse if terminal 363 currently has a logic 1, and decremented if terminal 363 has a logic 0. Counter 372 is a model 74AS867, manufactured commercially by the Company of Texas Instruments Inc., Dallas, Tex., 75265.

Another subcircuit 368 performs the function of generating clock pulse signals at a controllable frequency. The absolute-value circuit 368, whose input is at terminal 362, provides an analog voltage at an output terminal 369. The analog voltage at 369 is the magnitude of the signal of terminal 362, so terminal 369 is never negative, irrespective of the polarity of the bipolar signal at terminal 362.

Terminal 369 is connected to a voltage-controlled digital oscillator 370; it produces output pulses at a frequency that depends upon the control voltage at terminal 369. The oscillator 370 provides output pulses at a terminal 364, which are conducted to the clock input terminal of the counter 372. The oscillator 370 is a model NE555, manufactured commercially by Texas Instruments, Inc., Dallas, Tex., 75265.

The count contents of the counter 372 are connected to an EEPROM (Electronically Erasable Programmable Read-Only Memory) 374, which is optional in this circuit. The EEPROM is capable of storing the count when it is commanded to do so by the outer loop microprocessor 67. The output of the EEPROM is connected to a (digital-to-analog) converter 376, which is a model DAC0808, manufactured commercially by National Semiconductor Company of Santa Clara, Calif., 58090.

The analog output of the D/A converter 376 is inverted in an amplifier 378, whose output is connected to the bias terminal 361 of the amplifier 117.

Operation of the circuit is as follows. The calibration process is performed at a time when the vehicle is not over a wire. At such a time antenna 91 is not receiving any component of signal via wires on the ground. To start a calibration (bias setting) the outer loop microprocessor 67 sends a calibrationcommand bit to an "enable" terminal 365 of the counter 372.

If the voltage at terminal 362 is negative, the binary signal at terminal 363 is low, which causes the direction of counting of the counter 372 to be downward. The decreasing count passes through the EEPROM 374 and causes the D/A converter 376 to receive less input current, causing the voltage at the bias terminal 361 to increase. That makes the voltage at terminal 362 less negative, so the 362 voltage moves toward a null.

Conversely, if terminal 362 is positive, the signal at terminal 363 goes high, which causes the counter 372 to count upward, and causes the D/A converter 376 to receive more input current, causing the voltage of terminal 361 to decrease. Thereupon, the voltage at terminal 362 decreases toward zero.

The frequency of pulses at the clock input terminal of the counter 372 depends inversely upon the magnitude of the voltage at terminal 362; a greater magnitude results in a greater frequency of the pulses that are counted by the counter 372. Consequently the offset calibration signal at terminal 361 approaches a final value faster when it has farther to go. It reaches a final value when the voltage at terminal 362 is zero, which reduces the counting rate at terminal 364 to zero. The counter 372 retains its count contents, so the proper bias voltage remains on the bias terminal 361.

If the optional EEPROM 374 is provided, the vehicle need not be calibrated anew every time it is started. After a calibration the EEPROM is commanded by the outer loop microprocessor 67 to read the output of the counter 372 and store the value in its memory. The EEPROM therefore can reproduce the count that was in the counter 372 just before the power was turned off, and if it is still an appropriate value the calibration need not be repeated.

The following table comprises a list of components and component types or values for circuits seen in FIGS. 6, 12A, 12B, 15, 16A, 16B, 17A, 17B, 18, 19, 20, 21, 22, and 31:

| Number | Name | Value or Type |
| --- | --- | --- |
| C3 | Capacitor | .22 μf |
| C6 | Capacitor | .22 μf |
| C9 | Capacitor | .1 μf |
| C9' | Capacitor | .01 μf |
| C10 | Capacitor | 2.2 μf |
| C12 | Capacitor | 1 μf |
| C15 | Capacitor | .27 μf |
| C16 | Capacitor | .22 μf |
| C17' | Capacitor | 1 μf |
| C19 | Capacitor | 10 μf |
| C20 | Capacitor | 10 μf |
| C21 | Capacitor | 10 μf |
| C22 | Capacitor | 10 μf |
| C23 | Capacitor | 10 μf |
| C24 | Capacitor | 10 μf |
| C25 | Capacitor | .847 μf |
| C27 | Capacitor | 10 μf |
| C28 | Capacitor | .047 μf |
| C28' | Capacitor | 8.8 μf |
| C29 | Capacitor | 10 μf |
| C31 | Capacitor | .1 μf |
| C31' | Capacitor | 8.8 μf |
| C32 | Capacitor | 10 μf |
| C34 | Capacitor | .1 μf |
| C35 | Capacitor | .1 μf |
| C38 | Capacitor | 10 μf |
| C38' | Capacitor | 2.2 μf |
| C41 | Capacitor | .22 μf |
| C47 | Capacitor | 2.2 μf |
| C48 | Capacitor | 4700 μf |
| C49 | Capacitor | .022 μf |
| C50 | Capacitor | .1 μf |
| C51 | Capacitor | .0047 μf |
| C52 | Capacitor | .0047 μf |
| C59 | Capacitor | .847 μf |
| C60 | Capacitor | .047 μf |
| C61 | Capacitor | .22 μf |
| C67 | Capacitor | 2.2 μf |
| C68 | Capacitor | 4700 μf |
| C69 | Capacitor | .022 μf |
| C70 | Capacitor | .1 μf |
| C72 | Capacitor | 10 μf |
| CR1 | Diode | 1N4148 |
| CR2 | Diode | 1N4848 |
| CR3 | Diode | 1N5234 |
| CR4 | Diode | 1N5234 |
| CR5 | Diode | 1N4148 |
| CR6 | Diode | 1N4148 |
| CR8 | Diode | 1N4148 |
| CR10 | Diode | 1N4148 |
| CR11 | Diode | 1N5234 |
| CR12 | Diode | 1N5234 |
| CR13 | Diode | 1N4148 |
| CR14 | Diode | 1N4148 |
| CR17 | Diode | 1N4148 |
| CR18 | Diode | 1N4148 |
| CR19 | Diode | 1N4148 |
| CR23 | Diode | 1N4148 |
| CR24 | Diode | 1N4148 |
| CR25 | Diode | 1N4148 |
| CR26 | Diode | 1N4148 |
| CR27 | Diode | 1N4148 |
| CR28 | Diode | 1N4148 |
| CR29 | Diode | 1N4148 |
| CR30 | Diode | 1N4148 |
| CR31 | Diode | 1N4148 |
| CR32 | Diode | 1N4148 |
| U1 | Switches/Gates | LF11202D |
| U11 | | DC383 |

-continued

| Number | Name | Value or Type |
|---|---|---|
| U12 | Switches/Gates | 7402 |
| U13 | Switches/Gates | 7402 |
| U14 | Switches/Gates | LF11202D |
| U17 | Switches/Gates | LF11202D |
| U24 | Swithes/Gates | LF11202D |
| U29 | Switches/Gates | LF11202D |
| U30 | Switches/Gates | 7404 |
| L1 | Inductors | 50 mH |
| L2 | Inductors | 50 mH |
| L3 | Inductors | 50 mH |
| L4 | Inductors | 72.4 mH |
| L7 | Inductors | 72.4 mH |
| L8 | Inductors | 50 mH |
| L9 | Inductors | 50 mH |
| L10 | Inductors | 50 mH |
| L11 | Inductors | 72.4 mH |
| L12 | Inductors | 72.4 mH |
| E1 | Jumpers | |
| E2 | Jumpers | |
| U2 | Oper. Amp. | LF347 |
| U4 | Oper. Amp. | LF347 |
| U5 | Oper. Amp. | LF347 |
| U5' | Oper. Amp. | LM675T |
| U6 | Oper. Amp. | LM675T |
| U8, U8' | Oper. Amp. | LF347 |
| U19 | Oper. Amp. | LF347 |
| U20 | Oper. Amp. | LF347 |
| U23 | Oper. Amp. | LF347 |
| U25 | Oper. Amp. | LF347 |
| U26 | Oper. Amp. | LF347 |
| U28 | Oper. Amp. | LF347 |
| R2 | Resistor | 301 Ohms |
| R3 | Resistor | 3.57 K Ohms |
| R4 | Resistor | 63.4 K Ohms |
| R4' | Resistor | 165 K Ohms |
| R5 | Resistor | 1 K Ohms |
| R5' | Resistor | 15 K Ohms |
| R6 | Resistor | 1.4 K Ohms |
| R6' | Resistor | 1 K Ohms |
| R7 | Resistor | 1 K Ohms |
| R7' | Resistor | 301 Ohms |
| R8 | Resistor | 1 K Ohms |
| R8' | Resistor | 3.57 K Ohms |
| R9 | Resistor | 12.1 K Ohms |
| R9' | Resistor | 80.6 K Ohms |
| R10 | Resistor | 1 K Ohms |
| R10' | Resistor | 165 K Ohms |
| R11 | Resistor | 165 K Ohms |
| R11' | Resistor | 100 K Ohms |
| R12 | Resistor | 10 K Ohms |
| R13 | Resistor | 1.4 K Ohms |
| R13' | Resistor | 10 K Ohms |
| R14 | Resistor | 1 K Ohms |
| R14' | Resistor | 10 K Ohms |
| R15 | Resistor | 1 K Ohms |
| R15' | Resistor | 100 K Ohms |
| R16 | Resistor | 27.4 K Ohms |
| R16' | Resistor | 10 K Ohms |
| R17 | Resistor | 165 K Ohms |
| R18 | Resistor | 1 K Ohms |
| R18' | Resistor | 69.8 K Ohms |
| R18'' | Resistor | 10 K Ohms |
| R19 | Resistor | 10 K Ohms |
| R19' | Resistor | 499 Ohms |
| R20 | Resistor | 1 K Ohms |
| R20' | Resistor | 33.2 K Ohms |
| R21 | Resistor | 38.3 K Ohms |
| R21' | Resistor | 1 M Ohms |
| R22 | Resistor | 80.6 K Ohms |
| R22' | Resistor | 165 K Ohms |
| R23 | Resistor | 1 K Ohms |
| R23' | Resistor | 100 K Ohms |
| R24 | Resistor | 10 K Ohms |
| R24' | Resistor | 100 Ohms |
| R25 | Resistor | 10 K Ohms |
| R25'' | Resistor | 100 Ohms |
| R26 | Resistor | 10 K Ohms |
| R26' | Resistor | 22.1 K Ohms |
| R27 | Resistor | 10 K Ohms |
| R27' | Resistor | 121 Ohms |
| R28 | Resistor | 10 K Ohms |
| R28' | Resistor | 100 Ohms |
| R29 | Resistor | 10 K Ohms |
| R29' | Resistor | 200 K Ohms |
| R30 | Resistor | 10 K Ohms |
| R30' | Resistor | 110 K Ohms |
| R31 | Resistor | 20 K Ohms |
| R31' | Resistor | 51.1 K Ohms |
| R32 | Resistor | 2.74 K Ohms |
| R32' | Resistor | 4.99 K Ohms |
| R33 | Resistor | 1 ½ watt Ohms |
| R33' | Resistor | 8.06 K Ohms |
| R34 | Resistor | 1 Ohms |
| R34' | Resistor | 1 K Ohms |
| R35 | Resistor | 9.1 K Ohms |
| R36 | Resistor | 1.1 K Ohms |
| R37 | Resistor | 110 K Ohms |
| R38 | Resistor | 10 K Ohms |
| R39 | Resistor | 10 K Ohms |
| R40 | Resistor | 1 Ohms |
| R40' | Resistor | 221 K Ohms |
| R41 | Resistor | 127 K Ohms |
| R41' | Resistor | 10 K Ohms |
| R42 | Resistor | 154 K Ohms |
| R42' | Resistor | 10 K Ohms |
| R43 | Resistor | 10 K Ohms |
| R44 | Resistor | 1 K Ohms |
| R45 | Resistor | 10 K Ohms |
| R47 | Resistor | 604 K Ohms |
| R49 | Resistor | 1 K Ohms |
| R50 | Resistor | 10 K Ohms |
| R51 | Resistor | 49.9 K Ohms |
| R52 | Resistor | 10 K Ohms |
| R53 | Resistor | 10 K Ohms |
| R54 | Resistor | 604 K Ohms |
| R55 | Resistor | 49.9 K Ohms |
| R56 | Resistor | 20 K Ohms |
| R57 | Resistor | 1 K Ohms |
| R58 | Resistor | 20 K Ohms |
| R59 | Resistor | 1 K Ohms |
| R60 | Resistor | 100 Ohms |
| R61 | Resistor | 1K |
| R61' | Resistor | 1 K Ohms |
| R62 | Resistor | 137 K Ohms |
| R62' | Resistor | 100 Ohms |
| R63 | Resistor | 15 K Ohms |
| R63' | Resistor | 100 Ohms |
| R64 | Resistor | 1.4 K Ohms |
| R65 | Resistor | 1 K Ohms |
| R66 | Resistor | 1 K Ohms |
| R67 | Resistor | 12.1 K Ohms |
| R68 | Resistor | 137 K Ohms |
| R69 | Resistor | 137 K Ohms |
| R70 | Resistor | 10 K Ohms |
| R71 | Resistor | 1.4 K Ohms |
| R72 | Resistor | 1 K Ohms |
| R73 | Resistor | 1 K Ohms |
| R74 | Resistor | 27.4 K Ohms |
| R75 | Resistor | 137 K Ohms |
| R76 | Resistor | 10 K Ohms |
| R77 | Resistor | 10 K Ohms |
| R78 | Resistor | 1 K Ohms |
| R79 | Resistor | 1 M Ohms |
| R80' | Resistor | 165 K Ohms |
| R81 | Resistor | 100 K Ohms |
| R81' | Resistor | 100 Ohms |
| R82 | Resistor | 10 K Ohms |
| R83 | Resistor | 10 K Ohms |
| R84 | Resistor | 10 K Ohms |
| R85 | Resistor | 10 K Ohms |
| R86 | Resistor | 10 K Ohms |
| R87 | Resistor | 200 K Ohms |
| R88 | Resistor | 10 K Ohms |
| R89 | Resistor | 20 K Ohms |
| R90 | Resistor | 4.99 K Ohms |
| R91 | Resistor | 8.06 K Ohms |
| R92 | Resistor | 1 K Ohms |
| R97 | Resistor | 100 K Ohms |
| R98 | Resistor | 100 K Ohms |
| R107 | Resistor | 845 K Ohms |
| R108 | Resistor | 165 K Ohms |
| R109 | Resistor | 1.4 K Ohms |

-continued

| Number | Name | Value or Type |
|---|---|---|
| R110 | Resistor | 15 K Ohms |
| R111 | Resistor | 13.3 K Ohms |
| R112 | Resistor | 9.9 K Ohms |
| R113 | Resistor | 165 K Ohms |
| R114 | Resistor | 845 K Ohms |
| R115 | Resistor | 4.99 K Ohms |
| R116 | Resistor | 10 K Ohms |
| R117 | Resistor | 10 K Ohms |
| R118 | Resistor | 9.09 K Ohms |
| R119 | Resistor | 4.53 K Ohms |
| R120 | Resistor | 27.4 K Ohms |
| R121 | Resistor | 56.2 K Ohms |
| R122 | Resistor | 22.1 K Ohms |
| R124 | Resistor | 28.7 K Ohms |
| R126 | Resistor | 28.7 K Ohms |
| R127 | Resistor | 8.06 K Ohms |
| R128 | Resistor | 25.5 K Ohms |
| R129 | Resistor | 23.2 K Ohms |
| R133 | Resistor | 25.5 K Ohms |
| R134 | Resistor | 8.06 K Ohms |
| R136 | Resistor | 100 K Ohms |
| R137 | Resistor | 49.9 K Ohms |
| R138 | Resistor | 49.9 K Ohms |
| R139 | Resistor | 100 K Ohms |
| R141 | Resistor | 10 K Ohms |
| R142 | Resistor | 10 K Ohms |
| R143 | Resistor | 10 K Ohms |
| R144 | Resistor | 10 K Ohms |
| R145 | Resistor | 100 Ohms |
| R146 | Resistor | 100 Ohms |
| R147 | Resistor | 10 K Ohms |
| R148 | Resistor | 10 K Ohms |
| R149 | Resistor | 1 K Ohms |
| R150 | Resistor | 10 K Ohms |
| R151 | Resistor | 10 K Ohms |
| R152 | Resistor | 100 Ohms |
| R153' | Resistor | 1 K Ohms |
| R154 | Resistor | 35.7 K Ohms |
| R155 | Resistor | 35.7 K Ohms |
| R156 | Resistor | 1.21 K Ohms |
| R157 | Resistor | 15 K Ohms |
| R158 | Resistor | 15 K Ohms |
| R159 | Resistor | 47.5 K Ohms |
| R160 | Resistor | 82.5 K Ohms |
| R161 | Resistor | 845 K Ohms |
| R162 | Resistor | 165 K Ohms |
| R163 | Resistor | 1.4 K Ohms |
| R167 | Resistor | 165 K Ohms |
| R168 | Resistor | 845 K Ohms |
| R164 | Resistor | 15 K Ohms |
| R165 | Resistor | 13.3 K Ohms |
| R166 | Resistor | 49.9 K Ohms |
| R169 | Resistor | 4.99 K Ohms |
| R170 | Resistor | 10 K Ohms |
| R171 | Resistor | 10 K Ohms |
| R172 | Resistor | 9.09 K Ohms |
| R173 | Resistor | 4.53 K Ohms |
| R174 | Resistor | 10 K Ohms |
| R175 | Resistor | 10 K Ohms |
| R176 | Resistor | 27.4 K Ohms |
| R177 | Resistor | 56.2 K Ohms |
| R178 | Resistor | 22.1 K Ohms |
| R180 | Resistor | 47.5 K Ohms |
| R181 | Resistor | 47.5 K Ohms |
| R182 | Resistor | 3.32 K Ohms |
| R183 | Resistor | 10 K Ohms |
| R183' | Resistor | 27.4 K Ohms |
| R184 | Resistor | 100 K Ohms |
| R185 | Resistor | 100 K Ohms |
| R187 | Resistor | 10 K Ohms |
| R189 | Resistor | 10 K Ohms |
| R190 | Resistor | 150 K Ohms |
| R191 | Resistor | 10 K Ohms |
| R192 | Resistor | 1 K Ohms |
| R200 | Resistor | 10 K Ohms |
| R201 | Resistor | 10 K Ohms |
| R202 | Resistor | 1 K Ohms |
| R203 | Resistor | 20 K Ohms |
| R204 | Resistor | 1 K Ohms |
| R205 | Resistor | 100 Ohms |
| R206 | Resistor | 2 K Ohms |
| R207 | Resistor | 2 K Ohms |
| R208 | Resistor | 2 K Ohms |
| R209 | Resistor | 10 K Ohms |
| R210 | Resistor | 10 K Ohms |
| R211 | Resistor | 10 K Ohms |
| R212 | Resistor | 10 K Ohms |
| R213 | Resistor | 100 K Ohms |
| R214 | Resistor | 10 K Ohms |
| R215 | Resistor | 10 K Ohms |
| R216 | Resistor | 1 K Ohms |
| R217 | Resistor | 3.3 K Ohms |
| R218 | Resistor | 10 K Ohms |
| R219 | Resistor | 3.3 KR Ohms |
| Q1 | Transistor | 2N2222 |
| Q2 | Transistor | 2N2222 |
| Q3 | Transistor | 2N2222 |
| Q4 | Transistor | 2N2222 |
| Q5 | Transistor | 2N2222 |

Vehicle Navigation and Guidance

As earlier disclosed, vehicle 2A comprises a plurality of navigation and guidance systems. Under control of AGVC 13, vehicle 2A selectively guides over guidewire routes 3, in terminals 11, and along a ground marked route 5, performing autonomous or self-contained guidance between ground markers 6. Guidance along a guidewire is known in the art and will not be further covered herein.

Autonomous or Self-Contained Guidance

In the currently preferred embodiment, each vehicle 2A uses feedback from a linear encoder 58 from each wheel for autonomous or self-contained guidance. Aperiodic measurement of position and direction from update markers 6 and the angular rate sensor system (commonly called gyro 500) provide sufficient redundancy of measurement to correct positional and directional errors and allow the allocation and application of real time calibrations to correct for angular rate sensor drift, temperature changes, aging and wear of linear measurement components, and the like. In the currently preferred embodiment, the inertial guidance system provides a vehicle guidance accuracy of an error having a standard deviation of 2 inches over travel of fifty feet between ground markers 6. While such accuracy is not sufficiently accurate for travel within a terminal, it adequate for travel on the floor of a facility. As described earlier, terminal positioning guidance of the currently preferred embodiment provides a maximum error of $\pm\frac{1}{4}$ inch.

Figure 56:
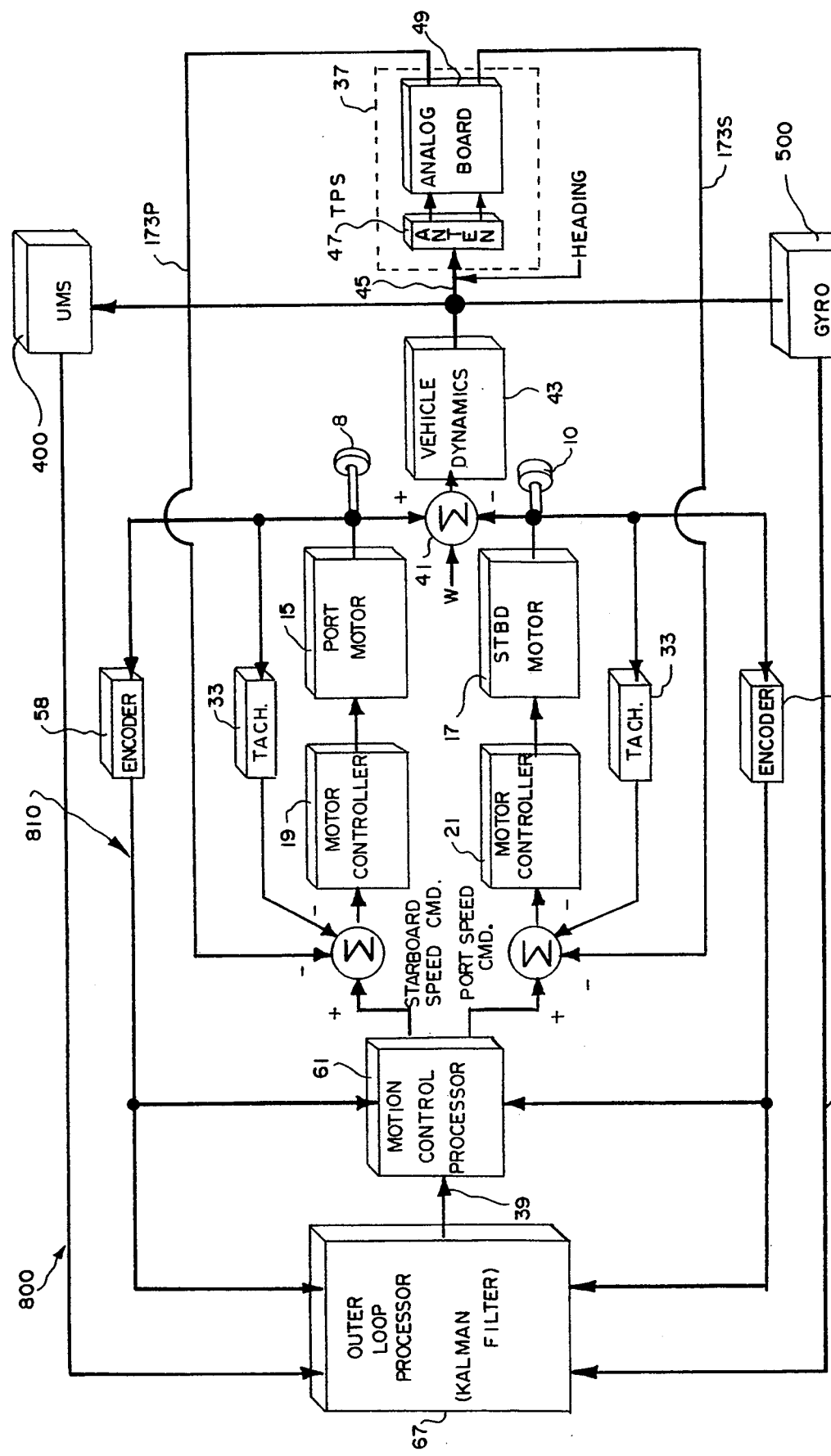
FIG. 56 is a block diagram of a vehicle navigation and guidance system showing relationships between outer and innerloop (motion control processor) control elements.

A block diagram of navigation and guidance system 800 is seen in FIG. 56. Note that the contents of FIG. 56 comprise all of the elements of FIG. 4A plus an outer loop comprising an update marker system (UMS) block 400, an angular rate sensor block (gyro block 500), and an outer loop processor block 67. The outer loop may be considered to comprise the navigational system while the inner loop (that which resides inside the outer loop) may be considered to comprise the guidance system.

Thus, the components of the outer loop are used to aperiodically provide measurement of position and direction as vehicle 2A travels across a marker 6 and reads direction from gyro 500 to provide updates from time to time. After readings are taken from blocks 400 and 500, a Kalman filter calculation is made whereby the navigation and guidance position and direction are updated and real time calibrations are made. Kalman calculations and calibrations are described in detail hereafter.

The Inertial Platform

Figure 57:
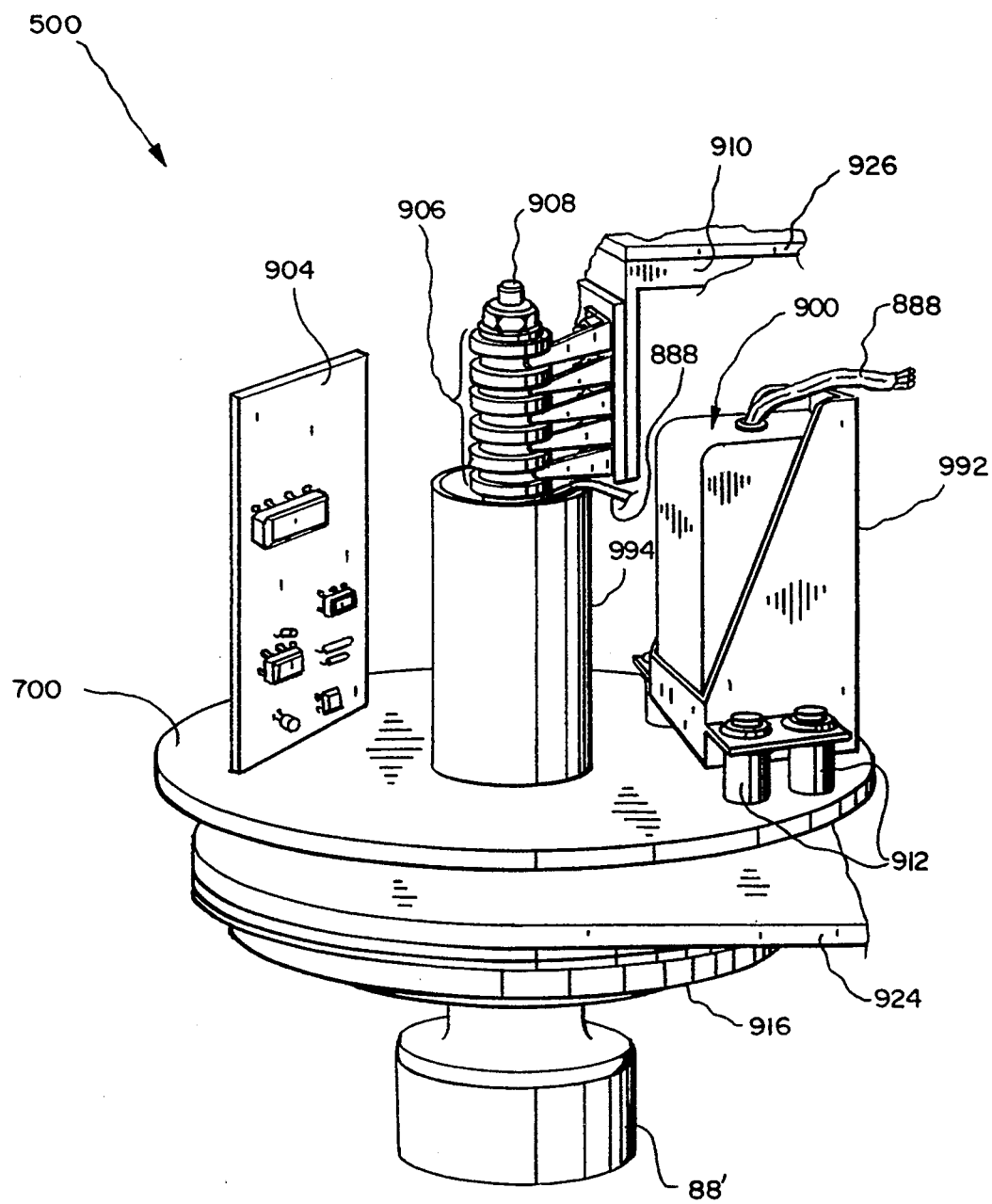
FIG. 57 is a simplified perspective of an inertial platform for the vehicle.

The inertial platform provides a source of angular measurements which are used in combination with estimates of vehicle 2A position from a ground marker 6 to update the AGV 2A control system. In combination, the ground marker and angular measurements need to provide sufficient precision and accuracy to maintain an acceptable guidepath error between each update. In the currently preferred embodiment, the acceptable guidepath error has a standard deviation of 2 inches in fifty feet of travel between ground markers 6. It is of primary importance that the combination of angular updates, inputs from the wheel encoders 58, and ground marker 6 position determinations, made successively, provide sufficient redundancy of vehicle 2A position and heading information that the errors due to deficiencies of the measuring devices comprising changes due to aging, wear, drift, and temperature, are correctable by real time calibration using Kalman filtering. Reference is made to FIG. 57 wherein the major elements of an inertial platform (commonly referred to as gyro 500) are seen. The major elements of gyro 500 comprise a printed circuit board 904 which contains gyro 500 control loop circuits, the angular rate sensor 900, the inertial table 700 comprising a motor 916 which continuously drives the angular displacement of angular rate sensor 900 to a null position, an angular rate to electrical signal encoder 58, and a slip ring assembly 906 and are centrally mounted in well 26 of vehicle 2A.

A package 901 (see FIG. 61) comprising heaters and insulators completely encompass angular rate sensor 900 and is affixed to support 992 which is shock mounted to inertial table 700 with stand-offs 912. On the opposite side of inertial table 700, printed circuit board 904 is firmly affixed in vertical orientation. A shaft is centrally disposed through and connected to moving parts of the gyro 500 comprising slip ring assembly 906, a hub 994 which firmly supports inertial table 700, a motor rotor 922 (seen in FIG. 60), and the moving parts of encoder 88'. Wires and other parts, such as circuit component details and power supply parts are not shown for clarity of presentation.

Electrical signals are transferred from the moving parts of inertial table 700 to non-moving parts through slip ring assembly 906. Of the five slip ring connections seen in slip ring assembly 906, four are used in the currently preferred embodiment. Non-moving parts of slip ring assembly 906 are supported by a nylon bracket 910 attached to an upper housing member 926, only partially seen in FIG. 57. Support for the inertial table is provided by mounting bracket 924, better seen in FIG. 60.

Figure 63:
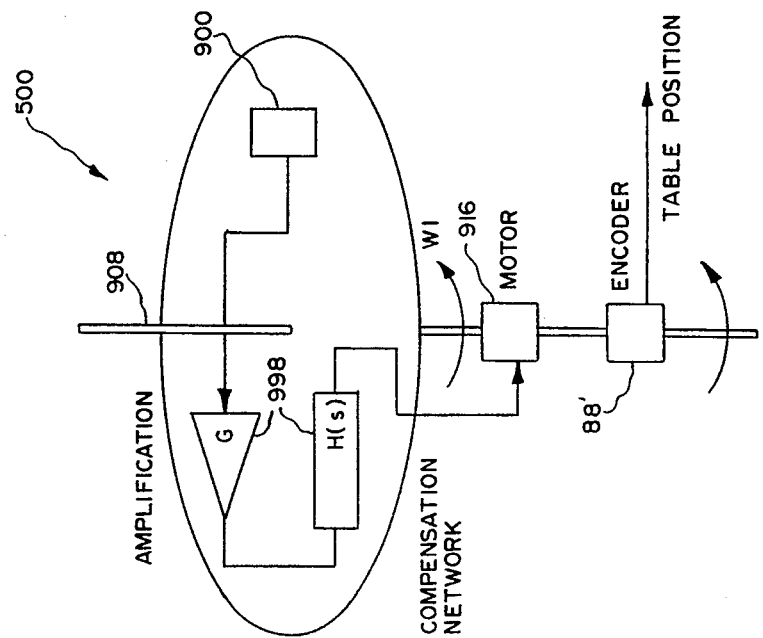
FIG. 63 is a block diagram of the inertial platform which is part of the stabilization and control loop.

A block diagram of the gyro 500 is seen in FIG. 63. A signal comprising the rate of angular change is sent to a network of amplification and compensation circuits 998 wherefrom feedback current to drive motor 916 is provided. Motor 916 is driven to maintain angular rate sensor 900 in a null direction. The angular travel of motor 916 is sensed by encoder 88' wherefrom a signal is provided to outerloop processor 67 for Kalman filtering and other processing.

Selection and processing the output of an angular rate sensor for an AGV vehicle is not trivial. All angular rate sensors drift or diverge as a function of time. As an example, navigation angular sensor drift rates are commonly in the range of 0.01 degrees/hour, submarine angular sensor drift rates are commonly more restrictive, in the range of 0.001 degrees/hour, while angular sensors may have as high a drift rate as 100 to 1,000 degrees/hour. The cost of an angular rate sensor normally increases significantly with decreases in rate of drift. The cost for very low drift rate angular rate sensors can be as much as the cost of an entire AGV 2A.

In addition, the angular rate sensor for an AGV 2A must have a rapid warm-up or response time. Some angular rate sensors, such as gas gyros, require up to one-half hour for warm-up. Maintenance of conventional angular sensors is also a concern. The common mean-time-between-servicing is commonly under 5000 hours for conventional angular sensors.

From a cost and maintenance perspective, the angular rate sensor selected for the currently preferred embodiment is suitable to the requirements of the invention. While other angular rate sensors can be used in the invention, the selected sensor is from a family of rate sensors (ARS-C121, ARS-C131, and ARS-C141) provided by Watson Industries, Inc., 3041 Melby Road, Eau Claire, Wis., 54701. Each of the family of rate sensors mentioned above provide full scale outputs at 30, 100, and 300 degrees/second, respectively. Model ARS-C121 is the selected product for the currently preferred embodiment of angular rate sensor 900 because it provides the greatest sensitivity over the range required. Use of the selected rate sensor requires the concurrent implementation of the inertial table 700 to eliminate the possibility of saturating measuring components.

The selected angular rate sensor 900 is an entirely solid state, "tuning fork", single axis sensor and utilizes piezoelectric vibrating beam technology to produce an inertial sensor with no moving parts. It provides an analog output voltage which is proportional to the angular rate about its sensing axis. At zero angular rate, the output is zero volts. Full scale angular rates produce an output of $+10$ or $-10$ volts, dependent upon direction of rotation. A dual power supply, providing regulated $+15$ and $-15$ volts, is required.

The selected angular rate sensor 900 has a drift rate which, if left uncorrected, would make sensor 900 unusable in the AGV 2A application. Surprisingly, however, use of redundant measurement and processing using a Kalman filter to periodically correct for and recalibrate the drift rate of selected angular rate sensor 900 provides a low cost, effective angular rate sensor for the AGV 2A application.

A feedback control loop modeling operation of gyro 500 is seen in FIG. 58. Physical angular movement of AGV 2A provides positive input $\omega_v$ to summing block 968. Output from summing block 968 is error signal $\omega_e$ which provides input to function 970. Function 970, $G_g(s)$, provides a transfer function approximated by $K_g/(1+s\tau_g)$, wherein $K_g$ is equal to a gain of approximately 19 volts/radian/second in the currently preferred embodiment. The term $(1+s\tau_g)$ provides a low pass filter with a break frequency of $1/\tau_g$ equal to 300 radians/second.

Output of function 970 is a voltage signal, $V_S$ providing input to function 972. Function 972, H(s), converts $V_S$ to a current for input to summer 974. Output from summer 974 is function 978, $K_d$, which models driving amplifiers for pancake motor 9]6. The output of function 978 is provided to summer 980 wherein the physical properties of motor 916 are summed with the driving output of function 978. The drive properties of motor 916 are modeled by function 982 as 1/R+sL (R and L being the resistive and inductive properties of motor 916). The output of function 982, representing motor current, is fedback to function 976 which provides a gain control based upon sensed motor current to summer 974, whereby a better model for control of inertial guidance loop poles and zeroes is provided. The output of function 982 is further provided as input to function 984, which represents motor torque. Output of function 984 is directed to summing junction 985 which also receives a negative input $T_d$ representing torque disturbances comprising stiction. Output of summer 985 is connected to function 986 wherein the inertial responses of motor 916 and inertial table 700 are modeled providing an output representing angular velocity of motor 916. In the motor 916 selected for use in the currently preferred embodiment, motor inertia is negligible.

The output of function 986 is fedback through gain $K_e$ to summer 980. In addition output of function 986 ($\omega\tau$) feeds back to summer 968, providing angular table error rate $\omega_e$. Further, output of function 986 is detected by an encoder 88' (see FIG. 63) and fed to a direction and integration circuit 90 which provides input to outerloop processor 67, as seen in FIG. 56.

Figure 59B:
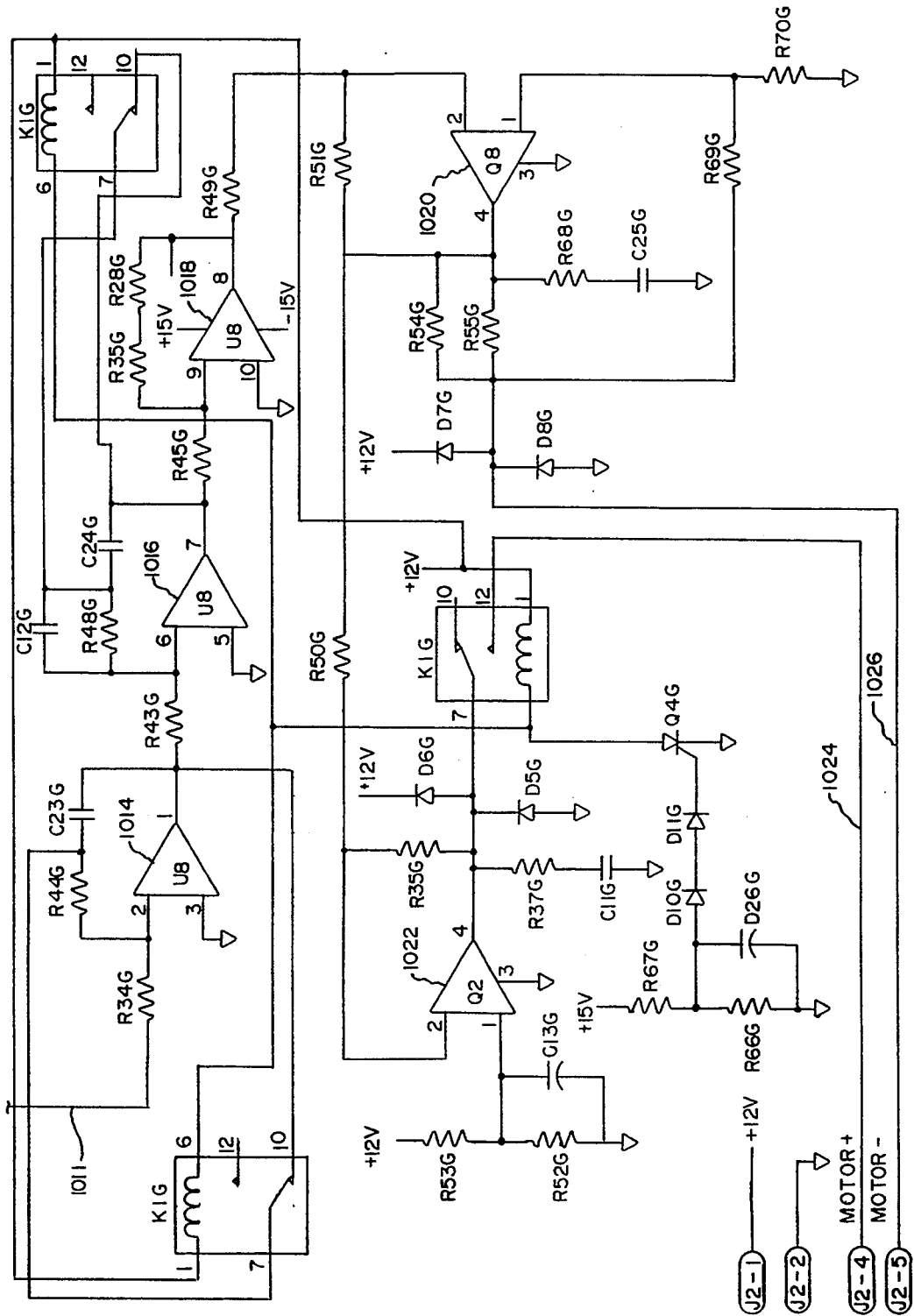

The circuits providing angular sensing and feedback control for inertial stabilization loop 996 are seen in FIG. 59. The output of angular rate sensor 900 is provided to amplifier filter 1012. From amplifier filter 1012, the compensated signal is resistively coupled to two serially connected differential amplifiers 1014 and 1016 which provide serially integrated filtering of the signal from amplifier filter 1012. The output of amplifier 1016, is resistively coupled to an inverting amplifier 1018 which comprises variable resistor R28G in the currently preferred embodiment by which a control voltage gain is provided. The output of inverting amplifier 1018 is resistively coupled to the inverting input of differential amplifier ]020 and therefrom resistively coupled to the inverting input of differential amplifier 1022 whereby differential drive is provided for motor 9! 6 on lines 1024 and 1026. Three switches K1G prevent output from amplifier 1022, and short integrating capacitors C23G and C24G only when the circuit supply voltage is not available, thereby providing an additional degree of control and a delay after the analog fifteen volt supply is available, thereby providing delay which prevents instabilities which would occur when the motor is driven before the control circuits are operating in a normal fashion.

Types and values of components seen in FIG. 59 are provided in the following table:

| Number | Name | Value or Type |
|---|---|---|
| R18K | Resistor | 2 M |
| R19G | Resistor | 3.18 K |
| R22G | Resistor | 10 K |
| R23G | Resistor | 10 K |
| R25G | Resistor | 200 K |
| R26G | Resistor | 1000 K |
| R27G | Resistor | 227 K |
| R28G | Resistor | 6.81 K |
| R34G | Resistor | 227 K |
| R35G | Resistor | 100 K |
| R36G | Resistor | 150 K |
| R37G | Resistor | 1 |
| R43G | Resistor | 227 K |

-continued

| Number | Name | Value or Type |
|---|---|---|
| R44G | Resistor | 100 K |
| R45G | Resistor | 51 K |
| R48G | Resistor | 100 K |
| R49G | Resistor | 150 K |
| R50G | Resistor | 150 K |
| R51G | Resistor | 51 K |
| R52G | Resistor | 150 K |
| R53G | Resistor | 150 K |
| R54G | Resistor | 1 ½ W |
| R55G | Resistor | 1 ½ W |
| R67G | Resistor | 47 K |
| R66G | Resistor | 16 K |
| R68G | Resistor | 1 |
| R69G | Resistor | 51 K |
| R70G | Resistor | 150 K |
| C10G | Capacitor | .47 μF |
| C11G | Capacitor | .22 μF |
| C12G | Capacitor | .01 μF |
| C13G | Capacitor | 15 μF |
| C14G | Capacitor | 10 μF |
| C23G | Capacitor | 1 μF |
| C24G | Capacitor | 10 μF |
| C25G | Capacitor | .22 μF |
| C26G | Capacitor | 100 μF |
| 1012 | Diff. Amp. | LF347 |
| 1014 | Diff. Amp. | LF347 |
| 1016 | Diff. Amp. | LF347 |
| 1018 | Diff. Amp. | LF347 |
| 1020 | Diff. Amp. | ULN-3751ZV |
| 1022 | Diff. Amp. | ULN-3751ZV |
| D3G | Diode | 1N4148 |
| D4G | Diode | 1N4148 |
| D7G | Diode | 1N4004 |
| D8G | Diode | 1N4004 |
| D10G | Diode | 1N5243B |
| D11G | Diode | 1N414B |
| Q4G | Diode | MCR100-6 |
| K1G | Relay Switch | DS1E-S-DC12V |

Figure 60:
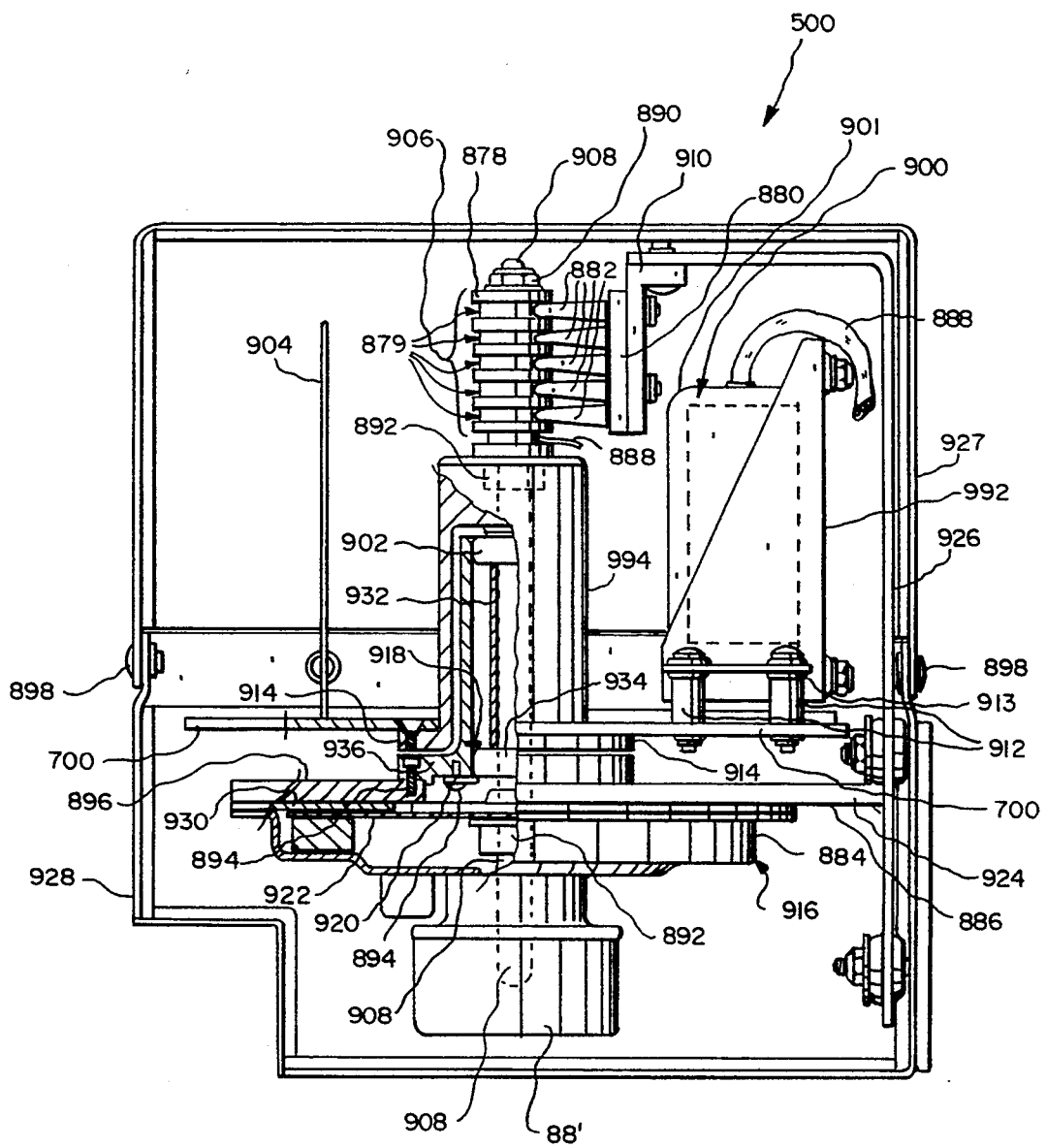
FIG. 60 is an assembly drawing of the inertial platform with parts cut away for clarity of presentation.

A more detailed view of gyro 500 is seen in FIG. 60. As seen therein, gyro 500 comprises a housing comprising an upper part 926 and a lower part 928. When finally assembled the upper part 926 and lower part 928 are releasibly attached together by nut and bolt assemblies 898. Mounting bracket 924 is firmly attached to lower housing part 928. To the upper side 896 of mounting plate 924 a bearing housing 936 is firmly affixed by screws 894, or the like. Attached to the inner bottom side of bearing housing 936 a washer-shaped bearing retainer ring 920 is firmly attached by other screws 894. A bearing 934 tightly constrained between bearing retainer 920 and a snap ring 918 is placed at the bottom of the inverted well provided by bearing housing 936. At the top of the inverted well of bearing housing 936 a second bearing 902 is held in vertical position by a spacer 932. Shaft 908 is held in strict vertical alignment by bearings 934 and 902. Spacer 932 separates bearings 934 and 902 by sufficient distance that any shaft 908 wobble due to any freedom of movement in the bearing is negligible.

Shaft 908 centrally connects the inner portion of slip ring assembly 906 to the moving parts of gyro 500 and therewith affixed by a capping nut and washer 890. Immediately below slip ring assembly 906, shaft 908 is affixed to hub 994 which comprises an outwardly projecting hub platform support 914, upon which inertial table 700 is securely affixed. As well, shaft 908 is connected to a motor rotor 922 by a locknut 892. Finally, the bottom of shaft 908 is connected to an angular rate decoding transducer 88'.

As mentioned earlier, printed circuit board 904 is mounted vertically on inertial table 700. Angular rate sensor 900 support 992 is affixed to inertial table 700 by standoff assemblies 912 which interface with support 992 through shock-absorbing gromets 9]3. Rate sensor 900 is firmly affixed to support 992. Interconnecting wires 888 are only seen in part extending from angular rate sensor 900 and slip ring assembly 906. A large mass of wires has been removed from FIG. 60 for clarity of presentation. Motor 916 is a pancake motor firmly mounted on the bottom side 886 of mounting bracket 924. The housing for motor 916 comprises an arcuately shaped concave bottom section 884 and an open centered, washer shaped top section 930. The top section 930 is a flux return plate which resides above motor 916 rotor 922. Motor 916 is a 12 FP kit motor, part number 00-01281-001, acquired from PMI Motors, Division of Kollmorgan Corporation, 5 Aerial Way, Syoset, New York, N.Y. 11791.

The central portion of bottom section 884 is modified such that an end bell on motor 916 provides an encoder 88' housing mounting connection.

Each spring loaded finger 882 of slip ring assembly 906 is affixed to a mounting plate 880 such that the end of each finger 882 comprises a spring bias causing each finger to ride connectively and continuously in a contact containing groove 879 of the moving portion of slip ring assembly 906. The other end of each finger is firmly affixed to mounting plate 880 which is releasibly affixed to the upper housing member 926 by mounting plate 910.

Figure 61:
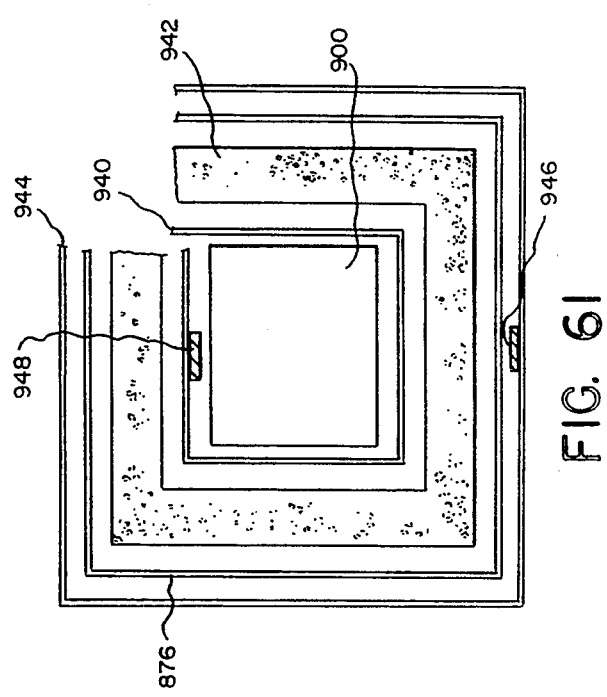
FIG. 61 is a simplified model of the heating system of the angular rate sensing element of the inertial platform.

For accurate operation of angular rate sensor 900, controlled temperature must be provided. The controlled temperature range for selected sensor 900 is between 55° and 65° Centigrade. As mentioned earlier, it is also important that warm-up time be short. To accomplish a short warm-up time, a novel two heater combination is used. As seen in FIG. 61, a multilayer heating/insulating blanket (not shown in prior Figures) surrounds angular rate sensor 900. The multilayer cover comprises, from inside out, a first heater unit 940, a vinyl foam insulating layer 942, a metal foil insulating layer 876, and a second heating layer 944. The insulating layer 942 is adhesively applied to the first heater unit 940 with insulating tape. A Kapton tape, by Dupont is used in the currently preferred embodiment. Metal foil comprising a PSA face, placed inward, available from IEPD, Saint Paul, Minn. is used in the currently preferred embodiment for metal foil insulating layer 876.

First heating unit 940 is controlled by a temperature control circuit which is well known in the art by feedback from a temperature sensor 948, located internal to heating unit 940 as seen in FIG. 61. Heating unit 944 is controlled by a similar temperature control circuit by feedback from a temperature sensor 946 located internal to heating unit 944. The internal heating unit 940 is designed to have a fast heating response time to bring angular rate sensor 900 to temperature quickly. The second heating element 944 comprises a greater thermal inertia and is provided to maintain angular rate sensor 900 at temperature over the entire operating period after initial heating by first heating unit 940.

Figure 62:
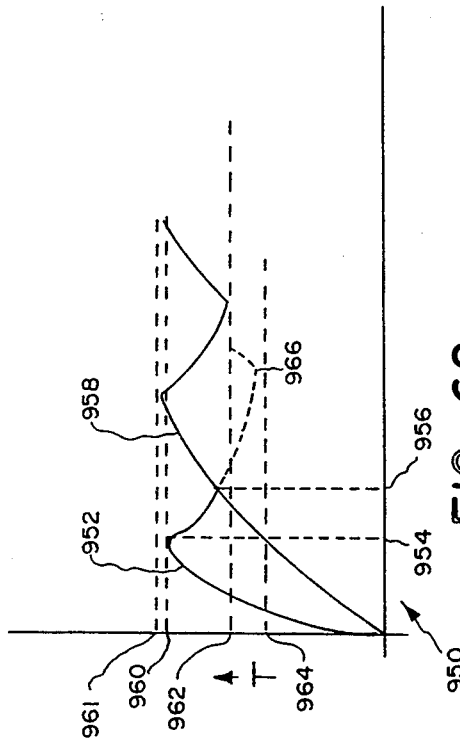
FIG. 62 is a plot showing curves from sensors used in the feedback loop in the angular rate sensing element of the inertial platform.

Reference is now made to FIG. 62 wherein the temperature control curves for the circuits of sensor 946 and 948 are seen. A first curve 952 shows a temperature response upon turn-on of sensor 948, showing a rapid rise to a cut-off threshold 960 at time 954 at which temperature heater unit 940 is turned off and temperature curve 952 decays toward a cooler temperature threshold 964 at which heater unit 940 would be turned back on. However, as seen by following temperature curve 958, before the temperature measured by sensor 948 falls to threshold 964, second heater unit 944 drives the temperature sensor 948 upward above threshold 964 whereupon curve begins to follow the temperature path of curve 958 at crossover time 956. Second heater 944 control circuits are set to control turn-on and turn-off of second heater at thresholds 961 and 962, respectively. Because the temperature at sensor 948 is not allowed to fall below threshold 962 or to threshold 964, first heater remains in a non-operative state after time 954.

The Fifth and Sixth Wheels (57, 59) and Encoder 58

Figure 43:
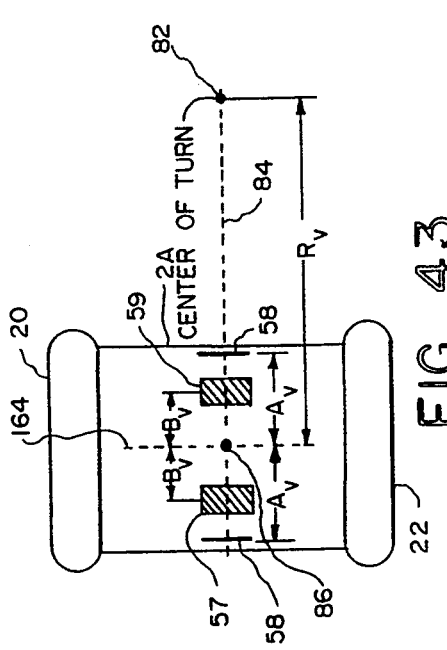
FIG. 43 is a simplified top view of the vehicle showing relative positions of wheels and travel measuring encoders.

As seen in FIG. 43, AGV 2A comprises a port fifth wheel 57 and starboard sixth wheel 59. An encoder 58 for each wheel 57, 59 is attached to vehicle 2A in a position to measure individual travel of wheels. However, in the currently preferred embodiment, encoder 58 distances are different than fifth and sixth wheel distances from the center 86 of the AGV 2A and any given center of a turn 82 and must be considered in vehicle control calculations by motion control processor 61. The following discloses such considerations and equations necessary to provide corrections for such differences.

The following defines terms used in equations which calculate ratios necessary to control a turn of AGV 2A:
C = a constant
$R_v$ = radius 84 of turn of the vehicle as the distance between turn center 82 and vehicle center 86
$A_v$ = center 86 to encoder 58 distance
$B_v$ = center 86 to wheel (57 or 59) distance
$r_e$ = ratio calculated using encoder 58 dimensions
$r_w$ = ratio calculated using drive wheel dimensions
$W_r$ = error due to differences in encoder 58 and wheel 57, 59 dimensions through a move (±sign of $w_r$ signifies direction of turn)

The ratio of the turn in encoder dimensions is $$r_e = \frac{C - abs(W_r)}{C + abs(W_r)} = \frac{(R_v - A_v)}{(R_v + A_v)}$$

Solving for $R_v$ yields, $$R_v = A_v \left[ \frac{1 + r_e}{1 - r_e} \right]$$

Thus, $$r_w = \frac{R_v - B_v}{R_v + B_v}$$

which is the actual control ratio used to power wheel drives 8, 10.

Figure 45:
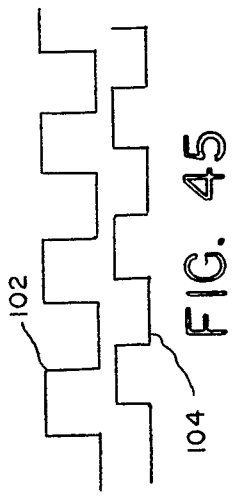
FIG. 45 is a graphical drawing of internally produced waveforms of a travel measuring encoder.
Figure 44:
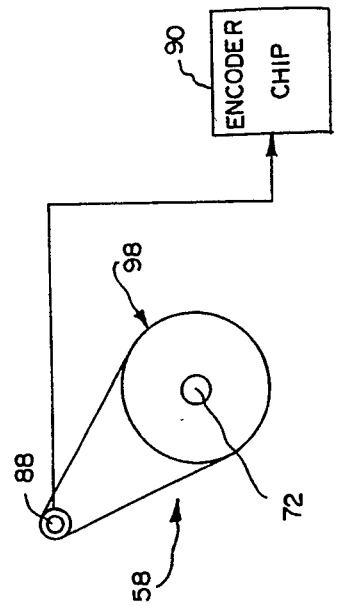
FIG. 44 is a simplified block diagram representation of a wheel travel measuring encoder.
Figure 47:
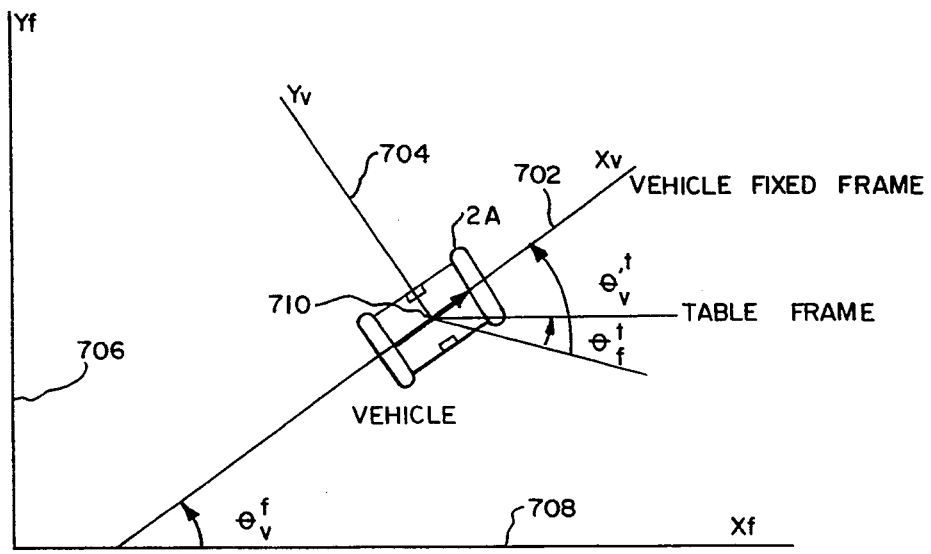
FIG. 47 is a top view of the vehicle in a factory frame showing factory frame to vehicle fixed frame and inertial table relationships.
Figure 48:
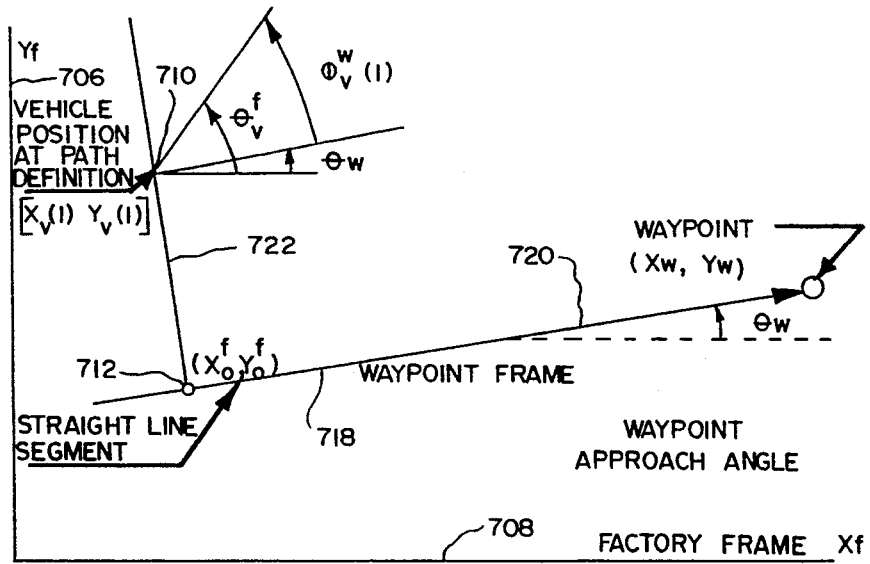
FIG. 48 is a graph showing relative geometry between the factory frame and a waypoint frame.
Figure 49:
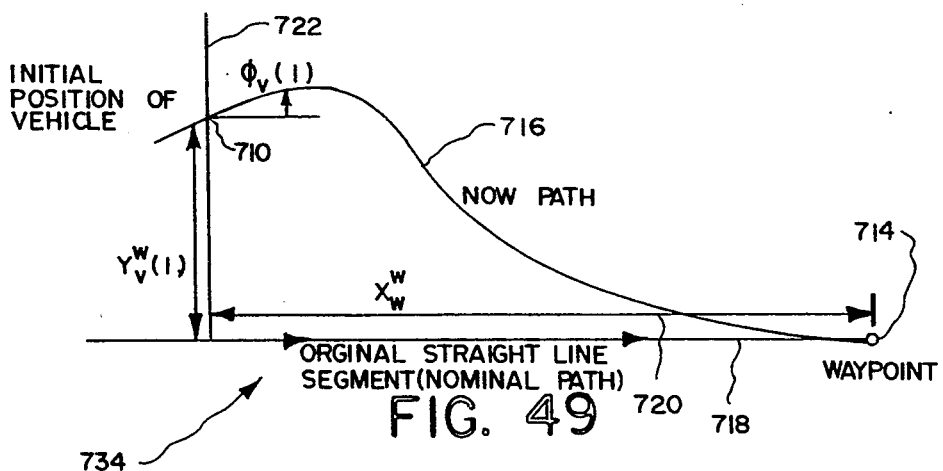
FIG. 49 is a graph showing geometry of a calculated path from a current vehicle position (and direction) to a next waypoint and direction of travel along the abscissa of the graph.
Figure 50:
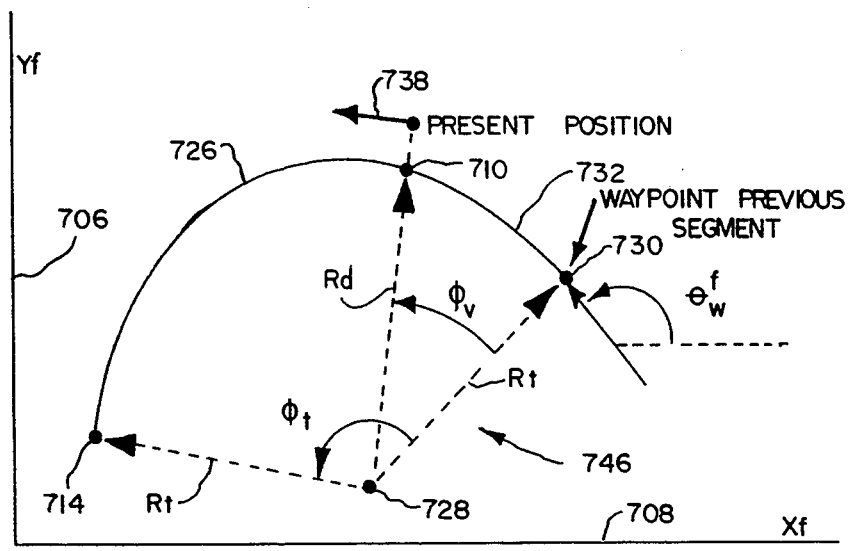
FIG. 50 is a graph showing geometry of a travel segment from a present vehicle position to a waypoint involving circular travel.
Figure 51:
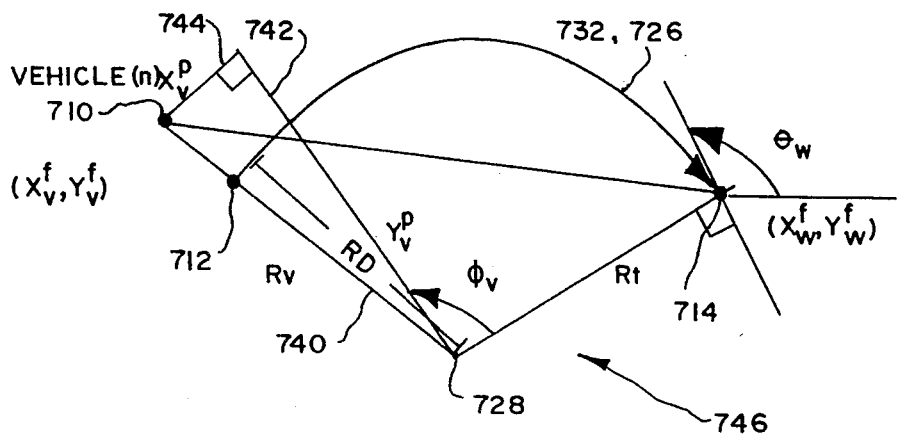
FIG. 51 is a graph showing geometry of circular travel of a vehicle in a vehicle frame to a waypoint in a waypoint frame.
Figure 52:
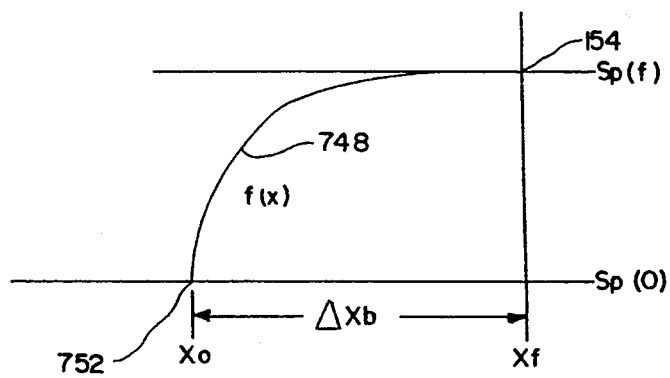
FIG. 52 is a graph showing a relationship between length of travel and a speed setpoint, from which a calculation is made to change the speed of a vehicle as a function of a length of travel.

As seen in FIG. 44, encoder 58 comprises a wheel 98 attached to a spring loaded AGV 2A axle 72 which retains firm but constant wheel 98 contact with the ground independent of AGV 2A load. Encoder 58 also comprises an encoding transducer 88 which provides an electrical measurement of travel and at least one semiconductor encoder chip 90 which receives encoder 58 output, accumulates a count related to travel distance and direction, and provides output bus communicating lines to a computer processor. The output of encoding transducer 88 comprises two waveforms, a phase a signal 102 and a phase b signal 104, as seen in FIG. 45. Signals 102 and 104 are square waves whose phase relationship changes based upon direction of travel. An encoder chip 90, receiving signals 102 and 104, increments (or decrements) a counter dependent upon rate and direction of travel.

Figure 46:
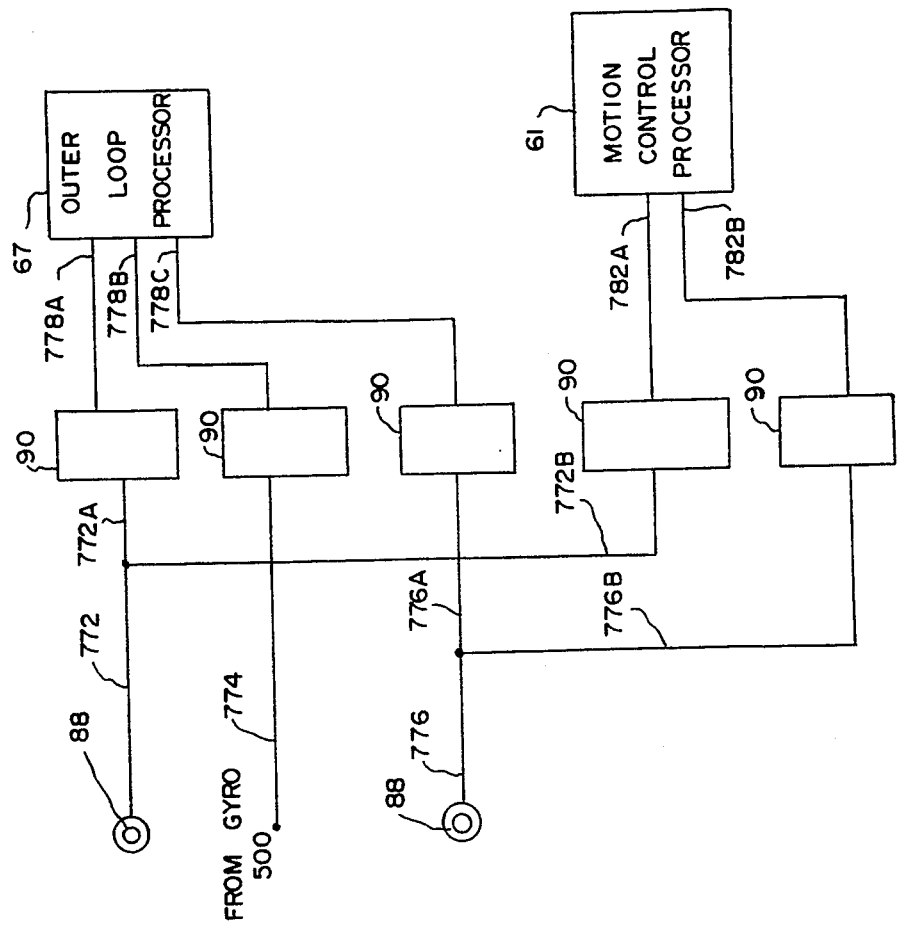
FIG. 46 is a simplified block diagram showing interconnections between wheel travel encoders and outer-loop motion control processors.

A simplified block diagram of the connection between wheel 57, 59 encoders 58 and the outerloop processor 67 and the innerloop processor (motion control processor 61) is seen in FIG. 46. As seen therein, the encoding transducer 88 is connected to two encoder chips 90. Encoding transducer 88 is thereby connected through lines 772 and lines 772A to a chip 90 which connects through lines 778A to outerloop processor 67. Similarly, bottom encoding transducer 88 is also connected through lines 776 and lines 776A to a chip 90 which connects through lines 778C to outerloop processor 67. In addition, the angular output of gyro 500, as described herein, is connected through lines 774 to a chip 90 and therefrom through lines 778B to outerloop processor 67. Thereby, all of the measurements from wheels 57 and 59 and gyro 500 are made available to outerloop processor 67.

Further, a connection is made from lines 772 through path 772B to a chip 90 and therefrom through lines 782A to motion control processor 61. As well, a connection is made from lines 776 through path 776B to a chip 90 and therefrom through lines 782B to motion control processor 61. These provide the inputs required for innerloop processing.

As seen in FIG. 44, encoder 58 comprises a wheel 98 attached to a spring loaded AGV 2A axle 72 which retains firm but constant wheel 98 contact with the ground independent of AGV 2A load. Encoder 58 also comprises an encoding transducer 88 which provides an electrical measurement of travel and at least one semiconductor encoder chip 90 which receives encoder 58 output, accumulates a count related to travel distance and direction, and provides output bus communicating lines to a computer processor. The output of encoding transducer 88 comprises two waveforms, a phase a signal 102 and a phase b signal 104, as seen in FIG. 45. Signals 102 and 104 are square waves whose phase relationship changes based upon direction of travel. An encoder chip 90, receiving signals 102 and 104, increments (or decrements) a counter dependent upon rate and direction of travel.

A simplified block diagram of the connection between wheel 57, 59 encoders 58 and the outerloop processor 67 and the innerloop processor (motion control processor 61) is seen in FIG. 46. As seen therein, the encoding transducer 88 is connected to two encoder chips 90. Top encoding transducer 88 is thereby connected through lines 772 and lines 772A to a chip 90 which connects through lines 778A to outerloop processor 67. Similarly, bottom encoding transducer 88 is also connected through lines 776 and lines 776A to a chip 90 which connects through lines 778C to outerloop processor 67. In addition, the angular output of gyro 500, as described herein, is connected through lines 774 to a chip 90 and therefrom through lines 778B to outerloop processor 67. Thereby, all of the measurements from wheels 57 and 59 and gyro 500 are made available to outerloop processor 67.

Further, a connection is made from lines 772 through path 772B to a chip 90 and therefrom through lines 782A to motion control processor 61. As well, a connection is made from lines 776 through path 776B to a chip 90 and therefrom through lines 782B to motion control processor 61. These provide the inputs required for innerloop processing.

Calculations for the Update Marker System

When traveling under self-contained guidance between floor marker 6 updates, AGV 2A continuously searches for an update marker 6. As update markers in the currently preferred embodiment are magnets, the following description will substitute descriptions of magnet 6 sensing in place of the more general update marker 6, although the invention is sufficiently broad to use update markers which are different from magnets.

Figure 69:
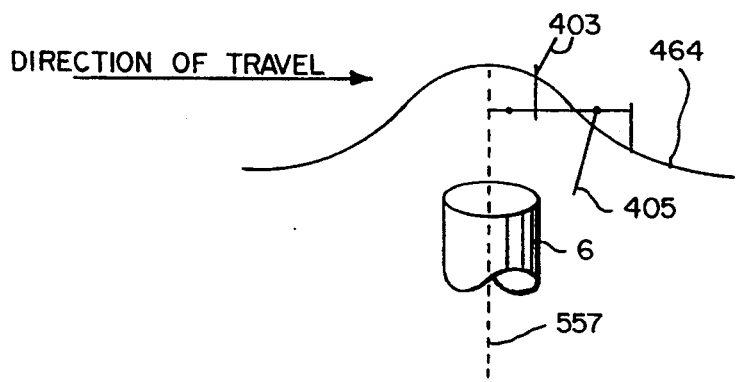
FIG. 69 is a schematic showing a magnet and the relative position of a sensed field that surrounds the magnet and points comprising time delays whereat the vehicle controls recognize the sensing of the magnetic field.
Figure 70:
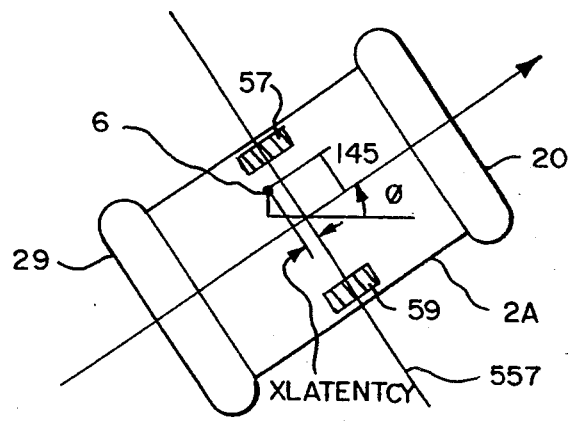
FIG. 70 is a top view of a vehicle having traversed a ground marker from which a position measurement has been made showing some sources of errors comprising the offset of the ground markers from the centerline of the vehicle and delays due to motion of the vehicle after the marker is sensed.

As the moving vehicle 2A traverses a magnet 6, the position of the magnet 6 is sensed in the vehicle 2A frame of reference. As seen in FIG. 69, the signal 403 sensed from a traversed magnet 6 results in a delayed recognition of the peak of the signal at a point 403 which is offset from magnet 6 centerline 557. As well, resulting control action based upon vehicle 2A outerloop 820 adds further delays from point 403 to 464 which are dependent upon vehicle 2A velocity relative to outerloop 820 computational speed.

The measured parameter is the offset from the direction of travel or the "Y" offset from the vehicle center line 559 (see FIG. 34) of magnet 6. Delays in the time of actually acquiring the position after vehicle 2A traverses the point of measurement generates an "offset" in addition to the actual measurement. The "offset" is referred to herein as latency. As an example, the movement of vehicle 2A between sensing of data and position determination by vehicle electronics correlates to an error in the direction of travel, referred to as $X_{latency}$. Other errors comprise errors in mounting which generate errors in both the $X^v$ and $Y^v$ directions, where the superscript v denotes vehicle frame.

The $X_{latency}$ is described and estimated as follows:

$$X_{latency} = A + B \cdot (\text{vehicle 2A speed})$$

Where:
A is a function of magnet 6 vertical alignment and other field abnormalities and magnet sensor and Hall sensor array 24 vehicle 2A mounting.
B is a function of vehicle speed.

After calculating $X_{latency}$, vehicle 2A position is converted to factory frame 736 coordinates. $X_{latency}$ is subtracted from the estimated position of the vehicle and added to the coordinates of traversed magnet 6 and the expected vehicle A to magnet 6 position is calculated by $$\begin{bmatrix} X \\ Y \end{bmatrix}^F_{V/M} = \begin{bmatrix} \cos\phi & -\sin\phi \\ \sin\phi & \cos\phi \end{bmatrix} \begin{bmatrix} -X_{latency} \\ 0 \end{bmatrix} + \begin{bmatrix} X \\ Y \end{bmatrix}^F_V$$

where V/M is the vehicle position when magnet sensed M/V is magnet position as calculated by vehicle M/F is magnet position defined in factory coordinates.

Convert "$-Y_{ums}$" offset to factory orientation $$\begin{bmatrix} X \\ Y \end{bmatrix}^f_{ums} = \begin{bmatrix} \cos\phi & -\sin\phi \\ \sin\phi & \cos\phi \end{bmatrix} \begin{bmatrix} 0 \\ Y_{ums} \end{bmatrix} \quad \text{Translation of } Y_{ums} \text{ values}$$

Compute the position where the vehicle has determined the magnet is located. Y position is equal to the current vehicle position in factory distance moved since passing magnet.

$$\begin{bmatrix} X \\ Y \end{bmatrix}^f_V = \begin{bmatrix} X \\ Y \end{bmatrix}^f_{V/m} - \begin{bmatrix} X \\ Y \end{bmatrix}^f_{Y_{ums}}$$

Compute error difference $X_{M/F}{}^F Y_{M/F}{}^F$ and $X_{M/V}{}^F$, $Y_{M/V}{}^F$ $$\begin{bmatrix} X \\ Y \end{bmatrix}_{error} = \begin{bmatrix} X \\ Y \end{bmatrix}^F_{M/F} - \begin{bmatrix} X \\ Y \end{bmatrix}^F_{Y_{M/V}}$$

where $\begin{bmatrix} X \\ Y \end{bmatrix}^F_{M/F}$ is defined in the *AGVC* tables and is transmitted to vehicle At beginning of next move segment use $X_{error}, Y_{error}, \begin{bmatrix} X \\ Y \end{bmatrix}^F_{V}$ to correct the $\begin{bmatrix} X \\ Y \end{bmatrix}^F_V$ vehicle position $$\begin{bmatrix} X \\ Y \end{bmatrix}^F_V = \begin{bmatrix} X \\ Y \end{bmatrix}^F_V + \begin{bmatrix} X \\ Y \end{bmatrix}_{error}$$

Vehicle 2A Insertion into Factory Frame 736

Figure 54:
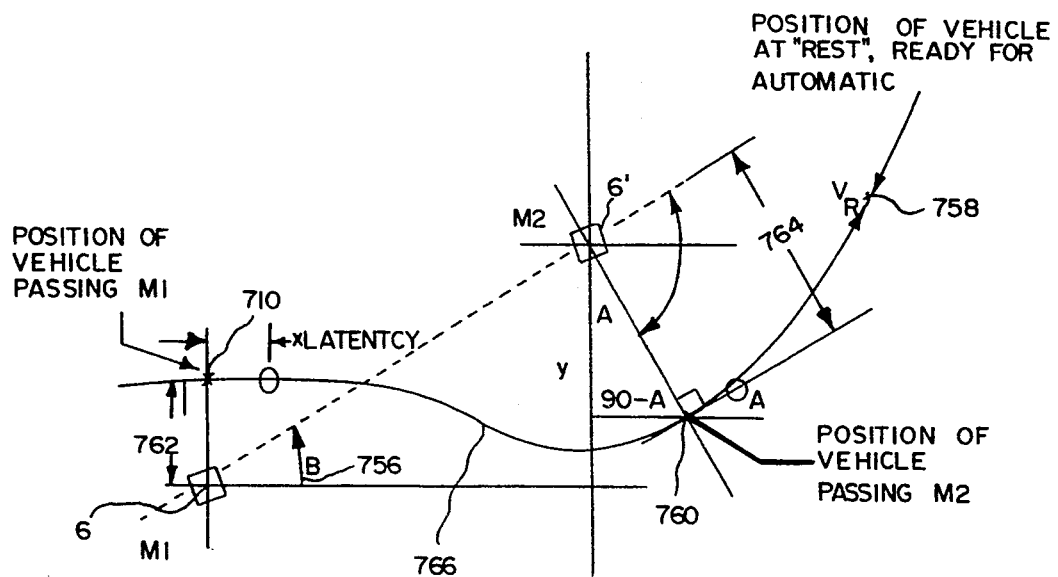
FIG. 54 is a graph showing the path geometry for a manually guided path from which measurements are made relative to vehicle insertion into a factory frame.

A process which uses vehicle 2A contained update marker 6 sensing to establish an insertion procedure of vehicle 2A in factory frame 736 is as follows. Two update markers 6 seen as 6 and 6' in FIG. 54 are traversed by a manually driven vehicle 2A. The path defined by the straight line between markers 6 and 6' makes an angle 756 with the factory frame. Each marker 6, 6' ($M_1$ and $M_2$) has a predetermined position $\begin{bmatrix} x \\ y \end{bmatrix}^F_{M_1}$ and $\begin{bmatrix} x \\ y \end{bmatrix}^F_{M_2}$, respectively, in factory frame 736.

The following table lists terms used in this insertion description:
F = Factory Frame 736
$M_1$ = 1st magnet 6 in insertion sequence
$M_2$ = 2nd magnet 6' in insertion sequence
V = Vehicle 2A
VR = Vehicle Resting place after insertion drive 758
I = Insertion frame 768
$A_N$ = Vehicle 2A heading relative to initial heading Δ HEADING
B = Angle between $M_1$ and $M_2$ in insert frame 768
$X_N, Y_N$ = Vehicle 2A coordinates as calculated relative to $M_1$
C = Angle between $M_1$, $M_2$ in Factory Frame 736 a
"'" indicates a measured value.
V/$M_1$ = V to $M_1$ or vehicle to magnet 1
As vehicle 2A traverses marker 6, a measurement is made. At the time such measurement is available for navigational use, an offset has resulted along the line of vehicle 2A travel 766 moving vehicle 2A to a position $X_{latency}$. In addition, manually driving vehicle 2A over update marker 6 generally results in a Y offset 762 as seen in FIG. 54. Thus, the initialized navigational values are $$\begin{bmatrix} X \\ Y \end{bmatrix}^I_{V/M1} = \begin{bmatrix} X_{latency} \\ Y_{762} \end{bmatrix}$$

The transformation to insertion coordinates is provided by $$\begin{bmatrix} X \\ Y \end{bmatrix}^I_{V/M2} = \begin{bmatrix} \cos A & -\sin A \\ \sin A & \cos A \end{bmatrix} \cdot \begin{bmatrix} X_{latency} \\ Y_{ums2} \end{bmatrix}$$

Where, for example,
Initial vehicle 2A position is defined as point $X_{latency}$ past the sensed point of $M_1$ and $Y_{762}$ is the distance to $M_1$ from magnet sensor in the center of the vehicle.

The angle 756(B) is angular measure predetermined by the locations of markers $M_1$, $M_2$ (6, 6'). Thus, for angle 756 in FIG. 54:

$$B = \tan^{-1} \left[ \frac{Y_{M1/M2}}{X_{M1/M2}} \right]$$

Similarly, with reference to factory frame 736:

$$C = \tan^{-1} \left[ \frac{Y^F_{M2} - Y^F_{M1}}{X^F_{M2} - X^F_{M1}} \right]$$

and, therefore, $$\begin{bmatrix} X \\ Y \end{bmatrix}^V_F = \begin{bmatrix} \cos(B-C) & \sin(B-C) \\ -\sin(B-C) & \cos(B-C) \end{bmatrix} \cdot \begin{bmatrix} X^I_{VR} - X^I_{V/M2} \\ Y^I_{VR} - Y^I_{V/M2} \end{bmatrix} + \begin{bmatrix} X^F_{M2} \\ Y^F_{M2} \end{bmatrix}$$

The vehicle 2A insertion process is as follows:
1. Drive vehicle 2A across marker 6. Measure Y distance 762.
2. Assume initial heading angle is "0" and position of $M_1$ (marker 6) in insertion frame 768 is 0, 0(x, y). Therefore, the initial conditions are $$\begin{bmatrix} X \\ Y \end{bmatrix}^I_{V/M1} = \begin{bmatrix} X_{latency} \\ Y_{762} \end{bmatrix} \text{ after } M_1 \text{ measurement}$$

3. Drive (manually) across second marker 6' ($M_2$). Measure Y distance 764. Then, $$\begin{bmatrix} X \\ Y \end{bmatrix}^I_{V/M2} = \begin{bmatrix} X_{latency} \\ Y_{764} \end{bmatrix}$$

The derived measurements now allow x, y to be computed by the navigation and guidance computer.

$A_{M2}^I$ = heading from which a calculation is made from the path to the next waypoint.

4. The position of $M_2$ in insertion frame 768 (relative to $M_1$) is computed by $$\begin{bmatrix} X \\ Y \end{bmatrix}_{M1/M2}^I = \begin{bmatrix} \cos A & -\sin A \\ \sin A & \cos A \end{bmatrix} \begin{bmatrix} X_{latency} \\ Y_{764} \end{bmatrix}$$

The angle is computed by $$B = \tan^{-1}\left[\frac{Y_{M1/M2}^I}{X_{M1/M2}^I}\right]$$

5. Drive vehicle 2A to a rest stop 758, STOP, REQUEST INSERT FROM AGVC 13.
6. On receipt on Insert from AGVC 13 (Actual $M_1$, $M_2$ coordinates)

$$C = \tan^{-1}\left[\frac{Y_{M2}^F - Y_{M1}^F}{X_{M2}^F - X_{M1}^F}\right]$$

Figure 53:
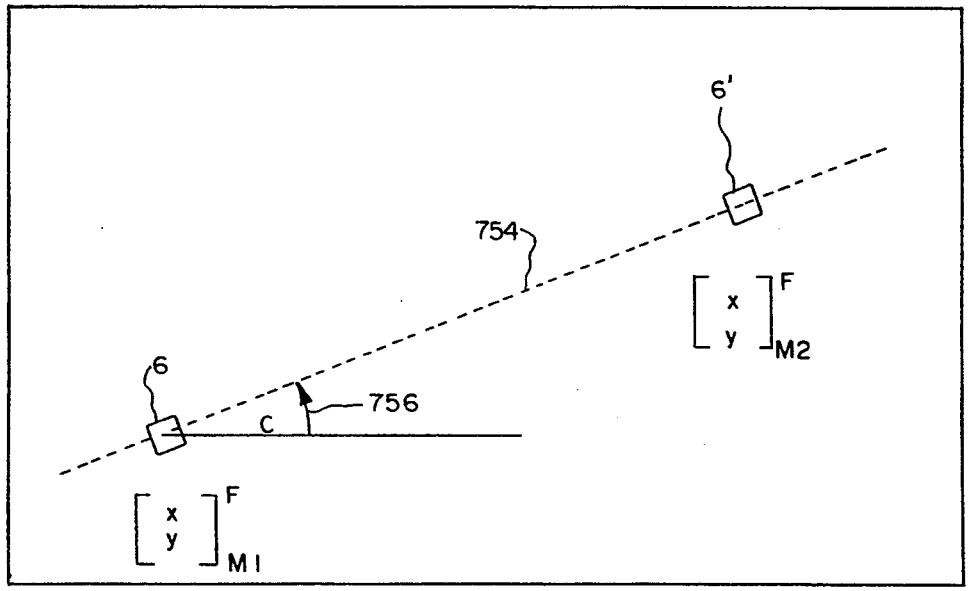
FIG. 53 is a simplified graph showing the geometrical relationships between the path between two markers and the factory frame.

(See FIG. 53 for definition of C.)

Compute position in factory coordinates $$\begin{bmatrix} X \\ Y \end{bmatrix}_V^F = \begin{bmatrix} \cos(B-C) & \sin(B-C) \\ -\sin(B-C) & \cos(B-C) \end{bmatrix} \cdot$$

$$\begin{bmatrix} X_{VR}^I - X_{V/M2}^I \\ Y_{VR}^I - Y_{V/M2}^I \end{bmatrix} + \begin{bmatrix} X \\ Y \end{bmatrix}_{M2}^F$$

7. The heading of the vehicle in the factory frame is calculated by $$[\text{HEADING}]_V^F = [\text{HEADING}]_{\text{at rest}}^I - (B - C)$$

Details of Vehicle 2A Calculations Including Kalman Equations

Some earlier described material is repeated in this section for clarity. The equations for navigation and guidance of the vehicle 2A and for the Kalman filter update of system parameters are based on aperiodic observation of surveyed floor position ground markers 6, aperiodic comparisons of vehicle 2A to factory frame 736 azimuth determined by the inertial table 700 with that based on fifth and sixth wheel (57, 59) data, and initial azimuth initialization estimates inserted manually into the system as herebefore described. Derivation of the equations are not provided. In this section, the equation sets are considered to provide for three separate computation cycle times. The first and fastest cycle is called the steering command loop. This loop provides a steering command to the vehicle steering computer and pre-processes wheel encoder data for a navigation loop. At this time it is not certain that these computations will have to be performed at a faster time than the navigation equations. If they do not, the equations given are easily modified for inclusion in a navigation loop. The time for the steering loop is designated $T_s$. The navigation loop contains the basic vehicle navigation equations, calculation of the steering command angle needed by the steering loop, and certain integrations needed in the Kalman filter loop. The navigation loop time is $T_n$.

The Kalman filter loop time is variable and is designated $T_k$. In the currently preferred embodiment, a Kalman filter cycle occurs immediately after the detection of a marker 6, at which time an observation is made of vehicle azimuth angle differences (table 700 vs. wheel 57, 59 data) and upon initial insertion of manual azimuth angle into the system. Each observation is assumed to be independent of the others (down-range vs. cross-range in the vehicle frame because of their orthogonality). Thus, the Kalman filter will process marker observations (sequentially) and angle comparisons concurrently.

References of distance and angle to frames of reference are as follows:

$X_v^f$ where X is the Cartesian measurement of x referenced from the factory to the vehicle frame.
Frames used herein consist of:
Vehicle (v)
Factory (f)
Waypoint (w)
Inertial Table (t)
Others are as specified.

$\theta_v^f$ where $\theta$ is an angle measured from factory frame to vehicle frame.
Frame references are as specified above. In some cases, angles are measured relative to two intersecting lines (e.g. s and ss).
Then the angle from s to ss is $\theta_s^{ss}$.

The first step in Kalman calculations initializes the system error covariance matrix P as seen below, where all $P_{ii}$ values are taken at time (0)

$$P(0) = \begin{bmatrix} p_{11} & 0 & 0 & 0 & 0 & 0 & 0 & 0 & 0 \\ 0 & p_{22} & 0 & 0 & 0 & 0 & 0 & 0 & 0 \\ 0 & 0 & p_{33} & 0 & 0 & 0, & 0 & 0 & 0 \\ 0 & 0 & 0 & p_{44} & 0 & 0 & 0 & 0 & 0 \\ 0 & 0 & 0 & 0 & p_{55} & 0 & 0 & 0 & 0 \\ 0 & 0 & 0 & 0 & 0 & p_{66} & 0 & 0 & 0 \\ 0 & 0 & 0 & 0 & 0 & 0 & p_{77} & 0 & 0 \\ 0 & 0 & 0 & 0 & 0 & 0 & 0 & p_{88} & 0 \\ 0 & 0 & 0 & 0 & 0 & 0 & 0 & 0 & p_{99} \end{bmatrix}$$

Where
$P_{11} = E[(\delta x_f)^2]$
$P_{22} = E[(\delta y_f)^2]$
$P_{33} = E[(\delta \theta_f)^2]$
$P_{44} = E[(\delta K_r)^2]$
$P_{55} = E[(\delta k_1)^2]$
$P_{66} = E[(\delta r_a)^2]$
$P_{77} = E[(\delta y_f)^2]$
$P_{88} = E[(\delta \omega_{MKV})^2]$
$P_{99} = E[(\delta \omega_R W)^2]$ Where the error state variables "$\delta$" are defined as
$\delta x_f$ = x error in the factory frame
$\delta x_f$ = y error in the factory frame
$\delta \theta_f$ = heading error of the vehicle in the factory frame
$\delta k_r$ = error in right wheel calibration
$\delta k_1$ = error in left wheel calibration $\delta r_a$ = error in axle ($r_a$) calibration $\delta y_f$ = error in gyro drift of the inertial table relative to the factory frame $\delta \omega_{MKV}$ = error in the drift rate estimate due to Markov noise $\delta \omega_{RW}$ = error in the drift rate estimate due to random walk noise The error state vector, $\delta X$, is defined as:

$$\delta X = \begin{bmatrix} \delta x_f \\ \delta y_f \\ \delta \theta_f \\ \delta K_r \\ \delta K_l \\ \delta r_a \\ \delta \gamma_f \\ \delta \omega_{MKV} \\ \delta \omega_{RW} \end{bmatrix}$$

The initial P matrix can be generated by performing the following calculation:

$P(k) = \Phi_p(k)(0.5Q(k))\Phi_p^T(k) + 0.5Q(k)$ where $k=0$

To initialize using measurements, which include typical system noise, vehicle 2A is moved between two markers 6, 6' having predetermined factory frame 736 locations. As vehicle 2A is moved, "noise" is propagated down this "typical path," designated by $\Phi_p$. Definition for Q is provided hereafter. As disclosed earlier, $P_{88}(0)$ is set equal to zero as Markov gyro drift error is negligible in the currently preferred embodiment.

Calculations Done in the Steering Loop

The steering loop is the fastest loop. The steering loop time is designated as $T_s$. Navigation and guidance loop time ($T_n$) is currently 30 milliseconds. Steering loop time can be as slow as navigation and guidance loop time $T_n$, but is cyclicly dependent upon vehicle 2A guidance stability requirements. In the currently preferred embodiment, $T_n$ is an incremental multiple of $T_s$ as related below. In the following discussion, vehicle 2A is assumed to be going forward such that starboard=right and port=left.

Input to steering loop equations:

$\Delta \theta_{rw'}$, incremental angle (ticks) from the fifth (starboard) wheel 57 encoder.

$\Delta \theta_{lw'}$, incremental angle (ticks) from the sixth (port) wheel 59 encoder.

$\theta_c(n)$, steering command angle from navigation and guidance loop calculations.

Output of equations and selective constants:

$K_{RW}$ Kalman correction of $C_D$ $\theta_f(n)$ vehicle azimuth derived from fifth and sixth wheel (57, 59) encoder 58 data. Sent to navigation and guidance loop at the end of "M" steering loop cycles. ($T_n = M*T_s$)

$\Delta X_{rw}(n)$ scaled starboard wheel 57 ticks accumulated over "M" steering loop cycles and sent to the navigation and guidance loop.

$\Delta X_{lw}(n)$ scaled port wheel 59 ticks accumulated over "M" steering loop cycles and sent to the navigation and guidance loop =

$\alpha$ = break frequency of gyro Markov noise $C_D$ = initial estimate of the gyro drift rate $\omega_c(s)$ steering command sent to vehicle steering computer every steering loop cycle.

$S_{rw,lw}$ = nominal scaling factors to convert right, left wheel encoders 58

$S_a = 1/r_a$ $K_{rw,lw}$ = Kalman correction of $S_{rw,lw}$

Equations:

$\Delta X_{rw}(s) = S_w * \Delta \theta_{rw}(s) * (1+K_{rw})$; $\Delta X_{rw}(0) = 0$ $\Delta X_{rw}(n) = \Sigma \Delta X_{rw}(s)$ over "M" cycles (one navigation and guidance cycle).

$\Delta X_{lw}(s) = S_w * \Delta \theta_{lw}(s) * (1+K_{lw})$; $\Delta X_{lw}(0) = 0$ $\Delta X_{lw}(n) = \Sigma \Delta X_{lw}(s)$ over "M" cycles $\Delta \theta_f(s) = S_a * [\Delta X_{rw}(s) - \Delta X_{lw}(s)]$ $\theta_f(s) = \theta_f(s-1) + \Delta \theta_f(s)$ $\theta_f(n) = \theta_f(s)$; $\theta_f$ is read out once each navigation and guidance cycle.

$\theta_e(s) = \theta_c(n) - \theta_f(s)$ $\omega_c(s) = S_{s1}*\omega_c(s-1) + S_{s2}*\omega_c(s-2) + S_{s3}*\theta_e(s) + S_{s4}*\theta_e(s-1) + S_{s5}*\theta_e(s-2)$

Calculations Done in the Navigation and Guidance Loop

The following calculations are performed in the navigation and guidance loop.

$T_n$ navigation and guidance loop time (30 ms) is the currently preferred embodiment.

$\Delta X^v(n) = [\Delta X_{rw}(n) + \Delta X_{lw}(n)]/2$ $\Delta y^v \Delta_0$ $COS(n) = [\cos\theta_f(n) + \cos\theta_f(n-1)]/2$ $SIN(n) = [\sin\theta_f(n) + \sin\theta_f(n-1)]/2$ $\Delta X_f(n) = COS(n) * \Delta X^v(n)$ $\Delta y_f(n) = SIN(n) * \Delta X^v(n)$ $x_f(n) = x_f(n-1) + \Delta x_f(n)$ $y_f(n) = y_f(n-1) + \Delta y_f(n)$ $\omega_{MKV}(n) = \omega_{MKV}(n-1) * (1-\alpha) = 0$ (in the currently preferred embodiment using gyro 500)

$\omega_f(n) = \omega_{MKV}(n) + C_D + K_{RW}$ (gyro 500 drift rate)

$\gamma_f(n) = \gamma_f(n-1) + T_n * \omega_f(n)$ $\Sigma_{13}(n) = \Sigma_{13}(n-1) + \Delta y_f(n)$ $\Sigma_{14}(n) = \Sigma_{14}(n-1) + COS(n) * \Delta X_{rw}$ $\Sigma_{15}(n) = \Sigma_{15}(n-1) + COS(n) * \Delta X_{lw}$ $\Sigma_{23}(n) = \Sigma_{23}(n-1) + \Delta x_f(n)$ $\Sigma_{24}(n) = \Sigma_{24}(n-1) + SIN(n) * \Delta X_{rw}(n)$ $\Sigma_{25}(n) = \Sigma_{25}(n-1) + SIN(n) * \Delta X_{lw}(n)$ $\Sigma_{34}(n) = \Sigma_{34}(n-1) + \Delta X_{rw}(n)$ $\Sigma_{35}(n) = \Sigma_{35}(n-1) + \Delta X_{lw}(n)$ $\Sigma_{36}(n) = \Sigma_{36}(n-1) + \Delta\theta_v(n)$ The following equations are calculated at the initialization of straight line maneuver at time I.

$\theta_w$ = the path angle to a waypoint 714 in factory frame 736 coordinates.
$X_v^f(I) = X_v^f(n)$
$Y_v^f(I) = Y_v^f(n)$
$x_v^w(I) = [x_w^f - x_v^f(I)]\cos\theta_w + [y_w^f - y_v^f(I)]\sin\theta_w$
$y_v^w(I) = [x_w^f - x_v^f(I)]\sin\theta_w - [y_w^f - y_v^f(I)]\cos\theta_w$
$x_0 = x_v^w(I)$
$y_0 = y_v^w(I)$
$d = X_0$
$a_0 = y_0$
$\beta(I) = \theta_v^f(I) - \theta_w$
$a_1 = \tan\beta(I)$ $a_3 = -\dfrac{10*y_0}{d^3} - \dfrac{6*\tan\beta(I)}{d^2}$ $a_4 = \dfrac{15*y_0}{d^4} + \dfrac{8*\tan\beta(I)}{d^3}$ $a_5 = -\dfrac{6*y_0}{d^5} - \dfrac{3*\tan\beta(I)}{d^4}$ $X_0^f(I) = X_w^f(I) - X_v^w(I)\cos\theta_w$
$Y_0^f(I) = Y_w^f(I) - Y_v^w(I)\cos\theta_w$ The following equations are then calculated at navigation and guidance loop rate (i.e., at $T_n$)

$x_v^2(n) = [x_v^f(n) - x_0^f(I)]\cos\theta_w + [y_v^f(n) - y_0^f(I)]\sin\theta_w$ $x_v^2(n) = -[x_v^f(n) - x_0^f(I)]\sin\theta_w + [y_v^f(n) - y_0^f(I)]\cos\theta_w$ $y_D^w(n) = a_0 + a_1*x_v^w(n) + a_3*(x_v^w(n))^3 + a_4*(x_v^w(n))^4 + a_5*(x_v^2(n))^5$ $\delta_p(n) = y_d^2(n) - y_v^w(n)$ The $b_i$ equations are calculated at the initialization of a polar turn. The other equations are calculated at navigation and guidance loop rate. $R_T$ is the radius of the turn $X_w^f$, $Y_w^f$ are defined here as $X_v^f(I)$, $Y_v^f(I)$, the initial starting point of the vehicle in the factory frame.

$X_v^P = R_T + [x_v^f(n) - x_w^f]\sin\theta_w - [y_v^f(n) - y_w^f]\cos\theta_w$
$y_v^P = [x_v^f(n) - x_w^f]\cos\theta_w + [y_v^f(n) - y_w^f]\sin\theta_w$ $\phi_v = \tan^{-1}\left[\dfrac{y_v^P(n)}{x_v^P(n)}\right]$ $R_v^P(n) = \sqrt{(x_v^P(n))^2 + (y_v^P(n))^2}$ $\phi_T$ = Total angle of the turn
$b_0 = R_T$ $b_2 = \dfrac{R_T}{2}$ $b_3 = -\dfrac{R_T}{\phi_T}$ $b_4 = \dfrac{R_T}{2*\phi_T^2}$ $R_D^P(n) = b_0 + b_2 * (\phi_v(n))^2 + b_3 * (\phi_v(n))^3 + b_4 * (\phi_v(n))^4$ -continued $\delta_p(n) = R_v^P(n) - R_D^P(n)$ Using either the above calculated value of $\delta_p(n)$ or that derived in the straight line turn, the vehicle is steered to stay on the calculated trajectory using, $\theta_c(n) = S\theta_1*\theta_c(n-1) + S\theta_2*\theta_c(n-2) + S\theta_3*\delta_p(n) + S\theta_4*\delta_p(n-1) + S\theta_5\Gamma_5*\delta_p(n-2)$ $\theta_c(n)$ is used in the steering loop calculations.

The Kalman Filter Loop Calculations $\phi_{13}(k) = -\Sigma_{13}(n)$ $\phi_{14}(k) = \Sigma_{14}(n)/2$ $\phi_{15}(k) = \Sigma_{15}(n)/2$ $\phi_{23}(k) = \Sigma_{23}(n)$ $\phi_{24}(k) = \Sigma_{24}(n)/2$ $\phi_{25}(k) = \Sigma_{25}(n)/2$ $\phi_{34}(k) = S_a*\Sigma_{34}(n)$ $\phi_{35}(k) = -S_a*\Sigma_{35}(n)$ $\phi_{36}(k) = -S_a*\Sigma_{36}(n)$ $\phi_{78}(k) = [1 - \exp(-\alpha*T_k)]/\alpha$ $\phi_{79}(k) = T_k$ $\phi_{88}(k) = \exp(-\alpha*T_k)$ $\Sigma_{ij} = 0$ (set all sums to zero)

Now construct the $\Phi$ matrix $$\Phi(k) = \begin{bmatrix} 1 & 0 & \phi_{13}(k) & \phi_{14}(k) & \phi_{15}(k) & 0 & 0 & 0 & 0 \\ 0 & 1 & \phi_{23}(k) & \phi_{24}(k) & \phi_{25}(k) & 0 & 0 & 0 & 0 \\ 0 & 0 & 1 & \phi_{34}(k) & \phi_{35}(k) & \phi_{36}(k) & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & \phi_{78}(k) & \phi_{79}(k) \\ 0 & 0 & 0 & 0 & 0 & 0 & 0 & \phi_{88}(k) & 0 \\ 0 & 0 & 0 & 0 & 0 & 0 & 0 & 0 & 1 \end{bmatrix}$$

In the currently preferred embodiment, gyro 500 drift rate is characterized by a random walk error state variable, $\delta\omega_{rw}$. Thus $V_{77} = 0$, $V_{88} = 0$ and $\alpha = 0$, so $\phi_{78} - \phi_{79} = T_k$, and $\phi_{88} = 0$. $T_k$ is the Kalman cycle time. $T_k$ is the Kalman cycle time.

Construction of the Q Matrix

The Q matrix is constructed from $Q = GVG^T$ where G is the matrix relating process noise to the error states, and V is the process noise covariance matrix. Elements of the G matrix are contained in the equations below:

$q_{11}(k) = v_{11}*(\phi_{14}(k))^2 + v_{22}*(\phi_{15}(k))^2 + v_{33}*(\phi_{13}(k))^2$ $q_{12}(k) = v_{11}*\phi_{14}(k)*\phi_{24}(k) + v_{22}*\phi_{15}(k)*\phi_{25}(k) + v_{33}*\phi_{13}(k)*\phi_{23}(k)$ $q_{13}(k) = v_{11}*\phi_{14}(k)*\phi_{34}(k) + v_{22}*\phi_{15}(k)*\phi_{35}(k)$ $q_{21}(k) = v_{11}*\phi_{14}(k)*\phi_{24}(k) + v_{22}*\phi_{15}(k)*\phi_{25}(k) + v_{33}*\phi_{13}(k)*\phi_{23}(k)$ $q_{22}(k) = v_{11}*(\phi_{24}(k))^2 + v_{22}*(\phi_{25}(k))^2 + v_{33}*(\phi_{23}(k))^2$ $q_{23}(k) = v_{11}*\phi_{24}(k)*\phi_{34}(k) + v_{22}*\phi_{25}(k)*\phi_{35}(k)$ $q_{31}(k) = v_{11}*\phi_{14}(k)*\phi_{34}(k) + v_{22}*\phi_{15}(k)*\phi_{35}(k)$ $q_{32}(k) = v_{11}*\phi_{24}(k)*\phi_{34}(k) + v_{22}*\phi_{25}(k)*\phi_{35}(k)$ $q_{33}(k) = v_{11}*(\phi_{34}(k))^2 + v_{22}*(\phi_{35}(k))^2$ $q_{77}(k) = v_{77}$ $q_{88}(k) = v_{88}$ $q_{99}(k) = v_{99}*T_k^2$ The uncorrelated process noises are represented by the covariance matrix:

$$V = \begin{bmatrix} V_{11} & 0 & 0 & 0 & 0 & 0 \\ 0 & V_{22} & 0 & 0 & 0 & 0 \\ 0 & 0 & V_{33} & 0 & 0 & 0 \\ 0 & 0 & 0 & V_{77} & 0 & 0 \\ 0 & 0 & 0 & 0 & V_{88} & 0 \\ 0 & 0 & 0 & 0 & 0 & V_{99} \end{bmatrix}$$

The values $V_{ii}$ in the above matrix provide the V process noise covariance matrix.

$v_{11} = E[\epsilon\theta_{rw}\epsilon\theta_{rw}] = E[\epsilon^2\theta_{rw}]$
$v_{22} = E[\epsilon^2\theta_{lw}]$
$v_{33} = E[\epsilon_s^2] + E[\epsilon_{vw/v}^2]$
$v_{77} = E[\epsilon_{WNg}^2]$
$v_{88} = E[(\sqrt{2a}\,\sigma_{MKV4}\,\epsilon_{MKV})^2] = 2a\sigma_{MKV}^2$
$v_{99} = E[\epsilon_{RW}^2]$ Where noise variances are due to:
floor anomalies (right wheel) ($V_{11}$)
floor anomalies (left wheel) ($V_{22}$)
wheels side slip ($V_{33}$)
white noise in angular rate sensor ($V_{77}$)
Markov noise in angular rate sensor (MKV)
where $\sigma_{MKV}$ is the standard deviation of the Markov noise ($V_{88}$)
random walk noise is angular rate sensor ($v_{99}$)

$$Q(k) = \begin{bmatrix} q_{11}(k) & q_{12}(k) & q_{13}(k) & 0 & 0 & 0 & 0 & 0 \\ q_{21}(k) & q_{22}(k) & q_{33}(k) & 0 & 0 & 0 & 0 & 0 \\ q_{31}(k) & q_{32}(k) & q_{33}(k) & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & q_{77}(k) & 0 & 0 \\ 0 & 0 & 0 & 0 & 0 & 0 & q_{88}(k) & 0 \\ 0 & 0 & 0 & 0 & 0 & 0 & 0 & q_{99}(k) \end{bmatrix}$$

Next, propagate the error covariance matrix P to time k using $T_k$, the time since the last Kalman cycle.

$P(k) = \phi(k)[P(k-1) + \frac{1}{2}*Q(k)]\phi(k)^t + \frac{1}{2}*Q(k)$

Now, construct the h vector(s) appropriate to the observation being processed.

$h_1 = [\cos\theta_f \sin\theta_f\; 0\; 0\; 0\; 0\; 0\; 0\; 0]$
$h_2 = [-\sin\theta_f \cos\theta_f\; 0\; 0\; 0\; 0\; 0\; 0\; 0]$
$h_3 = [0\; 0\; 1\; 0\; 0\; 0\; -1\; 0\; 0]$ In the above equations, all measurements are assumed to be independent, providing redundancy whereby systematic errors of measurement are evaluated and removed by real time calibration using Kalman filtering. Marker 6 measurements (x, y) are used in observations 1,2 and vehicle 2A gyro 500 measurement is used in observation 3 of the h vector(s), above. The down-range and cross-range observations are orthogonal in vehicle 2A coordinates and could be measured at different times. Of course x and y should be measured concurrently. However, in the currently preferred embodiment, a sample directional measurement is taken from gyro 500 each time a marker 6 is located. In another preferred embodiment, a sample directional measurement is also taken from gyro 500 each time a new turn or straight line path is calculated. Thus, the h matrix comprises $h_{1,2,3}$ in the currently preferred embodiment.

Note: While all measurements are dependent, the down-range and cross-range observations are orthogonal in vehicle coordinates, and can be taken separately, but x and y should be taken simultaneously.

Notation: $K_i$, $h_i$, $r_i$, $z_i$, ...; i = the measurement number
i.e.,
i = 1 down-range observation
i = 2 cross-range observation
i = 3 azimuth angle comparison The Kalman gain $K_i$ for the i'th observation where $r_i$ is defined as the i'th observation noise variance is computed.

$$K_i = \frac{P(k)h_i^T}{(h_i P(k)h_i^T + r_i)}$$

The filter covariance matrix is updated by the following equations:

$P^+(k) = (I - K_i h_i) = P(k) - K_i (P(k)h_i^T)^T$ where
$P^+(k)$ is updated $P(k)$
$\delta z_i = h_i \delta X$
$\delta X^+ = \delta X + K_i(\delta z_i - \delta z_i)$
Where " ̂ " over a variable denotes the estimated value of that variable. The initial estimate for $\delta X$ is zero at the beginning of each Kalman cycle.

For simultaneous observations, such as observations 1, 2, an iteration process is performed as follows:

$$K_1 = \frac{P(k)h_1^T}{h_1 P(k)h_1^T + r_1}$$

$\delta z_1 = h_1 \delta X = 0$
$\delta X^+ = k_1 \delta z_1$
$\delta X = \delta X^+$
$P^+(k) = P(k) - K_1(P(k)h_1^T)^T$
$P(k) = P^+(k)$ $$K_2 = \frac{P(k)h_2^T}{h_2 P(k)h_2^T + r_2}$$

$\delta z_2 = h_2 \delta x$
$\delta X^+ = \delta x + k_2(\delta z_2 - \delta z_2)$
$P^+(k) = P(k) - k_2(P(k)h_2^T)^T$ -continued $P(k) = P^+(k)$ The final values in $\delta X^+$ provide the state variable corrections, as error correcting estimates.

Review of the Kalman Filter as Used in the Currently Preferred Embodiment

Process errors are based on specifications, drawings and calculations. Once the process noises (6 maximum) and measurement noises (3 maximum) are selected, then the propogation process and measurement noises is defined by the path(s).

Process Noises $$V = \begin{bmatrix} V_{11} & & & & & \\ & V_{22} & & & & \\ & & V_{33} & & & \\ & & & 0 & & \\ & & & & 0 & \\ & & & & & V_{66} \end{bmatrix} \begin{matrix} \leftarrow \text{Floor, wheel irregularities} \\ \leftarrow \text{Floor, wheel irregularities} \\ \leftarrow \text{Sideslip} \\ \\ \\ \leftarrow \text{Gyro Random Walk} \end{matrix}$$

Measurement Noise $$R = \begin{bmatrix} r_{11} & 0 & 0 \\ 0 & r_{22} & 0 \\ 0 & 0 & r_{33} \end{bmatrix} \begin{matrix} \leftarrow \text{Magnet position heading calculation from encoder 58} \\ \leftarrow \text{Magnet position \& heading calculation from encoder 58} \\ \leftarrow \text{Gyro 500 encoder resolution \& Heading calculation from encoder 58} \end{matrix}$$

To estimate the first initial P matrix, one can use $$P(k) = \Phi(k)(.5Q(k))\Phi(k)^T + .5Q(k) + \begin{vmatrix} 0 & 0 & 0 & 0 & 0 \\ 0 & 0 & 0 & 0 & 0 \\ 0 & 0 & E(\delta_r)^2 & 0 & 0 \\ 0 & 0 & 0 & E(\delta_1)^2 & 0 \\ 0 & 0 & 0 & 0 & 0 \end{vmatrix}$$

where $k = 0$
in which $E(\delta k_r)^2$ = expected value of the squared error in wheel diameter
$(\delta k_r^2 = \delta k_1^2)$ NOTE: $\phi$ and Q are based on a "typical" path/pathlength.

It was previously shown that a marker (magnet) observation required two measurement inputs related to two of the error state variables ($\delta x_f$, $\delta y_f$). With error states $\delta r_a$, $\delta \gamma_f$, $\delta \omega_{MKV}$ removed from the error state vector, the definition of the measurement can be shown to be $\delta z = h \delta X$ (2 x 1 2 x 6 6 x 1 matrix orders)
$\delta$Meas. = $h \delta$state
where
 $\delta z$ = detected – calculated measurements
 $\delta X$ = actual – estimated (calculated) states h is selection vector.

The "preferred embodiment" involves also taking an azimuth measurement at the time the magnet is detected to provide overlapping, redundant information.

The azimuth measurement by itself is actually given by:

$$\begin{matrix} \delta_{z3} & = & \delta \text{ heading error} & - & \delta \text{ gyro drift error} \\ & = & \delta\theta_f & - & T_k \cdot \delta\omega_f \\ & & \text{encoder 58} & & \text{Kalman} & \text{Drift rate} \\ & & \text{wheels 57,} & & \text{time} & \text{error} \\ & & \text{59 error} & & & \end{matrix}$$

Careful expansion shows that $$\begin{matrix} \delta_{z3} & = & T_k\omega_f & + & \Delta\gamma_v{}^t & - & \theta_f \\ & & \text{Predicted} & & \text{Change in Gyro} & & \text{Encoder 58} \\ & & \text{Drift based} & & \text{500 Encoder} & & \text{for wheels} \\ & & \text{on last} & & & & 57, 59 \\ & & (\omega_f) \text{ updated drift rate} & & & & \end{matrix}$$

is equivalent to $\delta_{z3} = (0\ 0\ 1\ 0\ 0\ -T_k)\delta X$ where $\Delta\gamma_v{}^t$ is the change in gyro 500 angle over the last Kalman cycle "$\sim$" is the current estimate for the underlying variable (e.g., $\theta_f$ is the current estimate of $\theta$ measured from factory to vehicle coordinates.)

Using a simultaneous update actually reduces process time from a sequential method, besides offering the advantages of redundancy, "best information," stability, etc. so that the vehicle can operate at up to 200 ft/minute with no need to slow down for Kalman calculations.

To maintain speed, Kalman updates are only performed before a new trajectory calculations at a waypoint or after sensing a marker 6. An azimuth measurement can be performed prior to any waypoint. To combine azimuth and marker measurements, the measurement matrix h is expanded to be used as follows:

$$\begin{bmatrix} -\Delta_m \sin\theta_f - \Delta_{mx} \\ \Delta_m \cos\theta_f - \Delta_{my} \\ T_k \omega_f(0) + \Delta\gamma_v{}^t - \theta_f \end{bmatrix} =$$

$$\begin{bmatrix} 1 & 0 & \Delta_m\cos\theta_f & 0 & 0 & 0 \\ 0 & 1 & \Delta_m\sin\theta_f & 0 & 0 & 0 \\ 0 & 0 & 1 & 0 & 0 & -T_k \end{bmatrix} \begin{bmatrix} \delta_{xv}^f \\ \delta_{yv}^f \\ \delta\theta_f \\ \delta k_r \\ \delta k_1 \\ \delta\omega_f \end{bmatrix}$$

$(\delta_z = h\delta X)$ where $\omega(0)$ is the value of $\omega$ at time $t(0)$
where $\Delta_m$ is $y^v$ position acquired from a marker 6 measurement and $\Delta_{mx} = X_f - X_m{}^f$ where "m" is the measured marker position $$\Delta_{my} = Y_r{}^f - Y_m{}^f$$

During that Kalman time $[T_k = t(1) - t(0)]$ the transition matrix, $\Phi$, is propagated as shown earlier. At time $t(1)$, the P matrix is propogated as follows:

$$P(k) = \phi(k) \cdot (P(k-1) + 0.5 \cdot Q(k)) \Phi(k)^T + 0.5 \cdot Q(k)$$

then $K = P(k)h^T(hP(k)h^T + R)^{-1}$ Kalman gain
$\delta X^+ = K \cdot \delta_z$ Updated errors [actual − calculated estimated]
then when the waypoint is reached $X(n) = X(n-1) + \delta X^+]$
where $X(n)$ is the current estimate of the state of the vehicle parameters (i.e.,
$X = [X_r{}^f\ y_r{}^f\ \theta_r{}^f\ K_{rw}\ K_{1w}\ \omega_f]^T)$
$P^+(k) = (I - K \cdot h)P(k)$
$P(k) = P^+(k)$

Vehicle 2A Path Selection Criteria

As described earlier, each calculated path between waypoints 714 is based upon the calculation of coefficients for a fifth order cartesian coordinate or polar coordinate polynomial. Each polynomial being used for calculating in seriatim the guide points of a path along which vehicle 2A steers, the coefficients of the cartesian coordinate polynomial being used for "straight line" moves and the polar coordinate polynomial being used to calculate moves involving arcs, such as paths around corners. In some cases, both straight line and arc moves are used in sequential combination in those circumstances where a single move will not place the vehicle at the target waypoint 714 proceeding in the desired direction.

Figure 64:
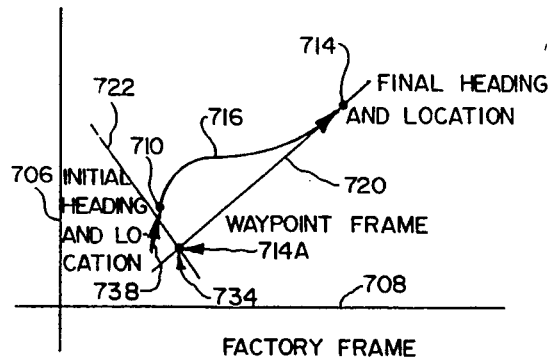
FIG. 64 is a diagram of a "straight line" guidepath showing relationship of a waypoint frame to the factory frame.

Polynomial generation constraints for the linear or "straight line" coefficient calculation comprise restricting the initial angle of the path to the then current direction of AGV 2A, defining a path which is continuous, and terminating the path at the target waypoint 714 tangent to the heading specified by AGVC 13. FIG. 64 provides a graph of a desired path between the vehicle and a next waypoint 714. The vehicle position 710 and direction 738 are usually not as originally planned and stored for the path between waypoints 714. Instead, in realistic terms, AGV 2A must be considered to reside at position 710 when the 710, 714 path calculations are made. Constraints placed upon calculation of the coefficients of the fifth order polynomial which describes path 716 in FIG. 64 are the following:

1. Initial heading of the path 710, 714 is equal to vehicle 2A heading 738.
2. The path described by the polynomial is continuous.
3. Final heading of vehicle 2A at 714 is the heading angle provided by AGVC 13 in the message directing vehicle 2A travel and is always zero in waypoint frame 734.

Exemplary path 716 shows expected curvature in the "straight line" guidepath.

Figure 66:
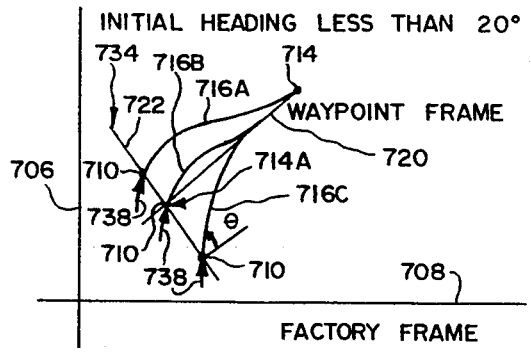
FIG. 66 is a diagram showing a family of three guidepaths each of which results from a different position of the vehicle with regard to a waypoint frame.

Dependent upon vehicle position relative to a target waypoint 714, one set of polynomial coefficients is generated. A new set of polynomial coefficients is generated for each different position of vehicle 2A relative to waypoint 714, thereby providing a family of curves, three of which are seen in FIG. 66. As seen in FIG. 66, guidepaths 716A, 716B, and 716C provide three such exemplary guidepaths for a vehicle placed at an initial position 710 and heading 738 near a first waypoint 714A.

Figure 65:
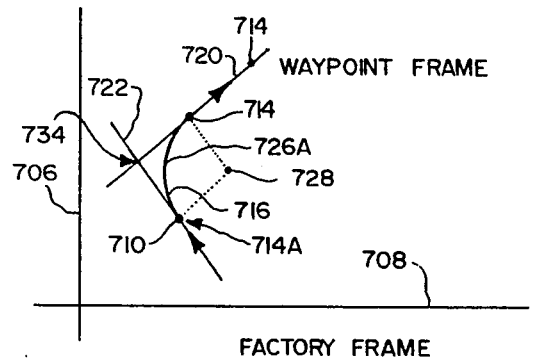
FIG. 65 is a diagram of an "arc" guidepath showing a plot of a turn in a waypoint frame.

Polynomial generation constraints for the polar or curve guidepath are similar to those of the "straight line" case, resulting in an arcing path as seen in FIG. 65. The constraints placed upon the coefficients of the fifth order polynomial in polar coordinates are as follows:

1. Initial heading of path 726A is tangent to the initial heading of AGV 2A at the beginning of the path.
2. The fifth order polynomial describes a continuous path.
3. Final heading of vehicle 2A at 714 is the heading angle provided by AGVC 13 in the message directing vehicle 2A travel and is always zero in waypoint frame 734. Exemplary path 726A, seen in FIG. 65, shows the expected guidepath arc along path 710, 716.

Dependent upon vehicle position relative to an initial waypoint 714A, one set of polar polynomial coefficients is generated. A new set of polynomial coefficients is generated for each different position of vehicle 2A relative to waypoint 714, thereby providing a family of curves.

Figure 96:
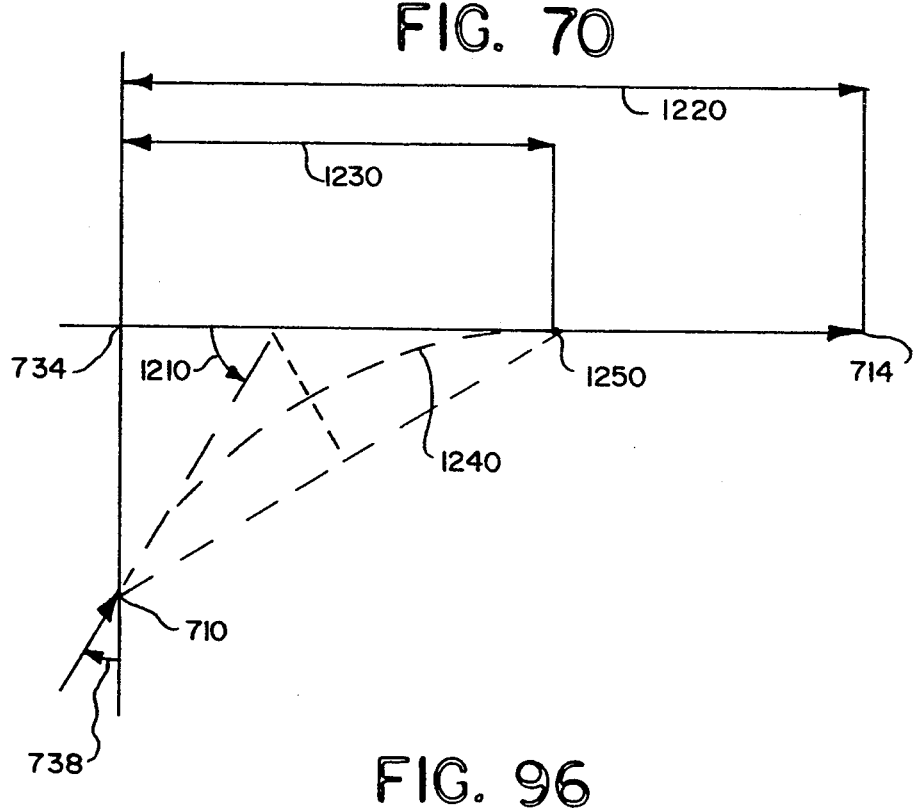
FIG. 96 is a graph showing a proposed path for a vehicle in a waypoint frame wherein measurements are made to determine path selection.

It has been found in the current embodiment, that selection of the type and number of polynomial calculations to define a guidepath is dependent upon initial heading 738 of AGV 2A in waypoint frame 734. If the initial heading 738 in waypoint frame 734 produces an angle with the abscissa of waypoint frame 734 which is an absolute angle less than 20°, a "straight line" calculation is made in Cartesian coordinates. If the heading angle produces an angle with the abscissa of waypoint frame 734 which is greater than or equal to 20°, a decision process, best described by referencing FIG. 96, is followed. As seen in FIG. 96, initial heading 738 results in angle 1210 with the abscissa of waypoint frame 734.

The next step in the decision process calculates a polar or curved path 1240 which tangentially intersects the abscissa of waypoint frame 734 at a point 1250. The intersection 1250 is a distance 1230 from the origin of waypoint frame 734. The distance along the abscissa of waypoint frame 734 to waypoint 714 is seen as line 1220. If the length of line 1230 is less than line 1220, a polar or arc move followed by a straight line move is performed. If line 1230 is equal to line 1220, a single polar move is performed. If line 1230 is greater than line 1220, and if angle 1210 is greater than 65° a compound move, as described hereafter, is performed.

Figure 67:
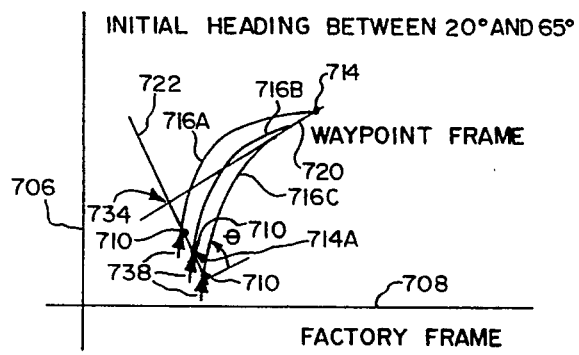
FIG. 67 is a diagram showing a family of three guidepaths where a turn of the vehicle is executed from different relative positions in a waypoint frame.

Another selecting criteria, is the use of X,Y and the heading angle 1210 in waypoint frame 734 coordinates. The ratio of X/Y and tangent of heading angle 1210 is calculated. If heading angle 1210 is between 20° and 65° and the ratio is less than 0.35 a "straight line" move is made. A family of three arch curves are seen in FIG. 67. The ratio provides an estimate of the overshoot of the vehicle and the abscissa of waypoint frame 734. If the ratio is greater than 0.35 and the heading angle is between 20° and 65°, a "straight line" path followed by a polar move is performed.

Figure 68:
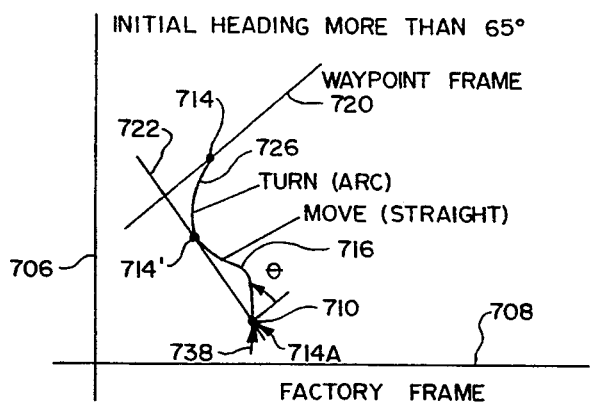
FIG. 68 is a diagram of a complex guidepath formed by successively calculated guidepaths comprising in seriatim a "straight line" and then an arcing or curved guidepath.

For those cases where the absolute value of angle 1210 is greater than 65° and line 1230 is greater than line 1220, as seen in FIG. 96, the guidepath is defined as a combination of "straight line" and curve moves. A guidepath is seen in FIG. 68 wherein the required waypoint 714 target position and direction are not achievable using a single fifth order polynomial calculated guidepath. In the case of the path requirements seen in FIG. 68, the path is divided into two segments, 716 and 726, the calculated path defining coefficients being calculated in Cartesian coordinates for first path 716 and in polar coordinates for second path 726, thereby achieving the necessary waypoint 714 position and exit heading.

The calculation of distances in waypoint frame 734 coordinates from factory frame 736 coordinates is:

$$\begin{bmatrix} X \\ Y \end{bmatrix}_V^W = \begin{bmatrix} \cos\theta & \sin\theta \\ -\sin\theta & \cos\theta \end{bmatrix} \begin{bmatrix} X_D - X_I \\ Y_D - Y_I \end{bmatrix}$$

Where:

X,Y are distances in waypoint frame 734 coordinates.

$\theta$ is the angle between the vehicle 2A and waypoint frame 734.

$X_D, Y_D$ are destination or waypoint 714 coordinates in the factory frame 736.

$X_I, Y_I$ are coordinates of initial vehicle 2A position in factory frame 736 coordinates.

For precision in calculation of positions in the currently preferred embodiment of a marker 6 in the factory frame 736, a three byte field is used in all position coordinate determinations yielding a range of 8,368,607 in units of 1/20 of an inch. Thus, the position measurement range is 34,952 feet or 10,653.5 meters. A two byte field is used for heading determinations, whereby a precision of 0–359.99 is achieved for calculational purposes.

AGV 2A Central Processing Units

Figure 77:
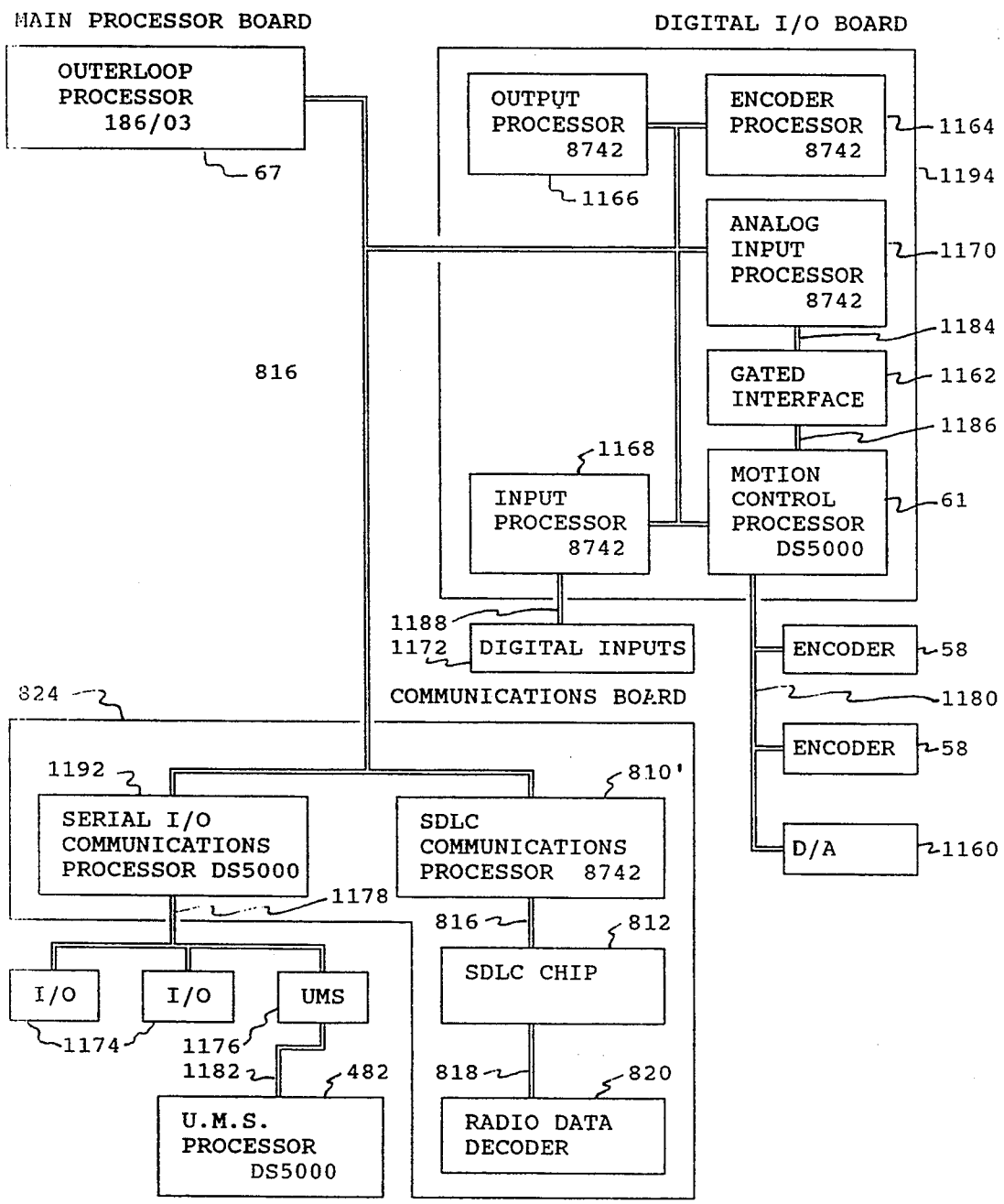
FIG. 77 is a simplified block diagram showing the plurality of microprocessors used in guidance and control of the vehicle, interconnecting bus lines between the processors, and some of the input devices which connect to the processors.
Figure 79:
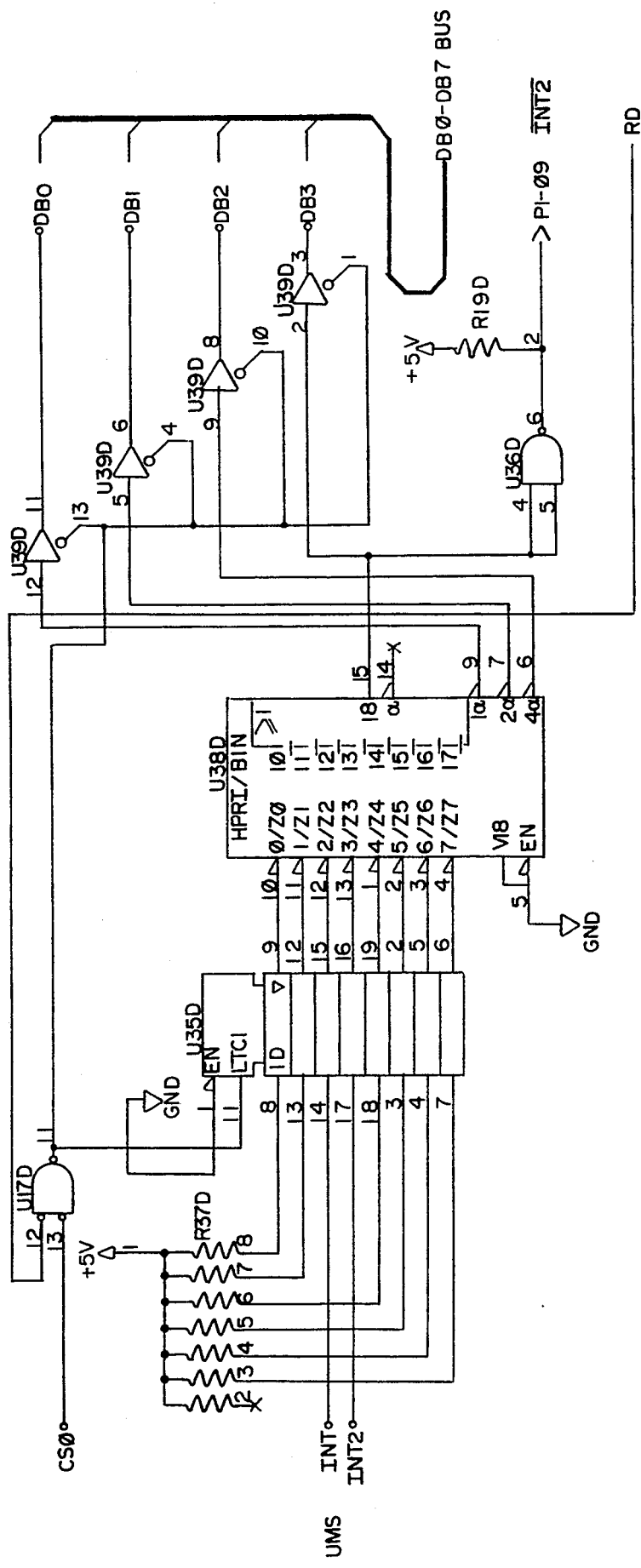
Figure 80A:
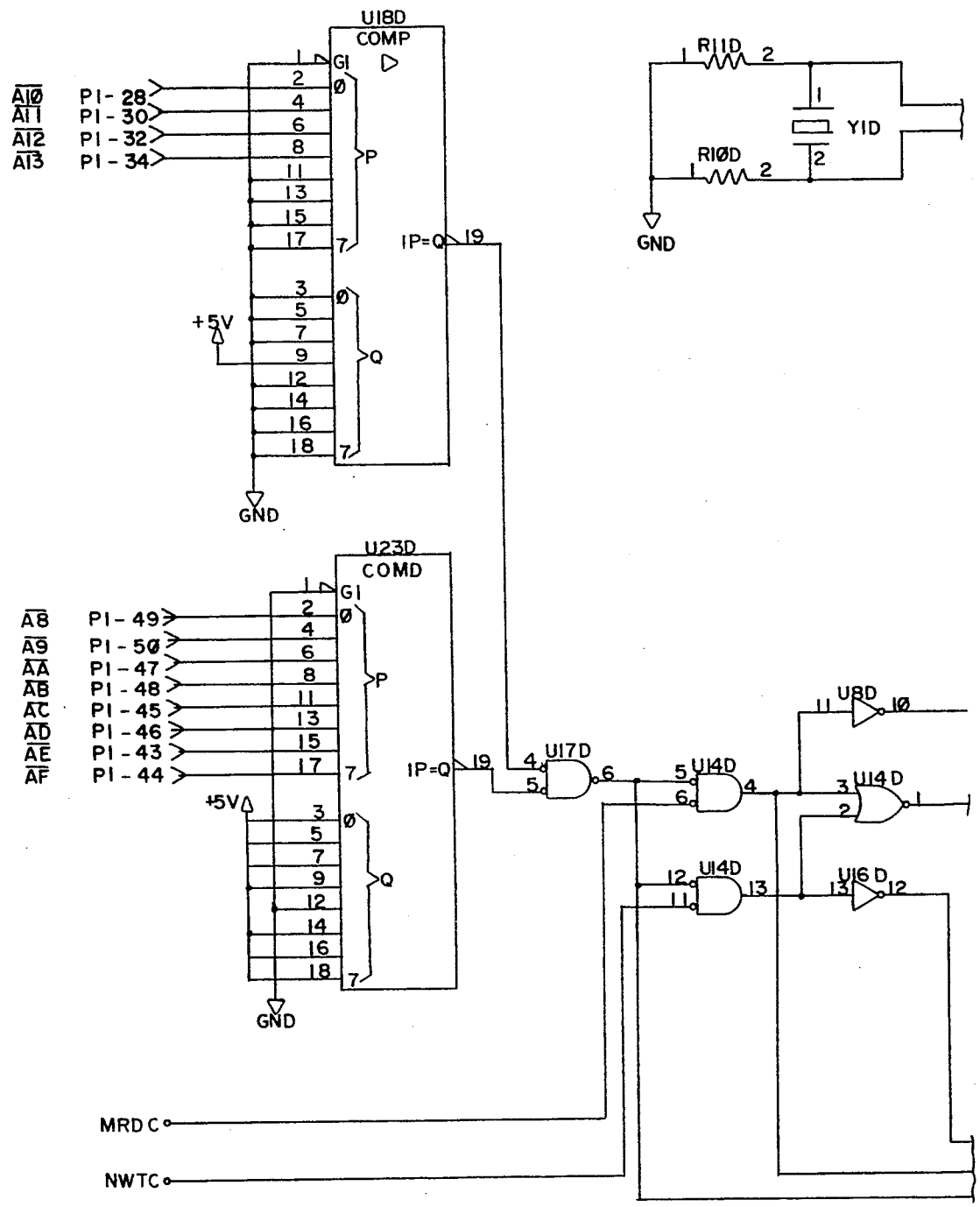
Figure 80B:
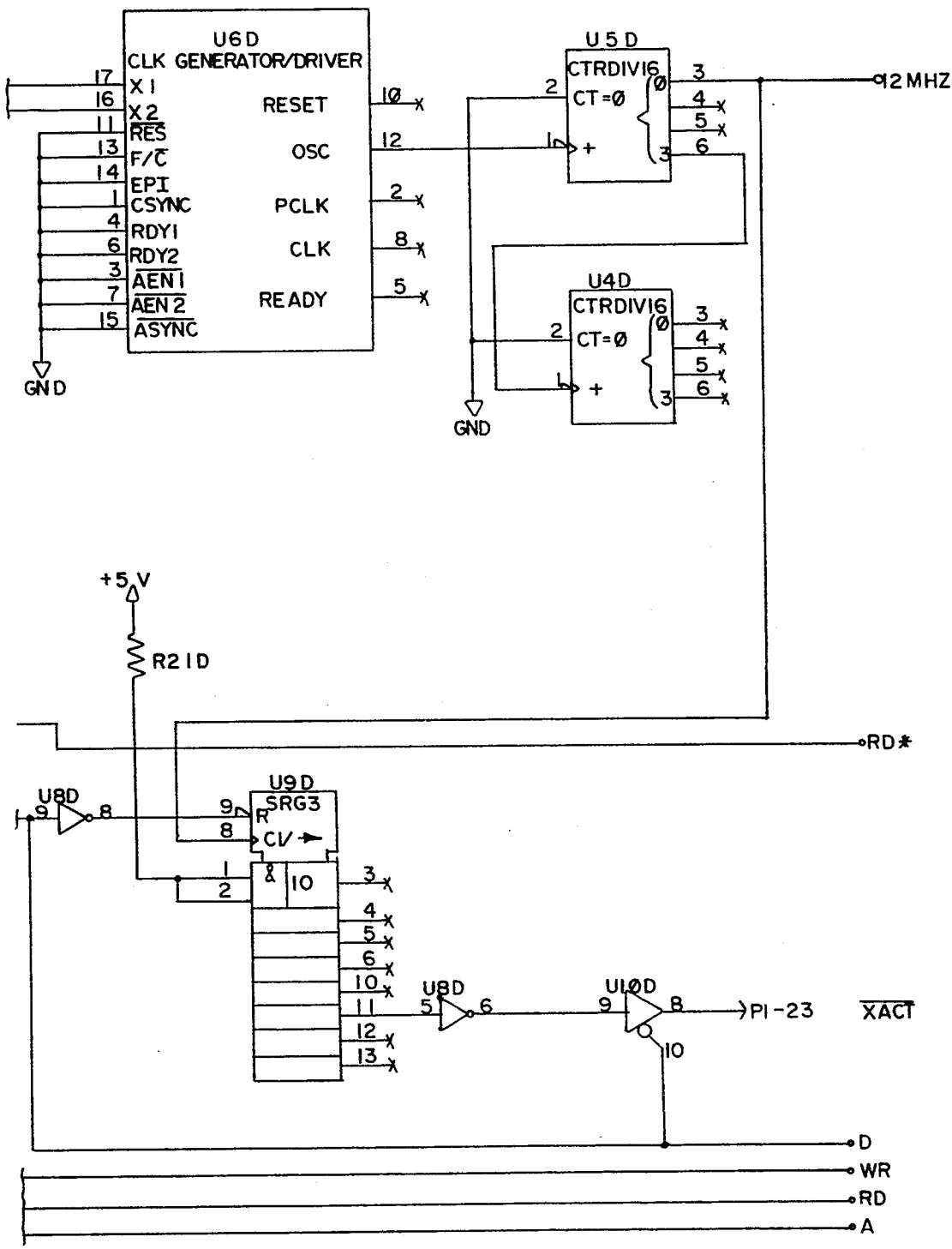
Figure 81A:
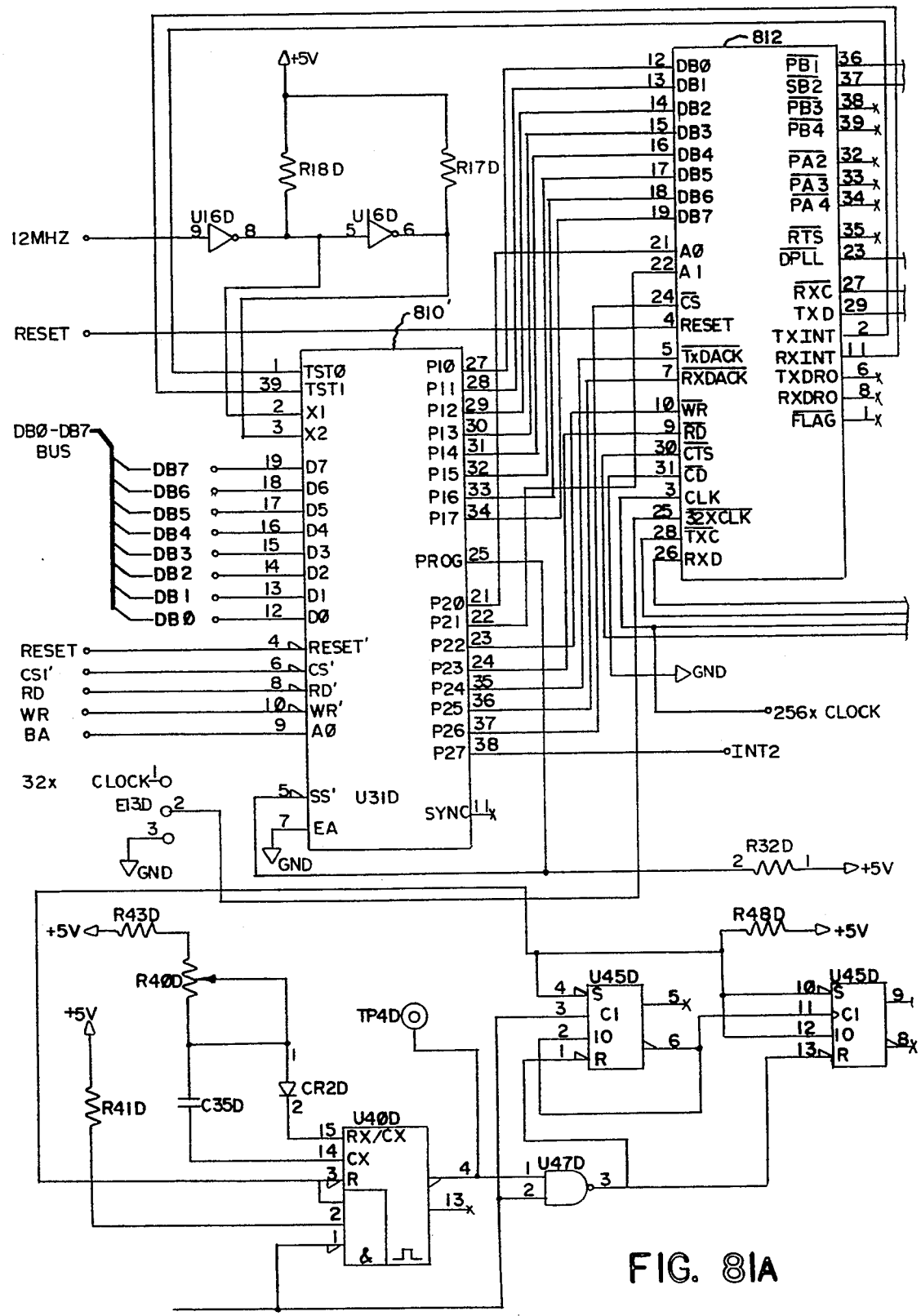
Figure 8I:
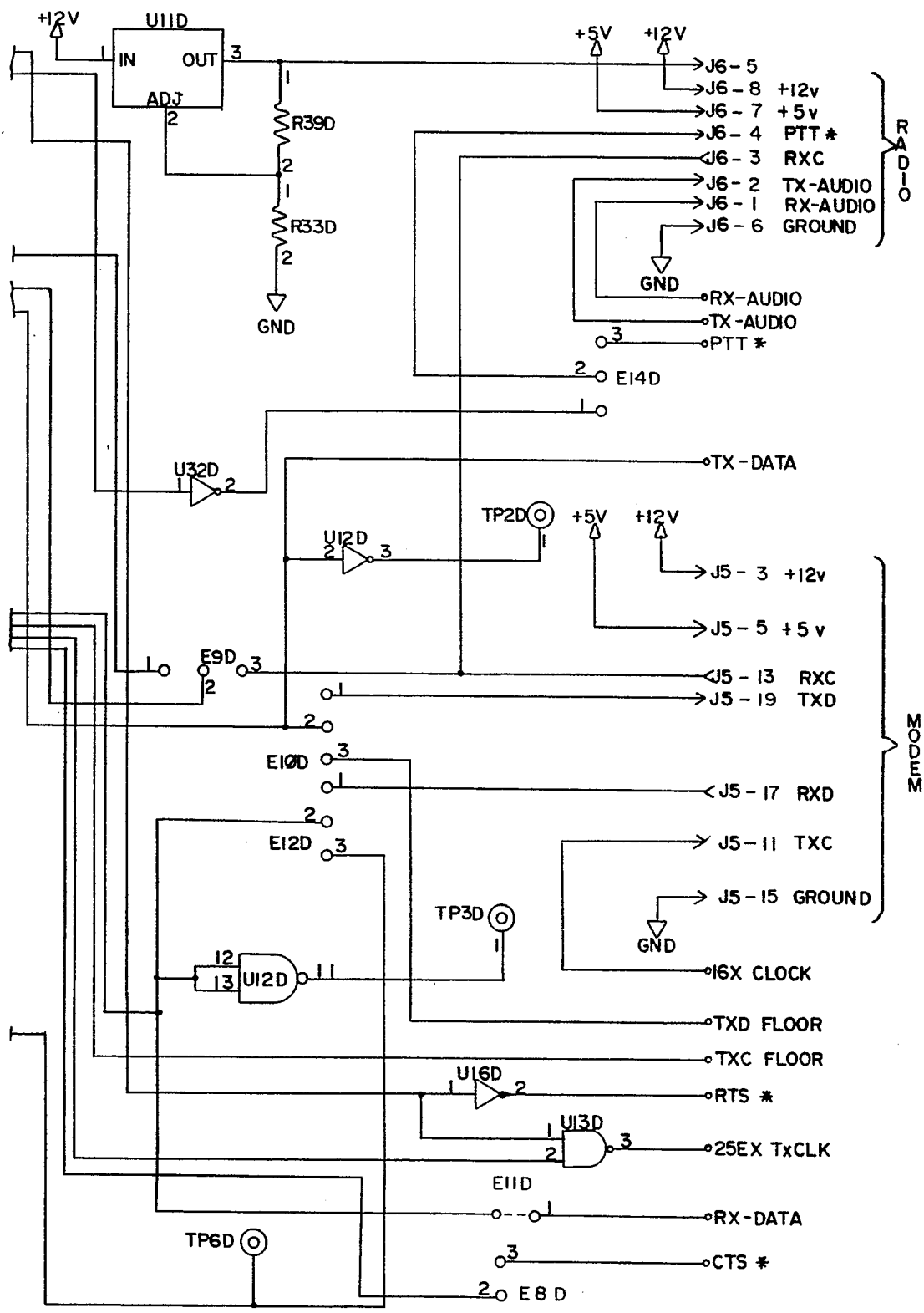
Figure 82A:
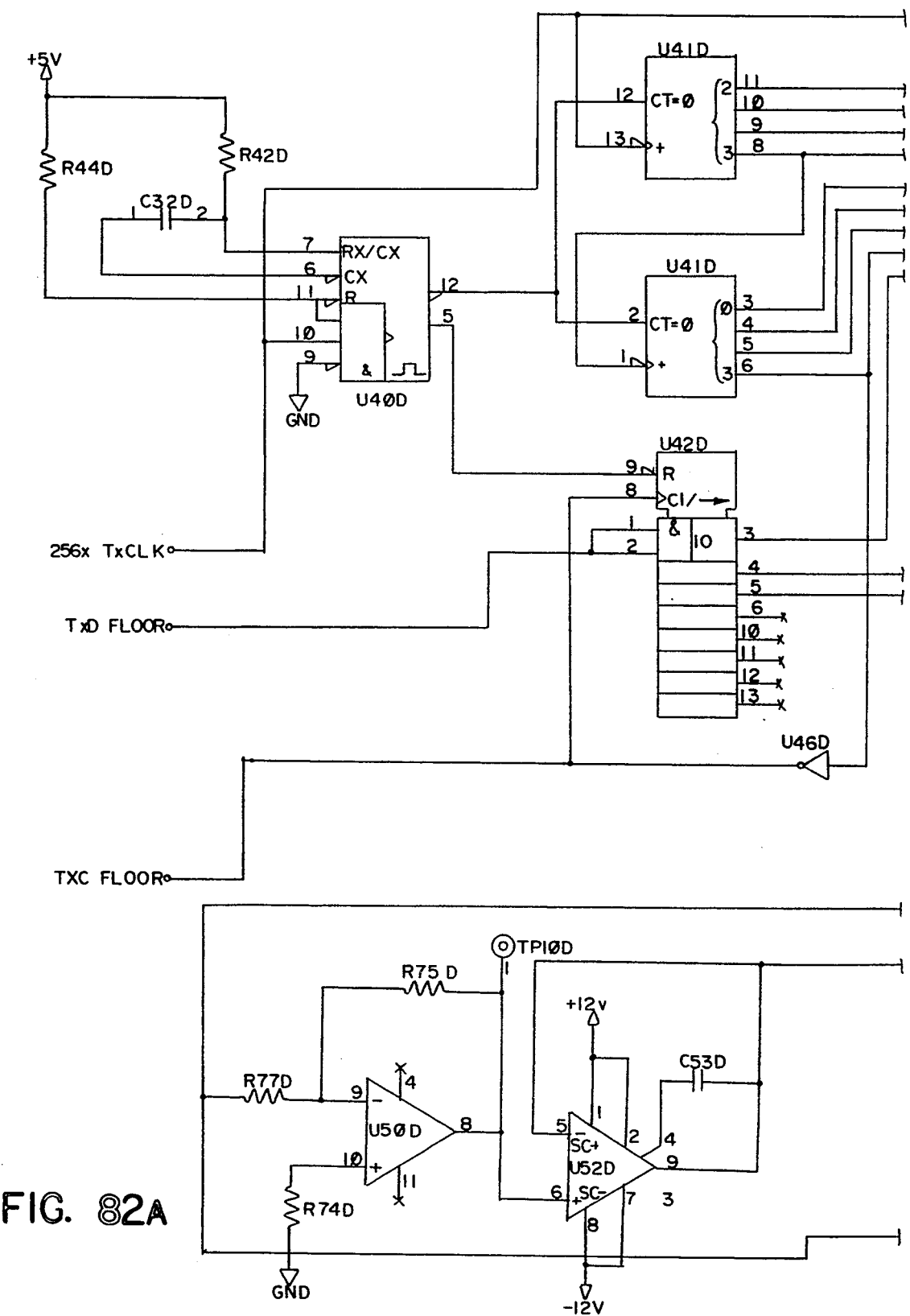
Figure 82B:
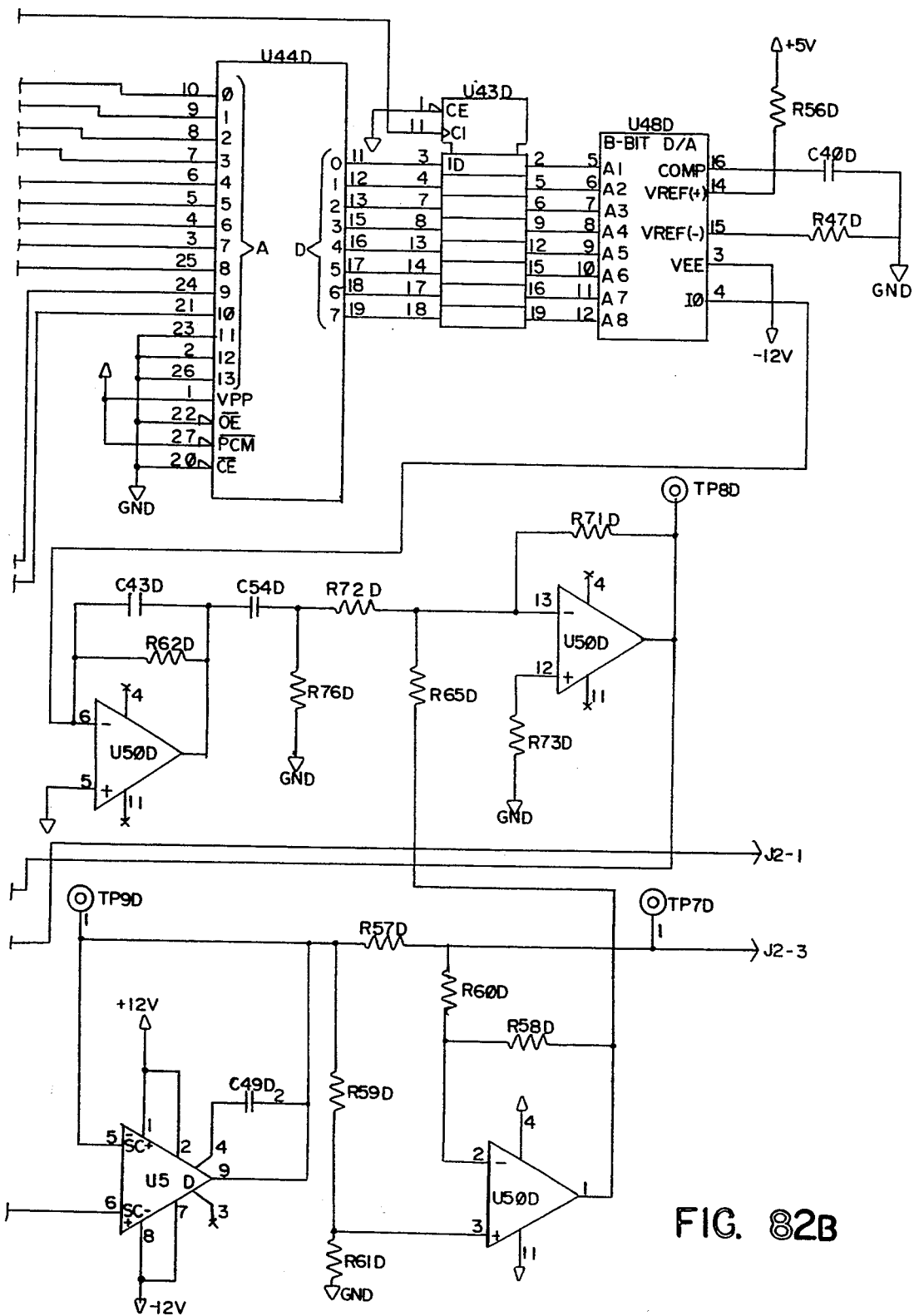
Figure 83:
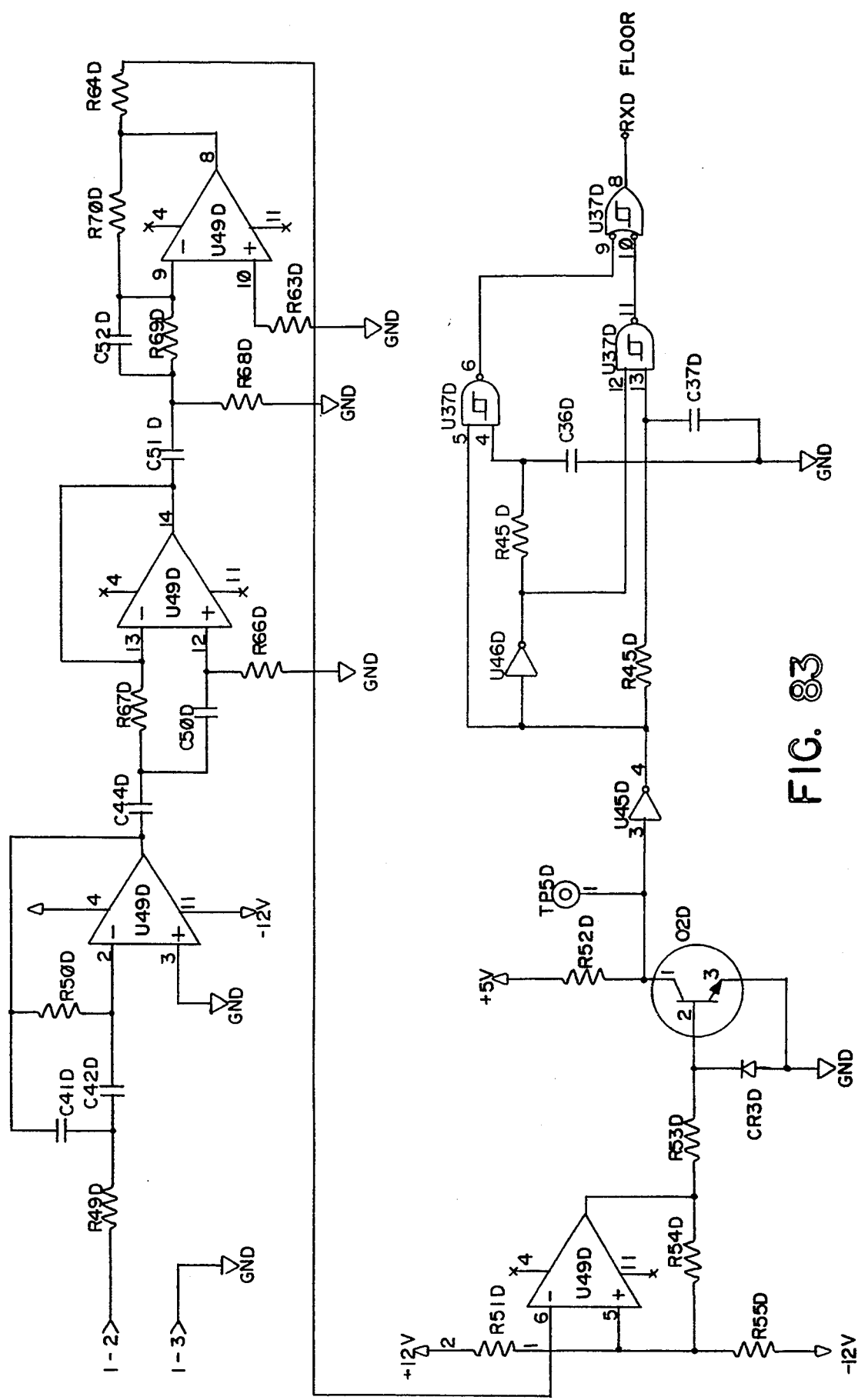
Figure 84A:
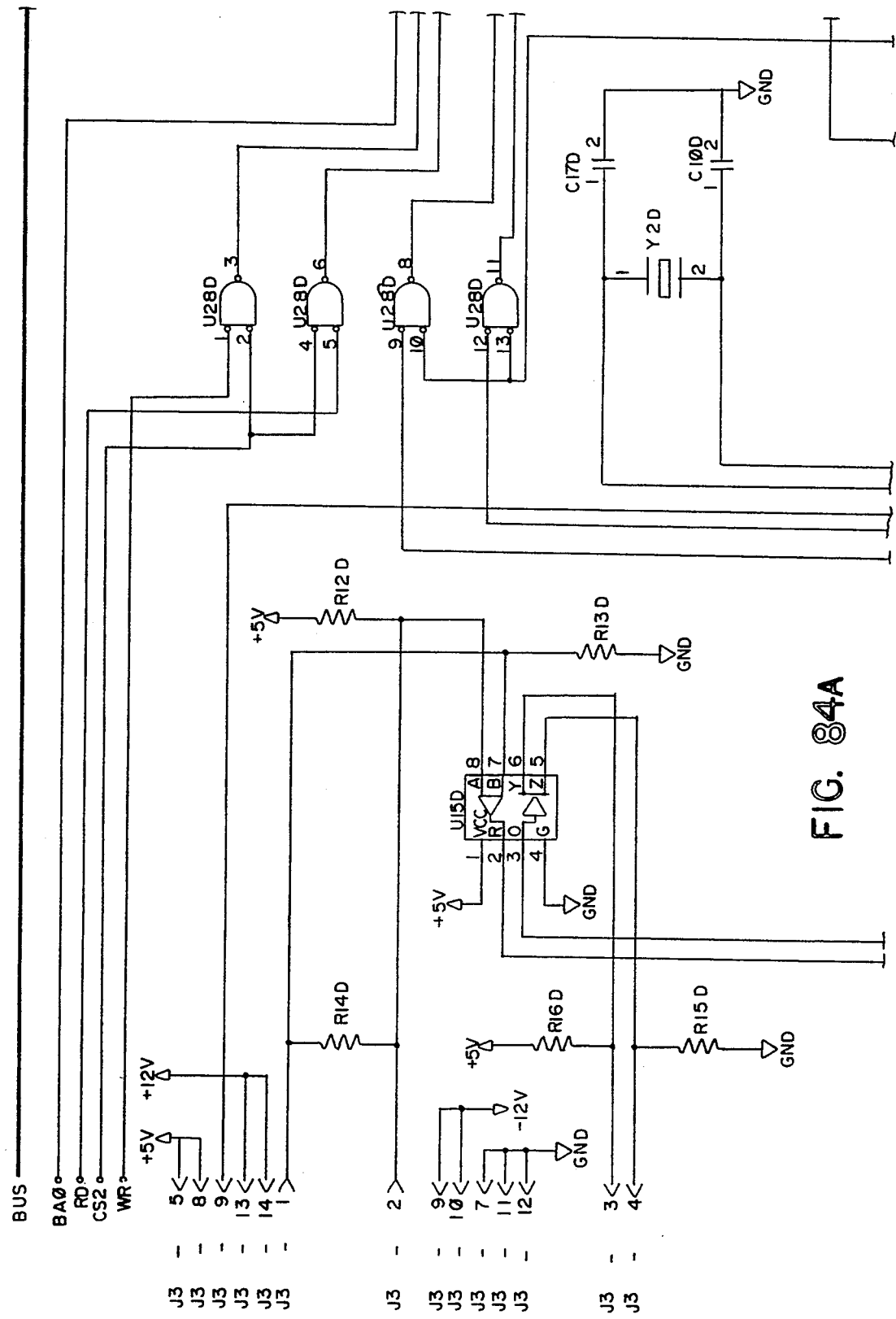
Figure 84B:
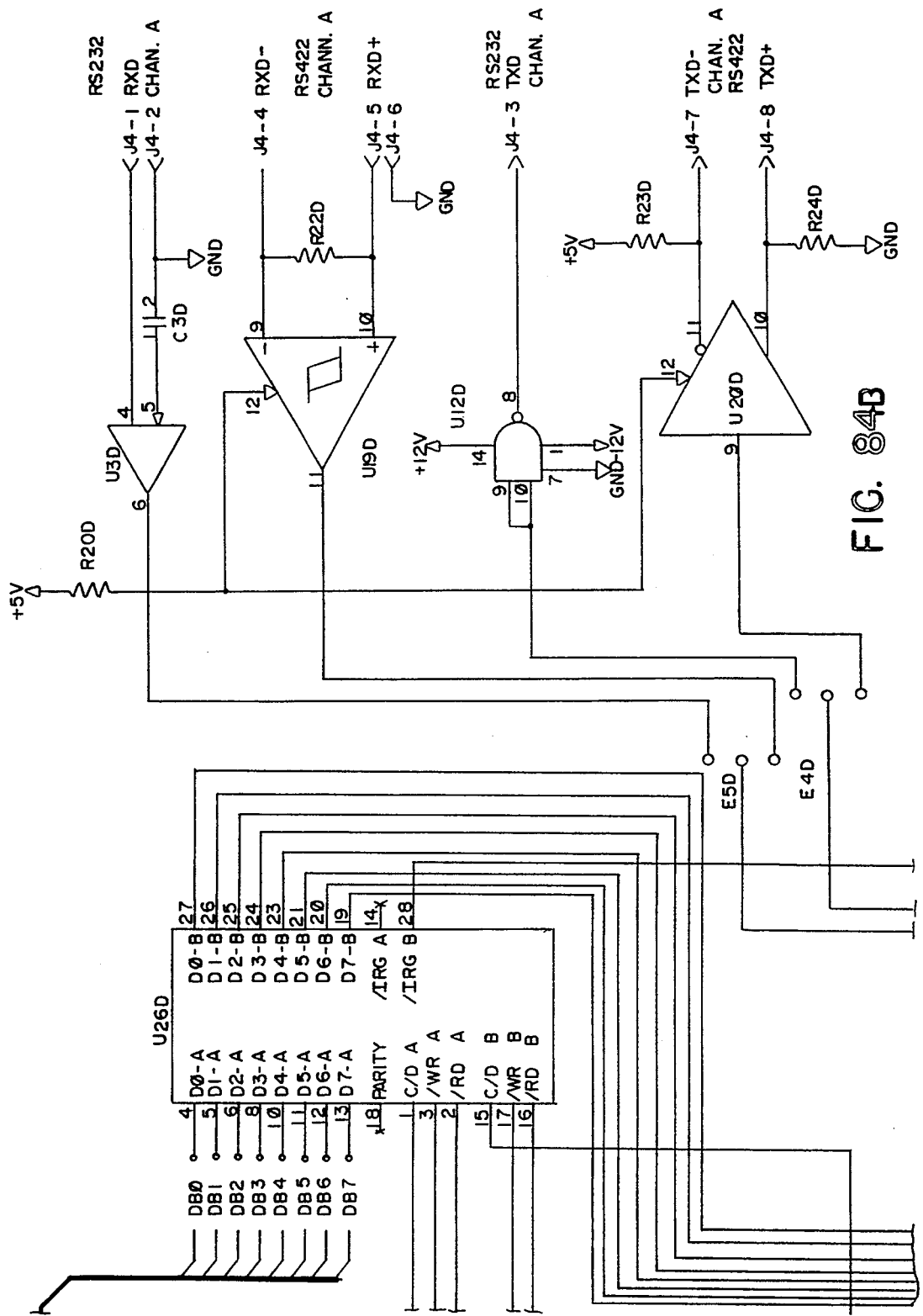
Figure 84C:
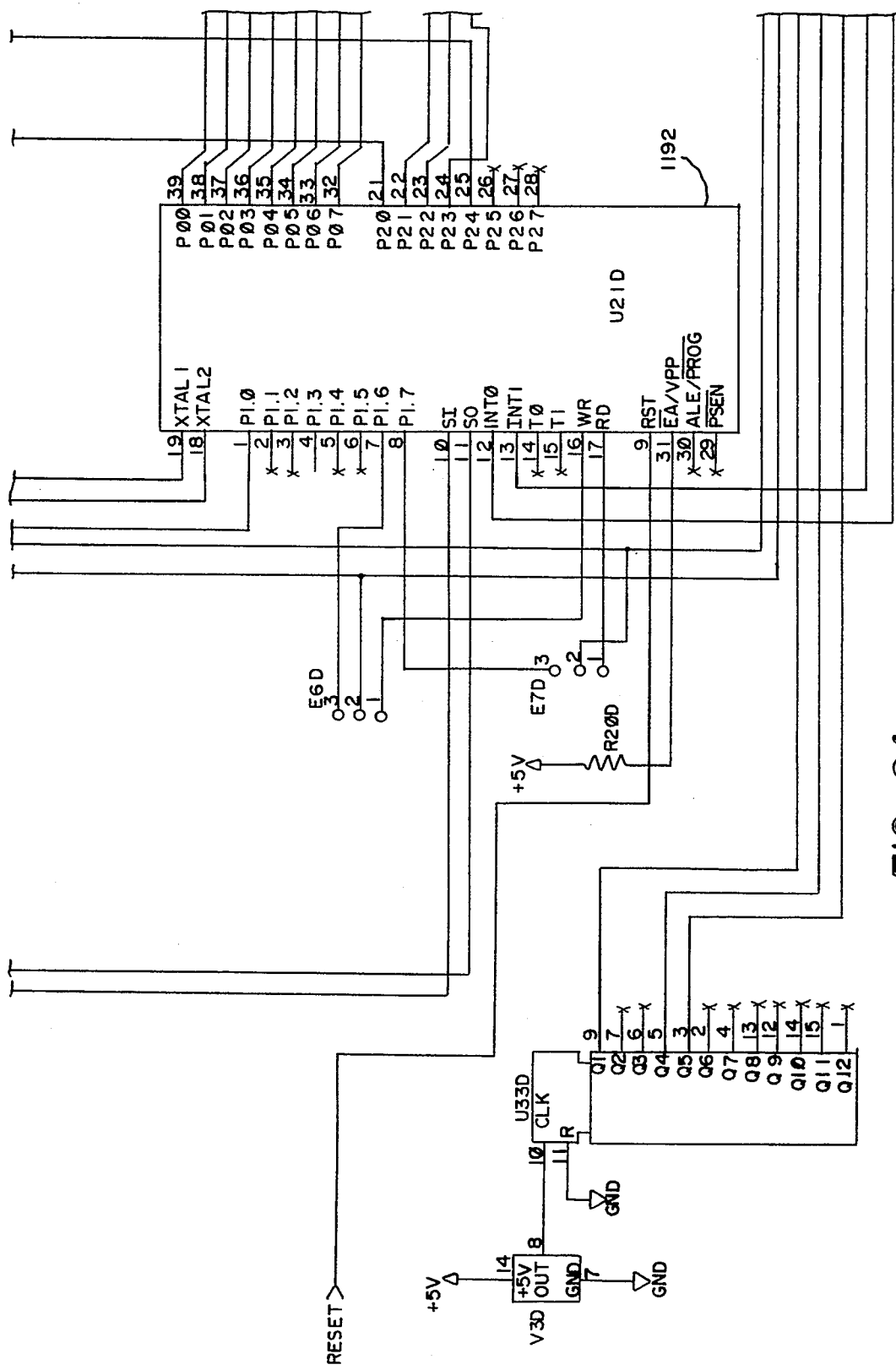
Figure 84D:
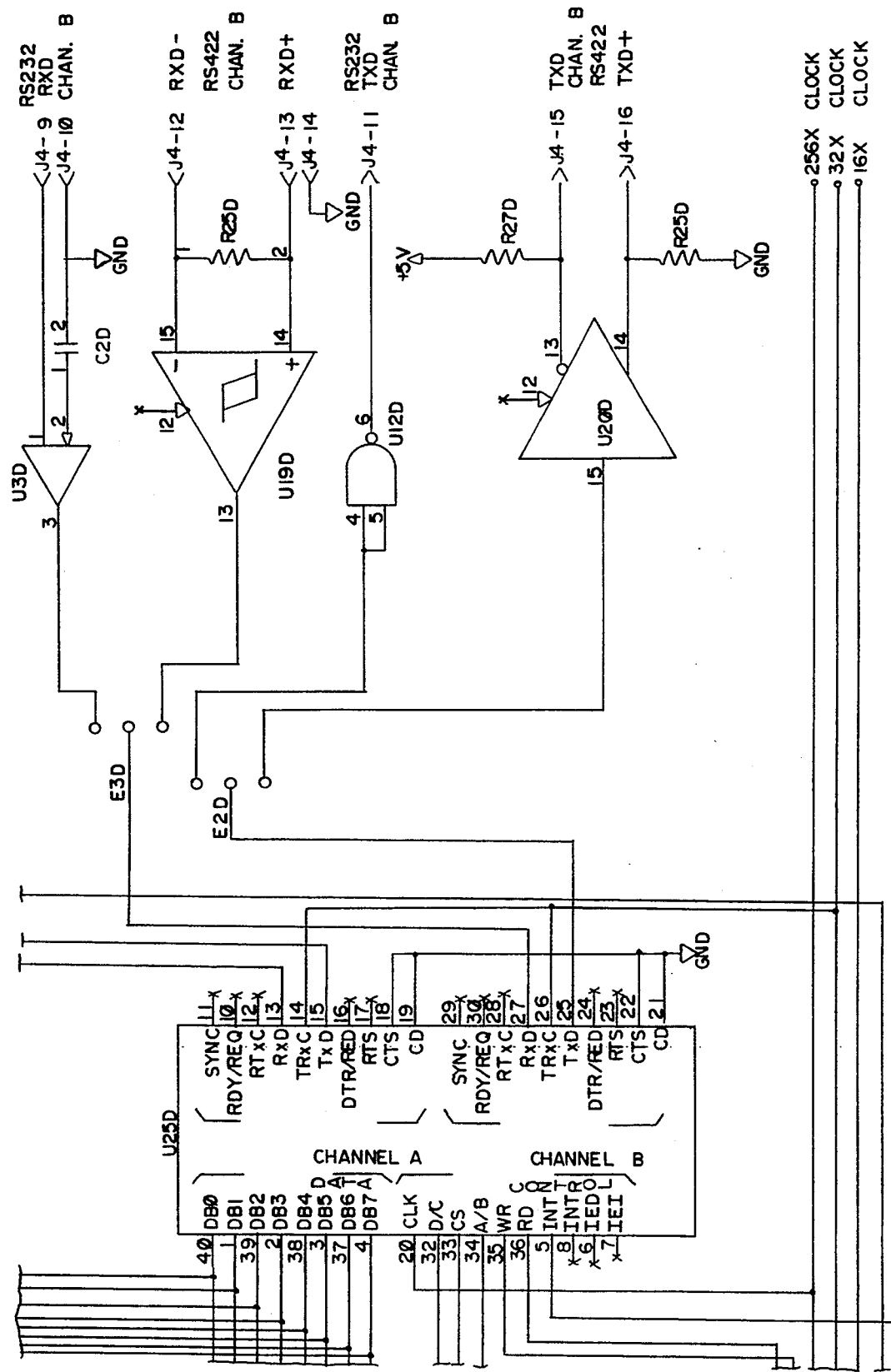
Figure 85A:
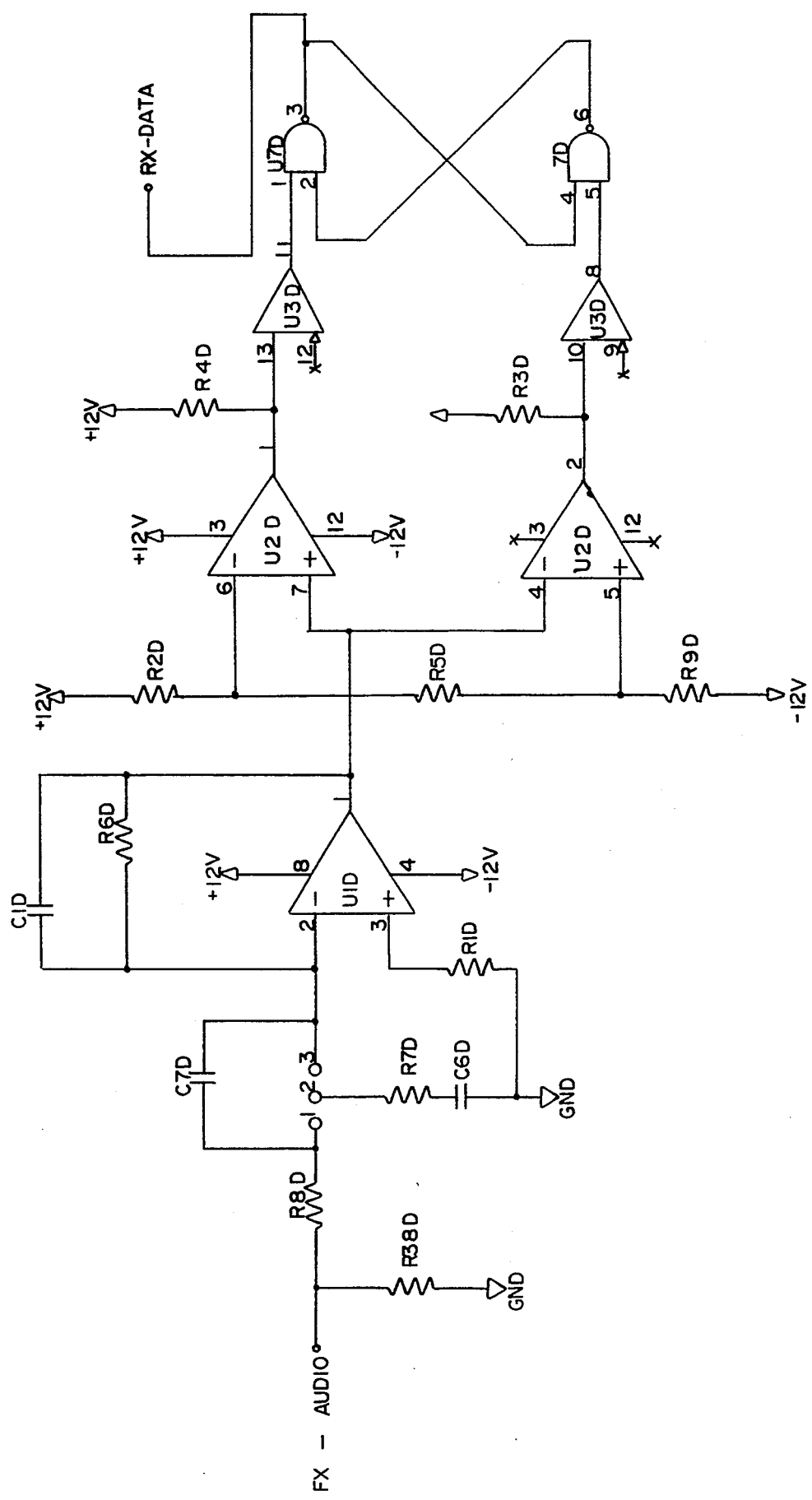
Figure 85B:
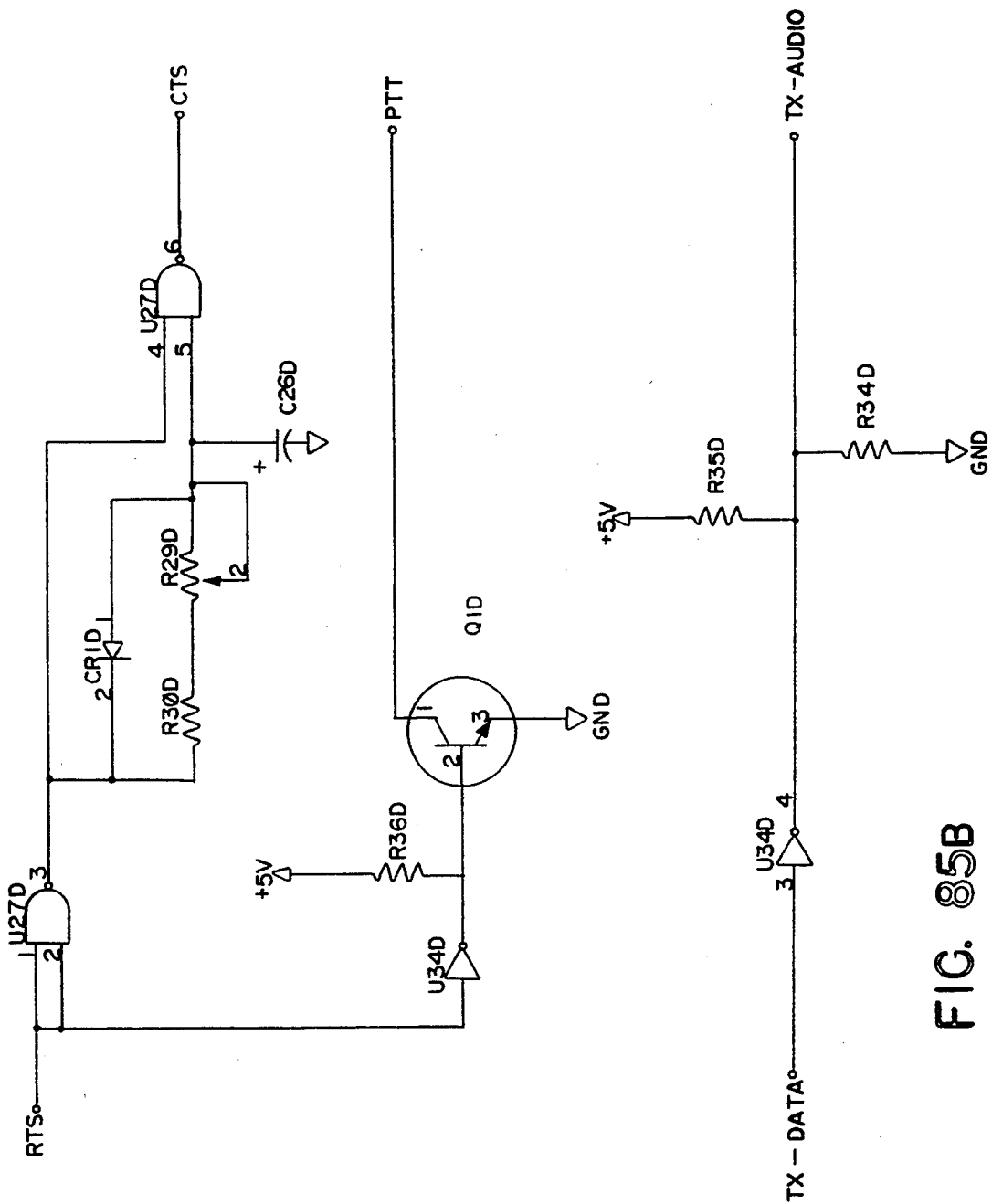
Figure 87:
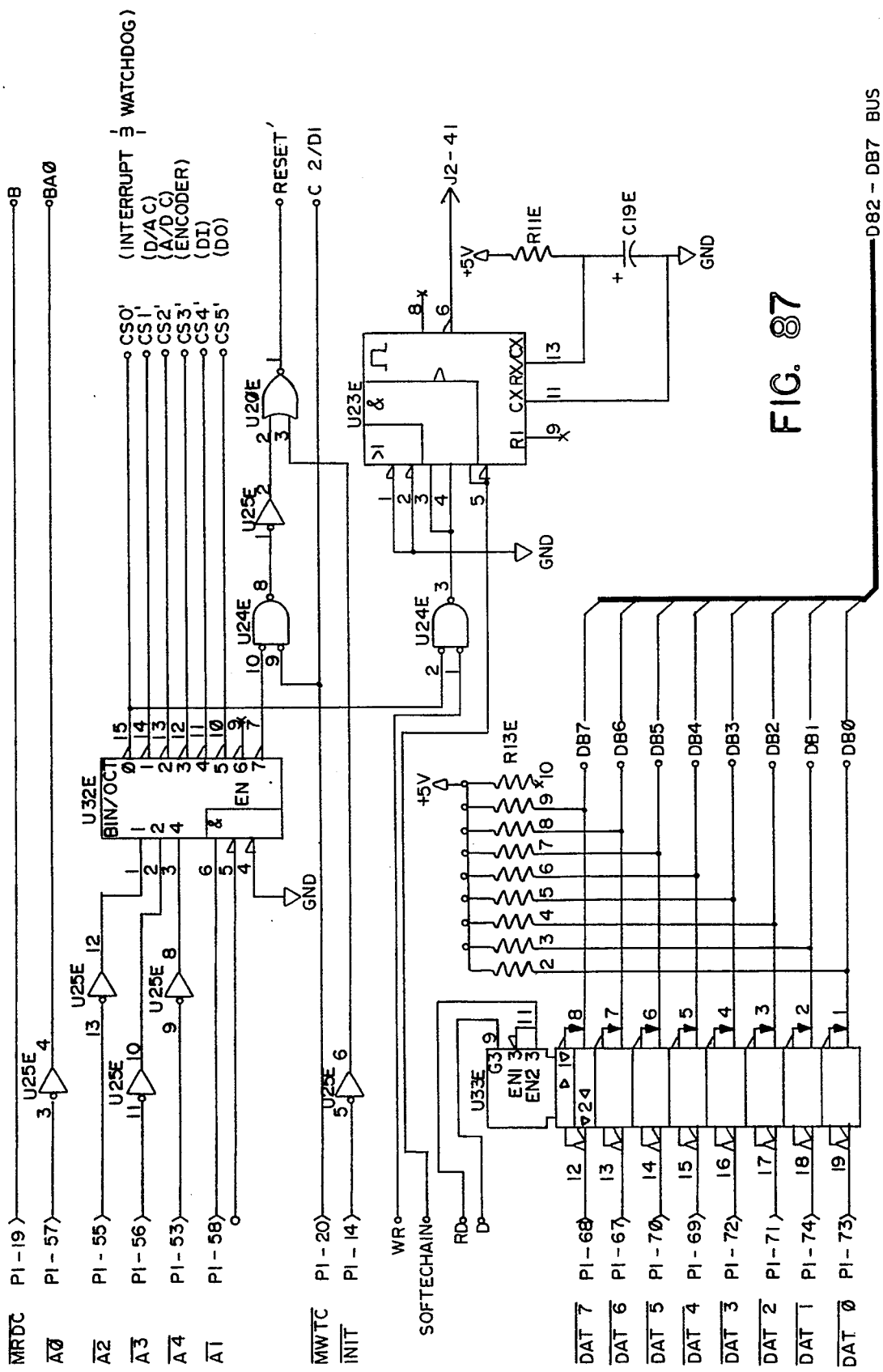
FIGS. 87, 88, 89, 90A–B, 91A–B, 92A–B, 93A–B, 94A–B and 95 provide a schematic of a digital I/O board, comprising five central processing units, contained in each vehicle.
Figure 88:
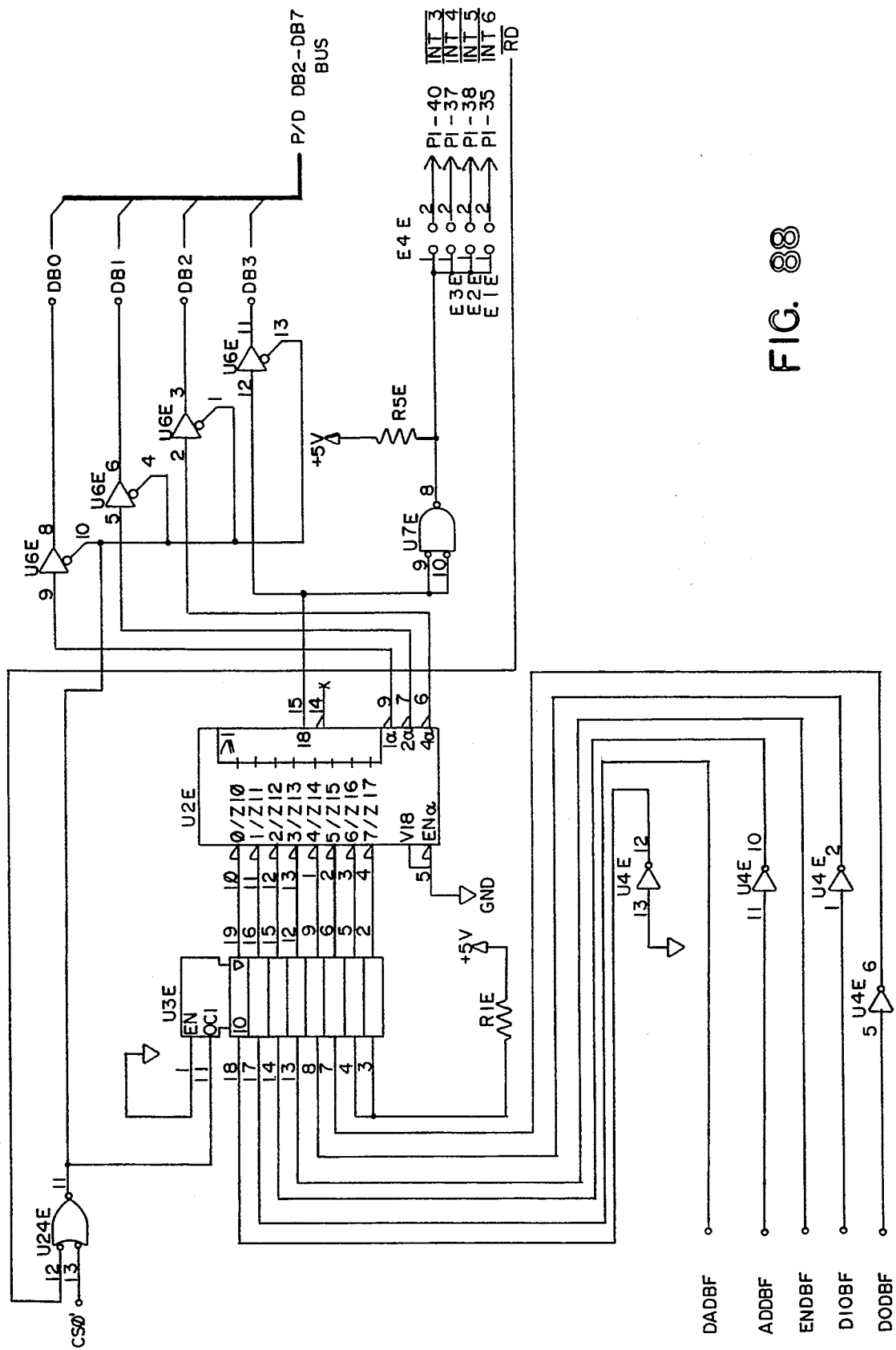
Figure 89:
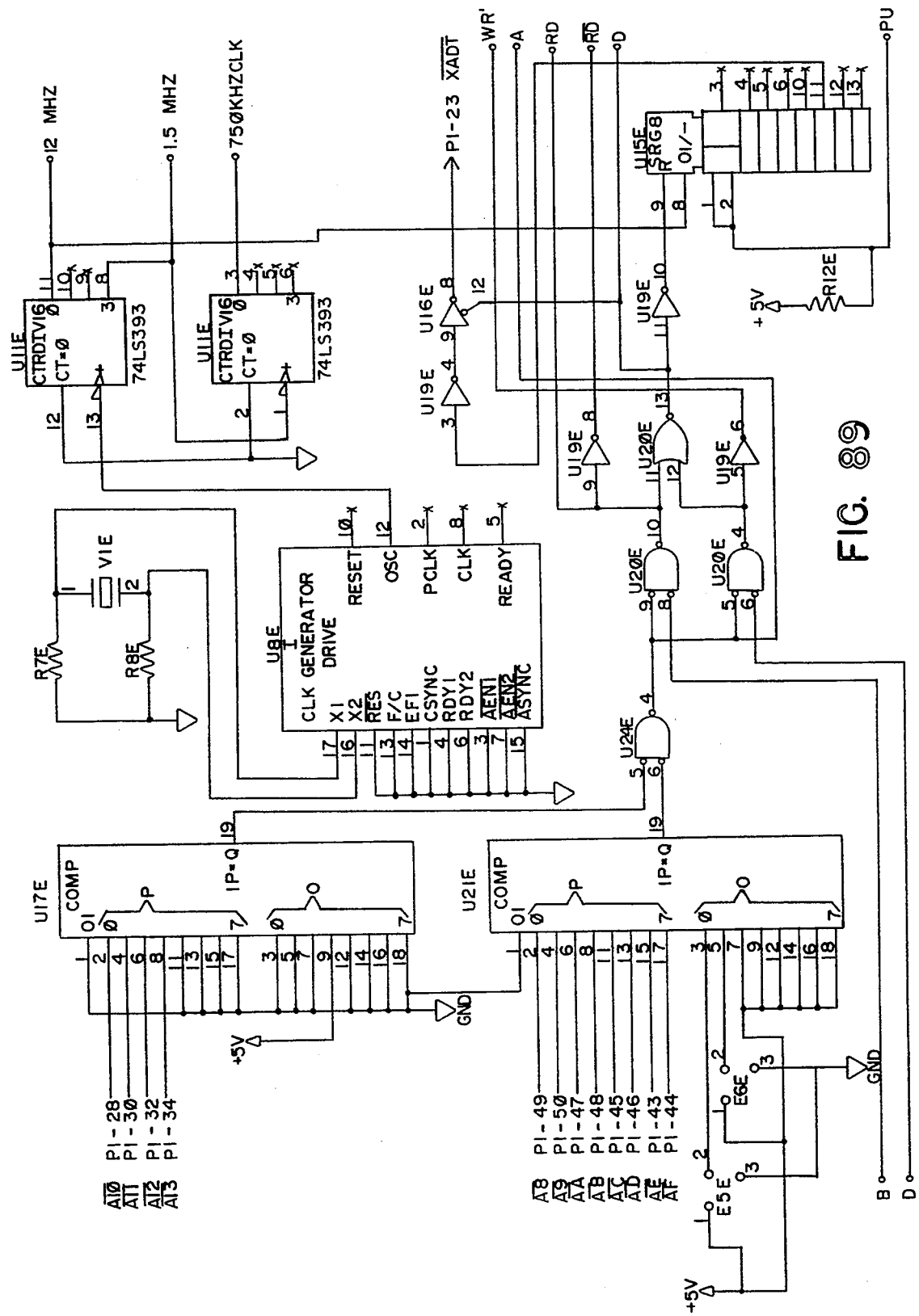
Figure 91:
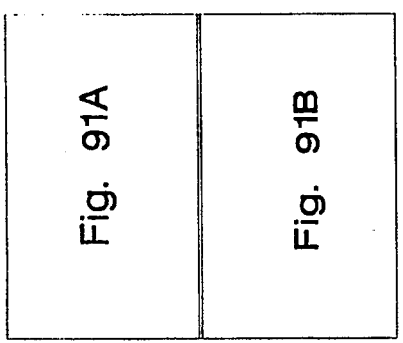
Figure 90:
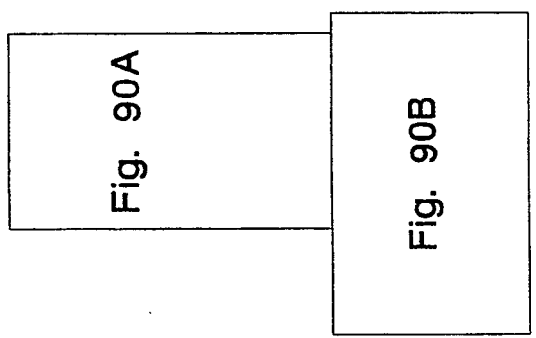
Figure 94:
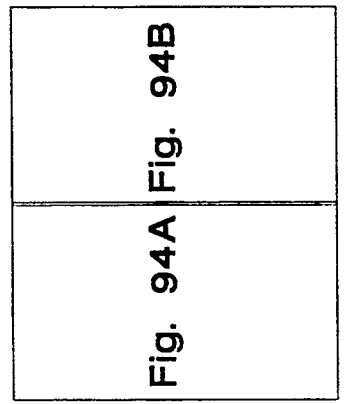
Figure 93:
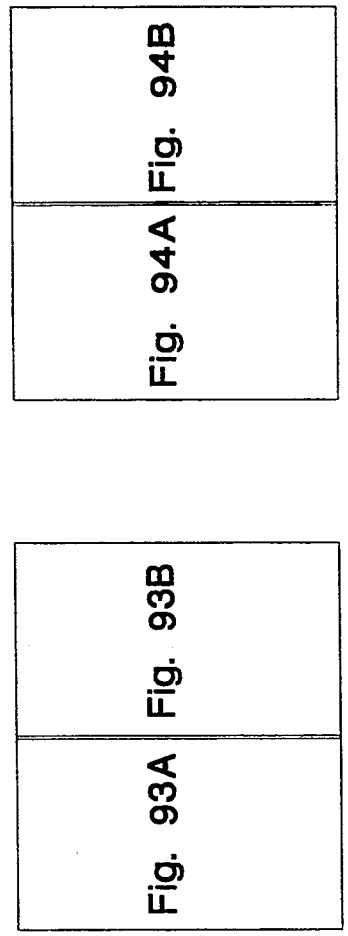
Figure 92:
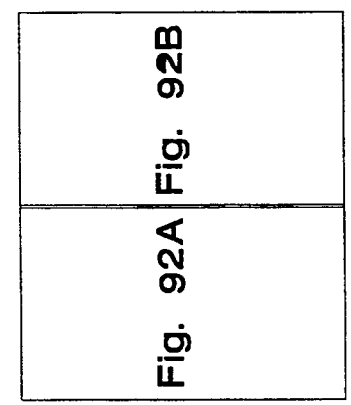
Figure 90A:
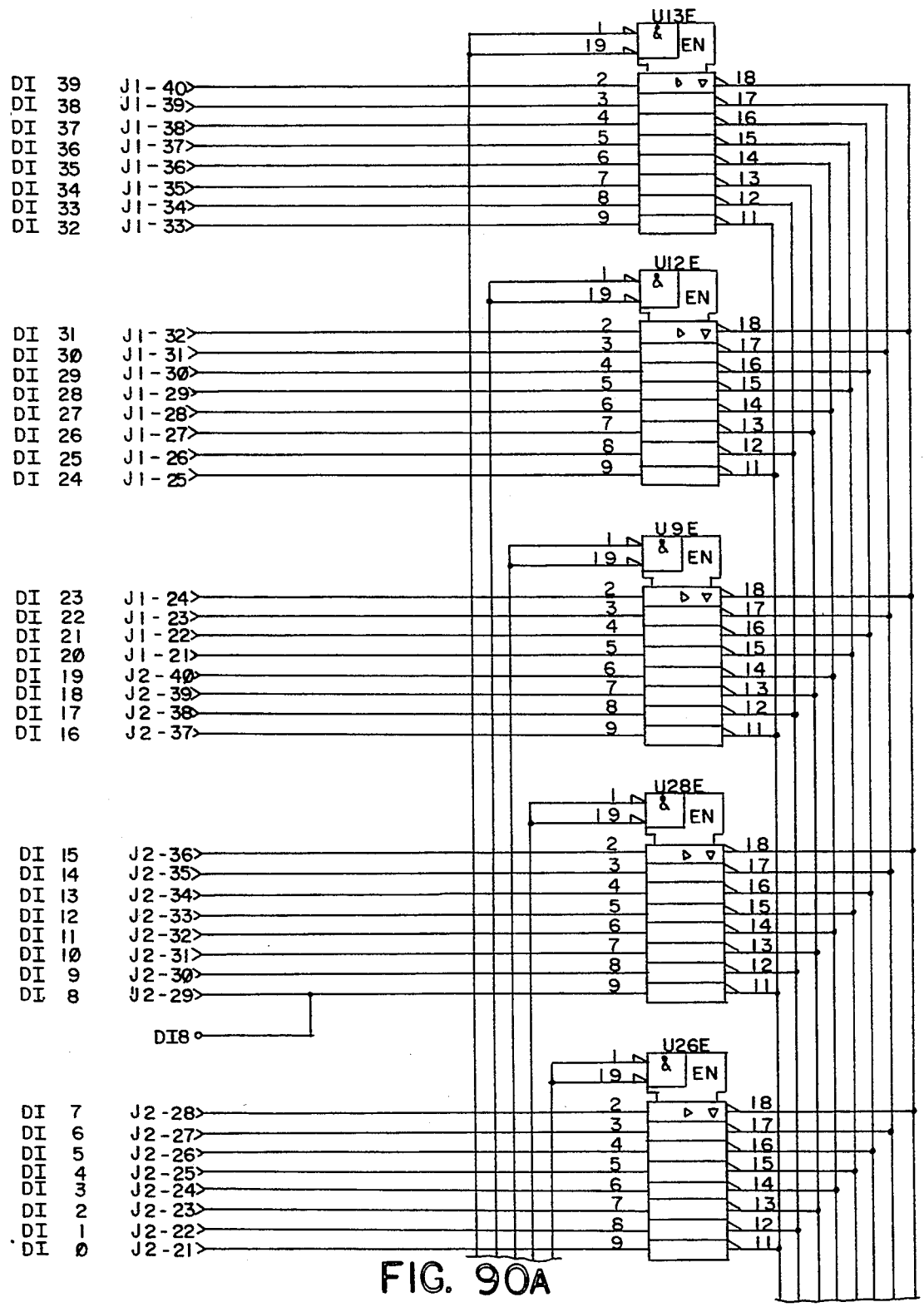
Figure 90B:
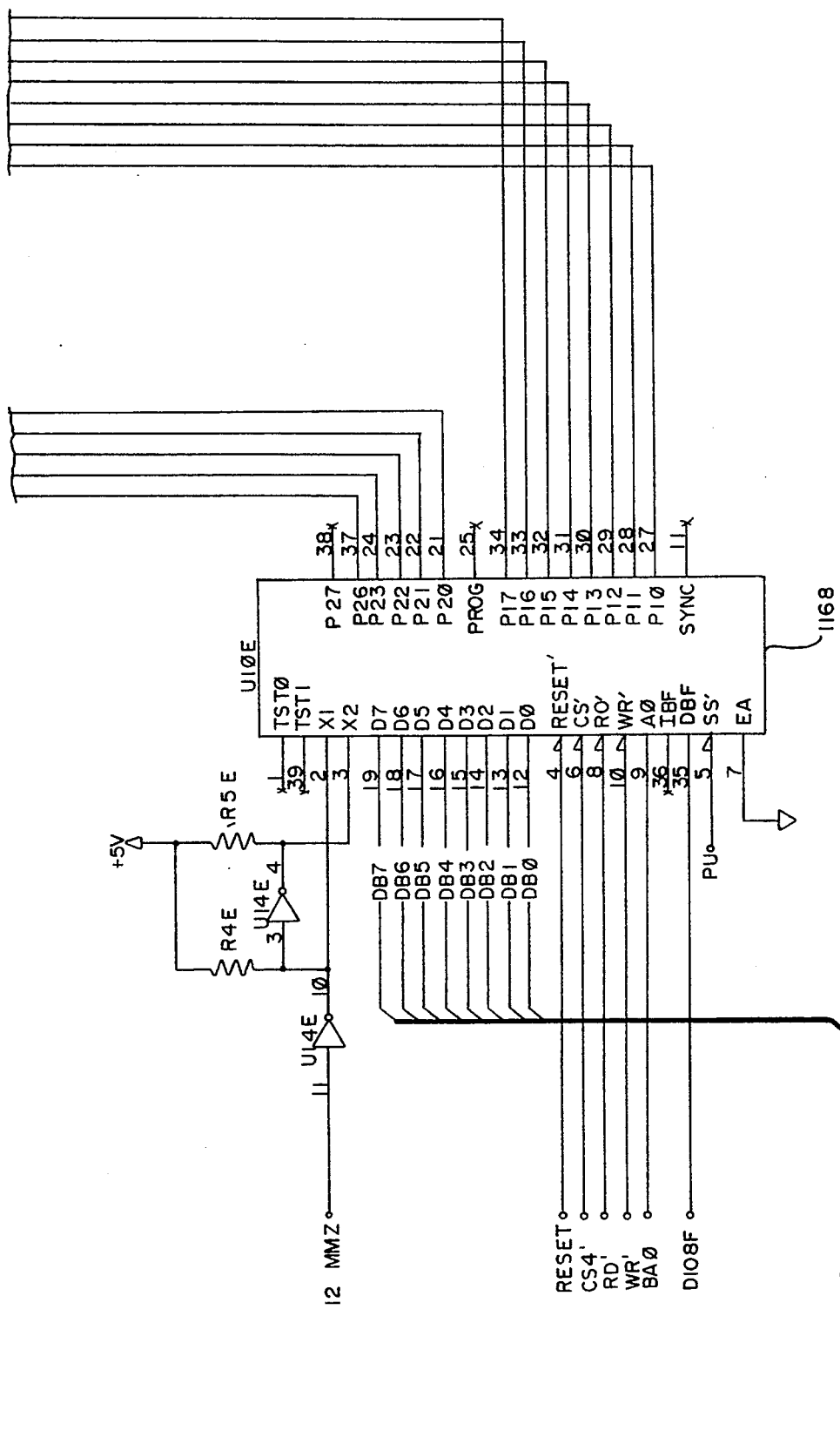
Figure 91A:
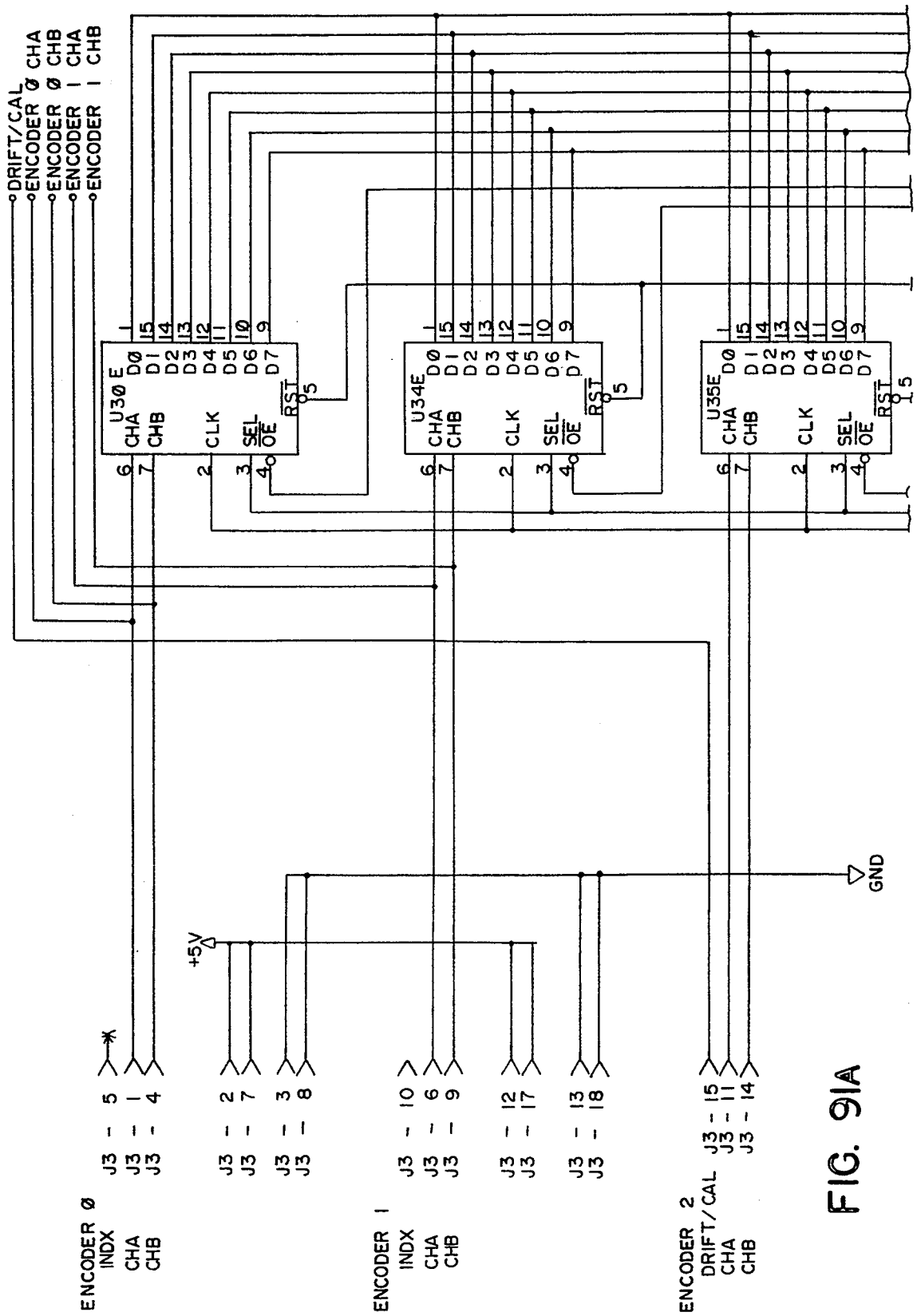
Figure 91B:
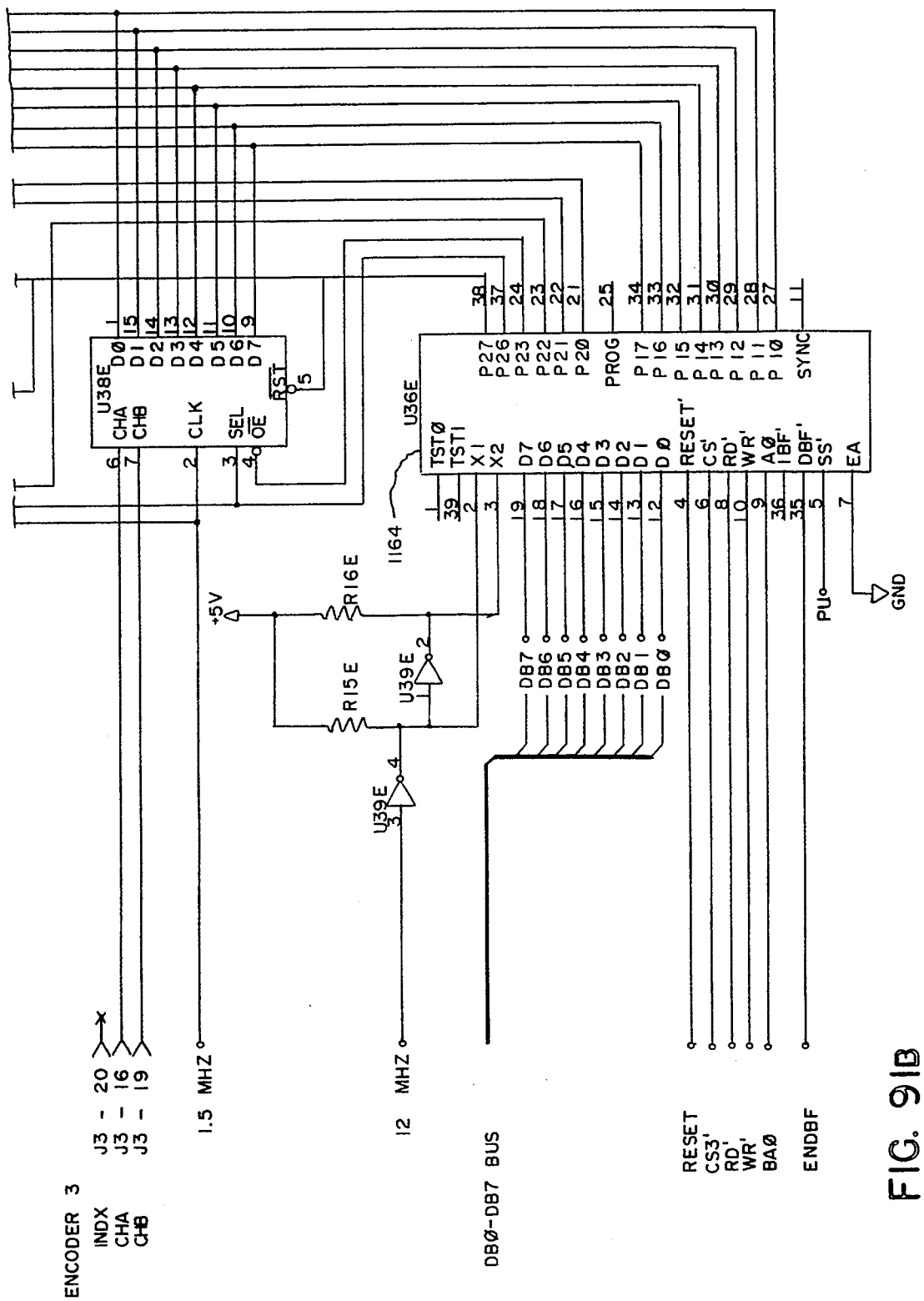
Figure 92A:
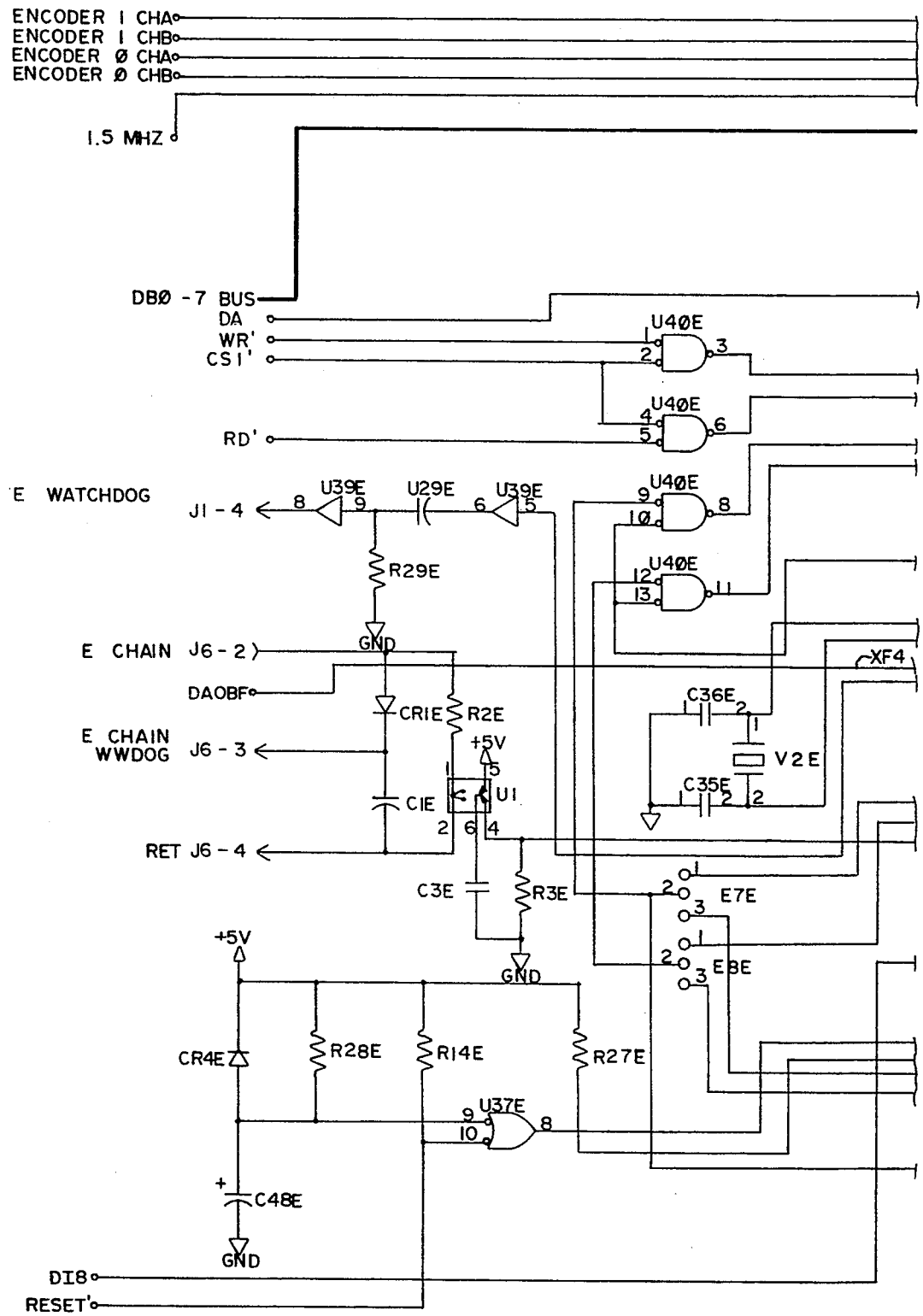
Figure 92B:
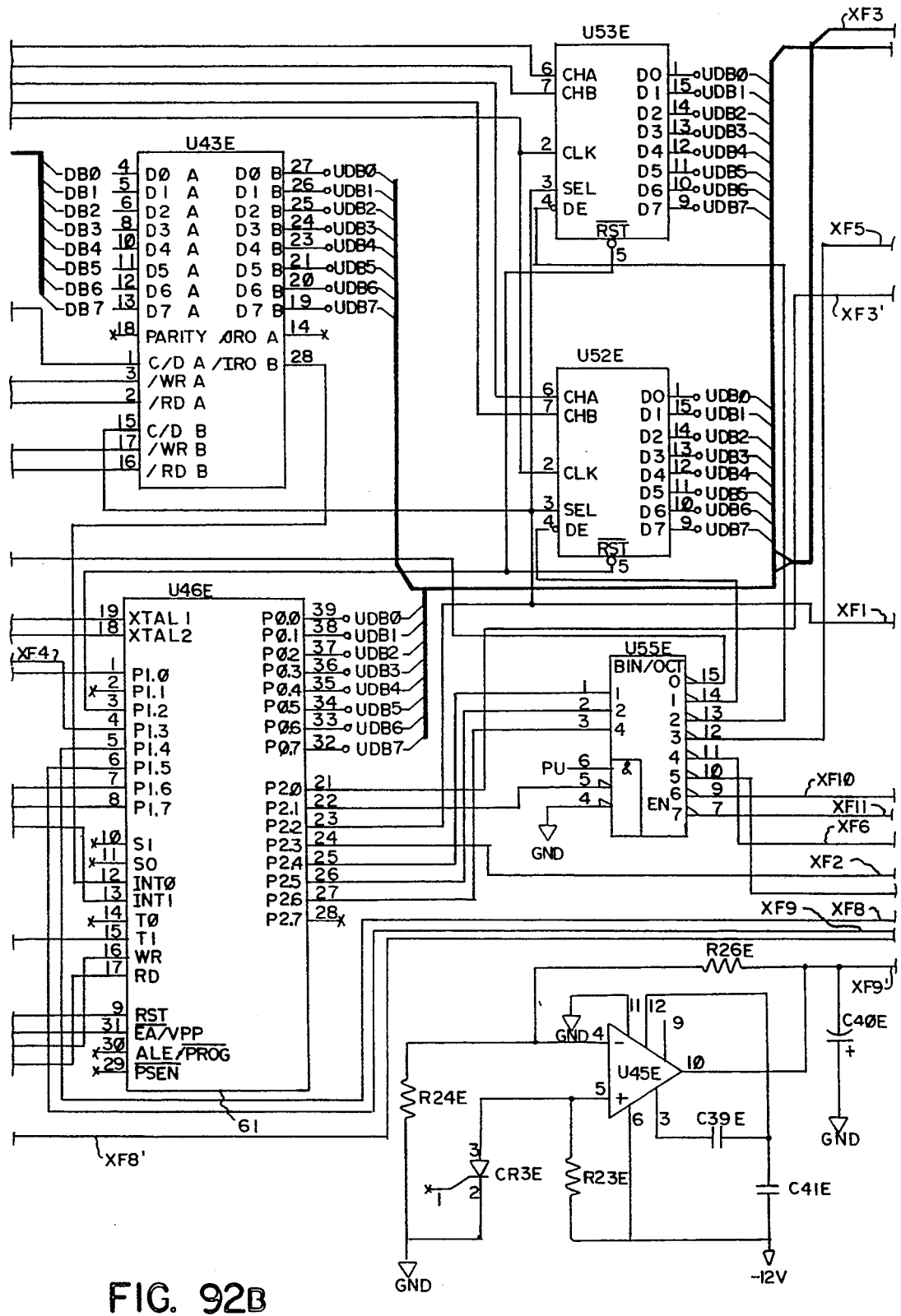
Figure 93A:
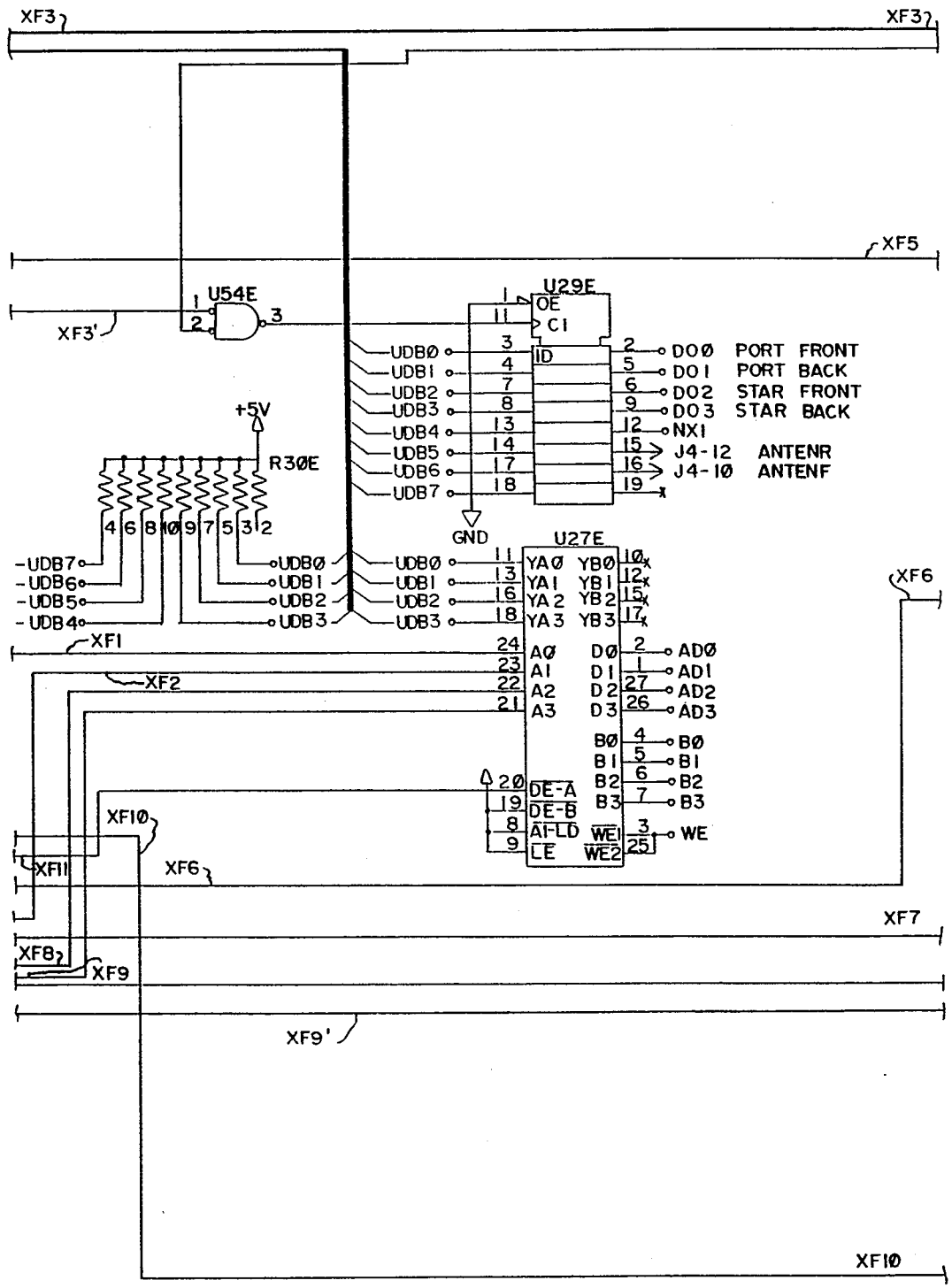
Figure 93B:
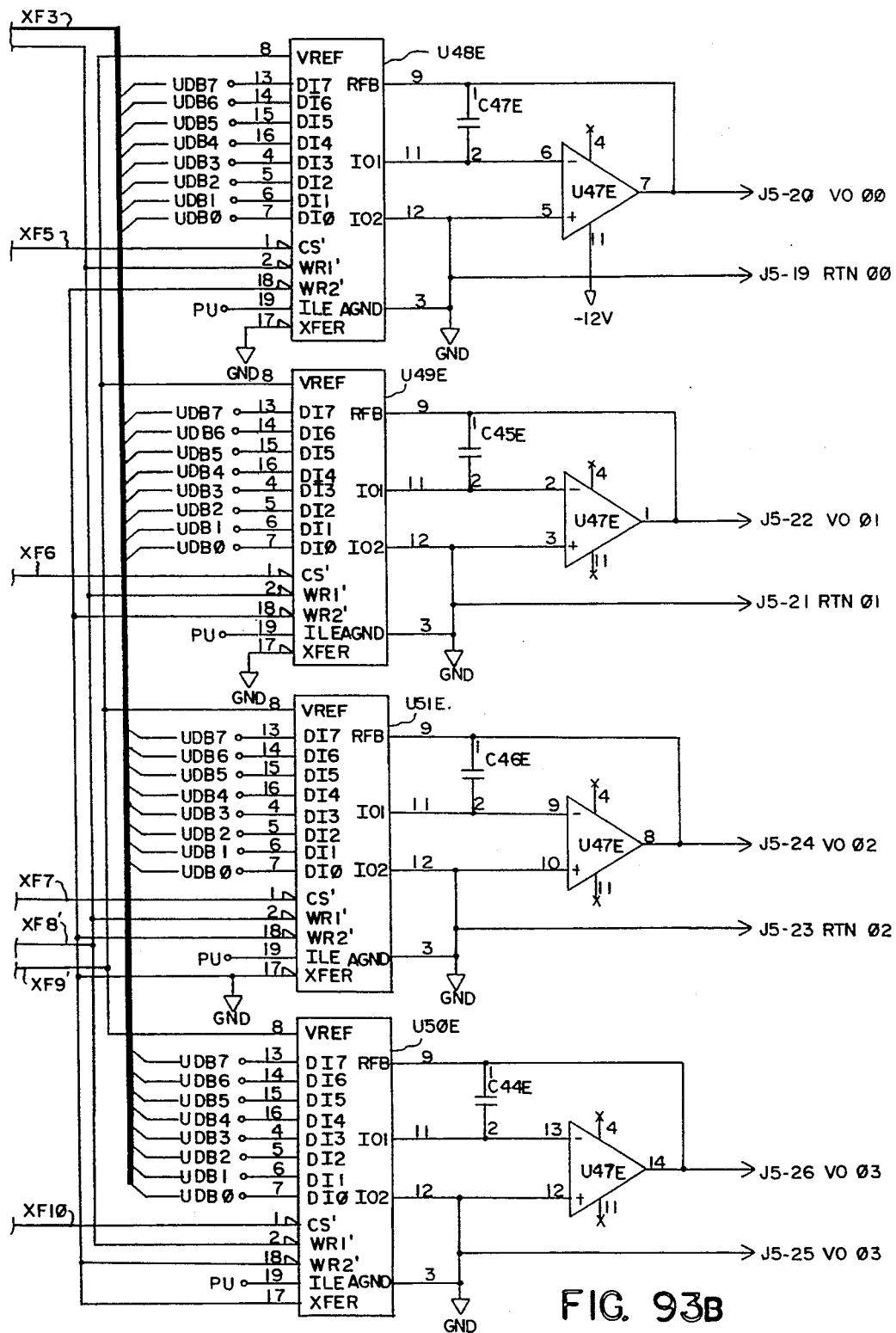
Figure 94A:
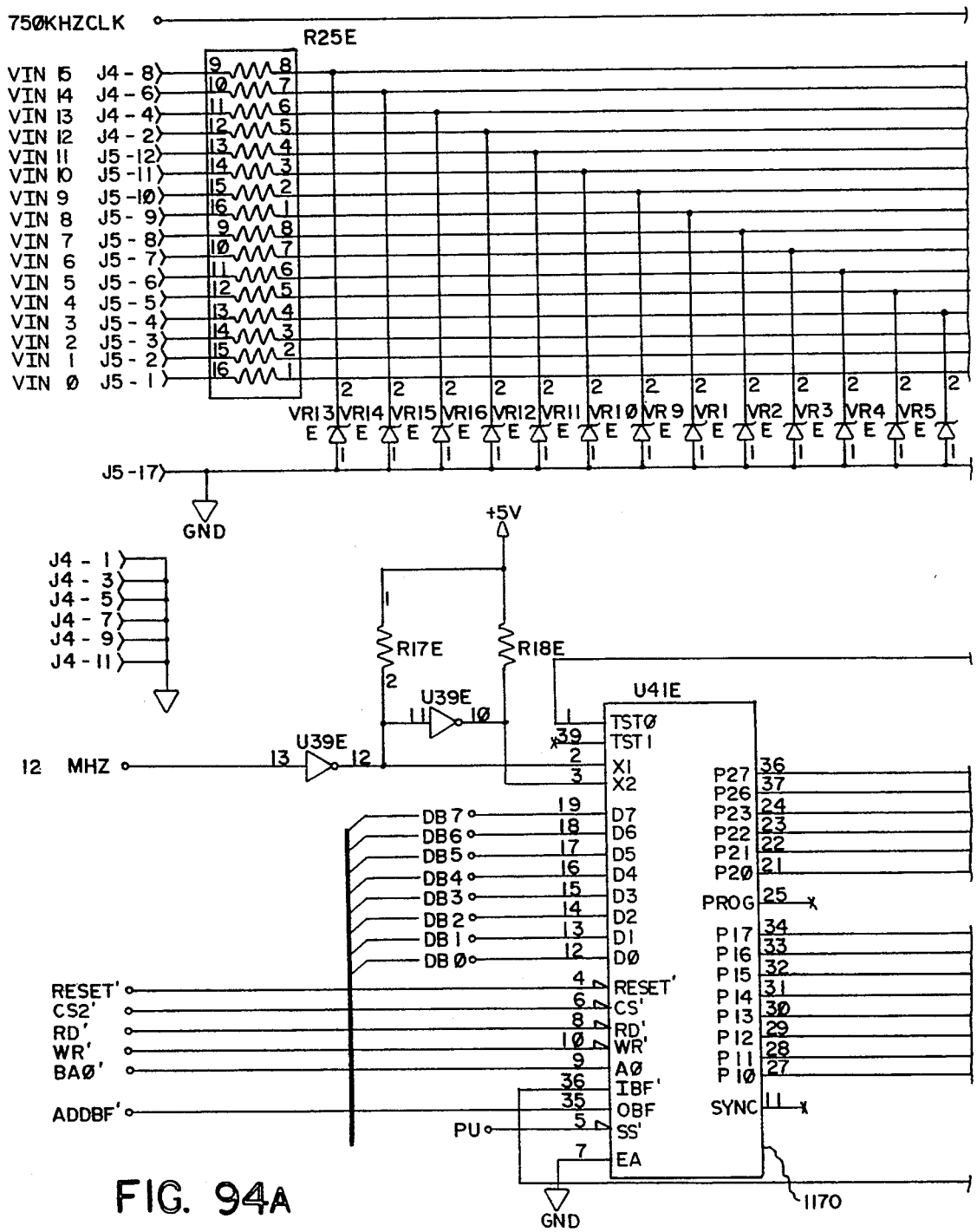
Figure 94B:
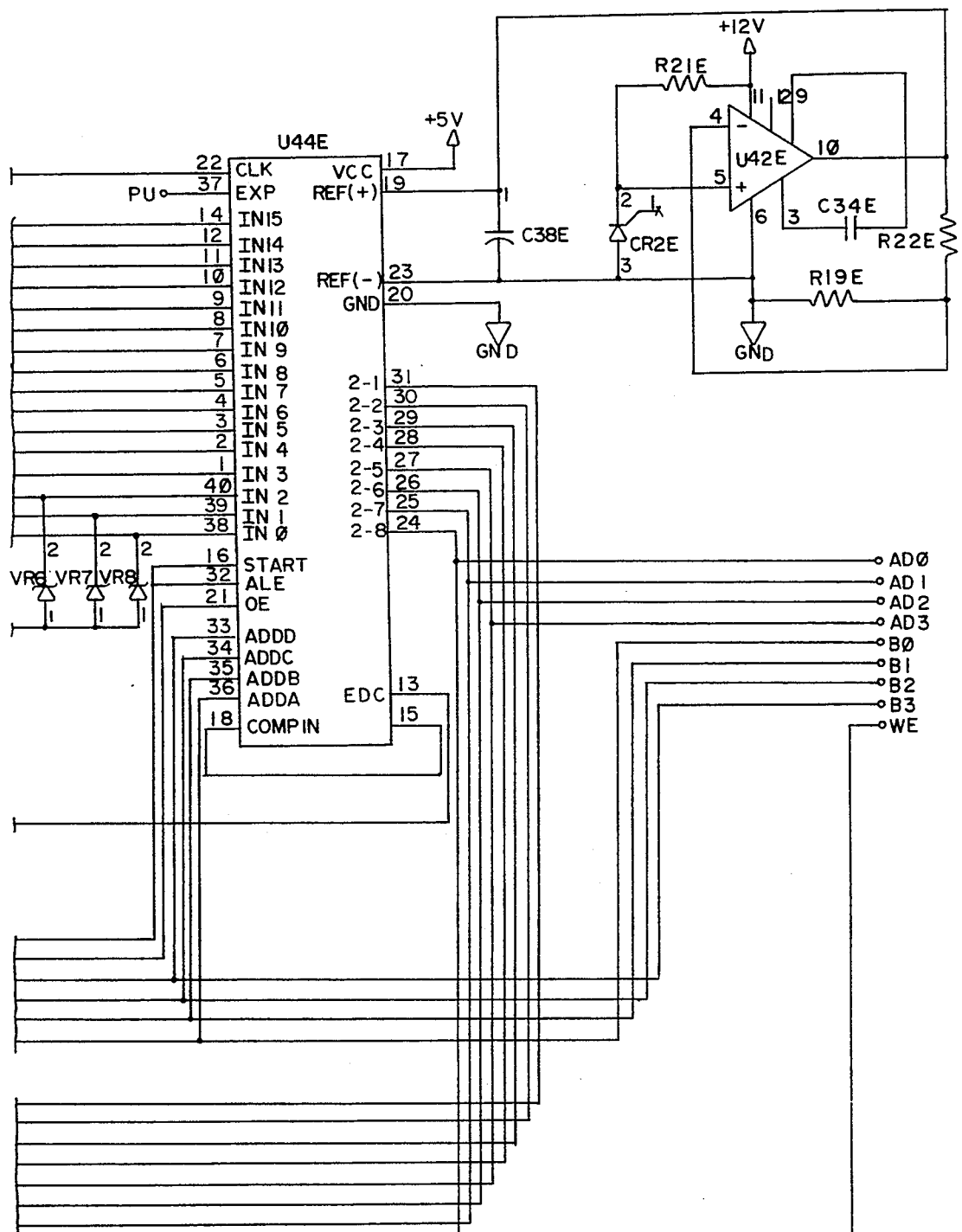

AGV 2A is controlled by a plurality of micro-processors as seen in FIG. 77. Outerloop processor 67 is the master controller, directly communicating across bus 816 to an output processor 1166, an encoder processor 1164, an analog input processor 1170, the motion control processor 61, a serial I/O communications processor 1192 and the central processing unit 810' for SDLC communications chip 812. Bus 816 is referenced by other numerical identifiers within this disclosure; however, it may be considered that all direct bus communications among the processors listed above traverse bus 816. Each of the processors fill an important mission for each AGV 2A. As an example, outerloop processor 67 performs the Kalman calculations in addition to other outerloop calculations and general control of AGV 2A. Outerloop processor is a 186/03 board, commercially available from Intel Corporation.

Output processor 1166 comprises programs which turn on and off AGV 2A lights, change speaker tone and duration, and actuate the AGV 2A beeper. In the current embodiment, output processor 1166 is preferably an 8742 central processing unit, now available from Intel Corporation.

Input processor 1168 provides general processing of input lines such as inputs from vehicle sensors, other than antennas and update markers. As an example, limit switches and emergency stop apparatus provide input signals processed by input processor 1168. In addition, digital discrete inputs which are directed to the main processor, such as signals from discrete digital devices are buffered (temporarily stored in memory), then processed by input processor 1168. In the current embodiment, input processor 1168 is preferably an 8742 central processing unit, now available from Intel Corporation.

Encoder processor 1164 processes encoder signals which provide measurement information for outerloop processor 67, such as signals from gyro 500, fifth wheel 57, and sixth wheel 59 travel information as used in Kalman filter calculations. In the currently preferred embodiment, encoder processor comprises four input channels, three of which are used for the angular and linear travel measurements. The fourth channel is a spare. Encoder processor 1164 is preferably an 8742 central processing unit, available from Intel Corporation.

Analog input processor 1170 provides analog to digital input processing, wherein analog voltage inputs from each tachometer 33, see FIG. 4A, are received, digitized, and monitored, thereby providing a safety backup to operation of motion control processor 61. In addition, analog input processor 1170 receives and processes inputs from a joy stick on a manual vehicle control box whereby each vehicle 2A is manually controllable. Further, analog input processor 1170 receives and processes inputs from obstacle detectors and AGV 2A battery voltage. Analog input processor 1170 is an 8742, available from Intel Corporation.

Motion control processor 61 function and responsibility are described in detail earlier. As seen in FIG. 77, motion control processor 61 receives inputs from encoders 58 as earlier described and provides digital to analog outputs which control operation of drive wheels 8, 10. Motion control processor 61 also provides a controlled "E" stop to bring AGV 2A to rest in a rapid, but not hard-braking stop in a detected emergency. Motion control processor 61 is preferably a DS5000 central processing unit, available from Dallas Semiconductor. A second, more direct, but gated signal path 1184, 1162, 1186 provides direct feedback from analog input processor 1170 to motion control processor 61.

In the currently preferred embodiment, output processor 1166, encoder processor 1164, analog input processor 1170, gated interface 1162 between analog input processor and motion control processor 61, motion control processor 61, and input processor 61 are installed on a single digital I/O board 1194. Detailed circuit schematics and layout orientation of digital I/O board 1194 are provided for completeness of disclosure in FIGS. 86–95. FIG. 86 provides a map showing relative orientation of FIGS. 92 and 93. All components seen in the above referenced figures are commercially available and are used in a manner which is known in the art. Power supply interconnections are removed for clarity of presentation. A list of component types and values, where applicable, for digital I/O board 1194 is found in the following table.

| Number | Name | Value or Type |
|---|---|---|
| U1E | Optical Sw. | |
| U2E | HPRI/Bin | 74LS148 |
| U3E | Latch | 74LS373 |
| U4E | Inv. Amp. | 74LS04 |
| U5E | Expander | P8243 |
| U6E | Amplifier | 74LS125 |
| U7E | Nand | 74LS03 |
| U8E | Clk Gen/Dr | 8284 |
| U9E | Octal Buffer | 74LS540 |
| U10E | CPU | D8742 |
| U11E | CtrDiv16 | 74LS393 |
| U12E | Octal Buffer | 74LS540 |
| U13E | Octal Buffer | 74LS540 |
| U14E | Inv. Amp. | 74LS04 |
| U15E | SRG8 | 74LS1 |
| U16E | Amplifier | 74LS125 |

-continued

| Number | Name | Value or Type |
|---|---|---|
| U17E | Comp. | 74ALS521 |
| U18E | CPU | D8742 |
| U19E | Inv. Amp. | 74LS04 |
| U20E | Nand | 74LS02 |
| U21E | Comp. | 74ALS521 |
| U22E | Expander | P8243 |
| U23E | MultiVibtrs | 74LS122 |
| U24E | OR Gate | 74LS32 |
| U25E | Inv. Amp. | 74LS04 |
| U26E | Octal Buffer | 74LS540 |
| U27E | 16 × 4 Duel ported ram | AM29705A |
| U28E | Octal Buffer | 74LS540 |
| U29E | Latch | 74LS374 |
| U30E | Phase Decoder | HCTL2000 |
| U31E | Nand | 74LS37 |
| U32E | Bin/Oct | 74LS138 |
| U33E | Oct Bus Trscvr | P8287 |
| U34E | Phase Decoder | HCTL2000 |
| U35E | Phase Decoder | HCTL2000 |
| U36E | CPU | D8742 |
| U37E | Nor | LS132 |
| U38E | Phase Decoder | HCTL2000 |
| U39E | Inv. Amp. | 74LS04 |
| U40E | OR Gate | 74LS32 |
| U41E | CPU | D8741 |
| U42E | Diff. Amp. | LM101AJ |
| U43E | BIFIFO | 67C4701 |
| U44E | A/D Converter | ADC0816 |
| U45E | Diff. Amp. | LM101AJ |
| U46E | CPU | DS500032 |
| U47E | Diff. Amp. | LM124 |
| U48E | D/A Converter | DAC0830 |
| U49E | D/A Converter | DAC0830 |
| U50E | D/A Converter | DAC0830 |
| U51E | D/A Converter | DAC0830 |
| U53E | Phase Decoder | HCTL2000 |
| U54E | OR Gate | 74LS32 |
| U55E | Bin/Oct | 74LS138 |
| U57E | Phase Decoder | HCTL2000 |
| Y1E | Oscillator | 24 MHertz |
| R1E | Resistor | 2.2 K Ohms |
| R2E | Resistor | 10 K Ohms |
| R3E | Resistor | 1 K Ohms |
| R4E | Resistor | 620 Ohms |
| R5E | Resistor | 620 Ohms |
| R7E | Resistor | 510 Ohms |
| R8E | Resistor | 510 Ohms |
| R9E | Resistor | 620 Ohms |
| R10E | Resistor | 620 Ohms |
| R11E | Resistor | 30 K Ohms |
| R12E | Resistor | 1 K Ohms |
| R13E | Resistor | 10 K Ohms |
| R14E | Resistor | 2.2 K Ohms |
| R15E | Resistor | 620 Ohms |
| R16E | Resistor | 620 Ohms |
| R17E | Resistor | 620 Ohms |
| R18E | Resistor | 620 Ohms |
| R19E | Resistor | 20K 1% Ohms |
| R21E | Resistor | 7.5 K Ohms |
| R22E | Resistor | 20 K 1% Ohms |
| R23E | Resistor | 7.5 K Ohms |
| R24E | Resistor | 20 K 1% Ohms |
| R25E | Resistor | 1 K Ohms |
| R26E | Resistor | 9.09 K1 Ohms |
| R27E | Resistor | 2.2 K Ohms |
| R28E | Resistor | 2.2 K Ohms |
| R29E | Resistor | 10 K Ohms |
| R30E | Resistor | 10 K Ohms |
| C1E | Capacitor | 1 |
| C3E | Capacitor | .01 μF |
| C19E | Capacitor | 100 μF |
| C29E | Capacitor | 10 μF |
| C34E | Capacitor | 100 pF |
| C35E | Capacitor | 33 pF |
| C36E | Capacitor | 33 pF |
| C38E | Capacitor | 10 μF |
| C39E | Capacitor | 100 pF |
| C40E | Capacitor | 10 μF |
| C41E | Capacitor | 100 pF |
| C44E | Capacitor | 20 pF |

-continued

| Number | Name | Value or Type |
|---|---|---|
| C45E | Capacitor | 20 pF |
| C46E | Capacitor | 20 pF |
| C47E | Capacitor | 20 pF |
| C48E | Capacitor | 100 μF |
| E1E | Jumper | |
| E2E | Jumper | |
| E3E | Jumper | |
| E5E | Jumper | |
| E6E | Jumper | |
| E7E | Jumper | |
| E8E | Jumper | |
| CR1E | Diode | 1N914 |
| CR2E | Diode | LM336BZ |
| CR3E | Diode | LM329BZ |
| CR4E | Diode | 1N914 |
| VR1E | Diode | 1N4733 |
| VR2E | Diode | 1N4733 |
| VR3E | Diode | 1N4733 |
| VR4E | Diode | 1N4733 |
| VR5E | Diode | 1N4733 |
| VR6E | Diode | 1N4733 |
| VR7E | Diode | 1N4733 |
| VR8E | Diode | 1N4733 |
| VR9E | Diode | 1N4733 |
| VR10E | Diode | 1N4733 |
| VR11E | Diode | 1N4733 |
| VR12E | Diode | 1N4733 |
| VR13E | Diode | 1N4733 |
| VR14E | Diode | 1N4733 |
| VR15E | Diode | 1N4733 |
| VR16E | Diode | 1N4733 |

Two central processing units are installed on the vehicle 2A communications board 824. As seen FIG. 77, communications board 824 comprises serial I/O communications processor 1192, SDLC communications processor 810', SDLC chip 812, and radio data recorder 820, and all related interfacing logic and other components.

Serial I/O communication processor 1192 provides a communications interface for all AGV 2A communications except for intercommunications between AGVC 13 and AGV 2A. Serial I/O communications processor 1192 also comprises an interface 1176 to update marker system processor 482, wherefrom update marker data, processed as earlier described, is received or transferred to outerloop processor 67. In the currently preferred embodiment, serial I/O communications processor is a DS5000, available from Dallas Semiconductor. Update marker system 482 is a DS5000 central processing unit available from Dallas Semiconductor.

The components and function of SDLC central processing unit (CPU 810') is described in detail earlier. CPU 810' is preferably an 8742 central processing unit, available from Intel Corporation.

Detailed schematics of communications board 824 are seen in FIGS. 78–85B. All components are commercially available and are used in a manner which is known and in the art. Note that some earlier disclosed circuits are repeated therein. For example, FIG. 85 comprises components and circuits found in radio data recorder 820, earlier seen in FIG. 74. Power supply interconnections are removed for clarity of presentation. A list of component types and values, where appropriate, for communications board 824 is found in the following table.

| Number | Name | Value or Type |
|---|---|---|
| U1D | Diff. Amp. | TL072 |
| U2D | Diff. Amp. | LM339 |

-continued

| Number | Name | Value or Type |
|---|---|---|
| U3D | Amplifier | DS1489 |
| U4D | CtrDiv16 | 74LS393 |
| U5D | CtrDiv16 | 74LS393 |
| U6D | Clk Gen./Dr. | 8284 |
| U7D | Nand | 74LS00 |
| U8D | Inv. Amp. | 74LS04 |
| U9D | SRG8 | 74LS164 |
| U10D | Amplifier | 74LS125 |
| U11D | Power Reg. | LM317T |
| U12D | Inv. Amp. | DS1488 |
| U13D | Nand | 74LS00 |
| U14D | Nand | 74LS02 |
| U15D | Drvr/Rcvr | 75179B |
| U16D | Inv. Amp. | 74LS04 |
| U17D | Nor | 74LS32 |
| U18D | Comp. | 74ALS521 |
| U19D | Amplifier | 3486 |
| U20D | Amplifier | 3487 |
| U21D | CPU | DS500032 |
| U22D | Bin/Oct | 74LS138 |
| U23D | Comp. | 74ALS521 |
| U24D | Inv. Amp. | 74LS04 |
| U25D | SDLC chip | 82530 |
| U26D | BIFIFO | 67C4701 |
| U27D | Nand | 74LS132 |
| U28D | OR Gate | 74LS32 |
| U29D | Oct Bus Trscvr | P8287 |
| U30D | SDLC Comm. | 8273 |
| U31D | CPU | D8742 |
| U32D | Inv. Amp. | 7406 |
| U33D | Counter | 74HC4040 |
| U34D | Inv. Amp. | 7406 |
| U35D | Buffer | 74LS373 |
| U36D | Nand | 74LS03 |
| U37D | Nand | LS132 |
| U38D | HPRT/Bin | 74LS148 |
| U39D | Amplifier | 74LS125 |
| U40D | Bin/Oct | LS123 |
| U41D | CtrDiv16 | 74LS393 |
| U42D | SRG8 | 74LS164 |
| U43D | Latch | 74LS374 |
| U44D | Eprom | 27128 |
| U45D | D Flip Flop | 74LS74 |
| U46D | Inv. Amp. | 74LS04 |
| U47D | Nand | 74LS00 |
| U48D | B-Bit D/A | DAC0808 |
| U49D | Diff. Amp. | LE347 |
| U50D | Diff. Amp. | LE347 |
| U51D | Diff. Amp. | LH0D21CK |
| U52D | Diff. Amp. | LH0021CK |
| Q1 | Transistor | 2N3904 |
| Q2 | Transistor | 2N2222 |
| Y1D | Oscillator | 24 MHertz |
| Y2D | Oscillator | 12 MHertz |
| Y3D | Oscillator | 4.9152 MHZ |
| E1D | Switch | SPDT |
| E2D | Switch | SPDT |
| E3D | Switch | SPDT |
| E4D | Switch | SPDT |
| E5D | Switch | SPDT |
| E6D | Switch | SPDT |
| E7D | Switch | SPDT |
| E13D | Switch | SPDT |
| TP1D | Status Ind. | LED |
| TP2D | Status Ind. | LED |
| TP3D | Status Ind. | LED |
| TP4D | Status Ind. | LED |
| TP5D | Status Ind. | LED |
| TP6D | Status Ind. | LED |
| TP7D | Status Ind. | LED |
| TP8D | Status Ind. | LED |
| TP10D | Status Ind. | LED |
| TP12D | Status Ind. | LED |
| TP13D | Status Ind. | LED |
| C1D | Capacitor | 100 pF |
| C2D | Capacitor | .001 µF |
| C3D | Capacitor | .001 µF |
| C6D | Capacitor | .1 Uf |
| C7D | Capacitor | .01 µF |
| C17D | Capacitor | 33 pF |
| C18D | Capacitor | 33 pF |

-continued

| Number | Name | Value or Type |
|---|---|---|
| C26D | Capacitor | 15 µF |
| C32D | Capacitor | .01 µF |
| C35D | Capacitor | .01 µF |
| C36D | Capacitor | .01 µF |
| C37D | Capacitor | .01 µF |
| C40D | Capacitor | .1 µF |
| C41D | Capacitor | .01 µF |
| C42D | Capacitor | .01 µF |
| C43D | Capacitor | 47 pF |
| C44D | Capacitor | .01 µF |
| C49D | Capacitor | 3000 pF |
| C51D | Capacitor | .1 µF |
| C52D | Capacitor | 4700 pF |
| C53D | Capacitor | 3000 pF |
| C54D | Capacitor | .1 µF |
| CR1D | Diode | 1N914 |
| CR3D | Diode | 1N914 |
| R1D | Resistor | 10 K Ohms |
| R2D | Resistor | 3.3 K Ohms |
| R3D | Resistor | 10 K Ohms |
| R4D | Resistor | 10 K Ohms |
| R5D | Resistor | 5.1 K Ohms |
| R6D | Resistor | 560 K Ohms |
| R7D | Resistor | 30 K Ohms |
| R8D | Resistor | 10 K Ohms |
| R9D | Resistor | 3.3 K Ohms |
| R10D | Resistor | 510 Ohms |
| R11D | Resistor | 510 Ohms |
| R12D | Resistor | 2.2 K Ohms |
| R13D | Resistor | 2.2 K Ohms |
| R14D | Resistor | 100 Ohms |
| R15D | Resistor | 2.2 K Ohms |
| R16D | Resistor | 2.2 K Ohms |
| R17D | Resistor | 620 Ohms |
| R18D | Resistor | 620 Ohms |
| R19D | Resistor | 2.2 K Ohms |
| R20D | Resistor | 2.2 K Ohms |
| R21D | Resistor | 1 K Ohms |
| R22D | Resistor | 100 Ohms |
| R23D | Resistor | 2.2 K Ohms |
| R24D | Resistor | 2.2 K Ohms |
| R25D | Resistor | 100 Ohms |
| R26D | Resistor | 2.2 K Ohms |
| R27D | Resistor | 2.2 K Ohms |
| R28D | Resistor | 2.2 K Ohms |
| R29D | Var. Resistor | 10 K Ohms |
| R30D | Resistor | 100 Ohms |
| R31D | Resistor | 10 K Ohms |
| R32D | Resistor | 510 Ohms |
| R33D | Resistor | 1.3 K 1% Ohms |
| R34D | Resistor | 100 Ohms |
| R35D | Resistor | 4.3 K Ohms |
| R36D | Resistor | 5.1 K Ohms |
| R37D | Resistor | 3.3 K Ohms |
| R38D | Resistor | 30 K Ohms |
| R39D | Resistor | 200 1% Ohms |
| R40D | Resistor | 5 K Ohms |
| R41D | Resistor | 3.3 K Ohms |
| R42D | Resistor | 10 K Ohms |
| R43D | Resistor | 12 K Ohms |
| R44D | Resistor | 3.3 K Ohms |
| R45D | Resistor | 270 Ohms |
| R46D | Resistor | 270 Ohms |
| R47D | Resistor | 5.6 K Ohms |
| R48D | Resistor | 1.5 K Ohms |
| R49D | Resistor | 2 K Ohms |
| R50D | Resistor | 2.7 K Ohms |
| R51D | Resistor | 10 K Ohms |
| R52D | Resistor | 2 K Ohms |
| R53D | Resistor | 10 K Ohms |
| R54D | Resistor | 5.1 K Ohms |
| R55D | Resistor | 10 K Ohms |
| R56D | Resistor | 5.6 K Ohms |
| R57D | Resistor | 1 Ohms |
| R58D | Resistor | 10 K Ohms |
| R59D | Resistor | 1 K Ohms |
| R60D | Resistor | 1 K Ohms |
| R61D | Resistor | 10 K Ohms |
| R62D | Resistor | 5.6 K Ohms |
| R63D | Resistor | 1 K Ohms |
| R64D | Resistor | 10 K Ohms |

-continued

| Number | Name | Value or Type |
|---|---|---|
| R65D | Resistor | 7.5 K Ohms |
| R66D | Resistor | 1 K Ohms |
| R67D | Resistor | 680 Ohms |
| R68D | Resistor | 470 Ohms |
| R69D | Resistor | 1 K Ohms |
| R70D | Resistor | 75 K Ohms |
| R71D | Resistor | 10 K Ohms |
| R72D | Resistor | 2.7 K Ohms |
| R73D | Resistor | 1 K Ohms |
| R74D | Resistor | 1 K Ohms |
| R75D | Resistor | 2 K Ohms |
| R77D | Resistor | 2 K Ohms |
| R76D | Resistor | 10 K Ohms |

A listing of programs used in each of the above described AGV 2A central processing units is provided in a table, entitled summary of AGV 2A Software, found below. Computer languages used comprise Intel C-86 and Intel Assembler in the outerloop processor, other languages used are seen in the AGV 2A Software table. The operating system for outerloop processor 67 is the AMX86, revision 1.0 from Kadak Products, Ltd., Vancouver, B.C., Canada (copyright 1983, 1984). The AMX operating system has been modified by the inventors to support the 8087 co-processor in the multi-tasking environment and to provide easier interfacing between the "C" language compiler and AMX86. Source of the AMX86 compiler, as adapted by the inventors, is not included because prior agreements between Eaton Kenway and Kadak Products, Inc. prohibit Eaton Kenway from publishing any AMX86 source code. Eaton Kenway can, only upon notification from Kadak that the requester is licensed and thereby qualified by Kadak to have access to the AMX86 system, provide a copy of the modified AMX86 code.

Following the AGV 2A Software table, a listing of each software module used in the currently preferred embodiment is provided. The listings are paginated as indicated in the AGV 2A Software table. Also found in the AGV 2A Software table are file names, file types, assemblers or compilers used (if applicable), and the basic function of the software.

| File Name | First Page | File Type | Assembler or Compiler | Function |
|---|---|---|---|---|
| ANIN.ASM | -1-1 | P | 8742 | ANALOG INPUT PROCESSOR 1170 |
| CNT.ASM | -2-1 | P | 8742 | ENCODER PROCESOR 1164 |
| COM.ASM | -3-1 | P | 8742 | SDLC PROCESSOR 810' |
| DSCOMM.C | -4-1 | P | C | SERIAL I/O COMMUNICATIONS 1192 |
| DIN.ASM | -5-1 | P | 8742 | INPUT PROCESSOR 1168 |
| DOUT.ASM | -6-1 | P | 8742 | OUTPUT PROCESSOR 1166 |
| MCP.C | -7-1 | P | C | MOTION CONTROL PROCESSOR 61 |
| MCP_CONK | -8-1 | F | — | MOTION CONTROL PROCESSOR 61 |
| UMSLNG_4.C | -9-1 | P | C | U.M.S. PROCESSOR 482 |
| CIA_PS5.A | -10-1 | P | 8742 | GUIDEWIRE PROCESSOR(NOT SHOWN) |
| DS5_DEF.A | -11-1 | P | C | DS5000(S) IN CIRCUIT EMULATOR |
| The following programs and files are used in OUTERLOOP PROCESSOR 67: | | | | |
| V2START.ASM | -12-1 | P | 8086 | OPERATING SYSTEM START-UP |
| V3_186.ASM | -13-1 | P | 8086 | SPECIAL START-UP CODE |
| V4COMT.ASM | -14-1 | P | 8086 | SDLC COMMUNICATION |
| V41AMX.ASM | -15-1 | P | 8086 | INIT. FOR AMX86 CODE |
| V4_INIT.ASM | -16-1 | P | 8086 | INTERFACE DRIVERS |
| V4_8274.ASM | -17-1 | P | 8086 | SERIAL PORT DRIVER(186BD) |
| EK2 | -18-1 | P | C | INTEL INTERFACING |
| EK_DUMMY.C | -19-1 | P | C | MORE INTEL INTERFACING |
| KALMAN.C | -20-1 | P | C | KALMAN FILTER |
| MOVE2WAY.C | -21-1 | P | C | VEHICLE DRIVER |
| V4ACTPRO.C | -22-1 | P | C | VEHICLE SYSTEM SUBR. |
| V4CMDT.C | -23-1 | P | C | AGVC COMMAND PROCESSOR |
| V4DSPMEM.C | -24-1 | P | C | HAND CONTRLLR DIAGNOSTICS |
| V4HCOMMN.K | -25-1 | F | — | HAND CONTROLLER CONSTANTS |
| V4INIT_D.K | -26-1 | F | — | INTERFACE DEFINITION FILE |
| V4LIFT.C | -27-1 | P | C | LIFT SUPPORT SUBROUTINES |
| V4LIFTT.C | -28-1 | P | C | LIFT TASK CONTROL |
| V4MCSGS.K | -29-1 | F | — | AGVC MESS. DEF. CONSTANTS |
| V4MOTION.K | -30-1 | F | — | MOTION CONTROL CONSTANTS |
| V4MV_WIR.K | -31-1 | P | C | WIRE DRIVER SUBROUTINES |
| V4VARS.K | -32-1 | F | — | MAJOR VEHICLE VARIABLES |
| V4HCU_AA.C | -33-1 | P | C | HAND CONTROLLER PROGRAM |
| V4HCU_CC.C | -34-1 | P | C | HAND CONTROLLER PROGRAM |
| V4MCPEMU.C | -35-1 | P | C | INNERLOOP PROCESSOR CONTROL |
| V4MOUT.C | -36-1 | P | C | MOVE TASK CONTROL |
| V4TMHD.C | -37-1 | P | C | HAND CONTR. SERIAL I/O |
| V4TRNT.C | -38-1 | P | C | MOTION TRANSLATION COMMAND INTERPRETER |
| V4VERS.C | -39-1 | P | C | VEHICLE PROGRAM STATUS INTERPRETER | where:
P represents a program file.
F represents a constant or variable file.
C represents "C" compiler used, otherwise xxxx indicates asembler used.

where:
P represents a program file.
F represents a constant or variable file.
C represents "C" compiler used, otherwise xxxx indicates assembler used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A downwardly compatible automated guided vehicle system wherein automatic guided vehicles at different times traverse a plurality of types of guidepaths, said system comprising:
   at least one guidepath marked only by a guidewire;
   at least one other guidepath marked only by widely dispersed update markers;
   at least one automated guided vehicle comprising means for navigating and guiding over the guidewire marked guidepath and for navigating and guiding over the guidepath marked only by update markers and which at different times traverses said at least one guidepath marked only by a guidewire and said at least one other guidepath of marked only by update markers of said plurality of guidepaths;
   central means for automatically planning and controlling activity of the at least one automated guided vehicle;
   means for sending and receiving two-way communications comprising the same type and rate of data presentation, independent of the type of guidepath traveled by the vehicle, between the central means and the at least one automated guided vehicle.

2. A downwardly compatible automated guided vehicle system according to claim 1 further comprising at least one other automated guided vehicle which traverses only one type of guidepath.

3. A downwardly compatible automated guided vehicle system according to claim 2 wherein the at least one other guided vehicle comprises a vehicle which only traverses the at least one guidepath marked by a guidewire.

4. A downwardly compatible automated guided vehicle system according to claim 1 wherein the at least one automated guided vehicle comprises at least two automated guided vehicles.

5. A downwardly compatible automated guided vehicle system according to claim 4 wherein the central means and the at least two automated guided vehicles comprise means for communicating among the central means and the at least two automated guided vehicles.

6. A downwardly compatible automated guided vehicle system according to claim 1 wherein the at least one automatic guided vehicle comprises two-way wireless vehicle communications means.

7. A downwardly compatible automated guided vehicle system according to claim 1 wherein the communicating means comprise two-way guidewire communication means and two-way wireless communication means.

8. A downwardly compatible automated guided vehicle system according to claim 1 wherein the communicating means comprise guidewire and wireless transceiving means in communication with the at least one vehicle, the transceiving means comprising means one set of which is located on said vehicle and one set which is at said center means for communicating the same control information with compatible characteristics along the guidewire and via wireless transmission between the central means and the at least one vehicle.

9. A downwardly compatible automated guided vehicle system according to claim 8 wherein the means for communicating the same control information comprise means for cognitively transmitting and receiving data along the guidewire and via the wireless transmission at substantially the same high baud rate.

10. A downwardly compatible automated guided vehicle system according to claim 9 wherein the data transmitting and receiving means comprise means for sending useable data at rates up to 9600 baud.

11. A downwardly compatible automated guided vehicle system according to claim 10 wherein the sending means has a bandpass frequency in the range of 3000 Hertz.

12. A downwardly compatible automated guided vehicle system according to claim 8 wherein the central means comprise means for receiving, automatically processing, prioritizing and delaying processing of some signals in favor of other signals.

13. A downwardly compatible automated guided vehicle system according to claim 1 wherein the central means comprise means for selectively issuing communication signals comprising guidewire signals comprising vehicle motion commands and wireless signals comprising vehicle motion commands to each at least one vehicle.

14. A downwardly compatible automated guided vehicle system according to claim 13 wherein the at least one automated guided vehicle comprises means for receiving guidewire and wireless signals whereby motion commands are received for processing at the at least one vehicle.

15. A downwardly compatible automated guided vehicle system according to claim 1 wherein the at least one vehicle comprises means for receiving target bearing and location data from the central means and means for adjusting vehicle bearing in order to drive the at least one automated guided vehicle toward a target.

16. A downwardly compatible automated guided vehicle system according to claim 1 wherein the at least one automated guided vehicle comprises means for accessing floor coordinates means whereby an estimate of each current location of the at least one automated guided vehicle is known to the at least one vehicle.

17. A downwardly compatible automated guided vehicle system according to claim 16 wherein the at least one automated guided vehicle further comprises means for calculating a path whereby the at least one vehicle is self-guided to reach a predetermined floor destination at a predetermined bearing.

18. A downwardly compatible automated guided vehicle system according to claim 1 wherein the at least one automated guided vehicle comprises at least one means for redundantly determining the bearing of the at least one automated guided vehicle relative to known guidepath sites and headings.

19. A downwardly compatible automated guided vehicle system according to claim 18 wherein the at least one redundant bearing determining means comprises an inertial platform means.

20. A downwardly compatible automated guided vehicle system according to claim 19 wherein the inertial platform means comprise tuning fork means.

21. A downwardly compatible automated guided vehicle system according to claim 20 wherein the tuning fork means comprise means for measuring angular rate of change of direction of the at least one automated guided vehicle and correcting for a drift rate which produces an error that if left uncorrected makes the tuning fork means unusable for determining the bearing of the at least one automated guided vehicle.

22. A downwardly compatible automated guided vehicle system according to claim 1 wherein the system further comprises at least one guidepath marked by localized passive guidewire means.

23. A downwardly compatible automated guided vehicle system according to claim 22 wherein the at least one guidepath marked by localized passive guidewire means comprises a temporary guidepath.

24. A downwardly compatible automated guided vehicle system according to claim 1 further comprising at least one automated guided vehicle which operates at different times over guidepaths marked by guidewires, update markers and passive guidewire means.

25. A downwardly compatible automated guided vehicle system according to claim 1 further comprising at least two incompatible automated guided vehicles which are operated at a common floor area and which each traverse only one type of guidepath.

26. A method by which automatic guided vehicles are controlled over a floor area in an automated guided vehicle system comprising the steps of:
providing an array of floor disposed marked paths comprising at least one path marked only by a guidewire and at least one path marked only by widely dispersed coordinate markers and at least two automatic guided vehicles;
selectively issuing communication signals from a control center, said signals comprising at least guidewire signals comprising vehicle motion commands and wireless signals comprising vehicle motion commands;
receiving said guidewire signals including the vehicle motion commands at a first automatic guided vehicle which is controlled by data transmitted through a guidewire;
receiving said wireless signals including the vehicle motion commands at a second automatic guided vehicle which is controlled by data transmitted by wireless transmitting means.

27. A method according to claim 26 further comprising the further steps of issuing communicating wireless signals from at least one automatic guided vehicle to the control center.

28. A method according to claim 26 further comprising the further steps of prioritizing and delaying receipt of some signals in favor of other signals.

29. A method according to claim 26 wherein steps of issuing wireless signals and guidewire signals comprise issuing the signals at substantially the same digital data rate.

30. A method according to claim 29 further comprising a precisely positioning step which comprises using vehicle power as an energy source for activating localized passive guidewire signals.

31. A method according to claim 26 comprising the following additional steps:
adding at least one update marker guidepath to the system;
providing at least one automatic guided vehicle which operates at one time along the guidewire guidepath and at another time along the update marker guidepath whereby the method of controlling automatic guided vehicles over a floor area is downwardly compatibly expanded to comprise inclusion of at least one guidepath marked exclusively by update markers.

32. A method according to claim 26 wherein the selectively issuing step comprises sending the same message over guidewire and wireless communications means.

33. A method according to claim 26 wherein the selectively issuing step comprises sending from the control center to said vehicle a 9600 baud data rate, transmission and reception of said baud rate being accomplished by radio transmitting and receiving means having a bandpass frequency of 3000 Hertz.

34. A method for communicating between automated guided vehicles and an automated guided vehicle control system, comprising the steps of:
selectively issuing communication signals from a control center, said signals comprising at least guidewire signals and wireless signals;
receiving the guidewire signals at at least a first automatic guided vehicle, said guidewire signals comprise a digital data string which restricts travel of the at least first vehicle to traversing guidewire guidepaths;
receiving the wireless signals at at least a second automatic guided vehicle, said wireless signals comprise the same content and format of said digital data string, which causes the at least second vehicle to travel to a predetermined destination.

35. A method according to claim 34 further comprising the step of communicating a guidewire signal from the at least first vehicle to the control center.

36. A method according to claim 34 further comprising the step of communicating wireless signals from the at least second vehicle to the control center.

37. A method according to claim 34 comprising the further step of:
communicating substantially the same form of digital data strings bidirectionally between each vehicle and the control center.

* * * * *